US012521440B2

(12) United States Patent
Huo et al.

(10) Patent No.: US 12,521,440 B2
(45) Date of Patent: *Jan. 13, 2026

(54) DEGRADATION OF BRUTON'S TYROSINE KINASE (BTK) BY CONJUGATION OF BTK INHIBITORS WITH E3 LIGASE LIGAND AND METHODS OF USE

(71) Applicant: BeOne Medicines I GmbH, Basel (CH)

(72) Inventors: Changxin Huo, Beijing (CN); Hexiang Wang, Beijing (CN); Ruipeng Qi, Beijing (CN); Zhiwei Wang, Beijing (CN); Huaqing Liu, Beijing (CN)

(73) Assignee: BeOne Medicines I GmbH, Basel (CH)

(*) Notice: Subject to any disclaimer, the term of this patent is extended or adjusted under 35 U.S.C. 154(b) by 0 days.

This patent is subject to a terminal disclaimer.

(21) Appl. No.: 19/048,594

(22) Filed: Feb. 7, 2025

(65) Prior Publication Data

US 2025/0205345 A1 Jun. 26, 2025

Related U.S. Application Data

(63) Continuation of application No. 18/758,176, filed on Jun. 28, 2024, which is a continuation of application No. PCT/CN2022/143837, filed on Dec. 30, 2022.

(30) Foreign Application Priority Data

Dec. 30, 2021 (WO) ................ PCT/CN2021/142804

(51) Int. Cl.
A61K 47/55 (2017.01)
A61K 47/54 (2017.01)

(52) U.S. Cl.
CPC ............ *A61K 47/55* (2017.08); *A61K 47/545* (2017.08)

(58) Field of Classification Search
CPC .................................................... A61K 47/55
See application file for complete search history.

(56) References Cited

U.S. PATENT DOCUMENTS

| 9,630,968 | B1 | 4/2017 | Lapierre |
| 10,280,169 | B2 | 5/2019 | Hopkins |
| 10,647,698 | B2 | 5/2020 | Crew |
| 12,172,992 | B2 * | 12/2024 | Bian ........................ A61P 35/02 |
| 2016/0045607 | A1 | 2/2016 | Crew |
| 2016/0096834 | A1 | 4/2016 | Gaillard |
| 2017/0008904 | A1 | 1/2017 | Crew |
| 2018/0050021 | A1 | 2/2018 | Ciulli |
| 2018/0072711 | A1 | 3/2018 | Crew |
| 2018/0194762 | A1 | 7/2018 | Atallah |
| 2019/0262458 | A1 | 8/2019 | Gray |
| 2019/0276459 | A1 | 9/2019 | Crews |
| 2020/0121684 | A1 | 4/2020 | Crews |
| 2020/0239430 | A1 | 7/2020 | Desantis |
| 2020/0297725 | A1 | 9/2020 | Crews |
| 2025/0041429 | A1 | 2/2025 | Lee |

FOREIGN PATENT DOCUMENTS

| CN | 106459002 | | 2/2017 |
| WO | 2002020740 | A2 | 3/2002 |
| WO | 2014064131 | A2 | 5/2014 |
| WO | 2014108452 | A1 | 7/2014 |
| WO | 2016146985 | A1 | 9/2016 |
| WO | 2016149668 | A1 | 9/2016 |
| WO | 2016149989 | A1 | 9/2016 |
| WO | 2016197032 | A1 | 12/2016 |
| WO | 2016197114 | A1 | 12/2016 |
| WO | 2017011590 | A1 | 1/2017 |
| WO | 2017030814 | A1 | 2/2017 |
| WO | 2017079267 | A1 | 5/2017 |
| WO | 2017182418 | A1 | 10/2017 |
| WO | 2017197036 | A1 | 11/2017 |
| WO | 2017197046 | A1 | 11/2017 |
| WO | 2017197051 | A1 | 11/2017 |
| WO | 2017197056 | A1 | 11/2017 |
| WO | 2017201449 | A1 | 11/2017 |
| WO | 2017211924 | A1 | 12/2017 |
| WO | 2018033556 | A1 | 2/2018 |
| WO | 2018035080 | A1 | 2/2018 |
| WO | 2018071606 | A1 | 4/2018 |
| WO | 2018102725 | A1 | 6/2018 |
| WO | 2018191577 | A1 | 10/2018 |
| WO | 2018237026 | A1 | 12/2018 |
| WO | 2019127008 | A1 | 7/2019 |
| WO | 2019140387 | A1 | 7/2019 |
| WO | 2019148150 | A1 | 8/2019 |
| WO | 2019177902 | A1 | 9/2019 |
| WO | 2019186343 | A1 | 10/2019 |
| WO | 2019186358 | A1 | 10/2019 |

(Continued)

OTHER PUBLICATIONS

Ju, Organic Process Research and Development, 2014, vol. 18(6), pp. 827-830.*
Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
Registry/Zregistry (CAS Registrysm) Sep. 2016 2 pages.*

(Continued)

*Primary Examiner* — Nizal S Chandrakumar
(74) *Attorney, Agent, or Firm* — Foley & Lardner LLP

(57) ABSTRACT

Disclosed herein are novel bifunctional compounds formed by conjugating BTK inhibitor moieties with E3 ligase Ligand moieties, which function to recruit targeted proteins to E3 ubiquitin ligase for degradation, and methods of preparation and uses thereof.

5 Claims, No Drawings

(56) References Cited

FOREIGN PATENT DOCUMENTS

| WO | 2019201123 |    | 10/2019 |
|----|------------|----|---------|
| WO | 2019222101 | A1 | 11/2019 |
| WO | 2020142228 | A1 | 7/2020  |
| WO | 2020163823 | A2 | 8/2020  |
| WO | 2020167518 |    | 8/2020  |
| WO | 2020198711 | A1 | 10/2020 |
| WO | 2020201080 | A1 | 10/2020 |
| WO | 2020239103 | A1 | 12/2020 |
| WO | 2020263935 |    | 12/2020 |
| WO | 2021053495 |    | 3/2021  |
| WO | 2021178920 | A1 | 9/2021  |
| WO | 2021180103 |    | 9/2021  |
| WO | 2021219070 |    | 11/2021 |
| WO | 2022268052 |    | 12/2022 |
| WO | 2023080732 | A1 | 5/2023  |

OTHER PUBLICATIONS

Venkatesh, J. Pharm. Sci. 89, 145-154 (2000) (p. 146, left column).*
J. G. Cannon, Chapter Nineteen in Burger's Medicinal Chemistry and Drug Discovery, Fifth Edition, vol. I: Principles and Practice, Wiley-Interscience 1995, pp. 783-802, 784.*
Arthur, Explor Target Antitumor Ther. 2020;1:131-52.*
Wang, Acta Pharmaceutica Sinica B 2020;10(2):207e238.*
*Abbvie Inc.,* v *BeiGene, Ltd et al.*, Civil Action No. 1:24-cv-08167 filed on Sep. 6, 2024, 59 pages.
Ardley, H.C. et al., "E3 ubiquitin ligases," Essays Biochemistry, 41:15-30, 2005.
Bradshaw, J. M., "The Src, Syk, and Tec family kinases: distinct types of molecular switches," Cell Signalling, 22(8):1175-1184, 2010.
Buhimschi, A. D. et al., "Targeting the C481S Ibrutinib-Resistance Mutation in Bruton's Tyrosine Kinase Using PROTAC-Mediated Degradation," Biochemistry, 57(26):3564-3575, 2018.
Cermakova, K. et al., "Next-Generation Drugs and Probes for Chromatin Biology: From Targeted Protein Degradation to Phase Separation," Molecules, 23(1958):26 pages, 2018.
Conley, M. E. et al., "Primary B Cell Immunodeficiencies: Comparisons and Contrasts," Annu. Rev. Immunol., 27:199-227, 2009.
Crews, Craig M. et al., "Inducing Protein Degradation as a Therapeutic Strategy," 61(2):403-404, 2018.
Defendants' Memorandum in Support of Motion to Dismiss, citation: Civil Action 1:24-cv-08167 filed on Dec. 19, 2024, 37 pages.
Dobrovolsky, D. et al., "Bruton tyrosine kinase degradation as a therapeutic strategy for cancer," Blood, 133(9):952-961, 2019.
Grice, G. L. et al., "The Proteasome Distinguishes between Heterotypic and Homotypic Lysine-11-Linked Polyubiquitin Chains," Cell Rep., 12(4):545-553, 2015.
Gurcan, H. M. et al., "A review of the current use of rituximab in autoimmune diseases," Int. Immunopharmacol., 9:10-25, 2009.
Humphries, L. A. et al., "Tee Kinases Mediate Sustained Calcium Influx via Site-specific Tyrosine Phosphorylation of the Phospholipase C Src Homology 2-Src Homology 3 Linker," J. Biol. Chem., 279(36): 37651-37661, 2004.
Khan, W. N., "Regulation of B lymphocyte development and activation by Bruton's tyrosine kinase," Immunol. Res., 23(213):147-156, 2001.
Komander, D. et al., "The Ubiquitin Code," Annu. Rev. Biochem., 81:203-229, 2012.
Lebraud, H. et al., "Protein degradation: a validated therapeutic strategy with exciting prospects," Essays Biochem., 61(5):517-527, 2017.
Liu, S. et al., "Targeted selective degradation of Bruton's tyrosine kinase by PROTACs," Medicinal Chemistry Research, 29:802-808, 2020.
Lochmuller, C. H. et al., "Chromatographic Resolution of Enantiomers," Journal of Chromatography, 113:283-302, 1975.
Lu, J. et al., "Hijacking the E3 Ubiquitin ligase cereblon to efficiently target BRD4," Chemistry and Biology, 22(6):755-763, 2015.
Lu, M. et al., "Discovery of a Keap1-dependent peptide PROTAC to knockdown Tau by ubiquitination-proteasome degradation pathway," European Journal of Medicinal Chemistry, 146:251-259, 2018.
Neklesa, T. K. et al., "Targeted protein degradation by PROTACs," Pharmacology & Therapeutics, 174:138-144, 2017.
Ottis et al., "Proteolysis-Targeting Chimeras: Induced Protein Degradation as a Therapeutic Strategy," ACS Chem. Biol., 12(4):892-898, 2017.
Plaintiff AbbVie Inc.'s Opposition to Defendants' Motion to Dismiss, citation: Civil Action 1:24-cv-08167 filed on Jan. 24, 2025, 44 pages.
Sakamoto, Kathleen M., "Chimeric molecules to target proteins for ubiquitination and degradation," Methods Enzymol., 399:833-847, 2005.
Sakamoto, Kathleen M., "Protacs: chimeric molecules that target proteins to the Skp1-Cullin-F box complex for ubiquitination and degradation," Proc Natl Acad Sci USA, 98(15):8554-8559, 2001.
Smith, C. I. E. et al., "Expression of Bruton's Agammaglobulinemia Tyrosine Kinase Gene, BTK, Is Selectively Down-Regulated in T Lymphocytes and Plasma Cells," J. Immunol., 152:557-565, 1994.
Sun, Y. et al., "Degradation of Bruton's tyrosine kinase mutants by PROTAC for potential treatment of ibrutinib-resistant non-Hodgkin lymphomas," Leukemia, 33:2105-2110, 2019.
Sun, Y et al., "PROTAC-induced BTK degradation as a novel therapy for mutated BTK C481S induced ibrutinib-resistant B-cell malignancies," Cell Research, 28:779-781, 2018.
Swatek, K. N. et al., "Ubiquitin modifications," Cell Research, 26(4):399-422, 2016.
Toure, M. et al., "Small-Molecule PROTACS: New Approaches to Protein Degradation," Angew. Chem. Int. Ed., 55(6):1966-1973, 2016.
Vetrie, D. et al., The gene involved in X-linked agammaglobulinaemia is a member of the src family of protein-tyrosine kinases, Nature, 361:226-233, 1993.
Zhou, P. et al., "Harnessing the ubiquitination machinery to target the degradation of specific cellular proteins," Mol. Cell., 6(3):751-756, 2000.
Zorba, A. et al., "Delineating the role of cooperativity in the design of potent PROTACs for BTK," PNAS, 115(31 ):E7285-E7292, 2018.
International Preliminary Report on Patentability issued in International Patent Application No. PCT/CN2022/143837, dated Jul. 11, 2024.
International Search Report issued in International Patent Application No. PCT/CN2022/143837, dated Mar. 8, 2023.
Defendants' reply in support of motion to dismiss, citation: Civil Action No. 1:24-cv-8167, filed Feb. 14, 2025, 27 pages.
Boichenko, I. et al., "Chemical ligand space of cereblon," ACS Omega, 3:1163-1171, 2018.
Bondenson, D. P. et al., "Lessons in PROTAC design from selective degradation with a promiscuos warhead," Cell Chemical Biology, 25:15 pages, 2018.
Burslem, G. M. et al., "Efficient synthesis of immunomodulatory drug analogues enables exploration of structure-degradation relationships," ChemMedChem, 13:1508-1512, 2018.
Caldwell, R. D. et al., "Discovery of Evobrutinib: an oral, potent, and highly selective, covalent Bruton's tyrosine kinase (BTK) inhibitor for the treatment of immunological diseases," Journal of Medicinal Chemistry, 62:7643-7655, 2019.
Casement, R. et al., "Mechanistic and structural features of PROTAC ternary complexes," Chapter 5, Methods in Molecular Biology, 2365:35 pages, 2021.
Crawford, J. J. et al., "Discovery of GDC-0853: a potent, selective, and noncovalent Bruton's tyrosine kinase inhibitor in early clinical development," Journal of Medicinal Chemistry, 61:2227-2245, 2018.
Cromm, P. M. et al., "Targeted protein degradation: from chemical biology to drug discovery," Cell Chemical Biology Review, 24:1181-1190, 2017.
Di Paolo, J. A. et al., "Specific Btk inhibition suppresses B cell- and myeloid cell-mediated arthritis," Nat. Chem. Biol., 7 (1):41-50, 2011.

(56) References Cited

OTHER PUBLICATIONS

Feng, Y. et al., "Bruton's tyrosine kinase (BTK) inhibitors in treating cancer: a patent review (2010-2018)," Expert Opinion on Therapeutic Patents, 29(4):217-241, 2019.

Han, X. et al., "Discovery of ARD-69 as a highly potent proteolysis targeting chimera (PROTAC) degrader of androgen receptor (AR) for the treatment of prostate cancer," J. Med. Chem., 62:941-964, 2019.

Karbo, Robert B., "Protac molecules for the treatment of autoimmune disorders," ACS Medicinal Chemistry Letters, 10:276-277, 2019.

Kronke, J. et al., "Lenalidomide induces ubiquitination and degradation of CK1alpha in del (9q) MDS," Nature, 523:20 pages, 2015.

Li, X. et al., "A patent review of the ubiquitin ligase system: 2015-2018," Expert Opinion on Therapeutic Patents, 28 (12):919-937, 2018.

Min, J. et al., "Phenyl-glutarimides: Alternative cereblon binders for the design of PROTACs," Angewandte Chemie, 60:26633-26670, 2021.

Moon, S. et al., "Chemically induced cellular proteolysis: an emerging therapeutic strategy for undruggable targets," Molecules and Cells, 41(11):933-942, 2018.

Nowak, R. P. et al., "Plasticity in binding confers selectivity in ligand-induced protein degradation," Nature chemical biology, 14:706-714, 2018.

Raina, K. et al., "Targeted protein knockdown using small molecule degraders," Current Opinion in Chemical Biology, 39:46-53, 2017.

Rankin, A. L et al., "Selective inhibition of BTK prevents murine lupus and antibody-mediated glomerulonephritis," The Journal of Immunology, 191(9):4540-4550, 2013.

Sainan, A. et al., "Small-molecule PROTACs: An emerging and promising approach for the development of targeted therapy drugs", EBioMedicine, 36:552-562, 2018.

Shi, Q. et al., "Purine derivatives as potent Bruton's tyrosine kinase (BTK) inhibitors for autoimmune diseases," Bioorganic and Medicinal Chemistry Letters, 24:2206-2211, 2014.

Tasso, B. et al., "The development of BTK inhibitors: a five-year update," Molecules, 26:1-31, 2021.

Tinworth, C. P. et al., "PROTAC-mediated degradation of Bruton's tyrosine kinase is inhibited by covalent binding"; ACS Chemical Biology, 14(3):342-347, 2019.

Troup, R. I. et al., "Current strategies for the design of PROTAC linkers: a critical review," Exploration of Targerted Anti-tumor Therapy, 1:273-312, 2020.

Weng, G. et al., "PROTAC-DB: an online database of PROTACs," Nucleic Acids Research, 49:D1381-D1387, 2021.

Winter, G. E. et al., "Phthalimide conjugation as a strategy for in vivo target protein degradation," Science, 348 (6241): 1376-1381, 2015.

Woodhead, Steve, Presentation: "Structure Guided Design and Optimization of Selective Kinase Inhibitors from Fragment Starting Points," Takeda California, 33 pages, Apr. 14, 2016.

Zhou, B. et al., "Discovery of a small-molecule degrader of bromodomain and extra-terminal (BET) proteins with picomolar cellular potencies and capable of achieving tumor regression," Journal of Medicinal Chemistry, 61:462-481, 2018.

\* cited by examiner

DEGRADATION OF BRUTON'S TYROSINE KINASE (BTK) BY CONJUGATION OF BTK INHIBITORS WITH E3 LIGASE LIGAND AND METHODS OF USE

CROSS-REFERENCE TO RELATED APPLICATIONS

This application is a continuation of U.S. patent application Ser. No. 18/758,176, filed Jun. 28, 2024, which is a continuation of International Patent Application No. PCT/CN2022/143837, filed Dec. 30, 2022, which claims priority from International Patent Application No. PCT/CN2021/142804, filed Dec. 30, 2021. The contents of these applications are incorporated herein by reference in their entirety.

FIELD OF THE INVENTION

Disclosed herein are novel bifunctional compounds formed by conjugating BTK inhibitor moieties with E3 ligase Ligand moieties, which function to recruit targeted proteins to E3 ubiquitin ligase for degradation, and methods of preparation and uses thereof.

BACKGROUND OF THE INVENTION

Proteolysis-targeting chimera (PROTAC) is a novel strategy for selective knockdown of target proteins by small molecules (Sakamoto K M et al., *Proc Natl Acad Sci* 2001, 98:8554-9.; Sakamoto K. M. et al., *Methods Enzymol.* 2005; 399:833-847.). PROTAC utilizes the ubiquitin-protease system to target a specific protein and induce its degradation in the cell (Zhou P. et al., *Mol Cell.* 2000; 6(3):751-756; Neklesa T. K. et al., *Pharmacol Ther.* 2017; 174:138-144; Lu M. et al., *Eur J Med Chem.* 2018; 146:251-259). The normal physiological function of the ubiquitin-protease system is responsible for clearing denatured, mutated, or harmful proteins in cells. The normal physiological function of the ubiquitin-protease system is responsible for clearing denatured, mutated, or harmful proteins in cells. The ubiquitin-proteasome system (UPS), also known as the ubiquitin-proteasome pathway (UPP), is a common posttranslational regulation mechanism that is responsible for protein degradation in normal and pathological states (Ardley H. et al., *Essays Biochem.* 2005, 41, 15-30; Komander D. et al., *Biochem.* 2012, 81, 203-229; Grice G. L. et al., *Cell Rep.* 2015, 12, 545-553; Swatek K. N. et al., *Cell Res.* 2016, 26, 399-422). Ubiquitin, which is highly conserved in eukaryotic cells, is a modifier molecule, composed of 76 amino acids, that covalently binds to and labels target substrates via a cascade of enzymatic reactions involving E1, E2, and E3 enzymes. Subsequently, the modified substrate is recognized by the 26S proteasome complex for ubiquitination-mediated degradation. So far, two E1 enzymes have been discovered, which are termed UBA1 and UBA6. On the other hand, there are about 40 E2 enzymes and more than 600 E3 enzymes that offer the functional diversity to govern the activity of many downstream protein substrates. However, only a limited number of E3 ubiquitin ligases have been successfully hijacked for use by small molecule PROTAC technology: the Von Hippel-Lindau disease tumor suppressor protein (VHL), the Mouse Double Minute 2 homologue (MDM2), the Cellular Inhibitor of Apoptosis (cIAP), and cereblon (Philipp O. et al., *Chem. Biol.* 2017, 12, 2570-2578).

Bifunctional compounds composed of a target protein-binding moiety and an E3 ubiquitin ligase-binding moiety have been shown to induce proteasome-mediated degradation of selected proteins. These drug-like molecules offer the possibility of temporal control over protein expression and could be useful as biochemical reagents for the treatment of diseases. In recent years, this newly developed method has been widely used in antitumor studies (Lu J. et al., *Chem Biol.* 2015; 22(6):755-763; Ottis P. et al., *Chem Biol.* 2017; 12(4):892-898.; Crews C. M. et al., *J Med Chem.* 2018; 61(2):403-404; Neklesa T. K. et al., *Pharmacol Ther.* 2017, 174:138-144.; Cermakova K. et al., *Molecules,* 2018.23(8).; An S. et al., *EBioMedicine,* 2018.; Lebraud H. et al., *Essays Biochem.* 2017; 61(5): 517-527.; Sun Y. H. et al., *Cell Res.* 2018; 28:779-81; Toure M. et al., *Angew Chem Int Ed Engl.* 2016; 55(6):1966-1973; Yonghui Sun et al., *Leukemia,* volume 33, pages 2105-2110(2019); Shaodong Liu et al., *Medicinal Chemistry Research,* volume 29, pages 802-808 (2020); Shenxin Z. et al., *European Journal of Medicinal Chemistry,* 2020, doi.org/10.1016/j.ejmech.2020.112981) and has been disclosed or discussed in patent publications, e.g., US20160045607, US20170008904, US20180050021, US20180072711, WO2002020740, WO2014108452, WO2016146985, WO2016149668, WO2016149989, WO2016197032, WO2016197114, WO2017011590, WO2017030814, WO2017079267, WO2017182418, WO2017197036, WO2017197046, WO2017197051, WO2017197056, WO2017201449, WO2017211924, WO2018033556, WO2018071606, US 20200297725, US20200239430, WO 2020142228, WO2020163823, WO2020198711, WO2020201080, et al.

Bruton's tyrosine kinase (Btk) belongs to the Tec tyrosine kinase family (Vetrie et al., *Nature* 361: 226-233, 1993; Bradshaw, *Cell Signal.* 22: 1175-84, 2010). Btk is primarily expressed in most hematopoietic cells such as B cells, mast cells and macrophages (Smith et al., *J. Immunol.* 152: 557-565, 1994) and is localized in bone marrow, spleen and lymph node tissue. Btk plays important roles in B-cell receptor (BCR) and FcR signaling pathways, which involve in B-cell development, differentiation (Khan, *Immunol. Res.* 23: 147, 2001). Btk is activated by upstream Src-family kinases. Once activated, Btk in turn phosphorylates PLC gamma, leading to effects on B-cell function and survival (Humphries et al., *J. Biol. Chem.* 279: 37651, 2004). These signaling pathways must be precisely regulated. Mutations in the gene encoding Btk cause an inherited B-cell specific immunodeficiency disease in humans, known as X-linked agammaglobulinemia (XLA) (Conley et al., *Annu. Rev. Immunol.* 27: 199-227, 2009). Aberrant BCR-mediated signaling may result in dysregulated B-cell activation leading to a number of autoimmune and inflammatory diseases. Preclinical studies show that Btk deficient mice are resistant to developing collagen-induced arthritis. Moreover, clinical studies of Rituxan, a CD20 antibody to deplete mature B-cells, reveal the key role of B-cells in a number of inflammatory diseases such as rheumatoid arthritis, systemic lupus erythematosus and multiple sclerosis (Gurcan et al., *Int. Immunopharmacol.* 9: 10-25, 2009). Therefore, Btk inhibitors can be used to treat autoimmune and/or inflammatory diseases.

Inhibition of BTK has been shown to affect cancer development (B cell malignancies) and cell viability, and improve autoimmune diseases (e.g., rheumatoid arthritis and lupus). Inhibition of BTK has also been reported via alternative strategies, such as through degradation of BTK (Alexandru D. et al., Biochemistry 2018, 57, 26, 3564-3575; Adelajda Z. et al., *PNAS* 2018 115 (31); Dennis D., et al., *Blood,* 2019, 133:952-961; Yonghui S. et al., *Cell Research,* 2018, 28, 779-781; Yonghui S. et al., *Leukemia,* 2019, Degradation of Bruton's tyrosine kinase mutants by PROTACs for potential treatment of ibrutinib-resistant non-Hodgkin lymphomas) and has been disclosed or discussed in patent publications, e.g. US20190276459, WO2019186343, WO2019186358, WO2019148150, WO2019177902, WO2019127008, and WO2020239103.

There is a need of new BTK inhibitors or degraders which are more potent than known inhibitors of BTK and inhibit BTK via alternative strategies, such as through degradation of BTK. The present application addresses the need.

SUMMARY OF THE INVENTION

The following aspects or embodiments are parts of the instant invention. However, the instant invention is not limited thereto.

Aspect 1. A compound of Formula (I):

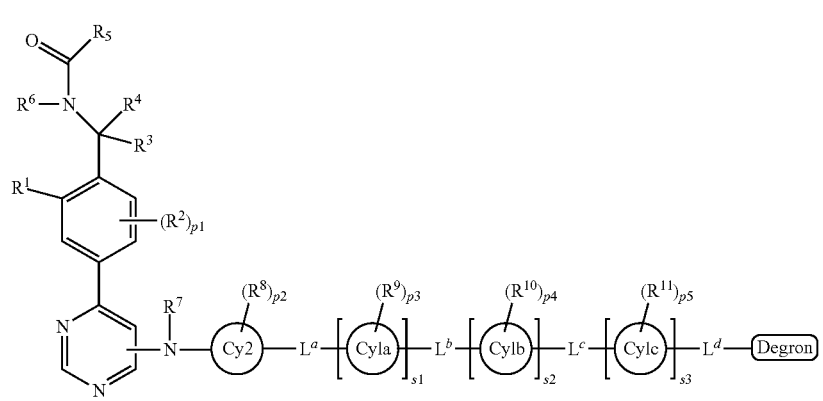

(I)

or a pharmaceutically acceptable salt thereof, or a stereoisomer thereof, wherein:

the Degron moiety is an E3 Ubiquitin ligase moiety selected from

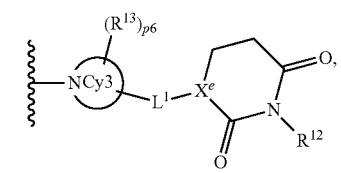

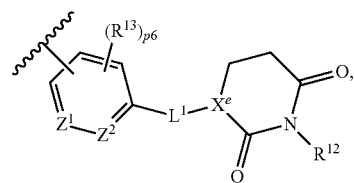

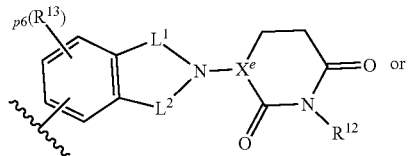

-continued

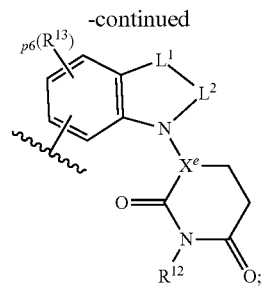

Cy1a, Cy1b and Cy1c are each independently a 4-, 5-, 6-, 7-, 8-, 9-, 10-, 11- or 12-membered saturated ring or unsaturated ring comprising 0-3 heteroatoms selected from nitrogen, oxygen and sulfur as ring member(s);

Cy2 is a 5- or 6-membered saturated ring or unsaturated ring (preferably aromatic ring) comprising 0-3 heteroatoms selected from nitrogen, oxygen and sulfur as ring member(s);

Cy3 is a 5- or 6-membered saturated ring or unsaturated ring comprising no additional heteroatom;

$L^a$, $L^b$, $L^c$ and $L^d$ are each independently a single bond, —O—, —S—, —C(O)—, —(CR$^a$R$^b$)$_n$— or —NR$^c$—;

$L^1$ and $L^2$ are each independently a single bond, —O—, —S—, —C(O)—, —(CR$^a$R$^b$)$_n$— or —NR$^c$—;

$Z^1$ and $Z^2$ are each independently CH, CR$^{14}$ or N;

$X^e$ is each independently CR$^{14}$ or N;

each of occurrence, $R^1$, $R^2$, $R^3$, $R^4$, $R^8$, $R^9$, $R^{10}$, $R^{11}$, $R^{13}$ and $R^{14}$ are each independently hydrogen, halogen, —$C_{1-8}$alkyl, —$C_{1-8}$alkoxy, —$C_{2-8}$alkenyl, —$C_{2-8}$alkynyl, cycloalkyl, heterocyclyl, aryl, heteroaryl, oxo (=O), —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said —$C_{1-8}$alkyl, —$C_{2-8}$alkenyl, —$C_{2-8}$alkynyl, cycloalkyl, heterocyclyl, aryl, or heteroaryl is optionally substituted with halogen, hydroxy, -halo$C_{1-8}$alkyl, —$C_{1-8}$alkyoxy, cycloalkyl, heterocyclyl, aryl, or heteroaryl;

$R^6$, $R^7$ and $R^{12}$ are each independently hydrogen, —$C_{1-8}$alkyl, —$C_{2-8}$alkenyl, —$C_{2-8}$alkynyl, cycloalkyl, heterocyclyl, aryl or heteroaryl, each of said —$C_{1-8}$alkyl, —$C_{2-8}$alkenyl, —$C_{2-8}$alkynyl, cycloalkyl, heterocyclyl, aryl, or heteroaryl is optionally substituted with halogen, hydroxy, -halo$C_{1-8}$alkyl, —$C_{1-8}$alkyoxy, cycloalkyl, heterocyclyl, aryl, or heteroaryl;

$R^5$ is a 5- or 6-membered aromatic ring comprising 0-3 heteroatoms selected from nitrogen, oxygen and sulfur as ring member(s); said aromatic ring is optionally substituted with halogen, —$C_{1-8}$alkyl, —$C_{2-8}$alkenyl, —$C_{2-8}$alkynyl, —$C_{1-8}$alkoxy, cycloalkyl, heterocyclyl, aryl, heteroaryl, —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said —$C_{1-8}$alkyl, —$C_{2-8}$alkenyl, —$C_{2-8}$alkynyl, cycloalkyl, heterocyclyl, aryl, or heteroaryl is optionally substituted with —$C_{1-8}$alkyl, halogen, hydroxy, -halo$C_{1-8}$alkyl, —$C_{1-8}$alkyoxy, cycloalkyl, heterocyclyl, aryl, or heteroaryl;

p1, p2, p3, p4, p5 and p6 are each independently 0, 1, 2, 3 or 4;

s1, s2 and s3 are each independently 0, 1;

n is 0, 1, 2, 3, 4, 5 or 6;

$R^a$ and $R^b$ are each independently hydrogen, halogen, —$C_{1-8}$alkyl, —$C_{2-8}$alkenyl, —$C_{2-8}$alkynyl, —$C_{1-8}$alkoxy, cycloalkyl, heterocyclyl, aryl, heteroaryl, oxo (=O), —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said —$C_{1-8}$alkyl, —$C_{2-8}$alkenyl, —$C_{2-8}$alkynyl, cycloalkyl, heterocyclyl, aryl, or heteroaryl is optionally substituted with halogen, hydroxy, -halo$C_{1-8}$alkyl, —$C_{1-8}$alkyoxy, cycloalkyl, heterocyclyl, aryl, or heteroaryl; or $R^a$ and $R^b$ together with the atom(s) to which they are attached, form a 3- to 12-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —$C_{1-8}$alkyl, —$C_{2-8}$alkenyl, —$C_{2-8}$alkynyl, cycloalkyl, heterocyclyl, aryl, heteroaryl, oxo, —CN or —$NO_2$;

$R^c$, $R^d$ and $R^e$ are each independently hydrogen, —$C_{1-8}$alkyl, —$C_{2-8}$alkenyl, —$C_{2-8}$alkynyl, cycloalkyl, heterocyclyl, aryl, or heteroaryl; or ($R^c$ and $R^d$) or ($R^d$ and $R^e$) together with the atom(s) to which they are attached, form a 3- to 12-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —$C_{1-8}$alkyl, —$C_{2-8}$alkenyl, —$C_{2-8}$alkynyl, cycloalkyl, heterocyclyl, aryl, heteroaryl, oxo, —CN or —$NO_2$.

Aspect 2 The compound according to Aspect 1, wherein the [Degron] moiety is selected from

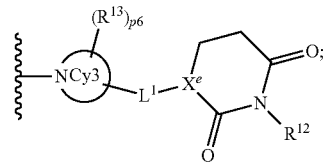

wherein

Cy3 is a 6-membered saturated ring or unsaturated ring comprising no additional heteroatom;

$L^1$, $X^e$, $R^{12}$, $R^{13}$ and p6 are defined as in Aspect 1.

Aspect 3. The compound according to Aspect 1 or 2, wherein the [Degron] moiety is selected from

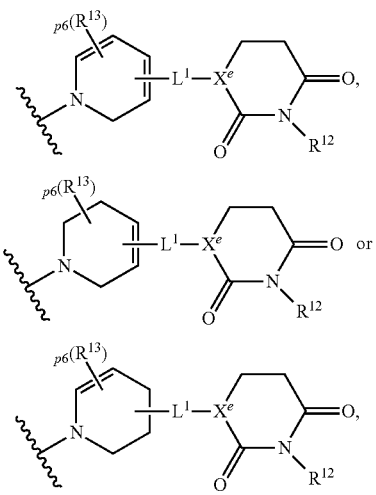

wherein $L^1$, $X^e$, $R^{12}$, $R^{13}$ and p6 are defined as in Aspect 1.

Aspect 4. The compound according to Aspect 1, wherein the [Degron] moiety is selected from

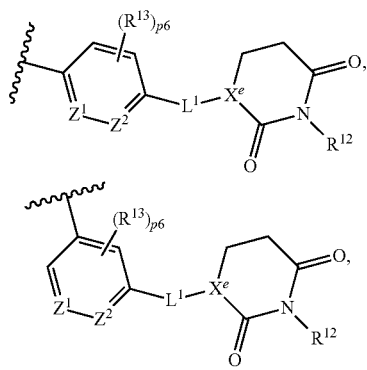

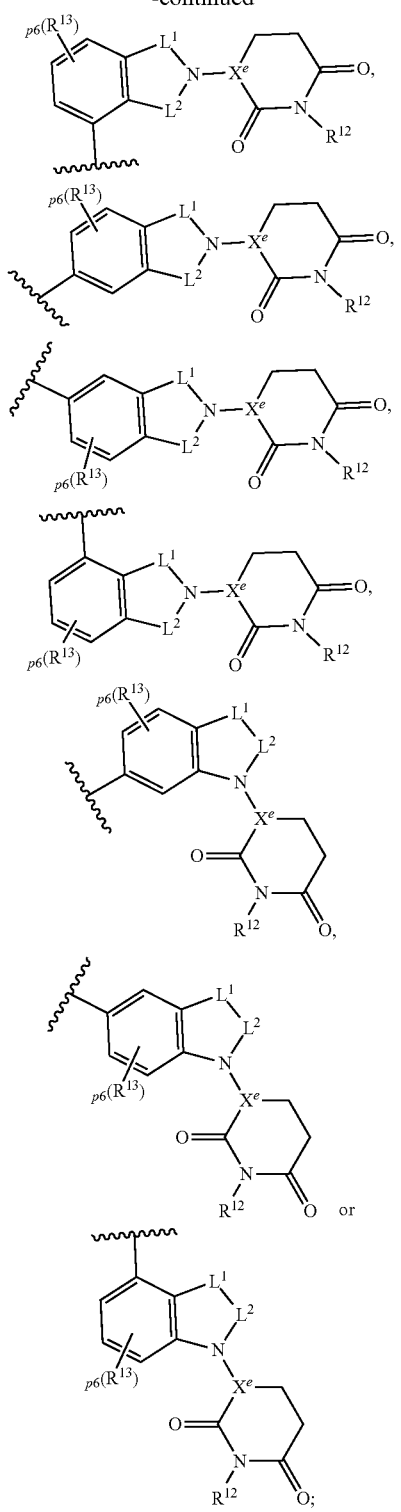
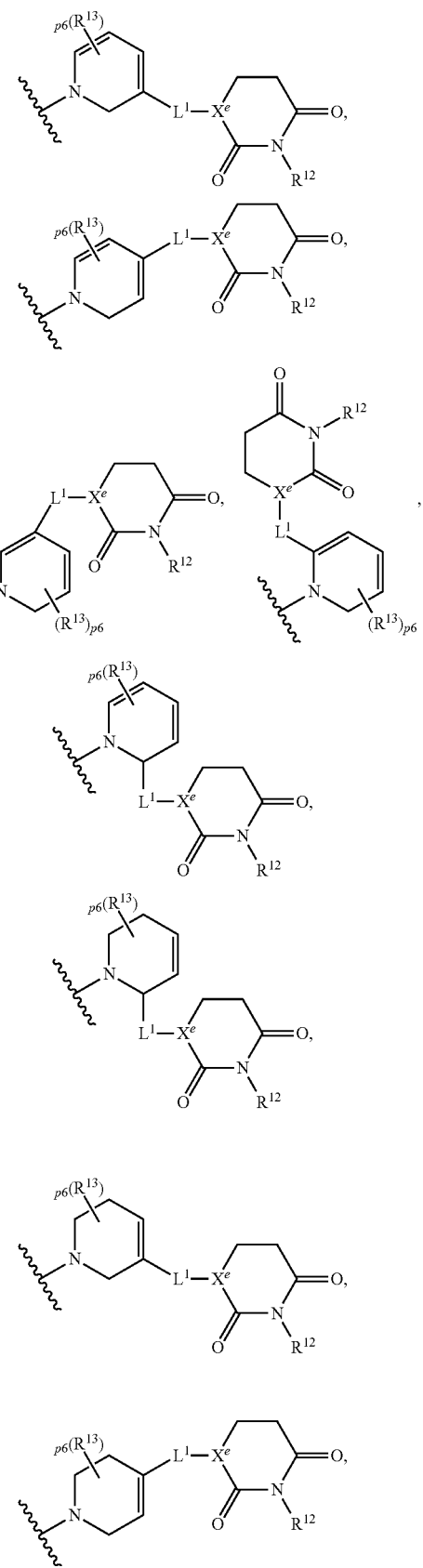
$L^1$, $L^2$, $Z^1$, $Z^2$, $X^e$, $R^{12}$, $R^{13}$ and p6 are defined as in Aspect 1.
Aspect 5. The compound according to Aspect 1 or 4, wherein the (Degron) moiety is selected from

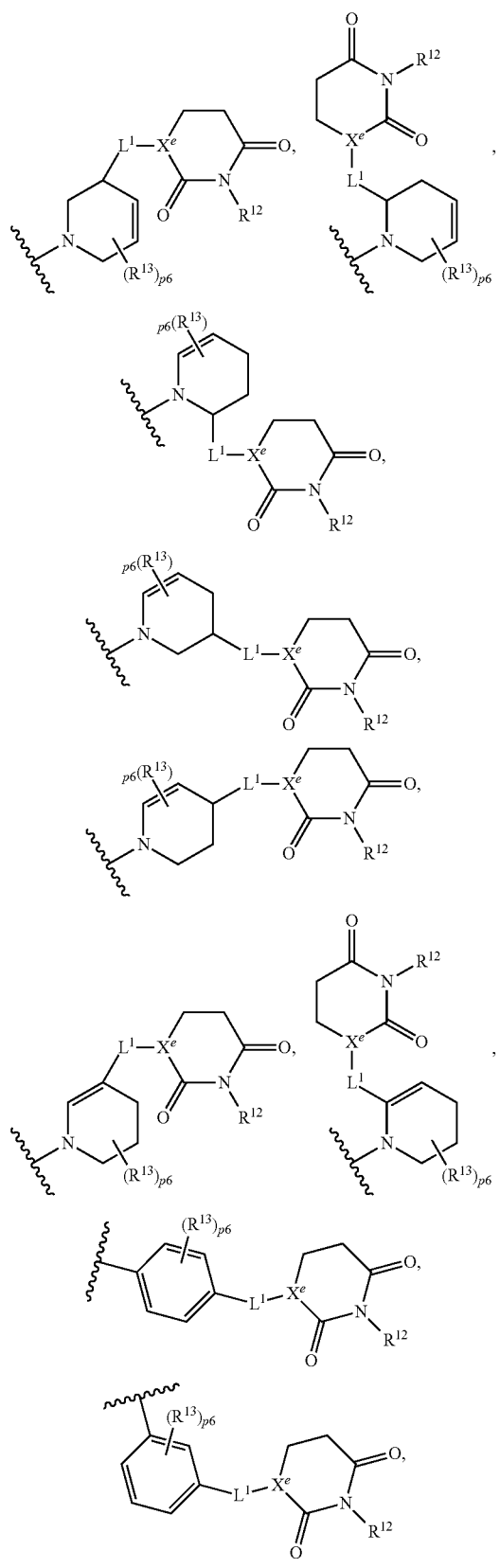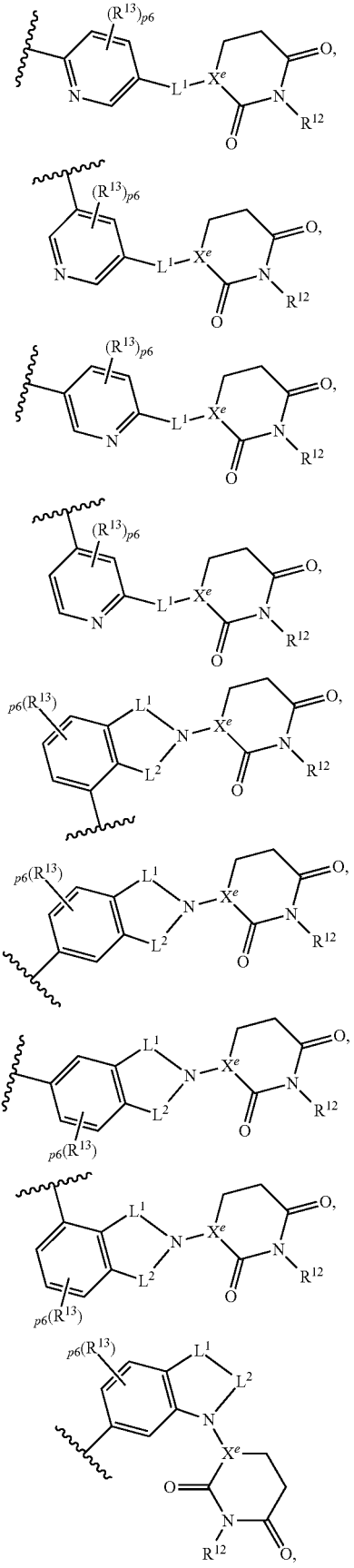

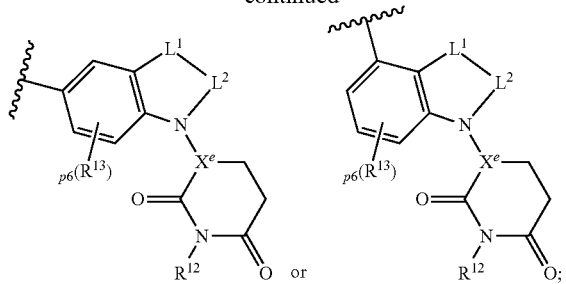

L¹, L², $X^e$, $R^{12}$, $R^{13}$ and p6 are defined as in Aspect 1.

Aspect 6. The compound according to any aspect of Aspects 1-5, wherein

L¹ and L² are each independently a single bond, —O—, —S—, —C(O)—, —(CR$^a$R$^b$)$_n$— or —NR$^c$—;

n is 1, 2, 3, 4, 5 or 6;

R$^a$ and R$^b$ are each independently hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl, or heteroaryl; or R$^a$ and R$^b$ together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —C$_{1-8}$alkyl, —C$_{2-8}$alkenyl, —C$_{2-8}$alkynyl, cycloalkyl, heterocyclyl, aryl, heteroaryl, oxo, —CN or —NO$_2$;

R$^c$ is each independently hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl or cyclohexyl, cycloheptyl, cyclooctyl, heterocyclyl, aryl, or heteroaryl.

Aspect 7. The compound according to any aspect of Aspects 1-6, wherein p6 is each independently 0, 1, 2, 3 or 4;

$X^e$ is each independently CR$^{14}$ or N;

$R^{13}$ and $R^{14}$ are each independently hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, —C$_{2-8}$alkenyl, —C$_{2-8}$alkynyl, heterocyclyl, phenyl, heteroaryl, oxo (=O), —CN, —NO$_2$, —OR$^c$, —SO$_2$R$^c$, —COR$^c$, —CO$_2$R$^c$, —CONR$^c$R$^d$, —C(=NR$^e$)NR$^d$R$^e$, —NR$^c$R$^d$, —NR$^c$COR$^d$, —NR$^c$CONR$^d$R$^e$, —NR$^c$CO$_2$R$^d$, —NR$^c$SONR$^d$R$^e$, or —NR$^c$SO$_2$R$^d$, each of said methyl, ethyl, propyl, butyl, pentyl, hexyl, heptyl, octyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, —C$_{2-8}$alkenyl, —C$_{2-8}$alkynyl, heterocyclyl, phenyl or heteroaryl is optionally substituted with F, Cl, Br, I, hydroxy, -haloC$_{1-8}$alkyl, —C$_{1-8}$alkyoxy, cycloalkyl, heterocyclyl, aryl, or heteroaryl;

R$^c$, R$^d$ and R$^e$ are each independently hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl, or heteroaryl; or (R$^c$ and R$^d$) or (R$^d$ and R$^e$) together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —C$_{1-8}$alkyl, —C$_{2-8}$alkenyl, —C$_{2-8}$alkynyl, cycloalkyl, heterocyclyl, aryl, heteroaryl, oxo, —CN or —NO$_2$;

$R^{12}$ is each independently hydrogen, methyl, ethyl, propyl, butyl, pentyl, hexyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl or heteroaryl, each of said methyl, ethyl, propyl, butyl, pentyl, hexyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -haloC$_{1-8}$alkyl, —C$_{1-8}$alkyoxy, cycloalkyl, heterocyclyl, aryl, or heteroaryl.

Aspect 8. The compound according to any aspect of Aspects 1-8, wherein

L$^a$, L$^b$, L$^c$ and L$^d$ are each independently selected from a single bond, —O—, —CO—, —(CR$^a$R$^b$)$_n$— or —NR$^c$—;

n is 1, 2, 3, 4 or 5;

R$^a$ and R$^b$ are each independently hydrogen, F, Cl, Br, I, methyl, ethyl, propyl, butyl, pentyl, hexyl, heptyl, octyl, —C$_{2-8}$alkenyl, —C$_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, heteroaryl, oxo (=O), —CN, —NO$_2$, —OR$^c$, —SO$_2$R$^c$, —COR$^c$, —CO$_2$R$^c$, —CONR$^c$R$^d$, —C(=NR$^e$)NR$^d$R$^e$, —NR$^c$R$^d$, —NR$^c$COR$^d$, —NR$^c$CONR$^d$R$^e$, —NR$^c$CO$_2$R$^d$, —NR$^c$SONR$^d$R$^e$, —NR$^c$SO$_2$NR$^d$R$^e$ or —NR$^c$SO$_2$R$^d$; each of said methyl, ethyl, propyl, butyl, pentyl, hexyl, heptyl, octyl, —C$_{2-8}$alkenyl, —C$_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -haloC$_{1-8}$alkyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl; or R$^a$ and R$^b$ together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from F, Cl, Br, I, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl, heteroaryl, oxo, —CN or —NO$_2$.

Aspect 9. The compound according to any aspect of Aspects 1-8, wherein

L$^a$, L$^b$, L$^c$ and L$^d$ are each independently selected from a single bond, —O—, —CO—, —(CR$^a$R$^b$)$_n$— or —NR$^c$—;

n is 1, 2, 3, 4 or 5;

R$^a$ and R$^b$ are each independently hydrogen, F, Cl, Br, I, methyl, ethyl, propyl, butyl, pentyl, hexyl, heptyl, octyl, —C$_{2-8}$alkenyl, —C$_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, heteroaryl, oxo (=O), —CN, —NO$_2$, —OR$^c$, —SO$_2$R$^c$, —COR$^c$, —CO$_2$R$^c$, —CONR$^c$R$^d$, —C(=NR$^c$)NR$^d$R$^e$, —NR$^c$R$^d$, —NR$^c$COR$^d$, —NR$^c$CONR$^d$R$^e$, —NR$^c$CO$_2$R$^d$, —NR$^c$SONR$^d$R$^e$, —NR$^c$SO$_2$NR$^d$R$^e$ or —NR$^c$SO$_2$R$^d$.

Aspect 10. The compound according to any aspect of Aspects 1-9, wherein L$^a$, L$^b$, L$^c$ and L$^d$ are each independently selected from a single bond, —O—, —CO—, —N(CH$_3$)—, —NH—, —(CH$_2$)$_n$—, —[CH(CH$_3$)]$_n$—, —[C(CH$_3$)$_2$]$_n$—; n is 1, 2, 3, 4 or 5; preferably L$^a$, L$^b$, L$^c$ and L$^d$ are each independently selected from a single bond, —O—, —CO—, —N(CH$_3$)—, —NH—, —CH$_2$—, —CH$_2$CH$_2$—, —CH$_2$CH$_2$CH$_2$—, —CH$_2$CH$_2$CH$_2$CH$_2$—.

Aspect 11. The compound of any aspect of Aspects 1-10, wherein Cy1a is each independently

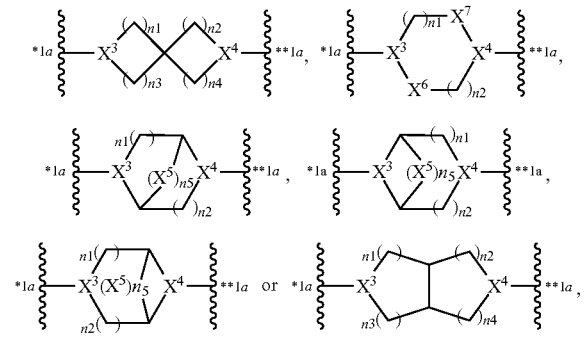

each of

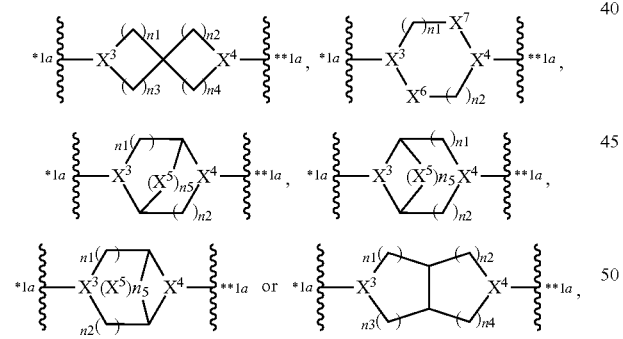

is optionally substituted with R$^9$, n1, n2, n3, n4 and n5 are each independently 0, 1, 2, 3 or 4;

X$^3$ and X$^4$ are each independently selected from —CR$^a$, or N;

X$^5$, X$^6$ and X$^7$ are each independently selected from —NR$^c$—, —O—, —S— and —CR$^a$R$^b$—;

R$^a$, R$^b$ and R$^c$ are defined as in Aspect 1;
*1a refers to the position attached to the

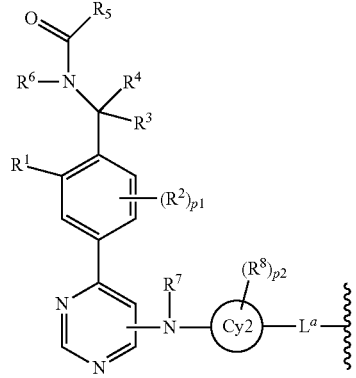

moiety and **1a refers to the position attached to the

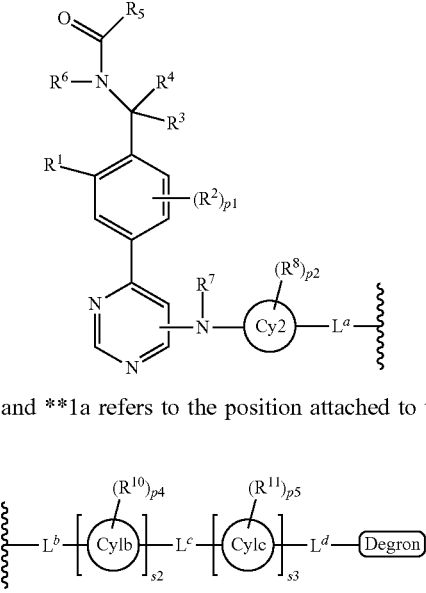

moiety.

Aspect 12. The compound of any aspect of Aspects 1-11, wherein Cy1a is each independently

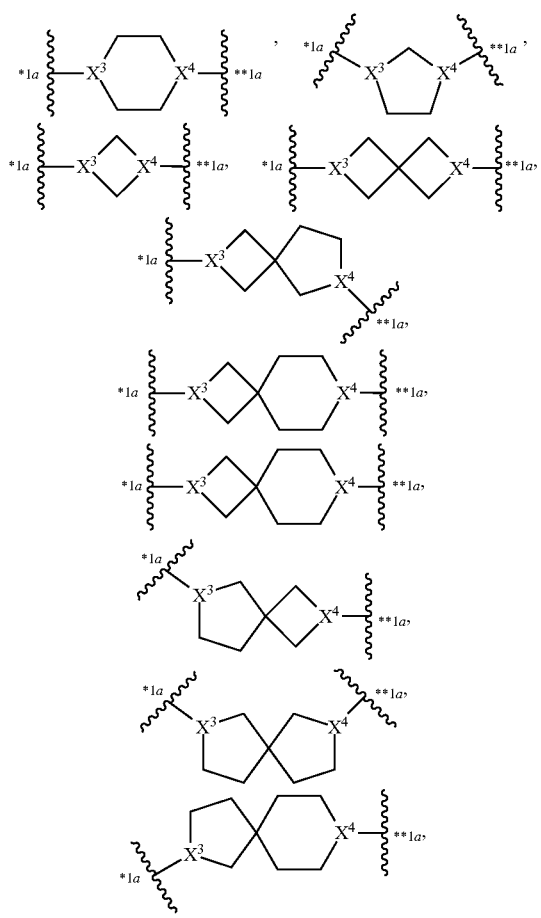

-continued

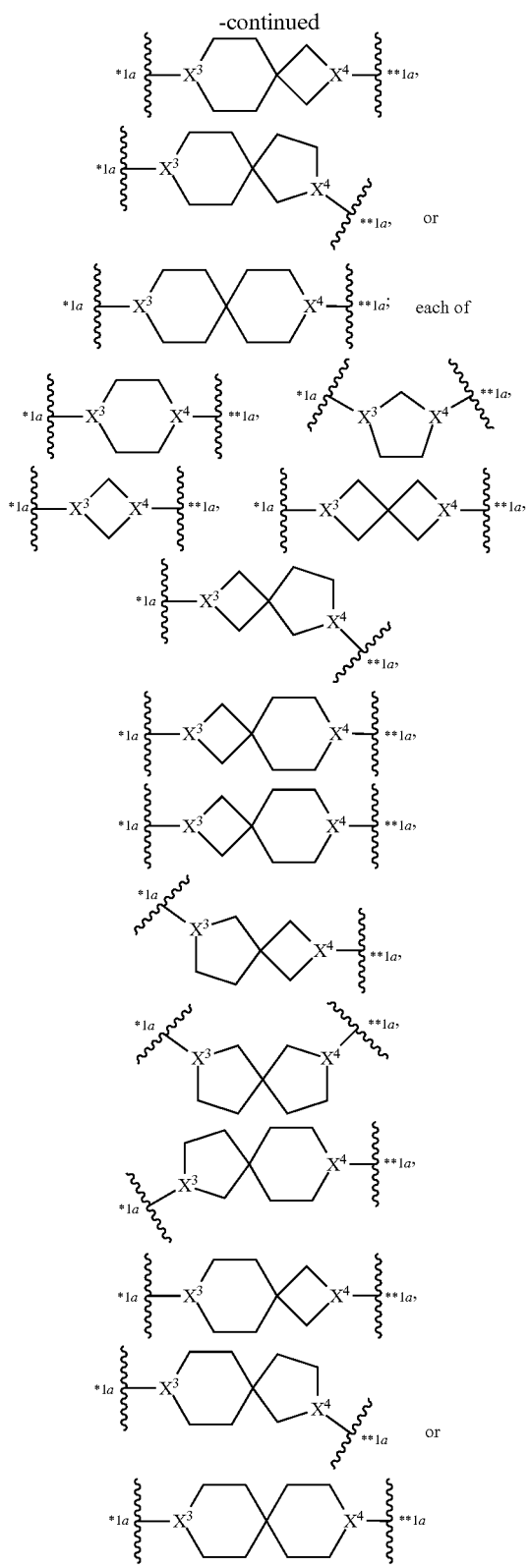

is optionally substituted with $R^9$;

X$^3$ and X$^4$ are each independently selected from —CR$^a$, or N;

X$^5$, X$^6$ and X$^7$ are each independently selected from —NR$^c$—, —O—, —S— and —CR$^a$R$^b$—;

R$^a$ and R$^b$ are each independently hydrogen, F, Cl, Br, I, methyl, ethyl, propyl, butyl, pentyl, hexyl, heptyl, octyl, —C$_{2-8}$alkenyl, —C$_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, heteroaryl, oxo (=O), —CN, —NO$_2$, —OR$^c$, —SO$_2$R$^c$, —COR$^c$, —CO$_2$R$^c$, —CONR$^c$R$^d$, —C(=NR$^c$)NR$^d$R$^e$, —NR$^c$R$^d$, —NR$^c$COR$^d$, —NR$^c$CONR$^d$R$^e$, —NR$^c$CO$_2$R$^d$, —NR$^c$SONR$^d$R$^e$, —NR$^c$SO$_2$NR$^d$R$^e$ or —NR$^c$SO$_2$R$^d$; each of said methyl, ethyl, propyl, butyl, pentyl, hexyl, heptyl, octyl, —C$_{2-8}$alkenyl, —C$_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -haloC$_{1-8}$alkyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

R$^c$ is independently selected from hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl, or heteroaryl.

Aspect 13. The compound of any aspect of Aspects 1-11, wherein Cy1a is each independently

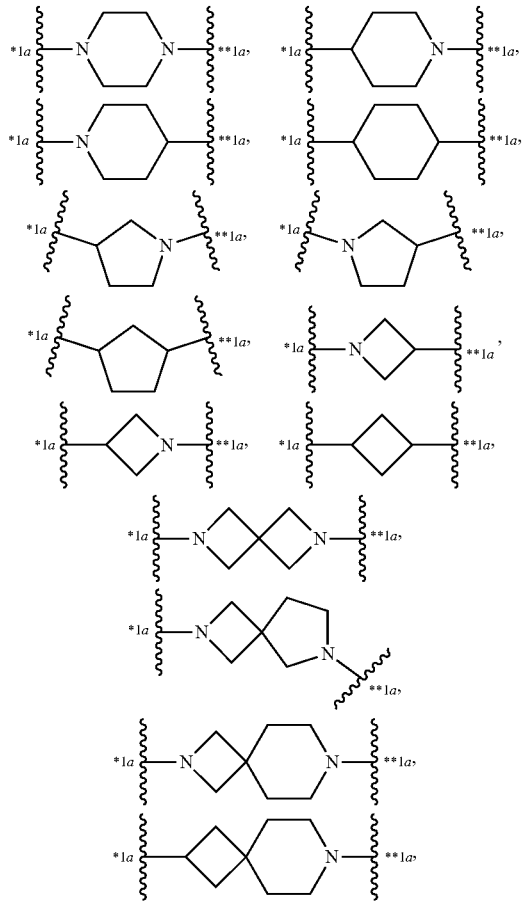

-continued

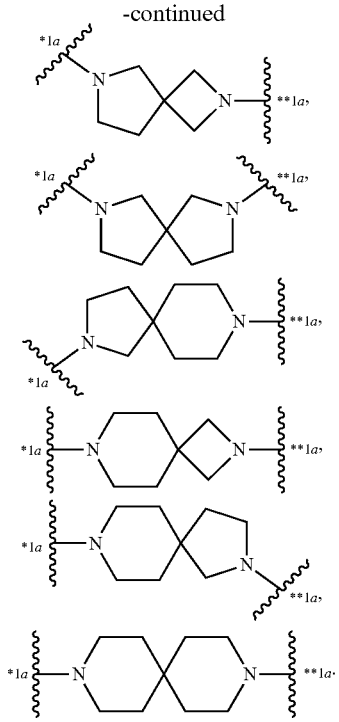

Aspect 14. The compound of any aspect of Aspects 1-13, wherein Cy1b is each independently

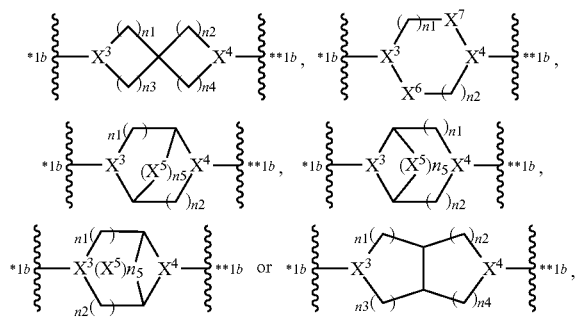

each of

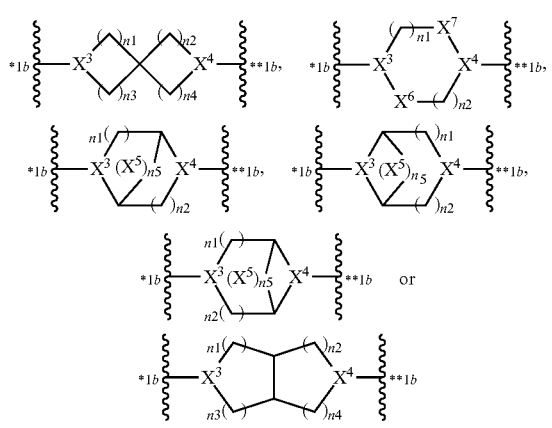

optionally substituted with $R^{10}$, n1, n2, n3, n4 and n5 are each independently 0, 1, 2, 3 or 4;

$X^3$ and $X^4$ are each independently selected from —$CR^a$, or N;

$X^5$, $X^6$ and $X^7$ are each independently selected from —$NR^c$—, —O—, —S— and —$CR^aR^b$—;

$R^a$, $R^b$ and $R^c$ are defined as in Aspect 1;

*1b refers to the position attached to the

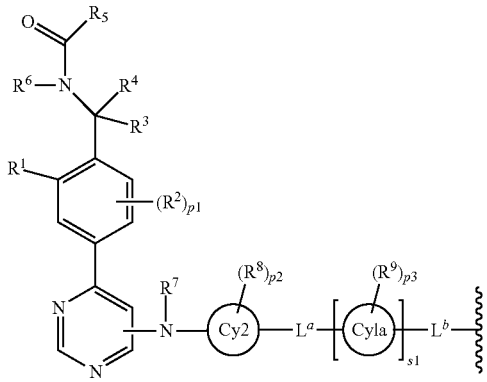

moiety and **1b refers to the position attached to the

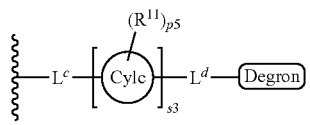

moiety.

Aspect 15. The compound of any aspect of Aspects 1-14, wherein Cy1b is each independently

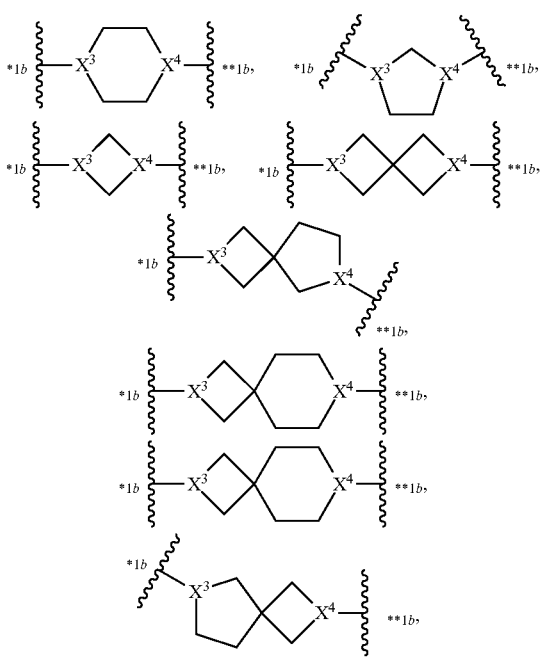

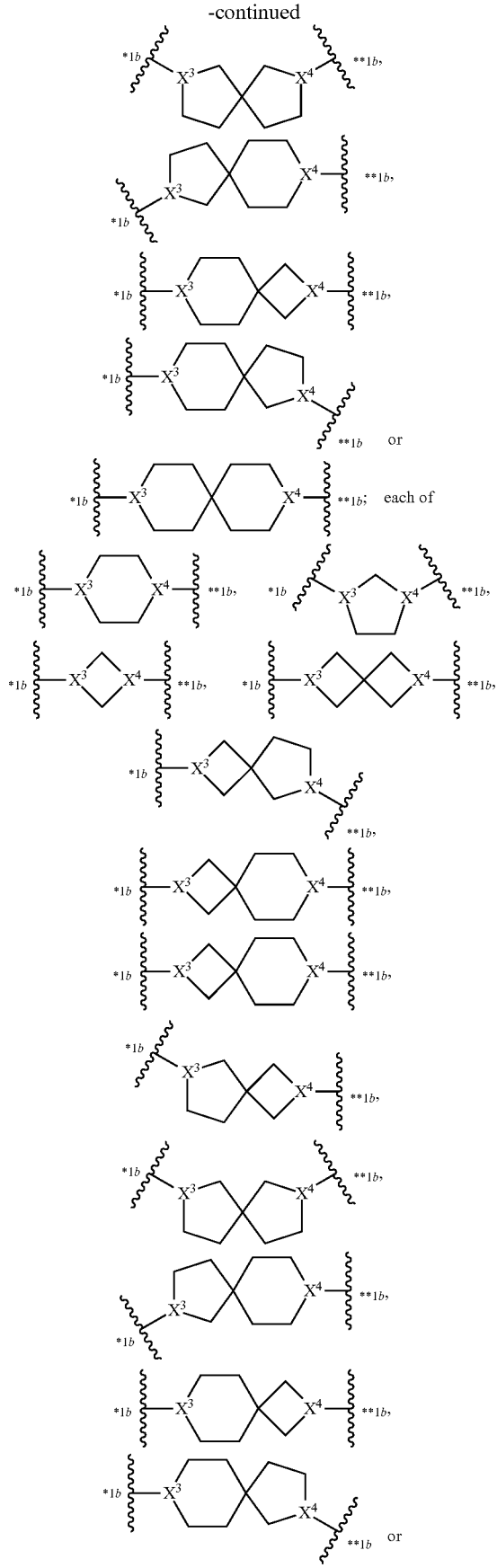

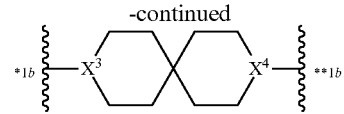

is optionally substituted with $R^{10}$;

$X^3$ and $X^4$ are each independently selected from —$CR^a$, or N;

$X^5$, $X^6$ and $X^7$ are each independently selected from —$NR^c$—, —O—, —S— and —$CR^aR^b$—;

$R^a$ and $R^b$ are each independently hydrogen, F, Cl, Br, I, methyl, ethyl, propyl, butyl, pentyl, hexyl, heptyl, octyl, —$C_{2-8}$alkenyl, —$C_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, heteroaryl, oxo (=O), —CN, —$NO_2$, —$OR^c$, —$SO_2R^c$, —$COR^c$, —$CO_2R^c$, —$CONR^dR^d$, —C(=$NR^c$)$NR^dR^e$, —$NR^eR^d$, —$NR^cCOR^d$, —$NR^cCONR^dR^e$, —$NR^cCO_2R^d$, —$NR^cSONR^dR^e$, —$NR^cSO_2NR^dR^e$ or —$NR^cSO_2R^d$; each of said methyl, ethyl, propyl, butyl, pentyl, hexyl, heptyl, octyl, —$C_{2-8}$alkenyl, —$C_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

$R^c$ is independently selected from hydrogen, methyl, ethyl, propyl, butyl, pentyl, hexyl, heptyl, octyl, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, or heteroaryl.

Aspect 16. The compound of any aspect of Aspects 1-15 wherein Cy1b is each independently

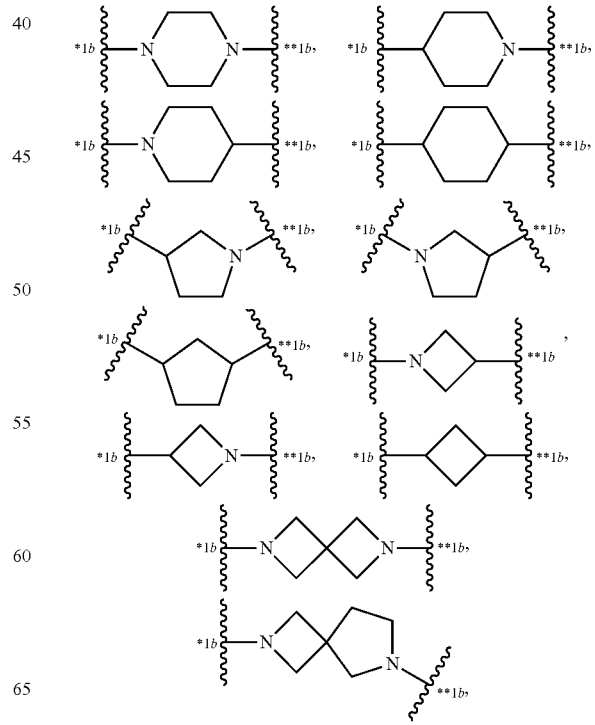

-continued

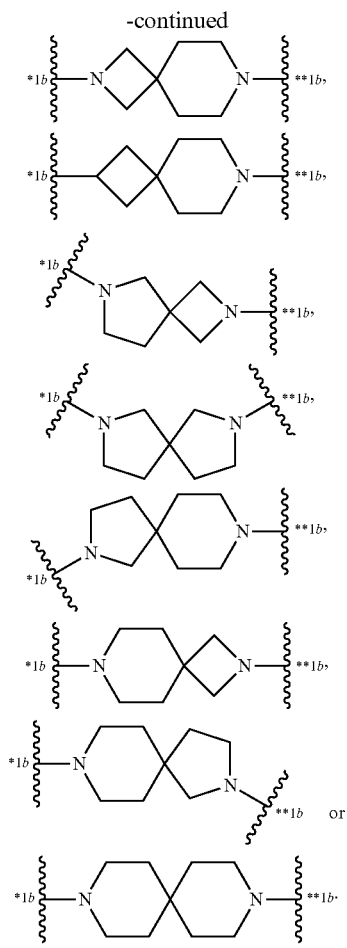

Aspect 17. The compound of any aspect of Aspects 1-16, wherein Cy1c is each independently

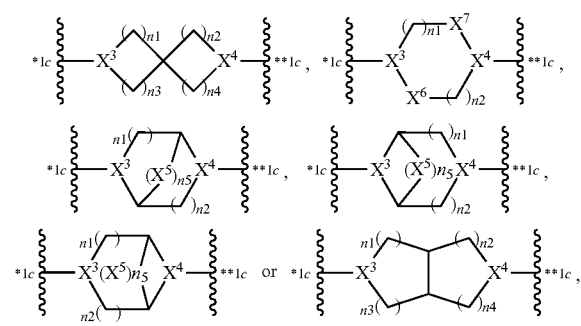

each of

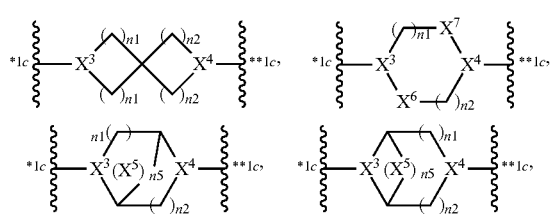

-continued

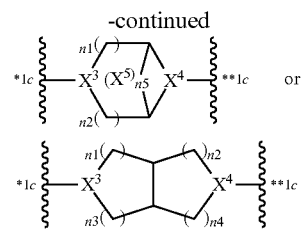

is optionally substituted with $R^{11}$, n1, n2, n3, n4 and n5 are each independently 0, 1, 2, 3 or 4;

$X^3$ and $X^4$ are each independently selected from —$CR^a$, or N;

$X^5$, $X^6$ and $X^7$ are each independently selected from —$NR^c$—, —O—, —S— and —$CR^aR^b$—;

$R^a$, $R^b$ and $R^c$ are defined as in Aspect 1;

*1c refers to the position attached to the

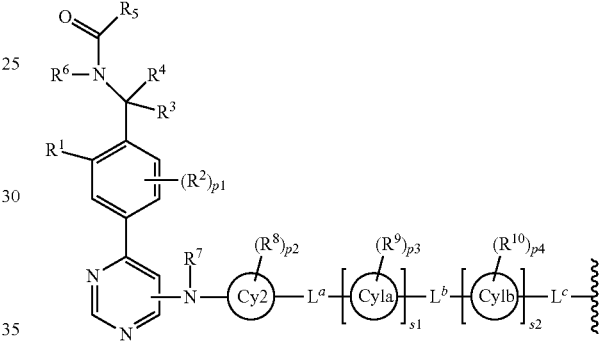

moiety and **1c refers to the position attached to the

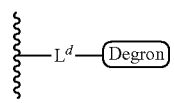

moiety.

Aspect 18. The compound of any aspect of Aspects 1-17, wherein Cy1c is each independently

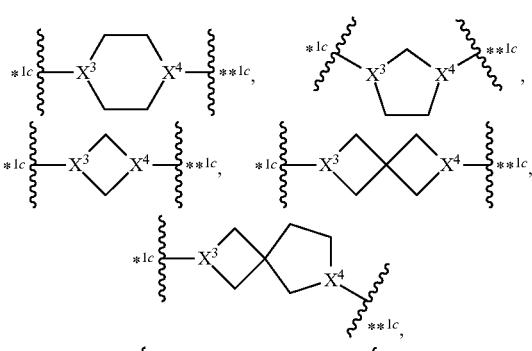

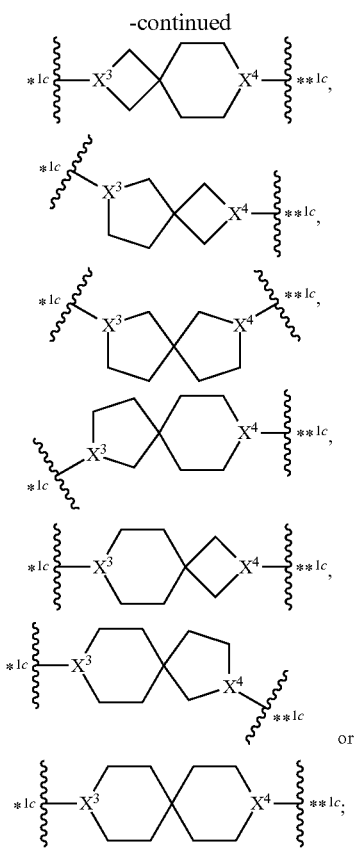

each of

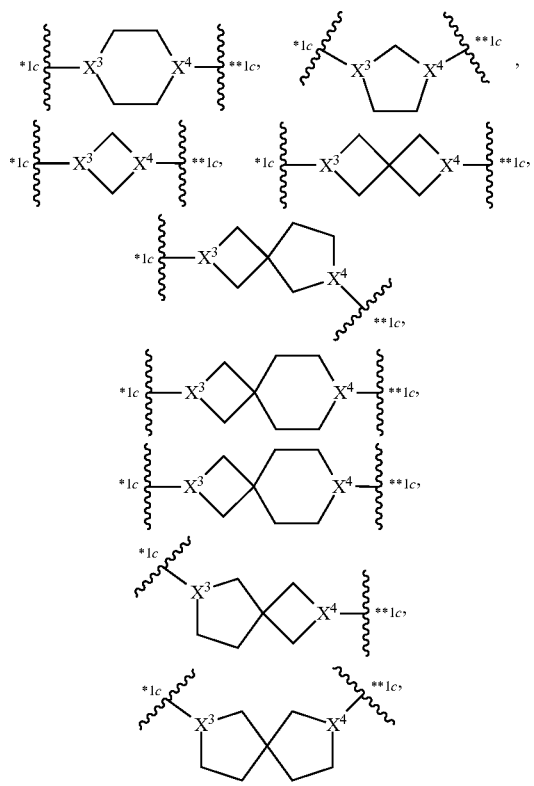

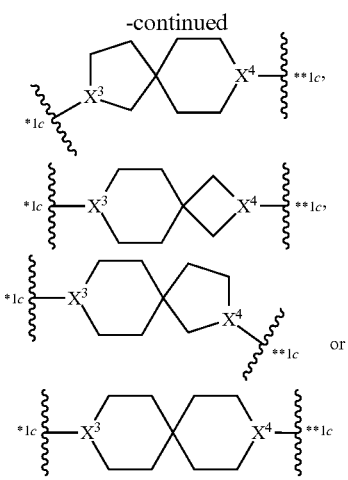

is optionally substituted with $R^{11}$;

$X^3$ and $X^4$ are each independently selected from —$CR^a$, or N;

$X^5$, $X^6$ and $X^7$ are each independently selected from —$NR^c$—, —O—, —S— and —$CR^aR^b$—;

$R^a$ and $R^b$ are each independently hydrogen, F, Cl, Br, I, methyl, ethyl, propyl, butyl, pentyl, hexyl, heptyl, octyl, —$C_{2-8}$alkenyl, —$C_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, heteroaryl, oxo (=O), —CN, —$NO_2$, —$OR^c$, —$SO_2R^c$, —$COR^c$, —$CO_2R^c$, —$CONR^cR^d$, —C(=$NR^c$)$NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$ or —$NR^cSO_2R^d$; each of said methyl, ethyl, propyl, butyl, pentyl, hexyl, heptyl, octyl, —$C_{2-8}$alkenyl, —$C_{2-8}$alkynyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

$R^c$ is independently selected from hydrogen, methyl, ethyl, propyl, butyl, pentyl, hexyl, heptyl, octyl, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, or heteroaryl.

Aspect 19. The compound of any aspect of Aspects 1-18, wherein Cy1c is each independently

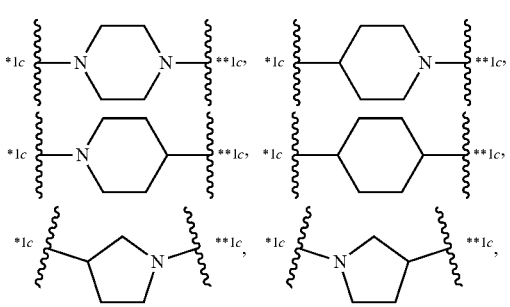

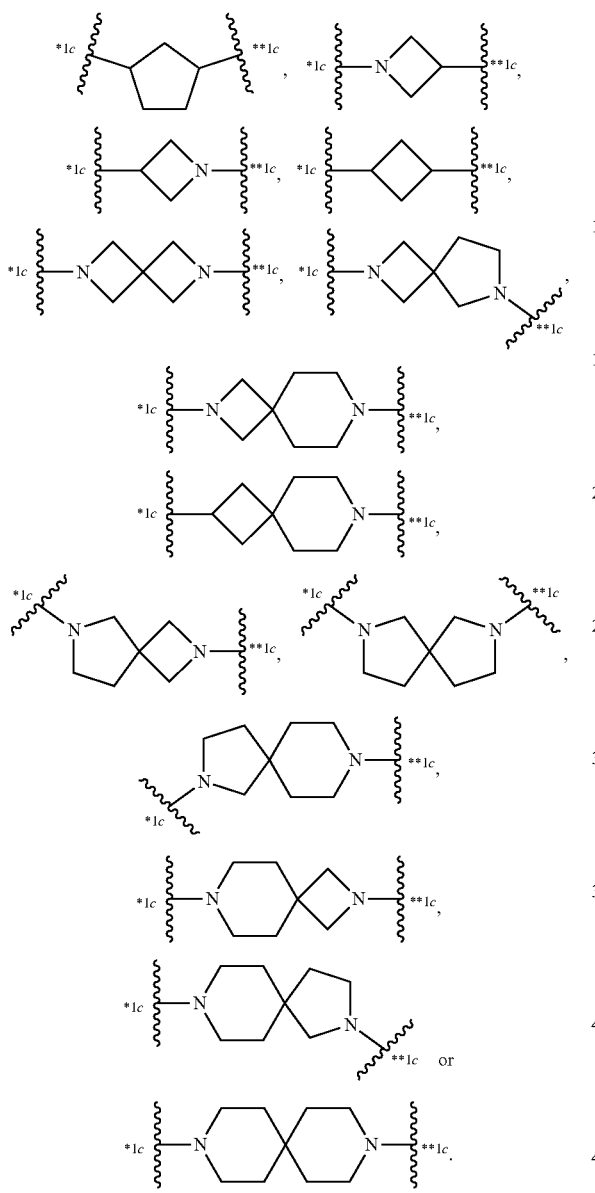
Aspect 20. The compound of any aspect of Aspects 1-19, wherein the
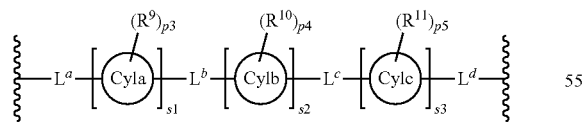
moiety is
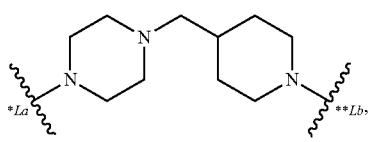
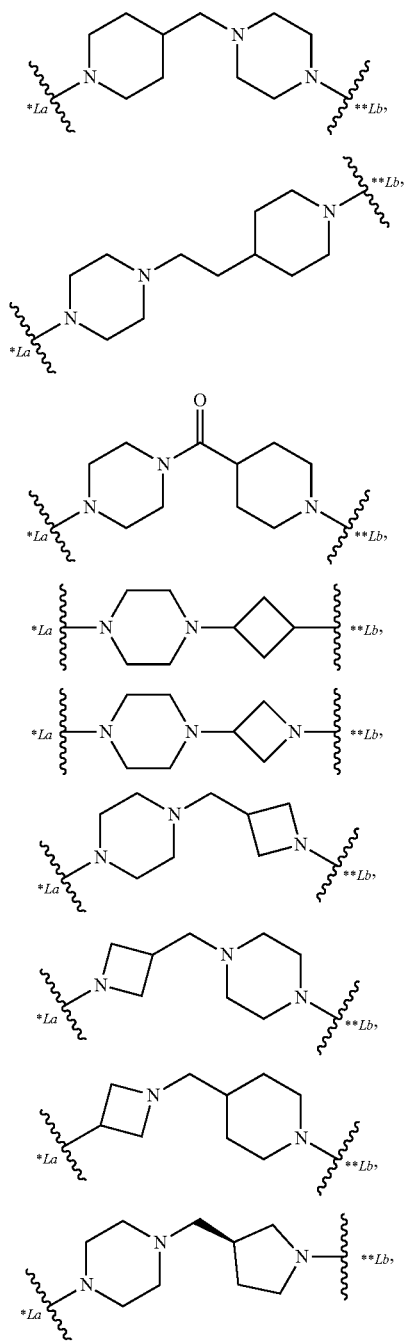
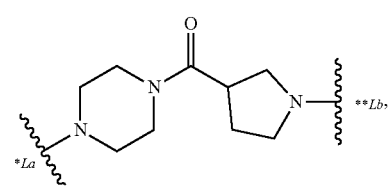

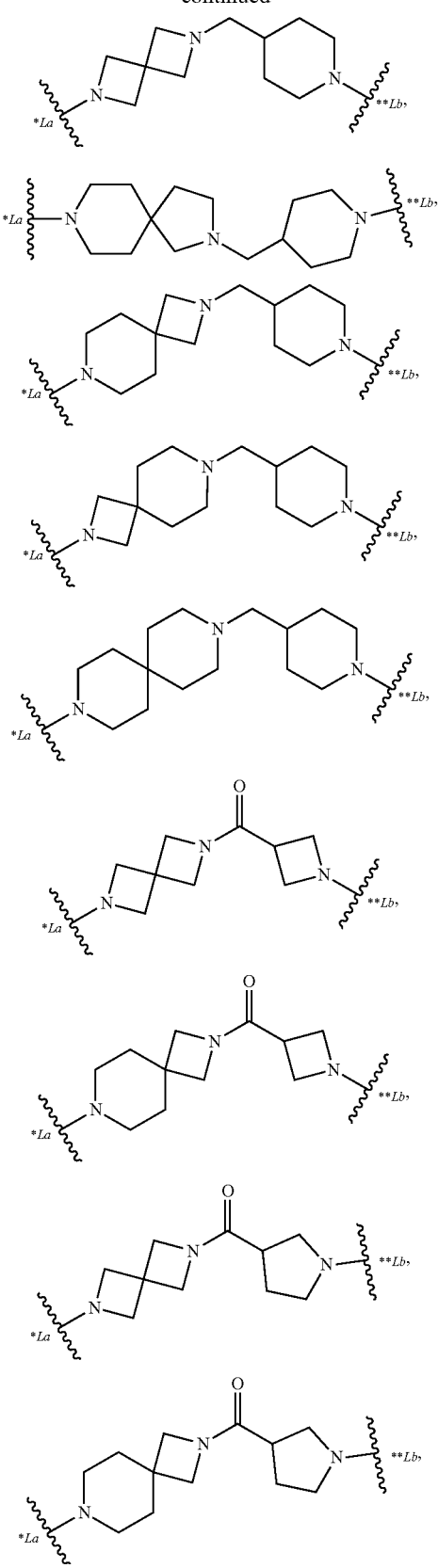
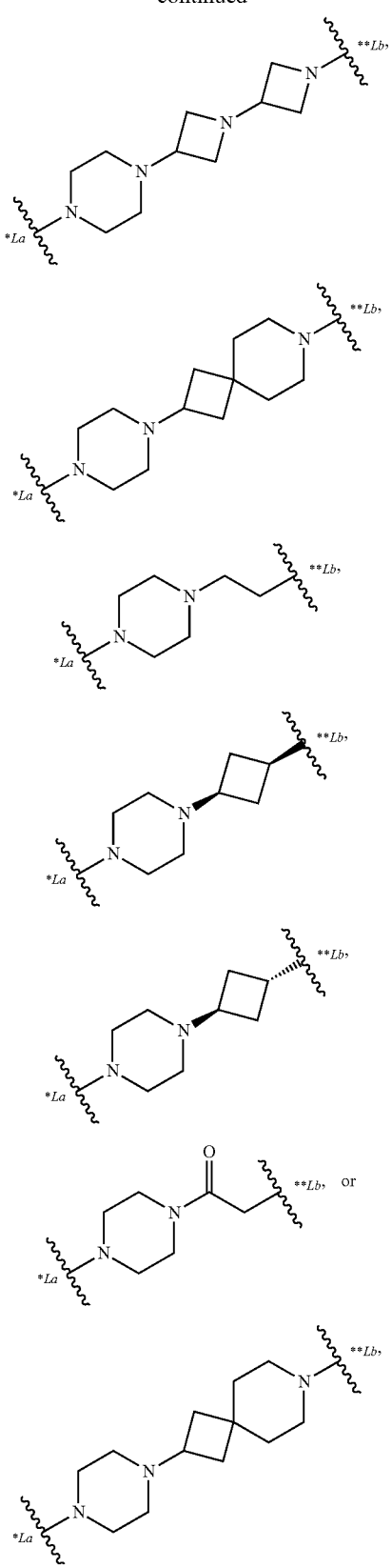

wherein *La refers to the position attached to the

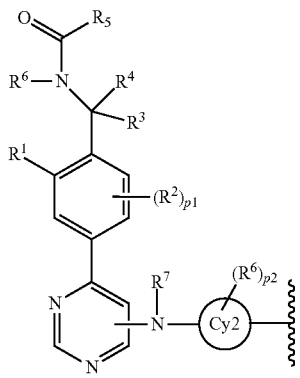

moiety and *Lb refers to the position attached to the

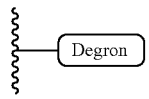

moiety.

Aspect 21. The compound of any aspect of Aspects 1-20, wherein $R^1$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, -methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

$R^c$, $R^d$ and $R^e$ are each independently hydrogen, methyl, ethyl, propyl, butyl, pentyl, hexyl, heptyl, octyl, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, or heteroaryl; or ($R^c$ and $R^d$) or ($R^d$ and $R^e$) together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —$C_{1-8}$alkyl, —$C_{2-8}$alkenyl, —$C_{2-8}$alkynyl, cycloalkyl, heterocyclyl, aryl, heteroaryl, oxo, —CN or —$NO_2$.

Aspect 22. The compound of any aspect of Aspects 1-21, wherein $R^1$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN or —$NO_2$; preferably $R^1$ is hydrogen, F, Cl, Br, I, methyl, ethyl, propyl, butyl, cyclopropyl, cyclobutyl.

Aspect 23. The compound of any aspect of Aspects 1-22, wherein $R^2$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, -methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

$R^c$, $R^d$ and $R^e$ are each independently hydrogen, methyl, ethyl, propyl, butyl, pentyl, hexyl, heptyl, octyl, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, or heteroaryl; or ($R^c$ and $R^d$) or ($R^d$ and $R^e$) together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —$C_{1-8}$alkyl, —$C_{2-8}$alkenyl, —$C_{2-8}$alkynyl, cycloalkyl, heterocyclyl, aryl, heteroaryl, oxo, —CN or —$NO_2$.

Aspect 24. The compound of any aspect of Aspects 1-23, wherein $R^2$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN or —$NO_2$; preferably $R^2$ is hydrogen, F, Cl, Br, I, methyl, ethyl, propyl, butyl, methoxy, ethoxy, propoxy, butoxy, cyclopropyl, cyclobutyl, cyclopentyl, —CN or —$NO_2$.

Aspect 25. The compound of any aspect of Aspects 1-24, wherein $R^3$ and $R^4$ are each independently hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, -methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl; $R^c$, $R^d$ and $R^e$ are each independently hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl, or heteroaryl; or (R$^c$ and R$^d$) or (R$^d$ and R$^e$) together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —C$_{1-8}$alkyl, —C$_{2-8}$alkenyl, —C$_{2-8}$alkynyl, cycloalkyl, heterocyclyl, aryl, heteroaryl, oxo, —CN or —NO$_2$.

Aspect 26. The compound of any aspect of Aspects 1-25, wherein R$^3$ and R$^4$ are each independently hydrogen, F, Cl, Br, I, methyl, ethyl, propyl, butyl, pentyl, hexyl, heptyl, octyl, methoxy, ethoxy, propoxy, cyclopropyl, cyclobutyl, cyclopentyl, cyclohexyl, cycloheptyl, cyclooctyl, heterocyclyl, aryl, heteroaryl or —CN; preferably R$^3$ and R$^4$ are each independently hydrogen, methyl, ethyl, propyl, butyl, cyclopropyl, cyclobutyl or cyclopentyl.

Aspect 27. The compound of any aspect of Aspects 1-26, wherein the

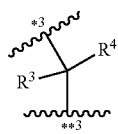

moiety is

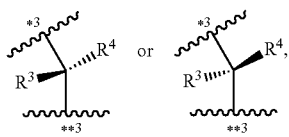

wherein *3 refers to the position attached to the

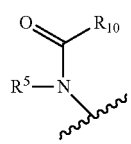

moiety, and **3 refers to the position attached to

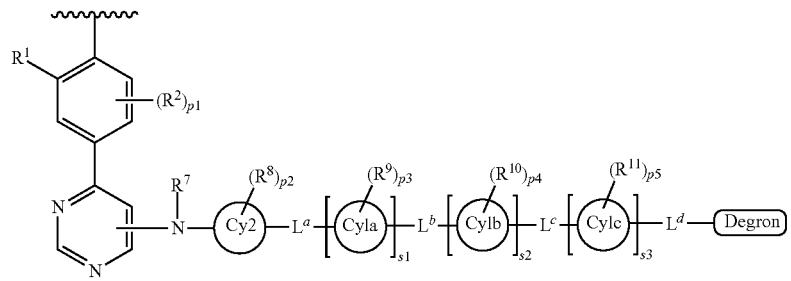

moiety.

Aspect 28. The compound of any aspect of Aspects 1-27, wherein R$^6$ and R$^7$ are each independently hydrogen, methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl or heteroaryl, each of said methyl, ethyl, propyl, butyl, pentyl, hexyl, heptyl, octyl, —C$_{2-8}$alkenyl, —C$_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -haloC$_{1-8}$alkyl, methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl or heteroaryl; preferably, R$^6$ and R$^7$ are each independently H, methyl, ethyl, propyl butyl, pentyl, hexyl, cyclopropyl, cyclobutyl, cyclopentyl or cyclohexyl.

Aspect 29. The compound of any aspect of Aspects 1-28, wherein R$^5$ is

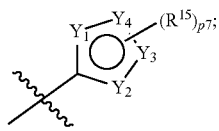

Y$^1$, Y$^2$, Y$^3$ and Y$^4$ are each independently selected from CH, O, S or N; R$^{15}$ is each independently selected from hydrogen, halogen, —C$_{1-8}$alkyl, —C$_{1-8}$alkoxy, —C$_{2-8}$alkenyl, —C$_{2-8}$alkynyl, cycloalkyl, heterocyclyl, aryl, heteroaryl, —CN, —NO$_2$, —OR$^c$, —SO$_2$R$^c$, —COR$^c$, —CO$_2$R$^c$, —CONR$^c$R$^d$, —C(=NR$^c$)NR$^d$R$^e$, —NR$^c$R$^d$, —NR$^c$COR$^d$, —NR$^c$CONR$^d$R$^e$, —NR$^c$CO$_2$R$^d$, —NR$^c$SONR$^d$R$^e$, —NR$^c$SO$_2$NR$^d$R$^e$, or —NR$^c$SO$_2$R$^d$, each of said —C$_{1-8}$alkyl, —C$_{1-8}$alkoxy, —C$_{2-8}$alkenyl, —C$_{2-8}$alkynyl, cycloalkyl, heterocyclyl, aryl, or heteroaryl is optionally substituted with halogen, hydroxy, -haloC$_{1-8}$alkyl, —C$_{1-8}$alkyoxy, cycloalkyl, heterocyclyl, aryl, or heteroaryl; R$^c$, R$^d$, and R$^e$ are each independently defined as in Aspect 1; and p7 is 0,1,2,3 or 4.

Aspect 30. The compound of Aspect 29, wherein Y$^1$ is CH, S, N or O; Y$^2$ is CH, S, O or N; Y$^3$ is CH, O, S or N; and Y$^4$ is CH, O, S or N.

Aspect 31. The compound of Aspect 28, wherein

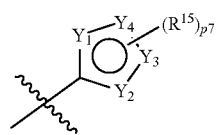

is selected from

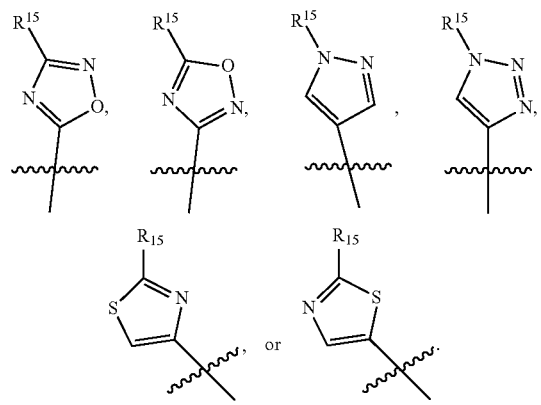

Aspect 32. The compound according to Aspect 29, wherein, $R^{15}$ is selected from —H, —F, —Cl, —Br, —I, —CH$_3$, —C$_2$H$_5$, —C$_3$H$_7$, —C$_4$H$_9$, —C$_5$H$_{11}$, —C$_6$H$_{13}$, methoxy, ethoxy, propoxy, butoxy, pentoxy, hexoxy, cyclopropyl, cyclobutyl, cyclopentyl, cyclohexyl, —C$_{2-8}$alkenyl, —C$_{2-8}$alkynyl, —CH$_2$OH, —CH$_2$CH$_2$OH, —CH(OH)CH$_3$, —CH$_2$CH$_2$CH$_2$OH, —CH(OH)CH$_2$CH$_3$, —CH$_2$CH(OH)CH$_3$, —CH$_2$OCH$_3$, —CFH$_2$, —CF$_2$H, —CF$_3$, —CH$_2$CF$_3$, —CH$_2$CH$_2$CF$_3$, each of said —CH$_3$, —C$_2$H$_5$, —C$_3$H$_7$, —C$_4$H$_9$, —C$_5$H$_{11}$, —C$_6$H$_{13}$, methoxy, ethoxy, propoxy, butoxy, pentoxy, hexoxy, cyclopropyl, cyclobutyl, cyclopentyl, cyclohexyl, —C$_{2-8}$alkenyl, —C$_{2-8}$alkynyl is optionally substituted with at least one F, Cl, Br, I, hydroxy, -haloC$_{1-8}$alkyl, —C$_{1-8}$alkyoxy, cycloalkyl, heterocyclyl, aryl, or heteroaryl.

Aspect 33. The compound according to Aspect 29, wherein, $R^{15}$ is selected from

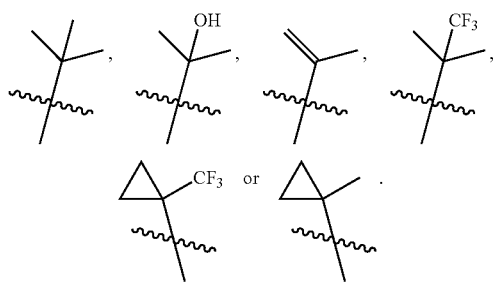

Aspect 34. The compound of any aspect of Aspects 1-33, wherein the

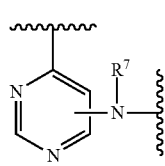

moiety is

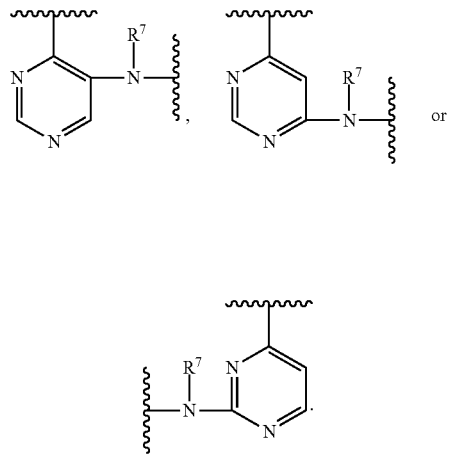

Aspect 35. The compound of any aspect of Aspects 1-34, wherein Cy2 is a 5- or 6-membered aromatic ring comprising 0-3 heteroatoms selected from nitrogen, oxygen and sulfur as ring member(s).

Aspect 36. The compound of any aspect of Aspects 1-35, wherein

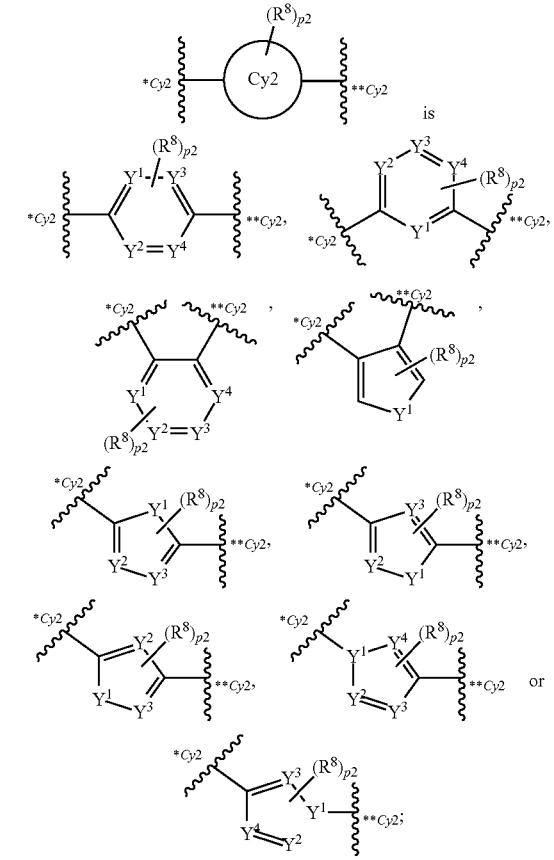

$Y^1$, $Y^2$, $Y^3$ and $Y^4$ are each independently defined as in Aspect 29 wherein *Cy2 refers to the position attached to the
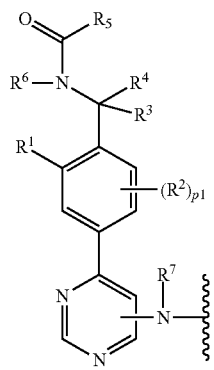
moiety, and **3 refers to the position attached to
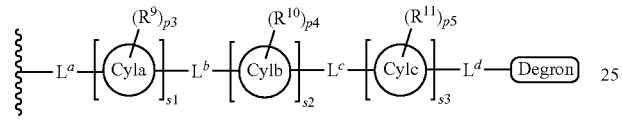
moiety.
Aspect 37. The compound of any aspect of Aspects 1-36, wherein
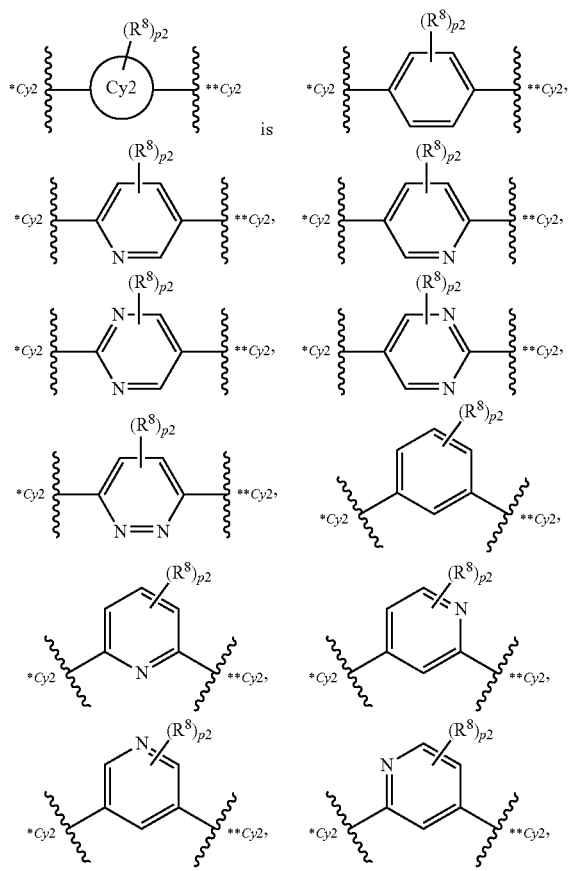 is
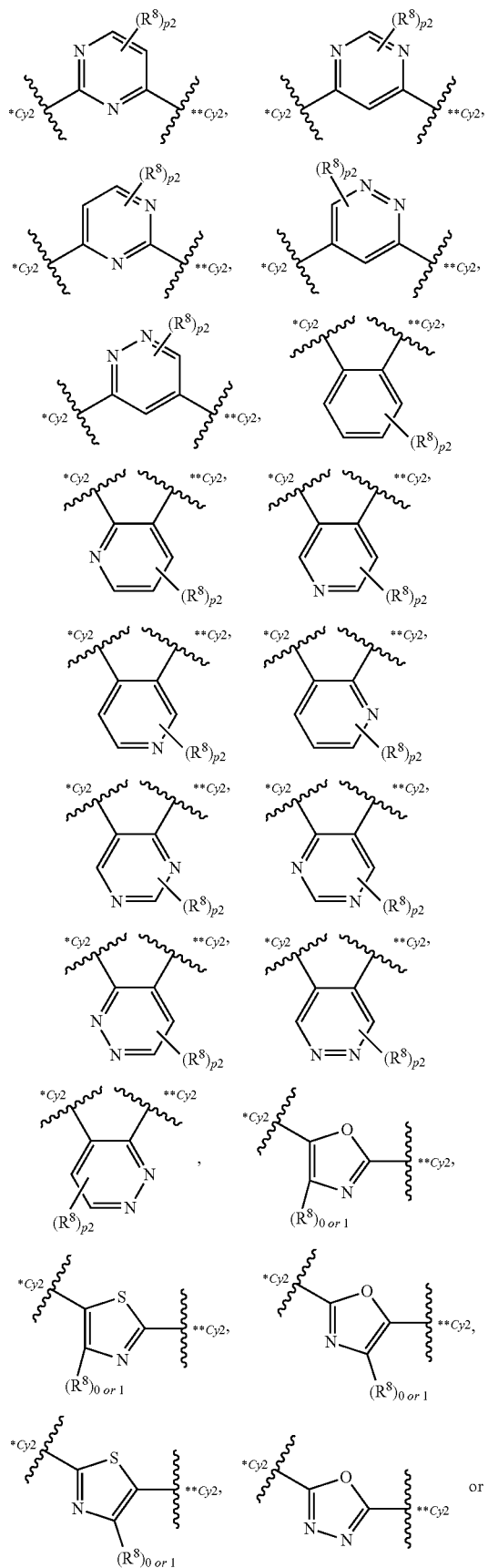

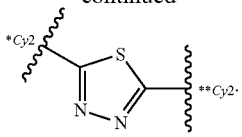

Aspect 38. The compound of any aspect of Aspects 1-36, wherein $R^8$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN, —$NO_2$, —$OR^c$, —$SO_2R^c$, —$COR^c$, —$CO_2R^c$, —$CONR^cR^d$, —$C(=NR^c)NR^dR^e$, —$NR^cR^d$, —$NR^cCOR^d$, —$NR^cCONR^dR^e$, —$NR^cCO_2R^d$, —$NR^cSONR^dR^e$, —$NR^cSO_2NR^dR^e$, or —$NR^cSO_2R^d$, each of said methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl or heteroaryl is optionally substituted with F, Cl, Br, I, hydroxy, -halo$C_{1-8}$alkyl, -methoxy, ethoxy, propoxy, butoxy, pentoxy, hexoxy, hepthoxy, octoxy, cyclopropyl, cyclobutyl, cyclopentyl, cyclohexyl, cycloheptyl, cyclooctyl, heterocyclyl, aryl, or heteroaryl;

$R^c$, $R^d$ and $R^e$ are each independently hydrogen, methyl, ethyl, propyl, butyl, pentyl, hexyl, heptyl, octyl, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, or heteroaryl; or ($R^c$ and $R^d$) or ($R^d$ and $R^e$) together with the atom(s) to which they are attached, form a 3-, 4-, 5-, 6-, 7- or 8-membered ring, said ring comprising 0, 1 or 2 additional heteroatoms independently selected from nitrogen, oxygen or optionally oxidized sulfur as ring member(s), said ring is optionally substituted with at least one substituent independently selected from halogen, —$C_{1-8}$alkyl, —$C_{2-8}$alkenyl, —$C_{2-8}$alkynyl, cycloalkyl, heterocyclyl, aryl, heteroaryl, oxo, —CN or —$NO_2$.

Aspect 39. The compound of any aspect of Aspects 1-37, wherein $R^8$ is hydrogen, F, Cl, Br, I, methyl, ethyl, propyl, butyl, pentyl, hexyl, heptyl, octyl, methoxy, ethoxy, propoxy, butoxy, pentoxy, hexoxy, hepthoxy, octoxy, —$C_{2-8}$alkenyl, —$C_{2-8}$alkynyl, cyclopropyl, cyclobutyl, cyclopentyl, cyclohexyl, cycloheptyl, cyclooctyl, heterocyclyl, aryl, heteroaryl, —CN or —$NO_2$; preferably $R^2$ is hydrogen, F, Cl, Br, I, methyl, ethyl, propyl, butyl, methoxy, ethoxy, propoxy, butoxy, cyclopropyl, cyclobutyl, cyclopentyl, —CN or —$NO_2$.

Aspect 40. The compound of any aspect of Aspects 1-38, wherein

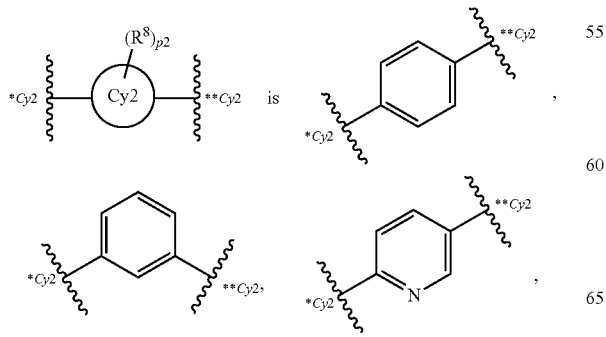

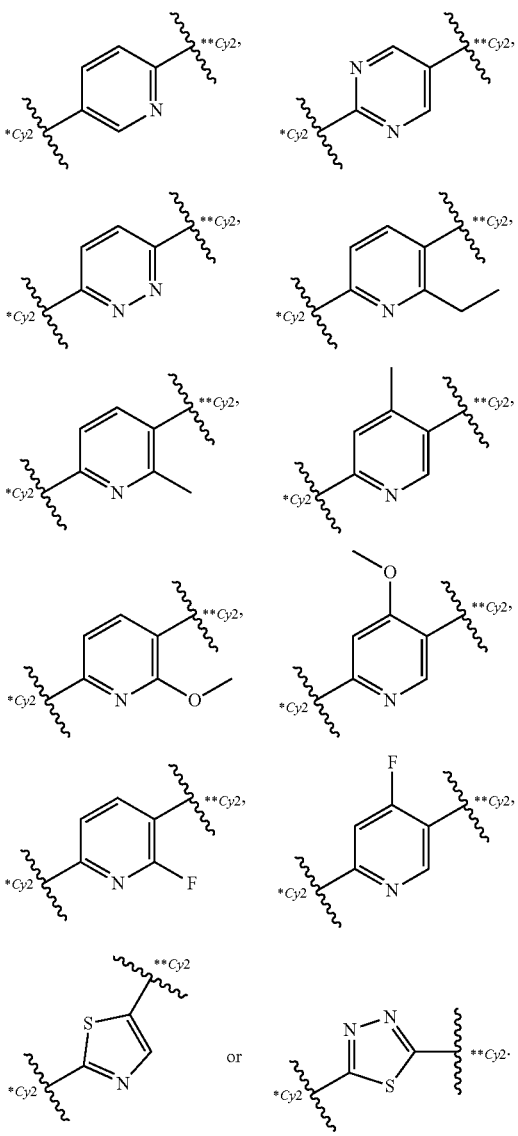

Aspect 41. The compound of any claim of aspects 1-40, wherein the

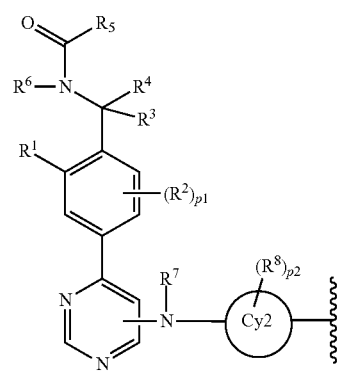

moiety is selected from
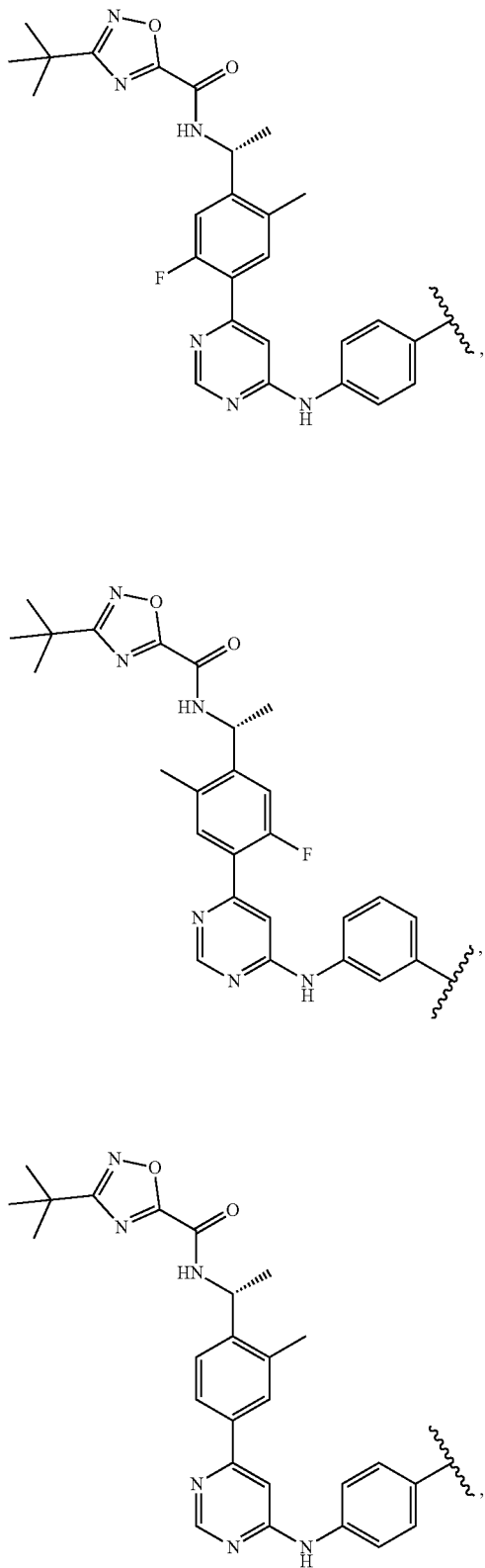
-continued
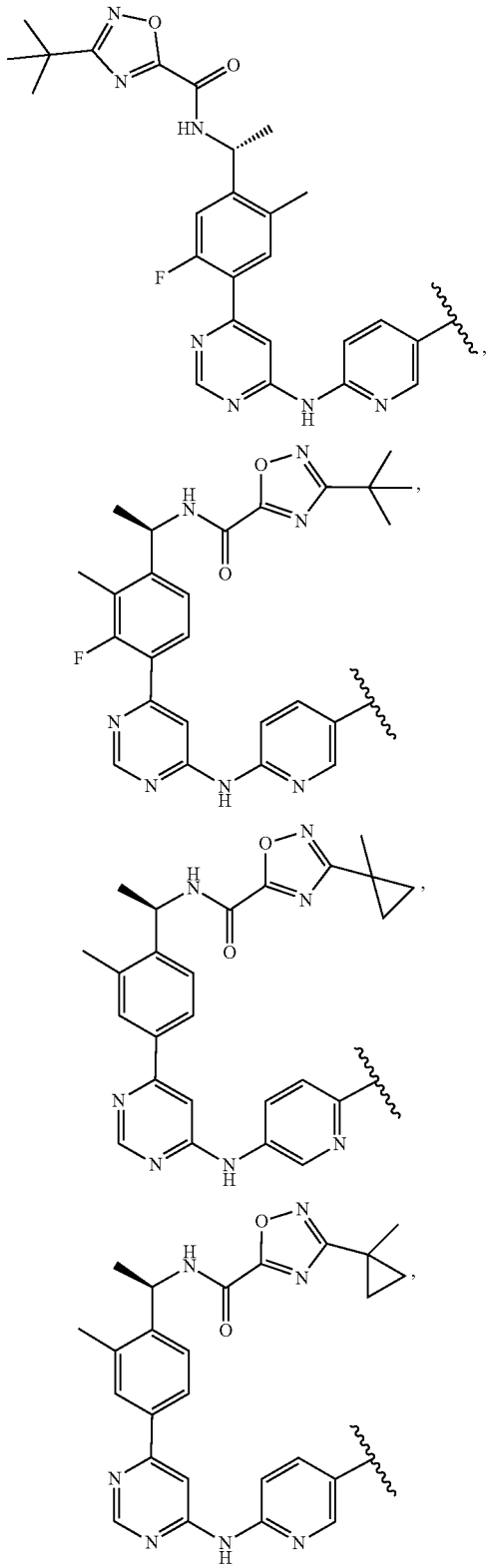

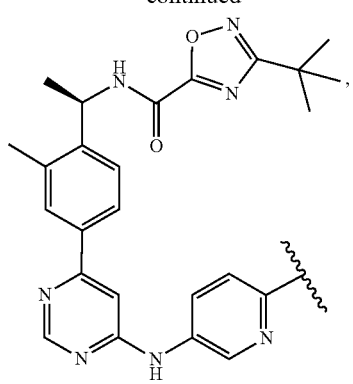
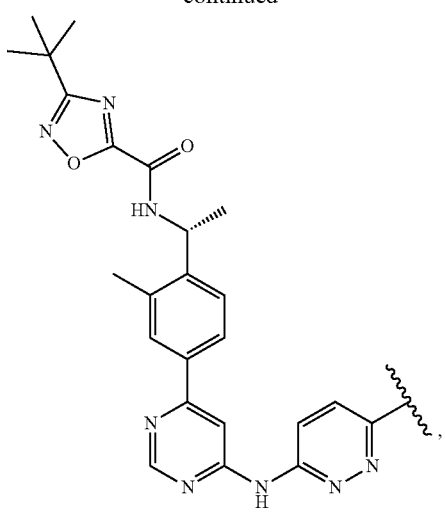
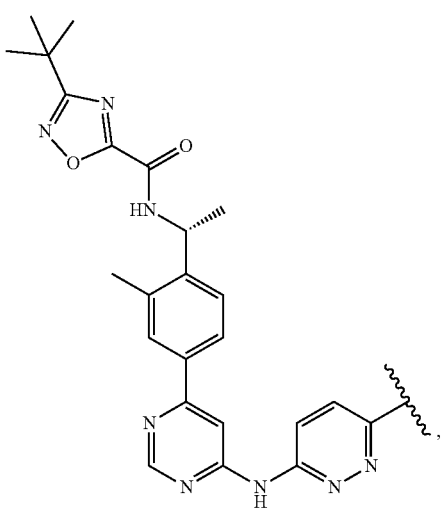
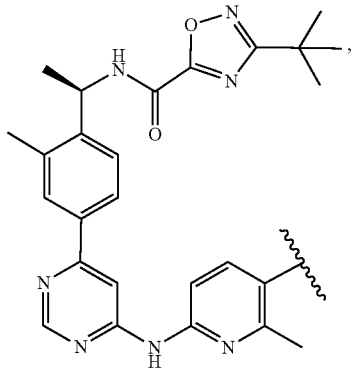

43
-continued
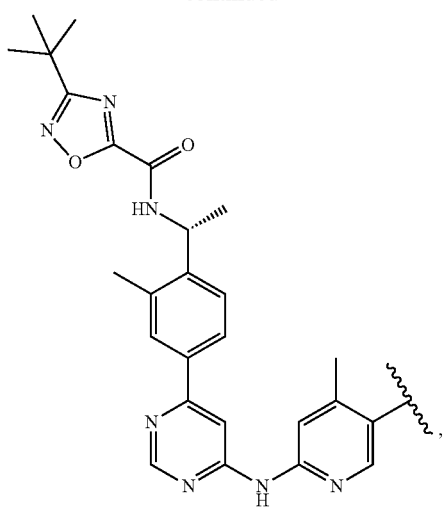
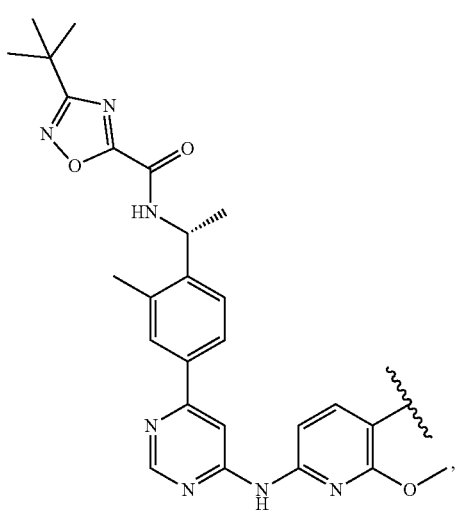
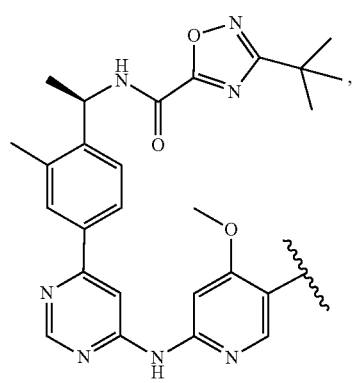
44
-continued
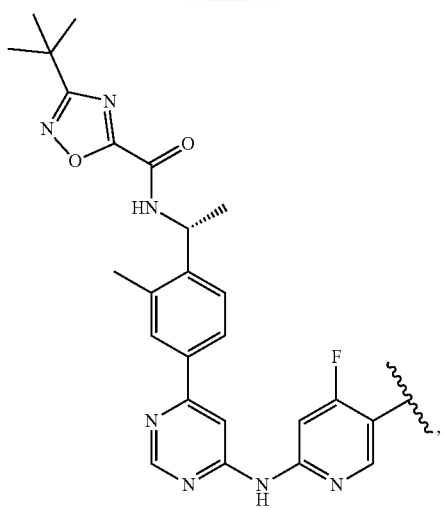
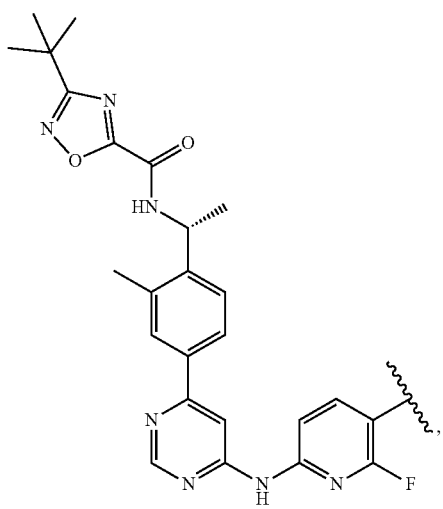
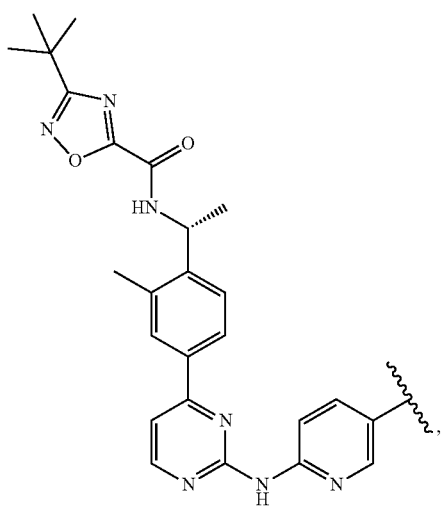

-continued
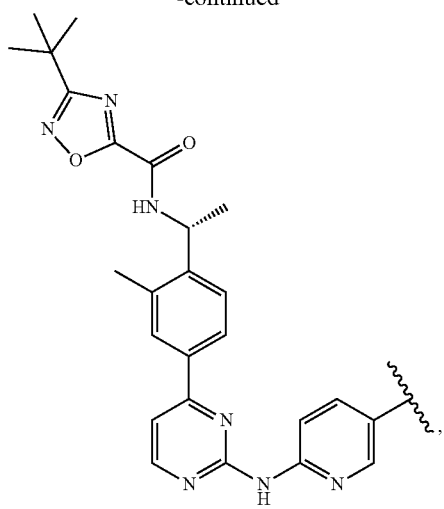
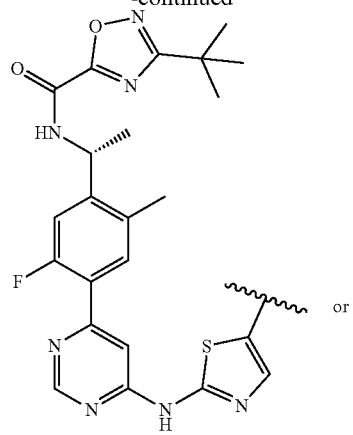
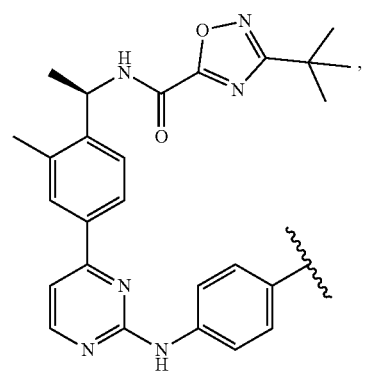
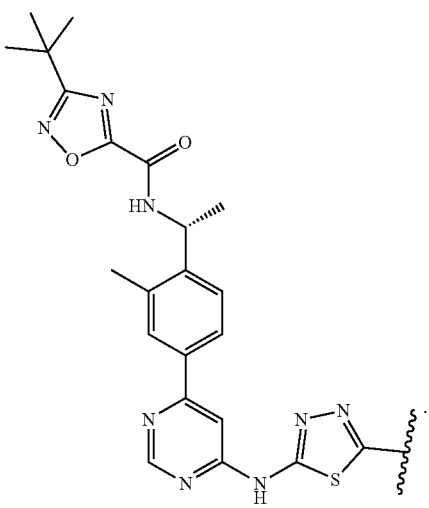 [SMILES: *c1nnc(Nc2cc(-c3ccc([C@@H](C)NC(=O)c4nc(C(C)(C)C)no4)c(C)c3)ncn2)s1]
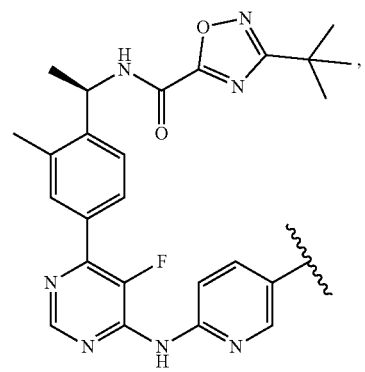
42. The compound of any aspect of Aspects 1-41, wherein the compound is selected from

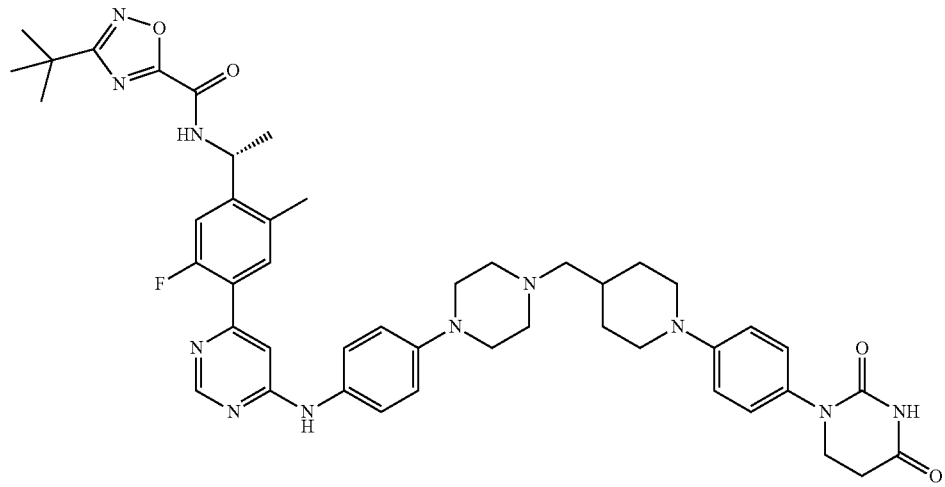
1
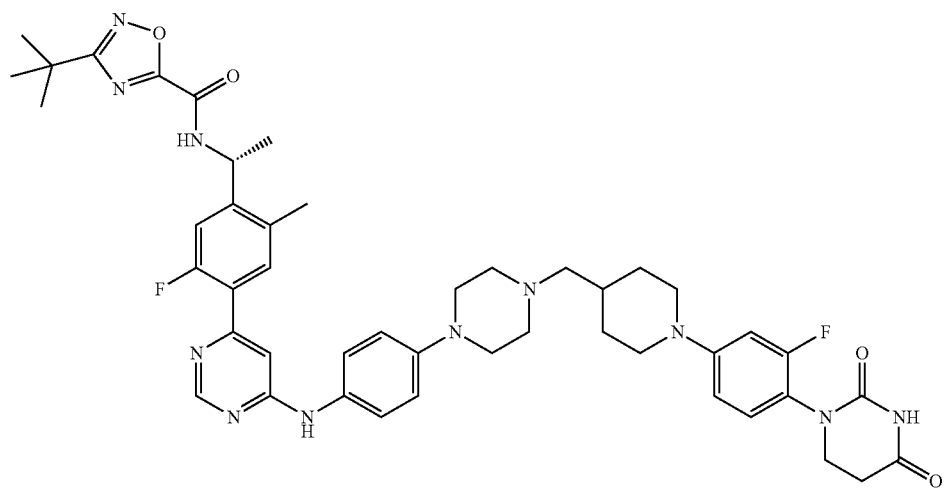
2
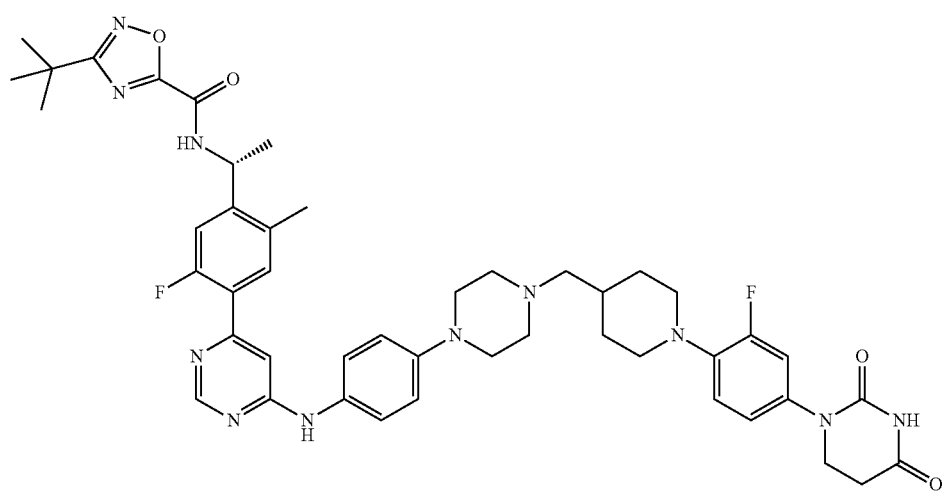
3

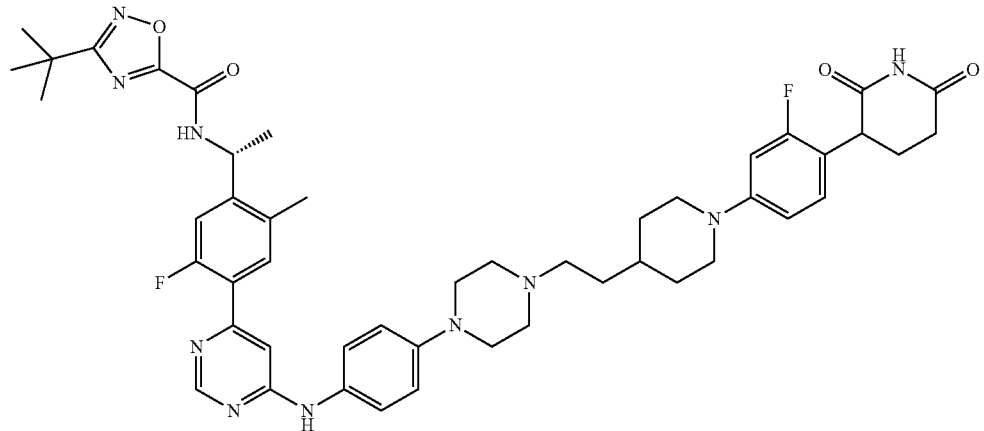
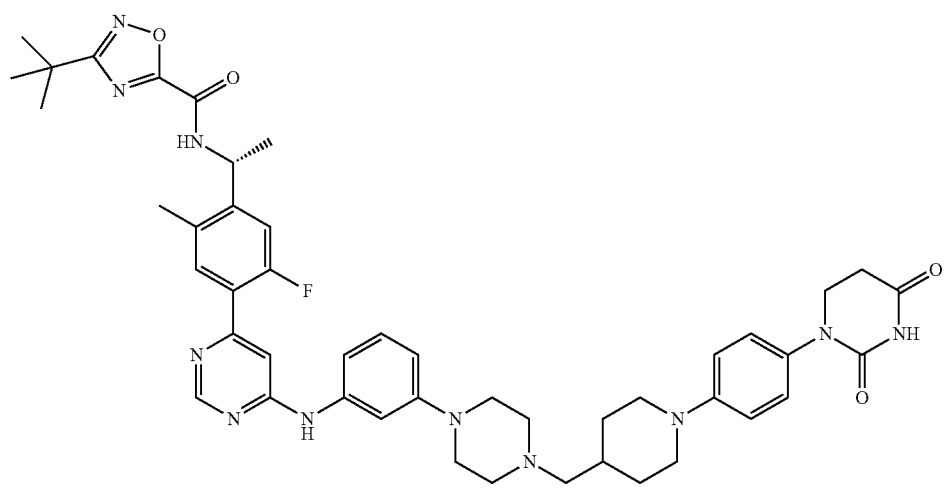
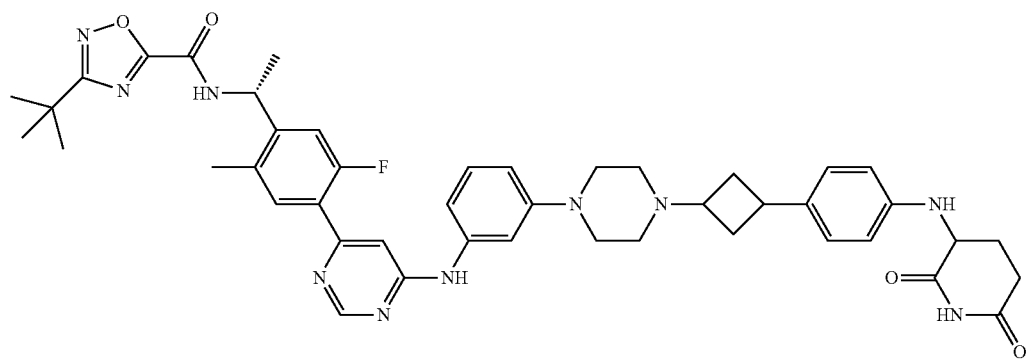

-continued
7
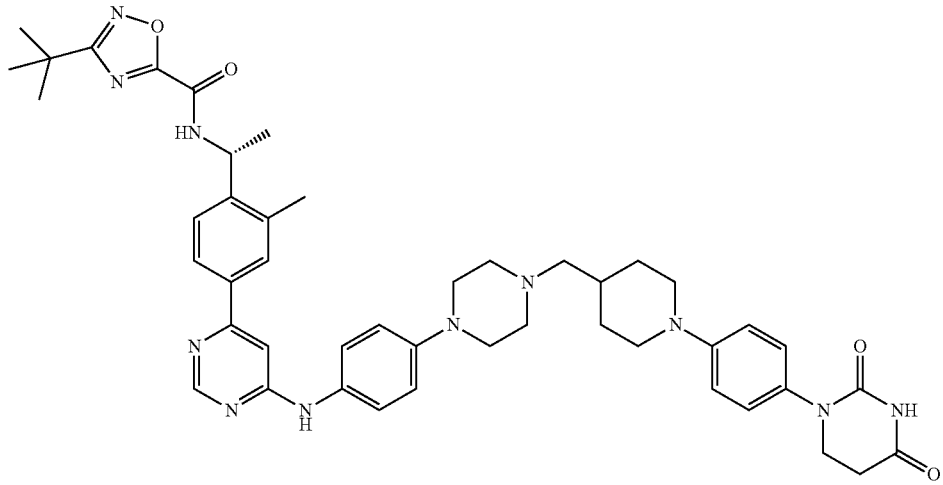
8
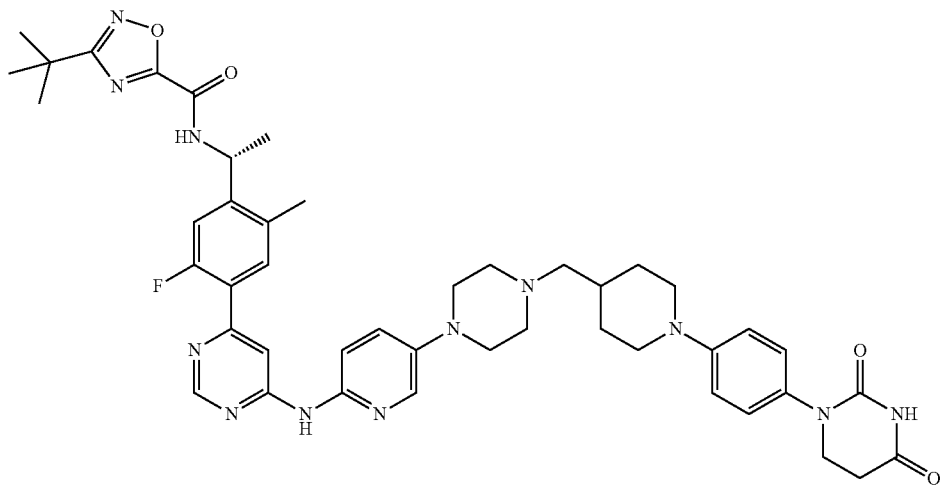
9
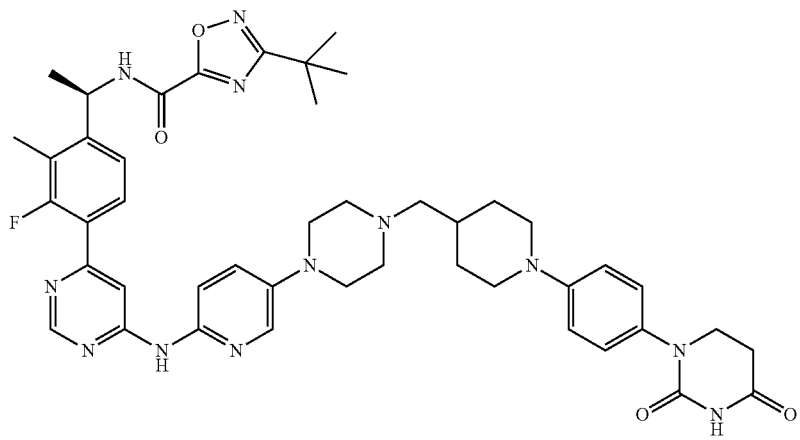

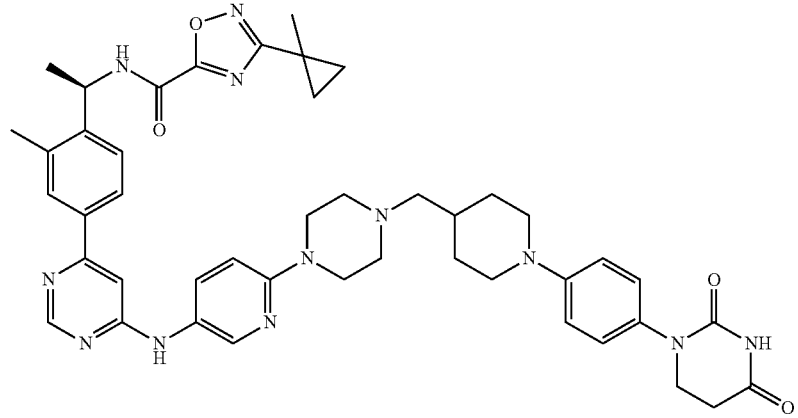
10
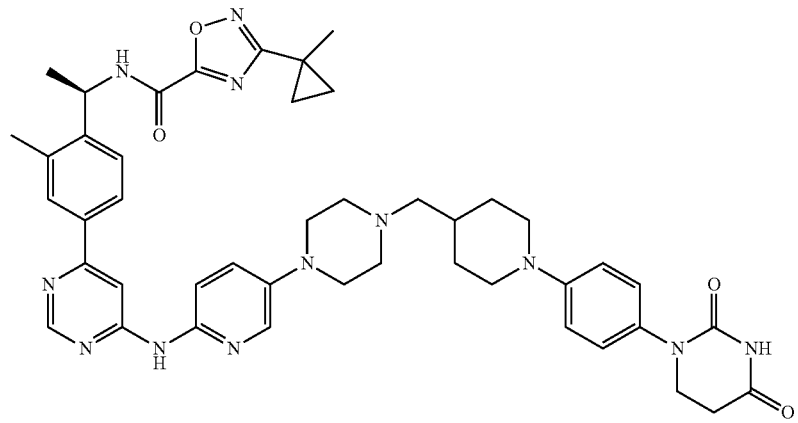
11
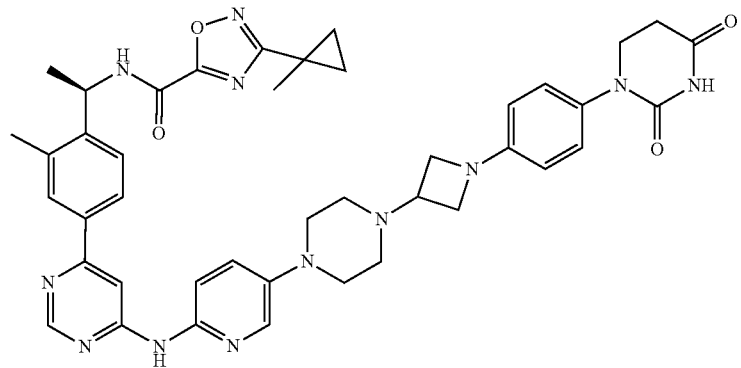
12
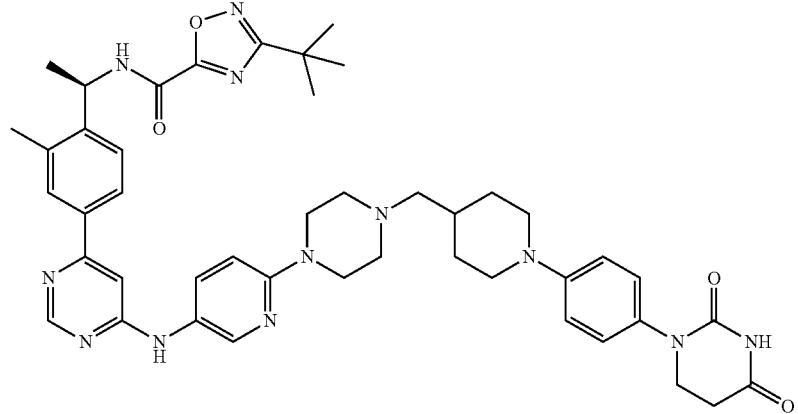
13

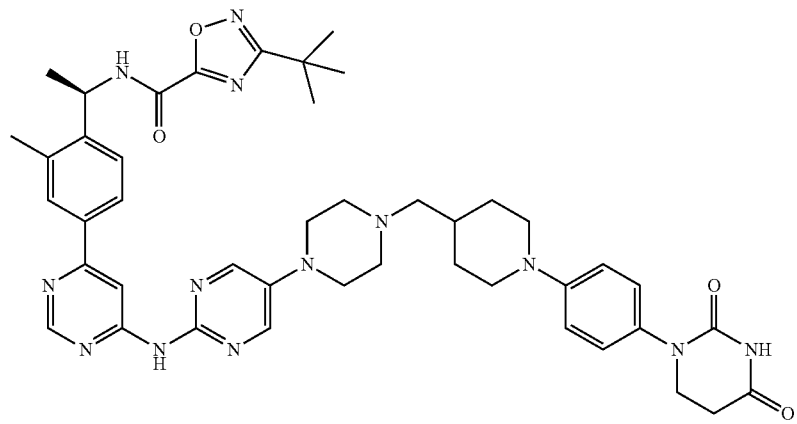
14
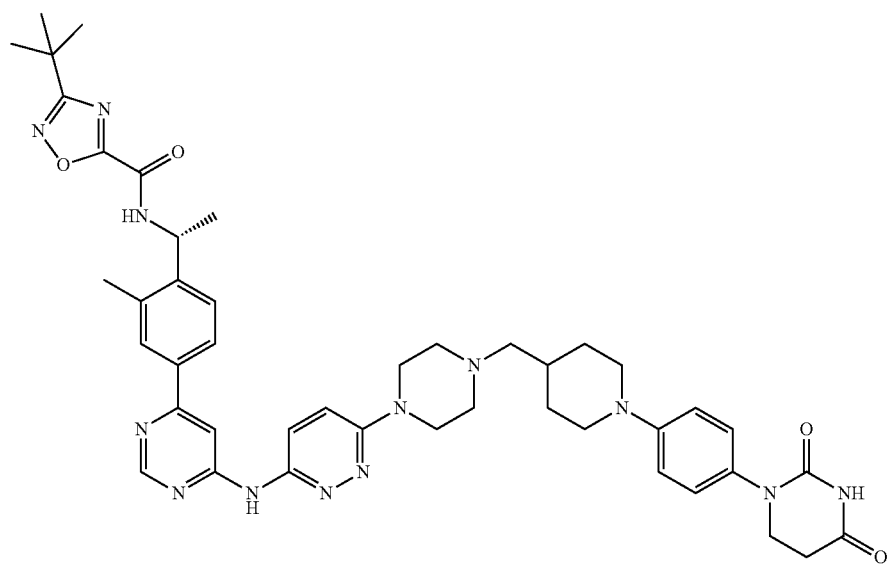
15
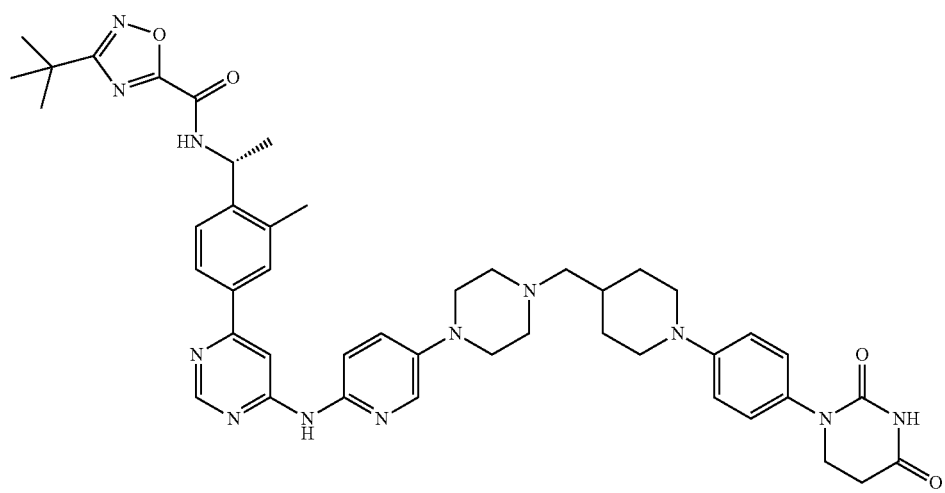
16

-continued
17
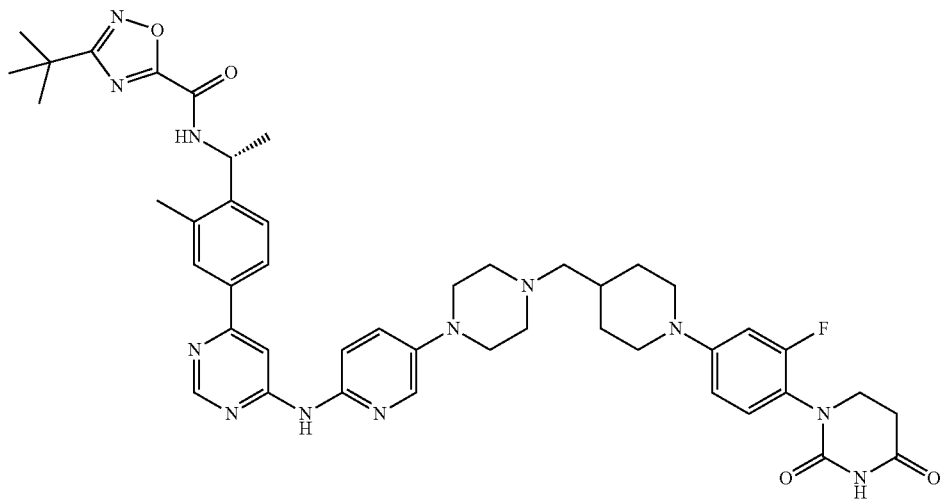
18
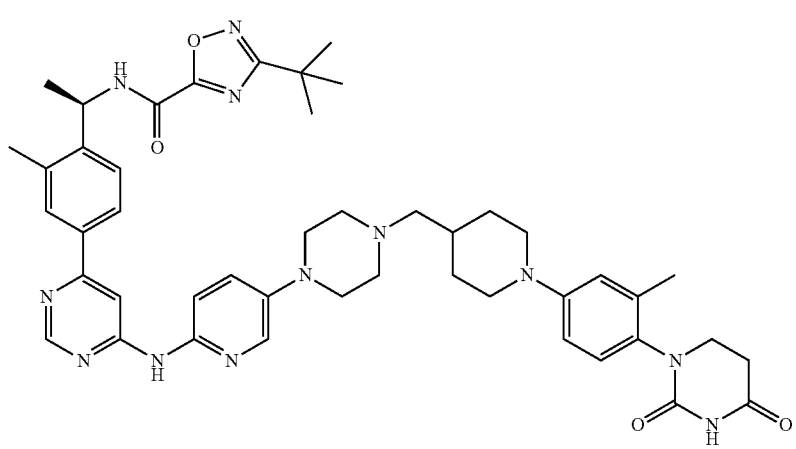
19
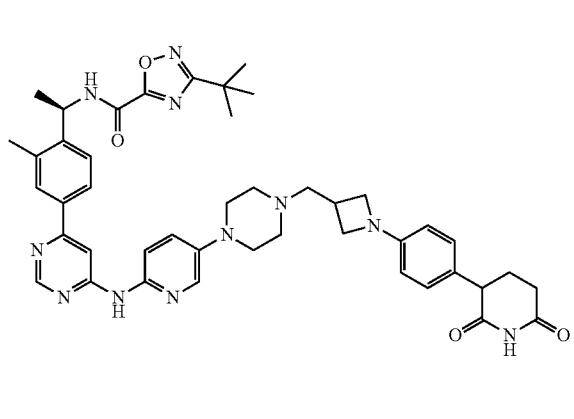
20
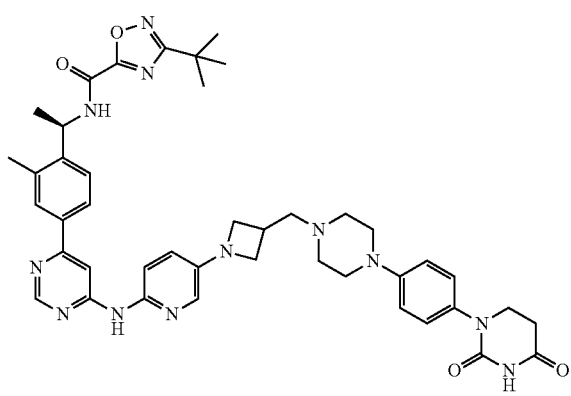

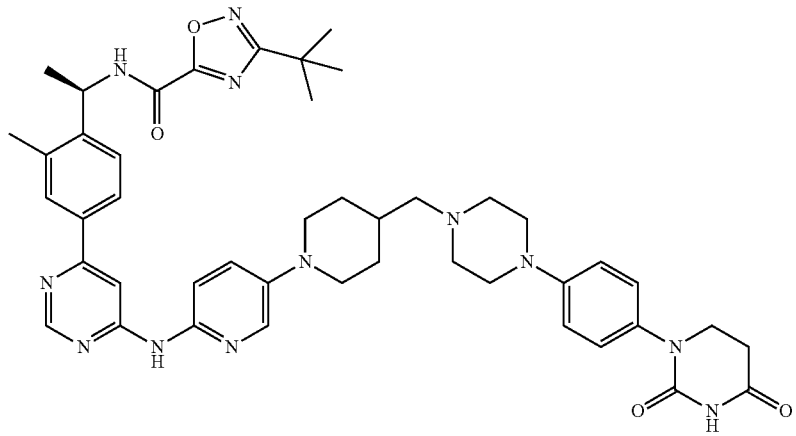
21
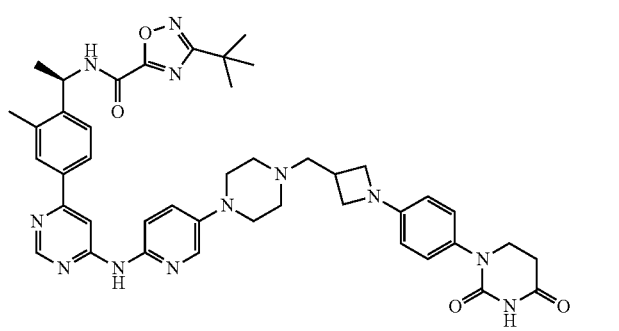
22
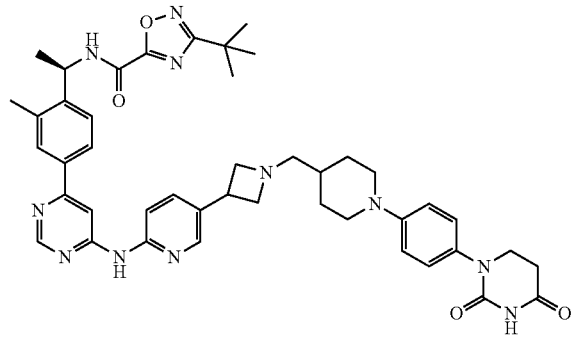
23
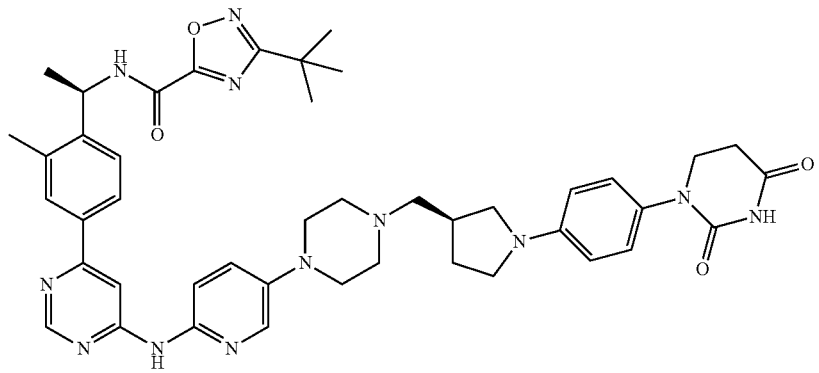
24
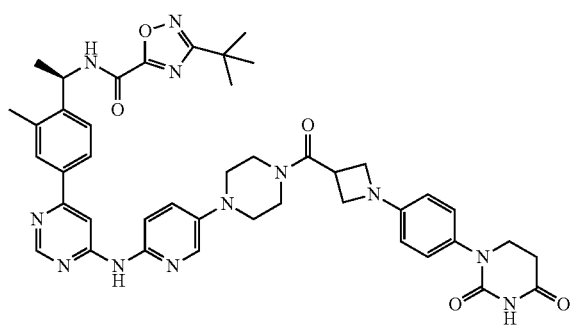
25
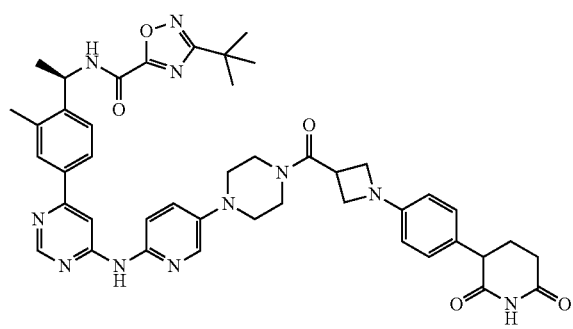
26

27
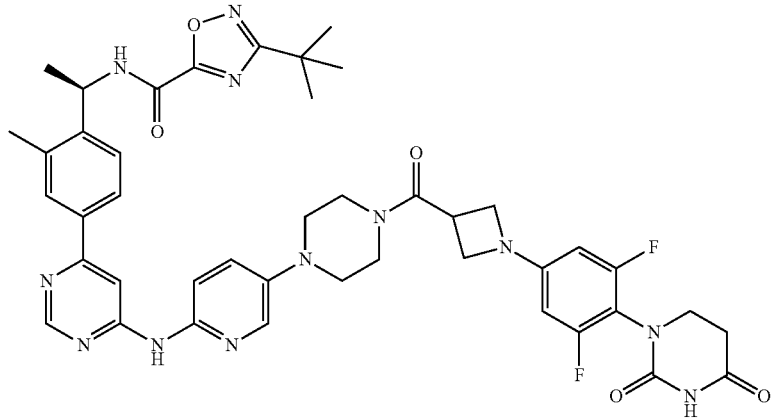
28
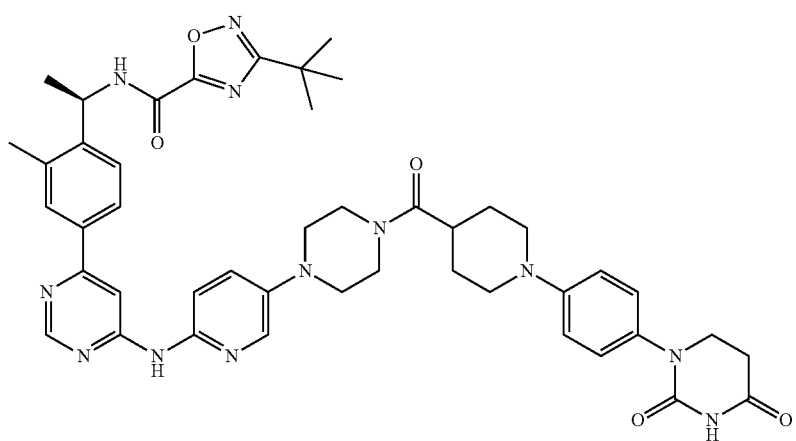
29
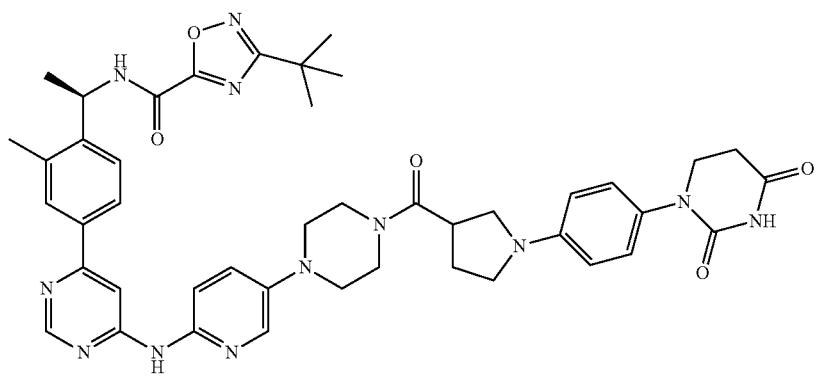

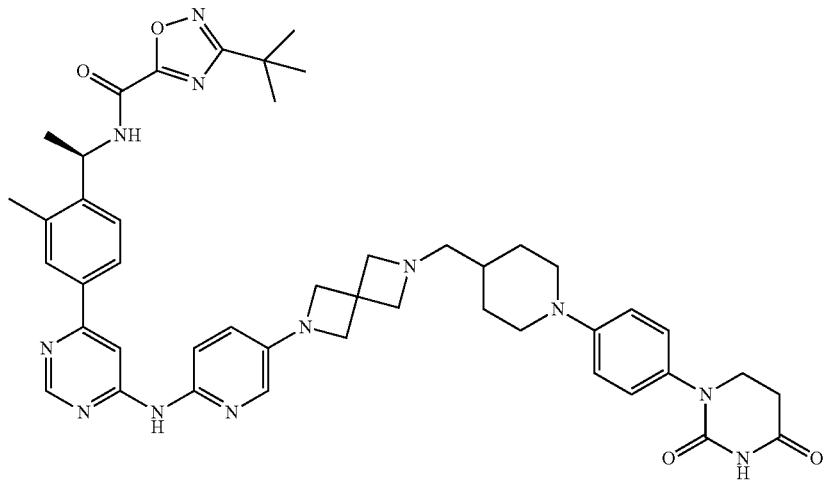
30
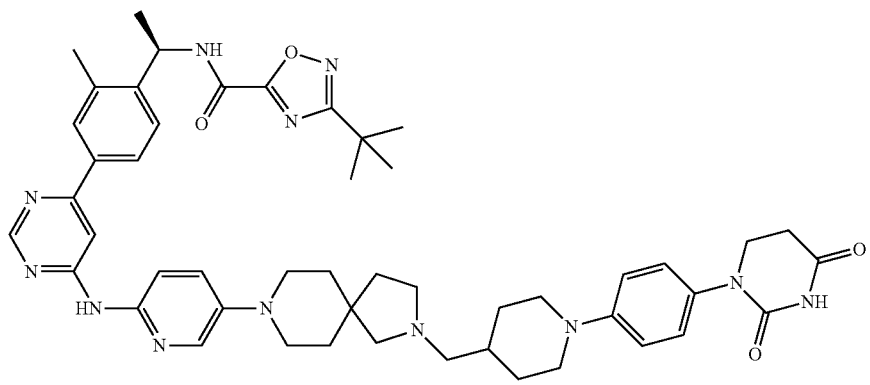
31
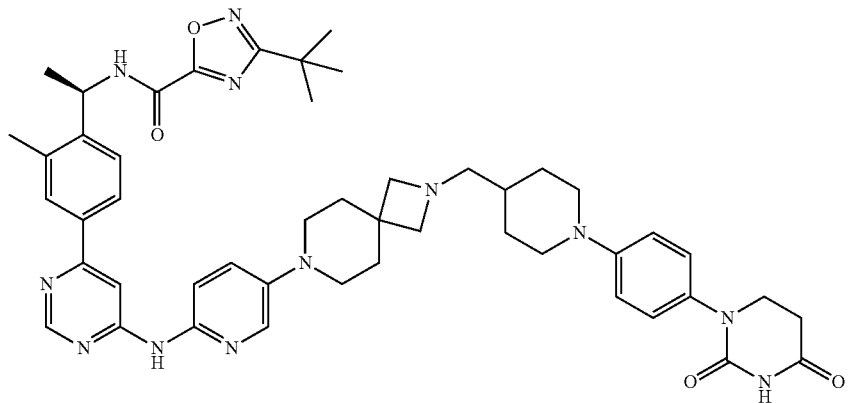
32

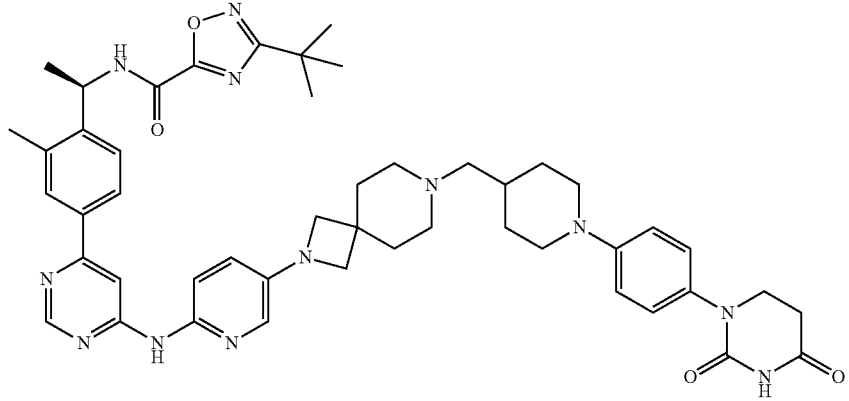
33
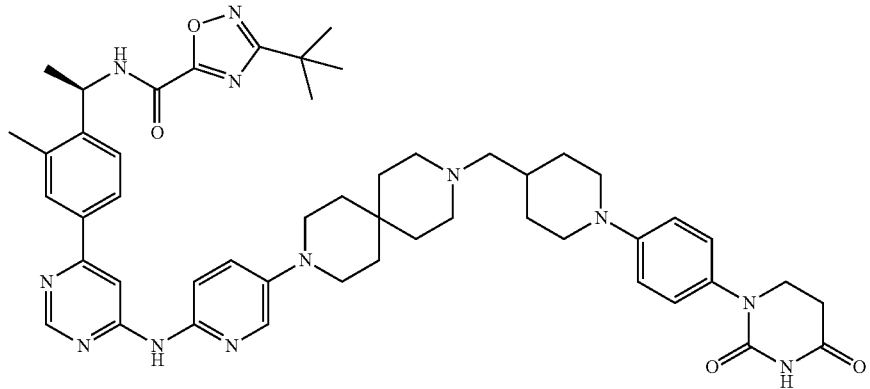
34
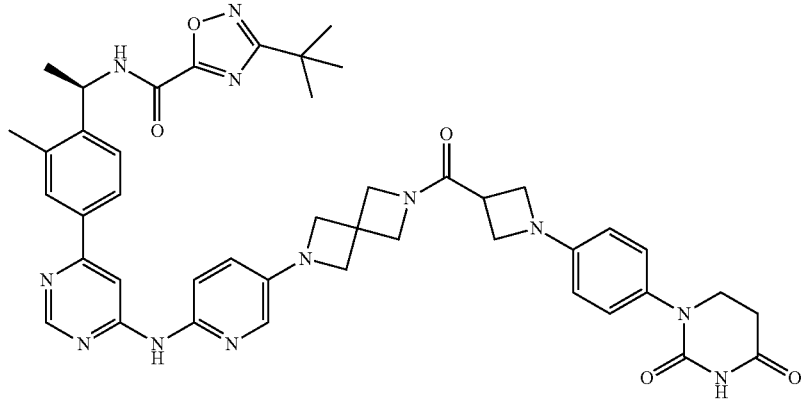
35
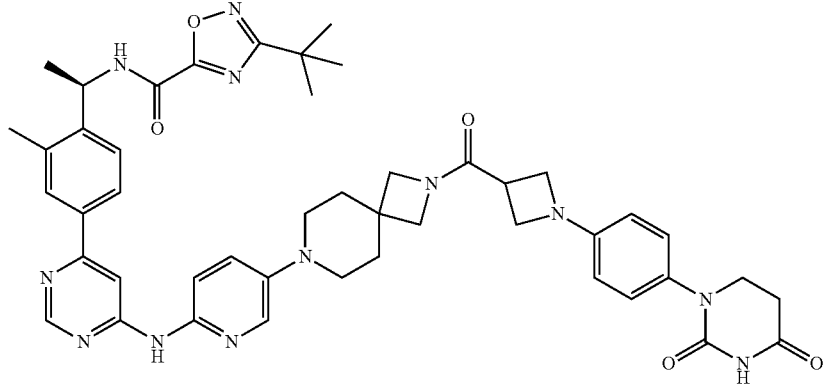
36

37
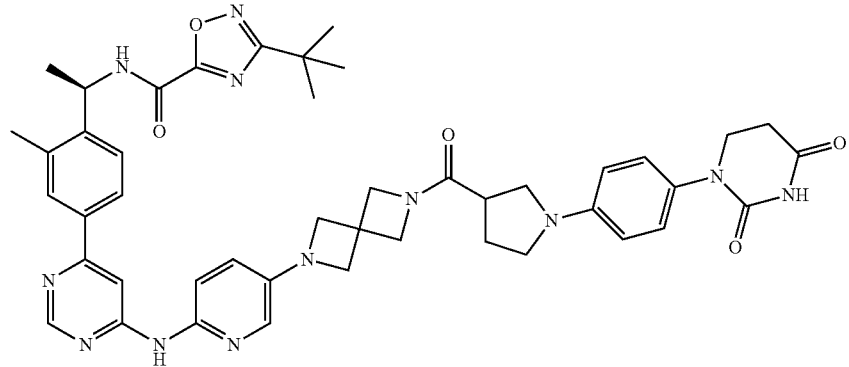
38
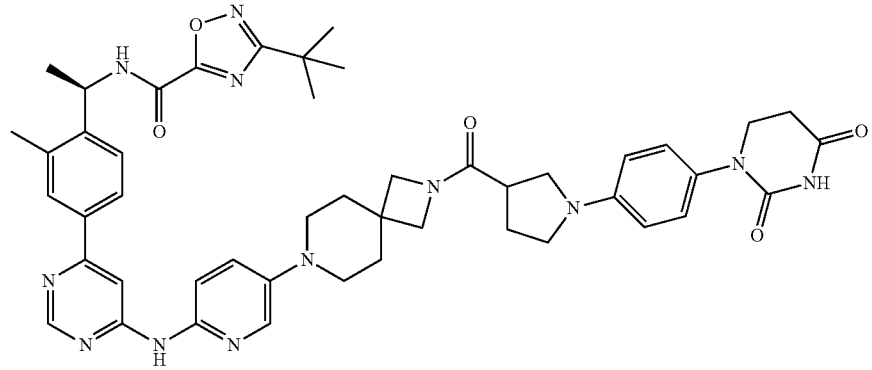
39
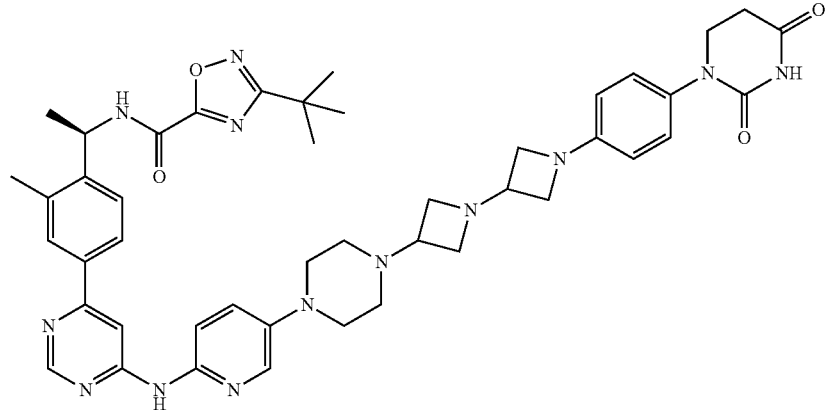
40
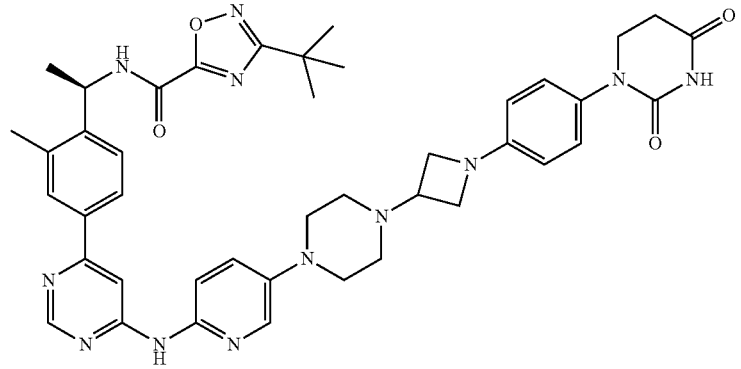

41
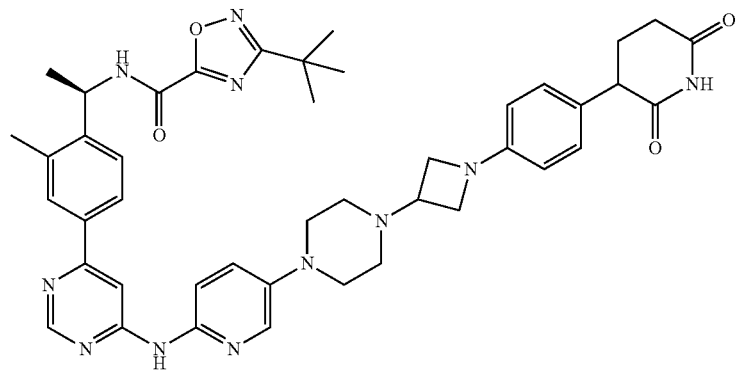
42
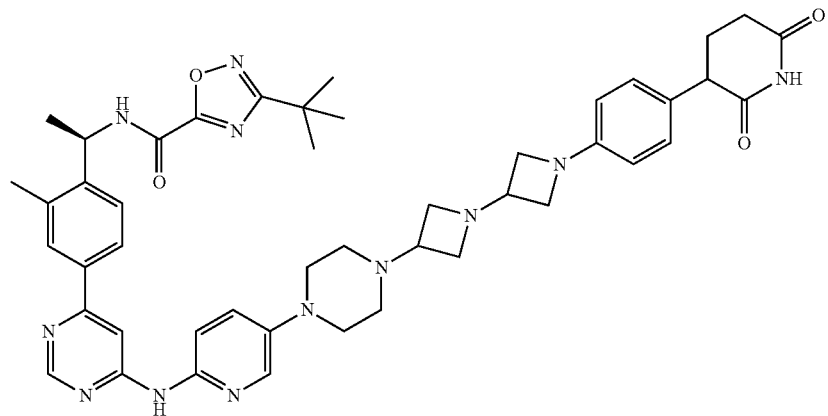
43
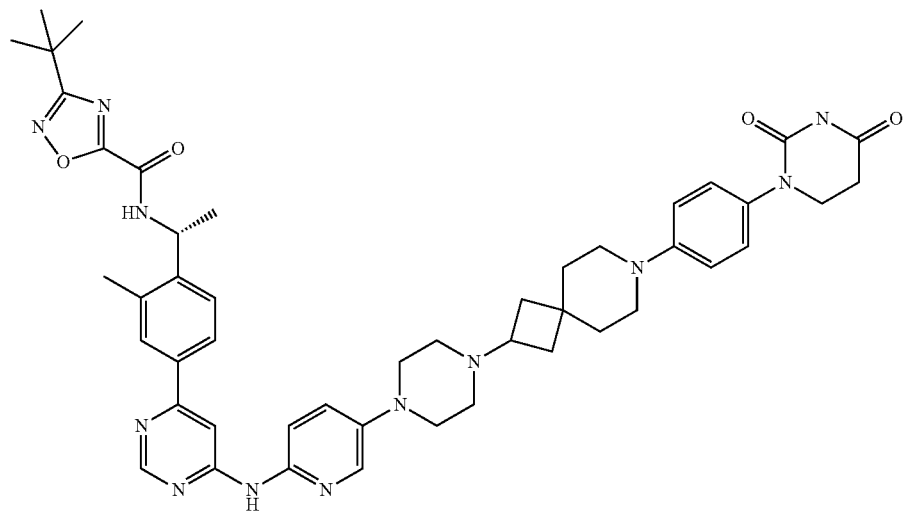

44
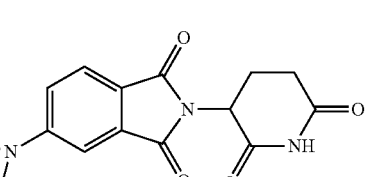
45
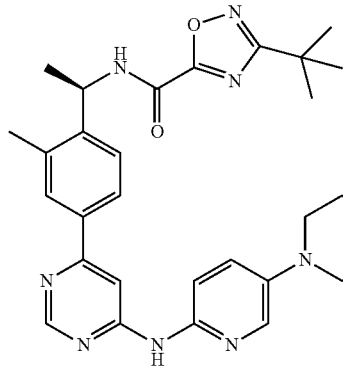
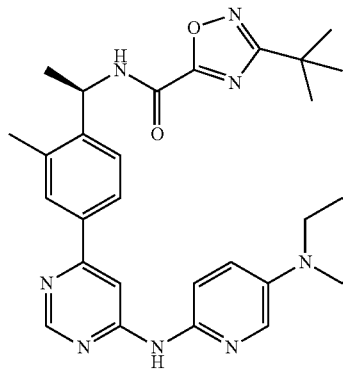
46
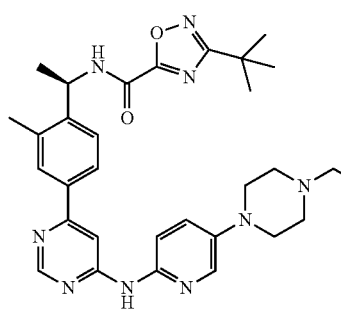
47
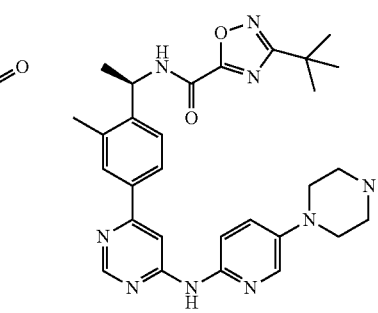
48
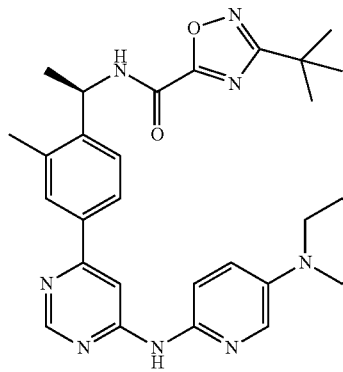

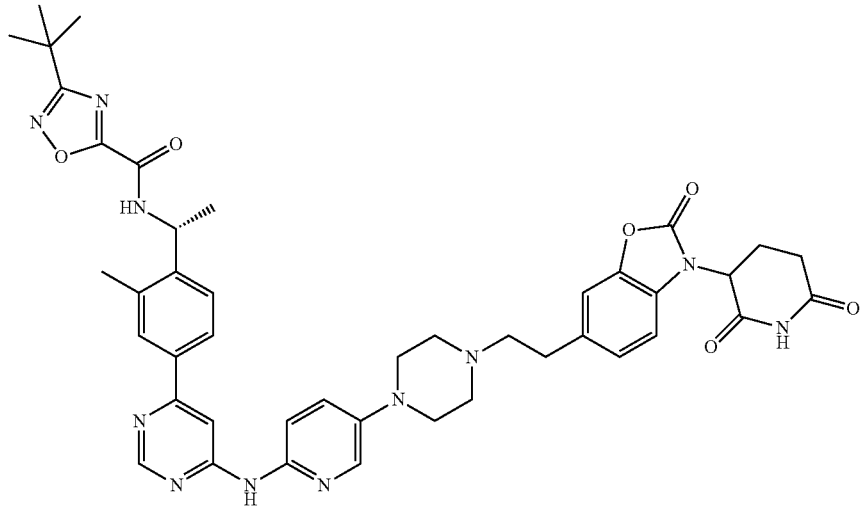
49
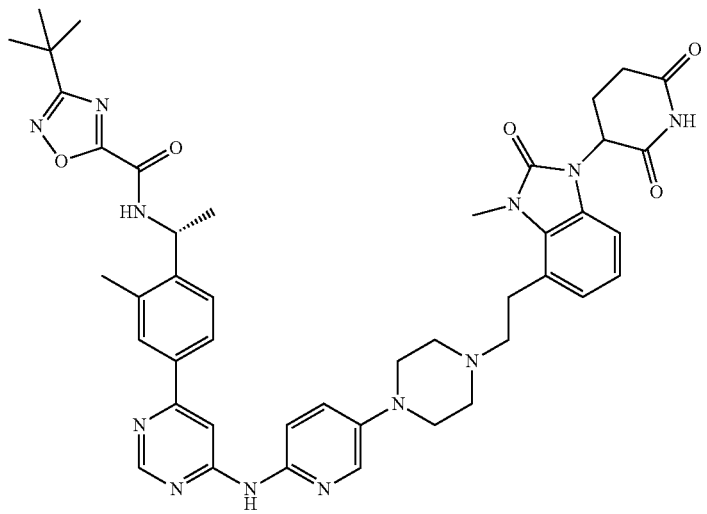
50
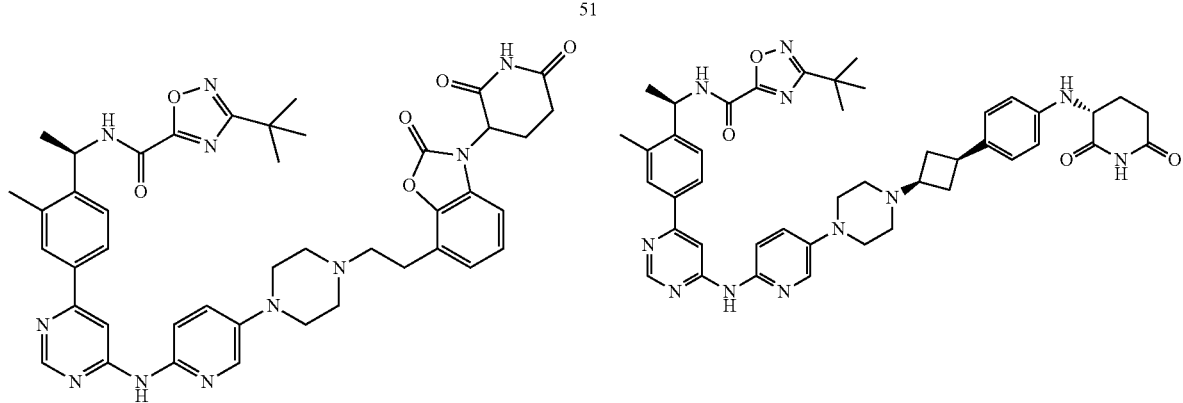
51
52

-continued
53
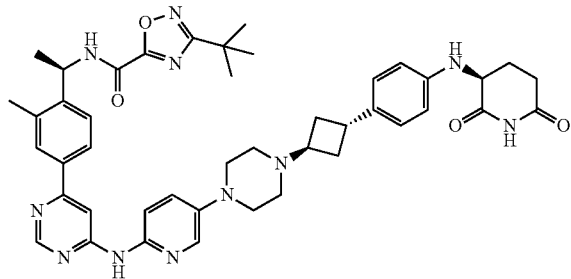
54
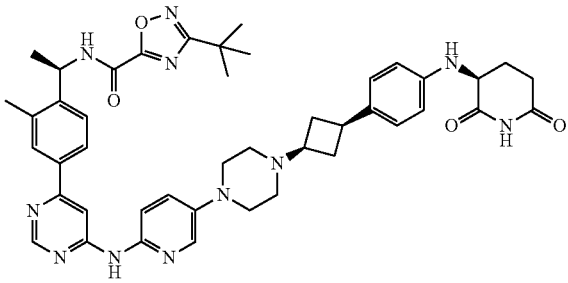
55
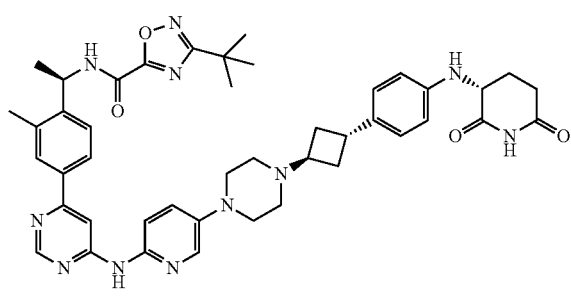
56
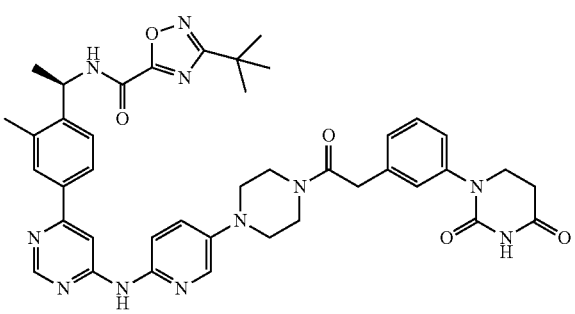
57
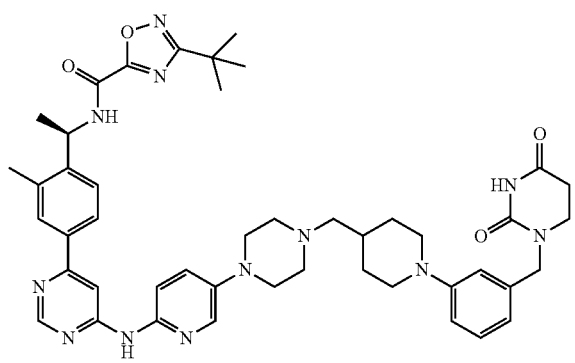
58
59

60
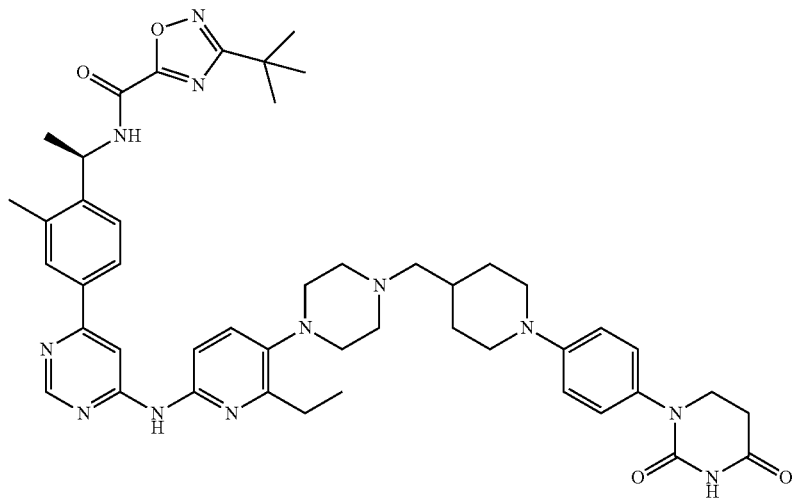
61
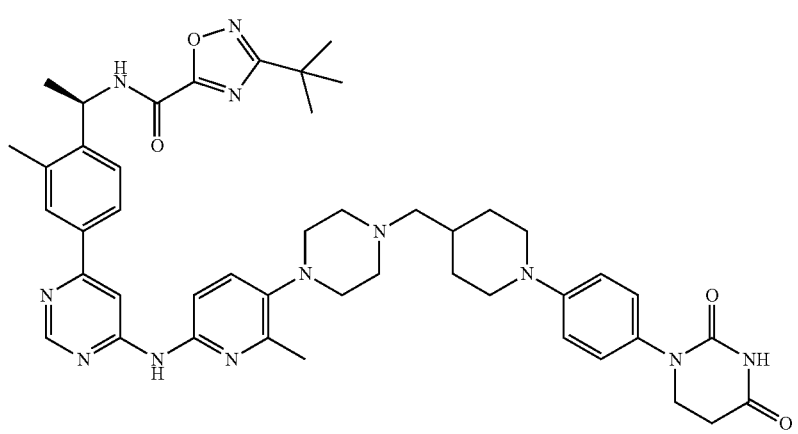
62
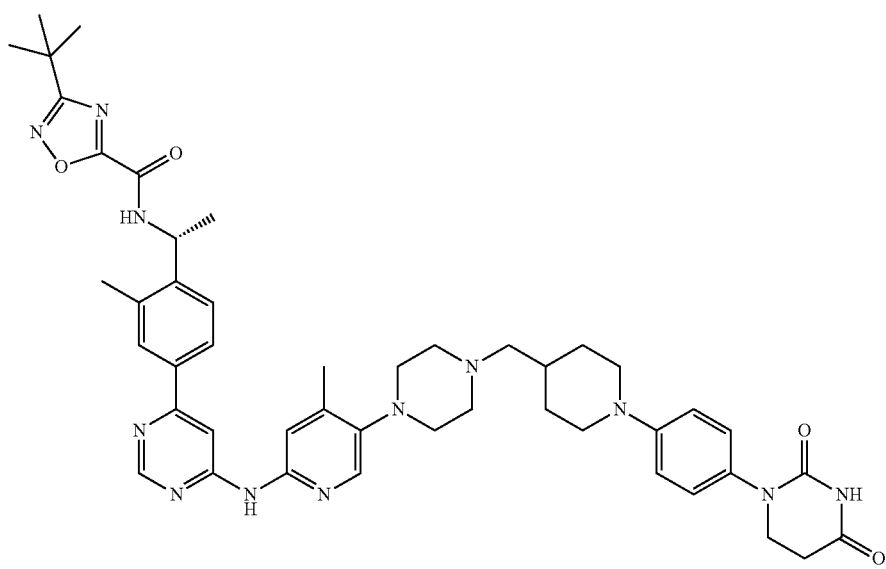

63
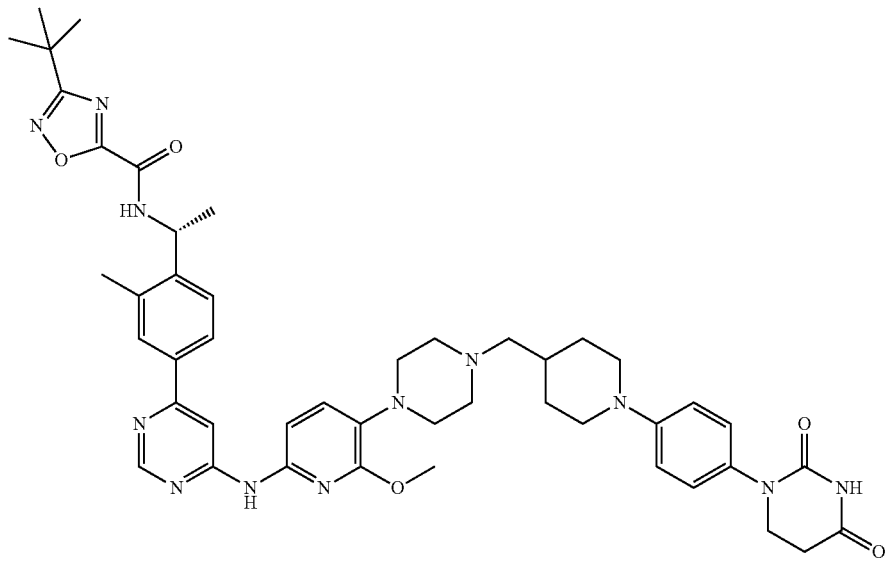
64
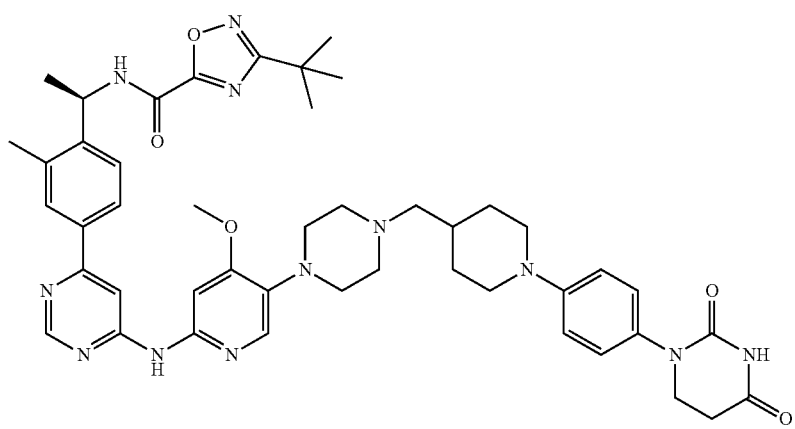
65
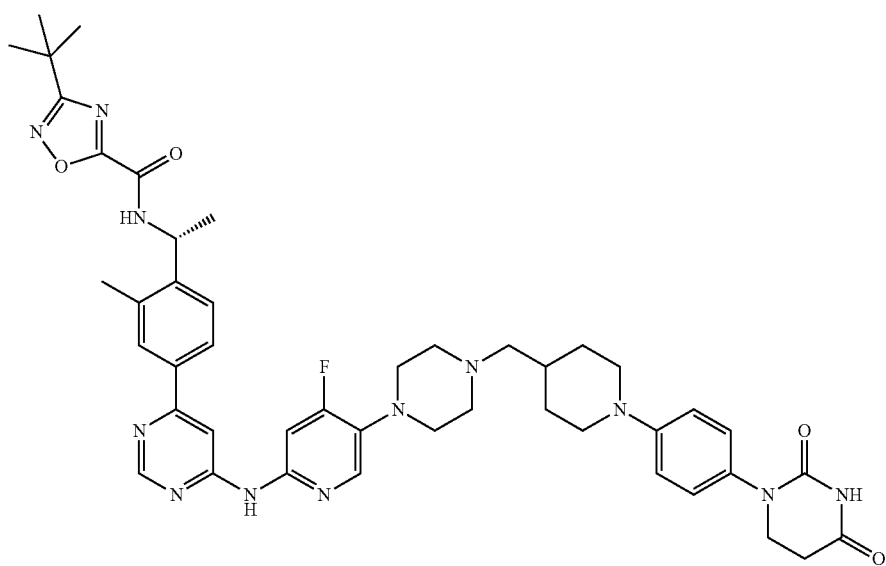

-continued
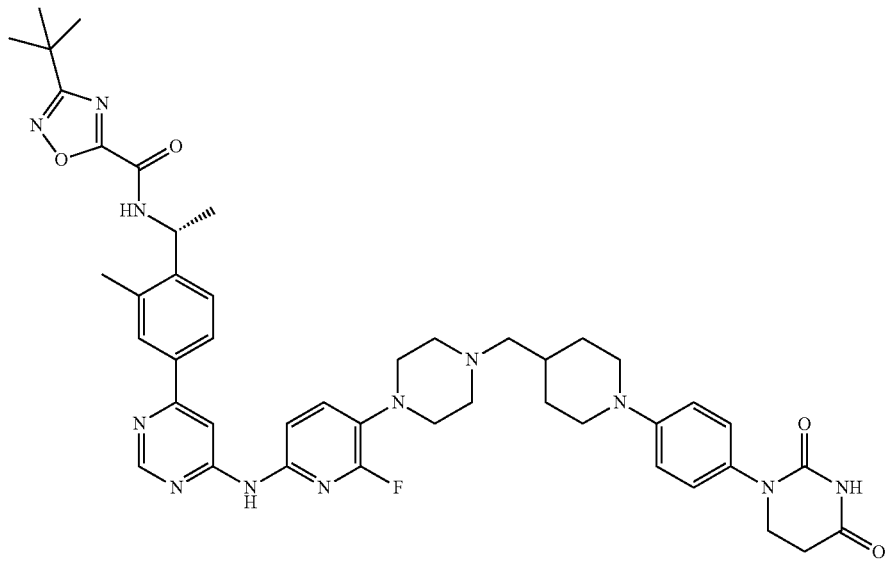
66
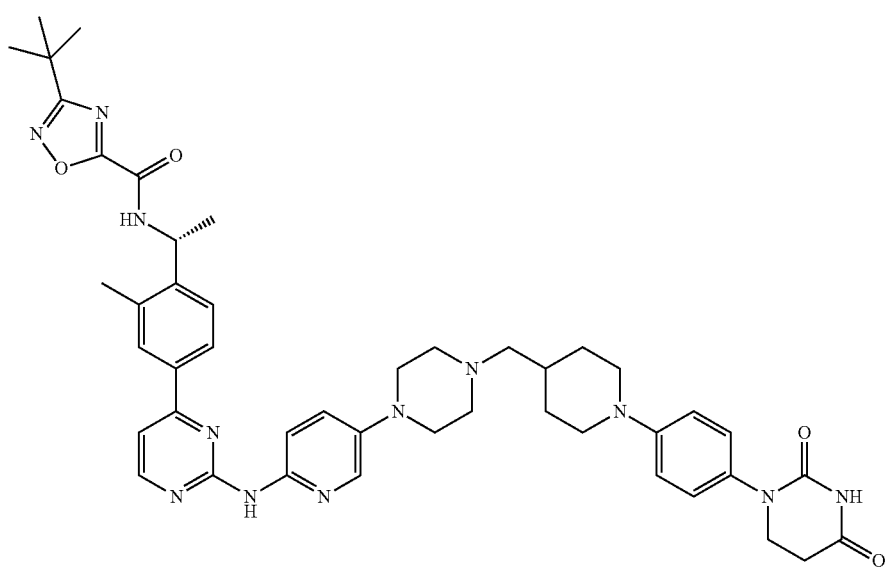
67
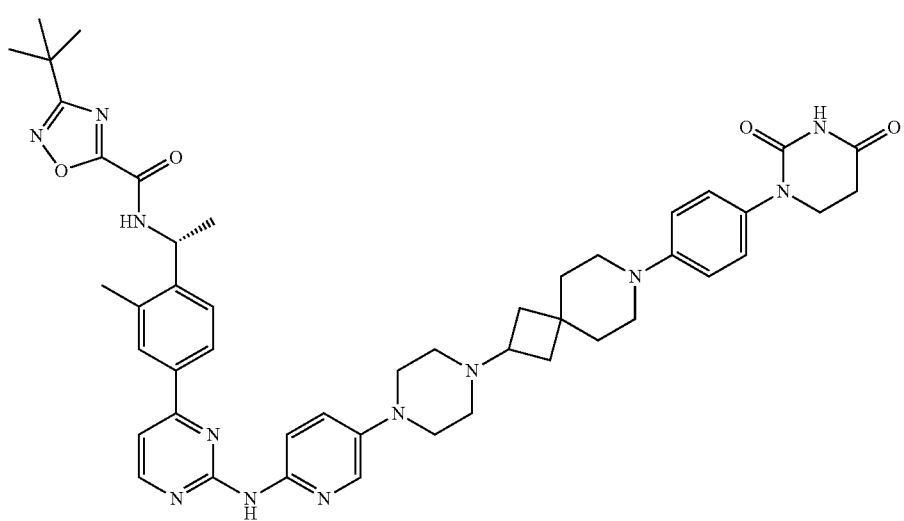
68

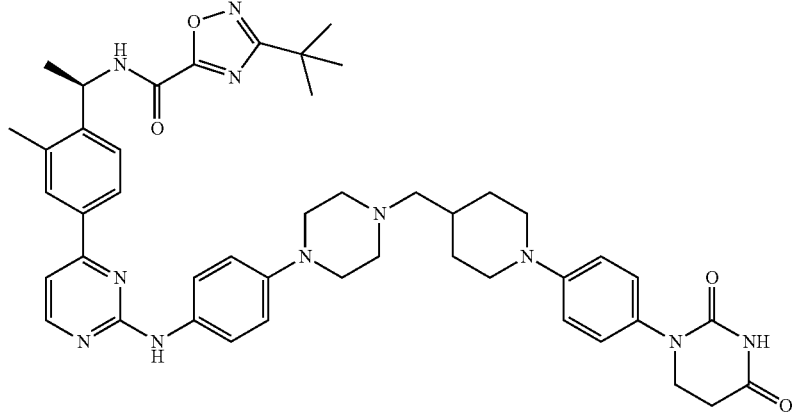
69
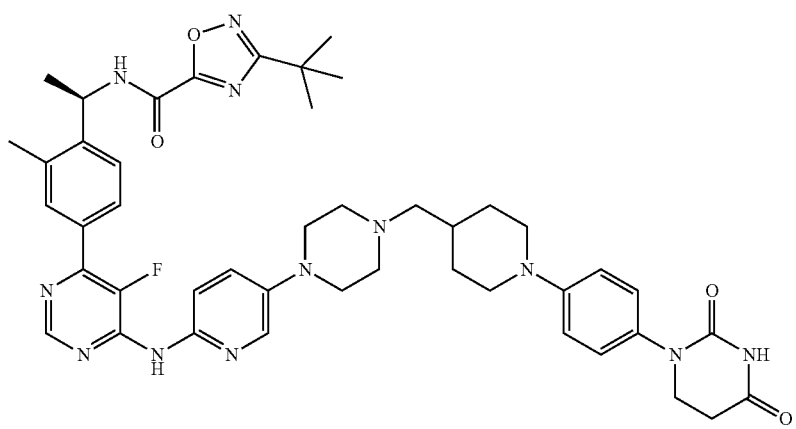
70
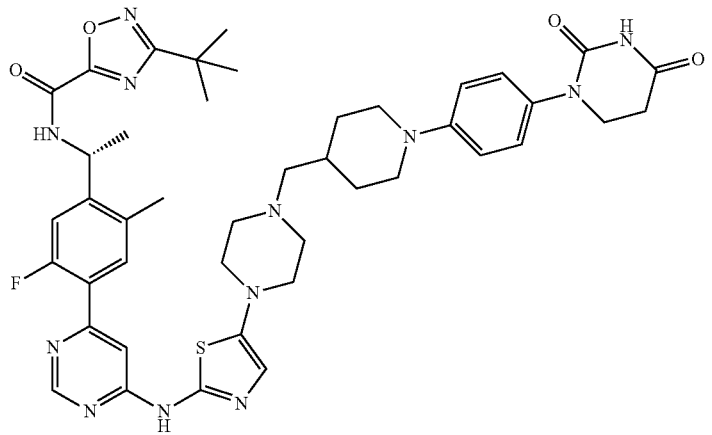
71

-continued

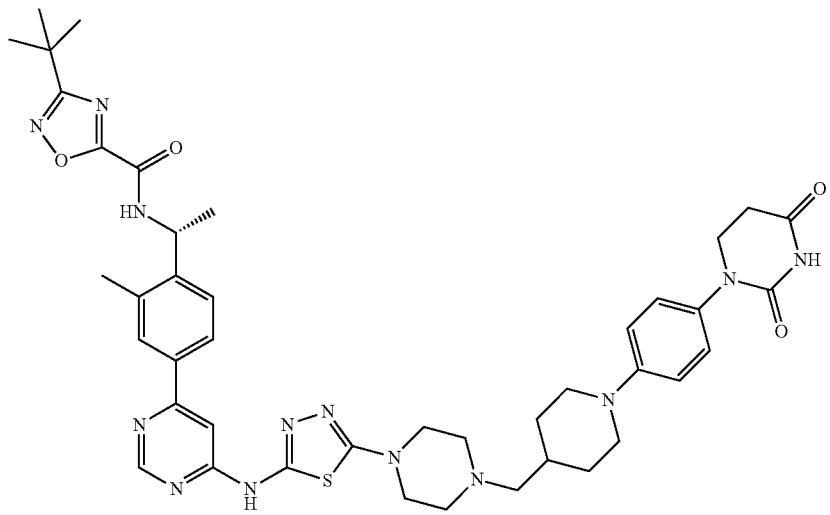

72

Aspect 43. A pharmaceutical composition comprising the compound according to any one of Aspects 1-42, or a pharmaceutically acceptable salt thereof, and at least one pharmaceutically acceptable carrier or excipient.

Aspect 44. A method of inhibiting BTK activity, which comprises administering to an individual the compound according to any one of Aspects 1-42, or a pharmaceutically acceptable salt thereof, including the compound of formula (I) or the specific compounds exemplified herein.

Aspect 45. A method of treating a disease or disorder in a patient comprising administering to the patient in need thereof a therapeutically effective amount of the compound any one of Aspects 1-42, or a pharmaceutically acceptable salt thereof as a BTK kinase inhibitor, wherein the disease or disorder is associated with inhibition of BTK, preferably, the disease or disorder is cancer.

DETAILED DESCRIPTION OF THE INVENTION

Definitions

The following terms have the indicated meaning throughout the specification:

As used herein, including the appended claims, the singular forms of words such as "a", "an", and "the", include their corresponding plural references unless the context clearly indicates otherwise.

The term "or" is used to mean, and is used interchangeably with, the term "and/or" unless the context clearly dictates otherwise.

The term "alkyl" refers to a hydrocarbon group selected from linear and branched, saturated hydrocarbon groups comprising from 1 to 18, such as from 1 to 12, further such as from 1 to 10, more further such as from 1 to 8, or from 1 to 6, or from 1 to 4, carbon atoms. Examples of alkyl groups comprising from 1 to 6 carbon atoms (i.e., $C_{1-6}$ alkyl) include without limitation to methyl, ethyl, 1-propyl or n-propyl ("n-Pr"), 2-propyl or isopropyl ("i-Pr"), 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu"), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl groups.

The term "propyl" refers to 1-propyl or n-propyl ("n-Pr"), 2-propyl or isopropyl ("i-Pr").

The term "butyl" refers to 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu").

The term "pentyl" refers to 1-pentyl, 2-pentyl, 3-pentyl, 2-methyl-2-butyl, 3-methyl-2-butyl, 3-methyl-1-butyl, 2-methyl-1-butyl.

The term "hexyl" refers to 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl.

The term "halogen" refers to fluoro (F), chloro (Cl), bromo (Br) and iodo (I).

The term "haloalkyl" refers to an alkyl group in which one or more hydrogens are replaced by one or more halogen atoms such as fluoro, chloro, bromo, and iodo. Examples of the haloalkyl include without limitation to halo$C_{1-8}$alkyl, halo$C_{1-6}$alkyl or halo $C_{1-4}$alkyl, such as —$CF_3$, —$CH_2Cl$, —$CH_2CF_3$, —$CHCl_2$, —$CF_3$, and the like.

The term "alkenyl" refers to a hydrocarbon group selected from linear and branched hydrocarbon groups comprising at least one C=C double bond and from 2 to 18, such as from 2 to 8, further such as from 2 to 6, carbon atoms. Examples of the alkenyl group, e.g., $C_{2-6}$ alkenyl, include without limitation to ethenyl or vinyl, prop-1-enyl, prop-2-enyl, 2-methylprop-1-enyl, but-1-enyl, but-2-enyl, but-3-enyl, buta-1,3-dienyl, 2-methylbuta-1,3-dienyl, hex-1-enyl, hex-2-enyl, hex-3-enyl, hex-4-enyl, and hexa-1,3-dienyl groups.

The term "alkynyl" refers to a hydrocarbon group selected from linear and branched hydrocarbon group, comprising at least one C≡C triple bond and from 2 to 18, such as 2 to 8, further such as from 2 to 6, carbon atoms. Examples of the alkynyl group, e.g., $C_{2-6}$ alkynyl, include without limitation to ethynyl, 1-propynyl, 2-propynyl (propargyl), 1-butynyl, 2-butynyl, and 3-butynyl groups.

The term "cycloalkyl" refers to a hydrocarbon group selected from saturated cyclic hydrocarbon groups, comprising monocyclic and polycyclic (e.g., bicyclic and tricyclic) groups including fused, bridged or spiro cycloalkyl.

For example, the cycloalkyl group may comprise from 3 to 12, such as from 3 to 10, further such as 3 to 8, further such as 3 to 6, 3 to 5, or 3 to 4 carbon atoms. Even further for example, the cycloalkyl group may be selected from monocyclic group comprising from 3 to 12, such as from 3 to 10, further such as 3 to 8, 3 to 6 carbon atoms. Examples of the monocyclic cycloalkyl group include cyclopropyl, cyclobutyl, cyclopentyl, cyclohexyl, cycloheptyl, cyclooctyl, cyclononyl, cyclodecyl, cycloundecyl, and cyclododecyl groups. In particular, examples of the saturated monocyclic cycloalkyl group, e.g., $C_{3-8}$cycloalkyl, include without limitation to cyclopropyl, cyclobutyl, cyclopentyl, cyclohexyl, cycloheptyl, and cyclooctyl groups. In a preferred embodiment, the cycloalkyl is a monocyclic ring comprising 3 to 6 carbon atoms (abbreviated as $C_{3-6}$ cycloalkyl), including but not limited to cyclopropyl, cyclobutyl, cyclopentyl, and cyclohexyl. Examples of the bicyclic cycloalkyl groups include those having from 7 to 12 ring atoms arranged as a fused bicyclic ring selected from [4, 4], [4, 5], [5, 5], [5,6] and [6,6] ring systems, or as a bridged bicyclic ring selected from bicyclo[2.2.1]heptane, bicyclo[2.2.2]octane, and bicyclo[3.2.2]nonane. Further examples of the bicyclic cycloalkyl groups include those arranged as a bicyclic ring selected from [5,6] and [6,6] ring systems.

The term "spiro cycloalkyl" refers to a cyclic structure which contains carbon atoms and is formed by at least two rings sharing one atom. The term "7 to 12 membered spiro cycloalkyl" refers to a cyclic structure which contains 7 to 12 carbon atoms and is formed by at least two rings sharing one atom.

The term "fused cycloalkyl" refers to a bicyclic cycloalkyl group as defined herein which is saturated and is formed by two or more rings sharing two adjacent atoms.

The term "bridged cycloalkyl" refers to a cyclic structure which contains carbon atoms and is formed by two rings sharing two atoms which are not adjacent to each other. The term "7 to 10 membered bridged cycloalkyl" refers to a cyclic structure which contains 7 to 12 carbon atoms and is formed by two rings sharing two atoms which are not adjacent to each other.

The term "cycloalkenyl" refers to non-aromatic cyclic alkyl groups of from 3 to 10 carbon atoms having single or multiple rings and having at least one double bond and preferably from 1 to 2 double bonds. In one embodiment, the cycloalkenyl is cyclopentenyl or cyclohexenyl, 1-cyclopent-1-enyl, 1-cyclopent-2-enyl, 1-cyclopent-3-enyl, 1-cyclohex-1-enyl, 1-cyclohex-2-enyl, 1-cyclohex-3-enyl, cyclohexadienyl, preferably cyclohexenyl.

The term "fused cycloalkenyl" refers to a bicyclic cycloalkyl group as defined herein which contain at least one double bond and is formed by two or more rings sharing two adjacent atoms.

The term "cycloalkynyl" refers to non-aromatic cycloalkyl groups of from 5 to 10 carbon atoms having single or multiple rings and having at least one triple bond.

The term "fused cycloalkynyl" refers to a bicyclic cycloalkyl group as defined herein which contains at least one triple bond and is formed by two or more rings sharing two adjacent atoms.

The term a "benzo fused cycloalkyl" is a bicyclic fused cycloalkyl in which a 4- to 8-membered monocyclic cycloalkyl ring fused to a benzene ring. For example, a benzo fused cycloalkyl is

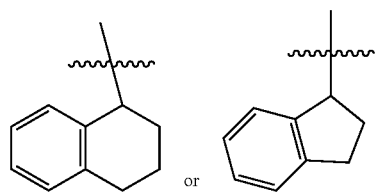 [SMILES: *C1CCCc2ccccc21 ; *C1CCc2ccccc21]

or wherein the wavy lines indicate the points of attachment.

The term a "benzo fused cycloalkenyl" is a bicyclic fused cycloalkenyl in which a 4- to 8-membered monocyclic cycloalkenyl ring fused to a benzene ring.

The term a "benzo fused cycloalkynyl" is a bicyclic fused cycloalkynyl in which a 4- to 8-membered monocyclic cycloalkynyl ring fused to a benzene ring.

Examples of fused cycloalkyl, fused cycloalkenyl, or fused cycloalkynyl include but are not limited to bicyclo [1.1.0]butyl, bicyclo[2.1.0]pentyl, bicyclo[3.1.0]hexyl, bicyclo[4.1.0]heptyl, bicyclo[3.3.0]octyl, bicyclo[4.2.0]octyl, decalin, as well as benzo 3 to 8 membered cycloalkyl, benzo $C_{4-6}$ cycloalkenyl, 2,3-dihydro-1H-indenyl, 1H-indenyl, 1, 2, 3, 4-tetralyl, 1,4-dihydronaphthyl, etc. Preferred embodiments are 8 to 9 membered fused rings, which refer to cyclic structures containing 8 to 9 ring atoms within the above examples.

The term "aryl" used alone or in combination with other terms refers to a group selected from:
  a) 5- and 6-membered carbocyclic aromatic rings, e.g., phenyl;
  b) bicyclic ring systems such as 7 to 12 membered bicyclic ring systems, wherein at least one ring is carbocyclic and aromatic, e.g., naphthyl and indanyl; and,
  c) tricyclic ring systems such as 10 to 15 membered tricyclic ring systems wherein at least one ring is carbocyclic and aromatic, e.g., fluorenyl.

The terms "aromatic hydrocarbon ring" and "aryl" are used interchangeable throughout the disclosure herein. In some embodiments, a monocyclic or bicyclic aromatic hydrocarbon ring has 5 to 10 ring-forming carbon atoms (i.e., $C_{5-10}$ aryl). Examples of a monocyclic or bicyclic aromatic hydrocarbon ring include without limitation to phenyl, naphth-1-yl, naphth-2-yl, anthracenyl, phenanthrenyl, and the like. In some embodiments, the aromatic hydrocarbon ring is a naphthalene ring (naphth-1-yl or naphth-2-yl) or phenyl ring. In some embodiments, the aromatic hydrocarbon ring is a phenyl ring.

Specifically, the term "bicyclic fused aryl" refers to a bicyclic aryl ring as defined herein. The typical bicyclic fused aryl is naphthalene.

The term "heteroaryl" refers to a group selected from:
  a) 5-, 6- or 7-membered aromatic, monocyclic rings comprising at least one heteroatom, for example, from 1 to 4, or, in some embodiments, from 1 to 3, in some embodiments, from 1 to 2, heteroatoms, selected from nitrogen (N), sulfur (S) and oxygen (O), with the remaining ring atoms being carbon;
  b) 7- to 12-membered bicyclic rings comprising at least one heteroatom, for example, from 1 to 4, or, in some embodiments, from 1 to 3, or, in other embodiments, 1 or 2, heteroatoms, selected from N, O, and S, with the remaining ring atoms being carbon and wherein at least one ring is aromatic and at least one heteroatom is present in the aromatic ring; and c) 11- to 14-membered tricyclic rings comprising at least one heteroatom, for example, from 1 to 4, or in some embodiments, from 1 to 3, or, in other embodiments, 1 or 2, heteroatoms, selected from N, O, and S, with the remaining ring atoms being carbon and wherein at least one ring is aromatic and at least one heteroatom is present in an aromatic ring.

When the total number of S and O atoms in the heteroaryl group exceeds 1, those heteroatoms are not adjacent to one another. In some embodiments, the total number of S and O atoms in the heteroaryl group is not more than 2. In some embodiments, the total number of S and O atoms in the aromatic heterocycle is not more than 1. When the heteroaryl group contains more than one heteroatom ring member, the heteroatoms may be the same or different. The nitrogen atoms in the ring(s) of the heteroaryl group can be oxidized to form N-oxides.

Specifically, the term "bicyclic fused heteroaryl" refers to a 7- to 12-membered, preferably 7- to 10-membered, more preferably 9- or 10-membered fused bicyclic heteroaryl ring as defined herein. Typically, a bicyclic fused heteroaryl is 5-membered/5-membered, 5-membered/6-membered, 6-membered/6-membered, or 6-membered/7-membered bicyclic. The group can be attached to the remainder of the molecule through either ring.

Representative examples of bicyclic fused heteroaryl include without limitation to the following groups: benzisoxazolyl, benzodiazolyl, benzofuranyl, benzofurazanyl, benzofuryl, benzoimidazolyl, benzoisothiazolyl, benzothiadiazolyl, benzothiazolyl, benzothienyl, benzothiophenyl, benzotriazolyl, benzoxadiazolyl, benzoxazolyl, furopyridinyl, furopyrrolyl, imidazopyridinyl, imidazopyridyl, imidazothiazolyl, indazolyl, indolizinyl, indolyl, isobenzofuryl, isoindolyl, isoquinolinyl (or isoquinolyl), naphthyridinyl, phthalazinyl, pteridinyl, purinyl, pyrazinopyridazinyl, pyrazolopyridinyl, pyrazolopyrimidinyl, pyrazolopyridyl, pyrazolotriazinyl, pyridazolopyridyl, pyrrolopyridinyl, quinazolinyl, quinolinyl (or quinolyl), quinoxalinyl, thiazolopyridyl, thienopyrazinyl, thienopyrazolyl, thienopyridyl, thienopyrrolyl, thienothienyl, or triazolopyridyl.

The term a "benzo fused heteroaryl" is a bicyclic fused heteroaryl in which a 5- to 7-membered (preferably, 5- or 6-membered) monocyclic heteroaryl ring as defined herein fused to a benzene ring.

The terms "aromatic heterocyclic ring" and "heteroaryl" are used interchangeably throughout the disclosure herein. In some embodiments, a monocyclic or bicyclic aromatic heterocyclic ring has 5-, 6-, 7-, 8-, 9- or 10-ring forming members with 1, 2, 3, or 4 heteroatom ring members independently selected from nitrogen (N), sulfur (S) and oxygen (O) and the remaining ring members being carbon. In some embodiments, the monocyclic or bicyclic aromatic heterocyclic ring is a monocyclic or bicyclic ring comprising 1 or 2 heteroatom ring members independently selected from nitrogen (N), sulfur (S) and oxygen (O). In some embodiments, the monocyclic or bicyclic aromatic heterocyclic ring is a 5- to 6-membered heteroaryl ring, which is monocyclic and which has 1 or 2 heteroatom ring members independently selected from nitrogen (N), sulfur (S) and oxygen (O). In some embodiments, the monocyclic or bicyclic aromatic heterocyclic ring is an 8- to 10-membered heteroaryl ring, which is bicyclic and which has 1 or 2 heteroatom ring members independently selected from nitrogen, sulfur and oxygen.

Examples of the heteroaryl group or the monocyclic or bicyclic aromatic heterocyclic ring include, but are not limited to, (as numbered from the linkage position assigned priority 1) pyridyl (such as 2-pyridyl, 3-pyridyl, or 4-pyridyl), cinnolinyl, pyrazinyl, 2,4-pyrimidinyl, 3,5-pyrimidinyl, 2,4-imidazolyl, imidazopyridinyl, isoxazolyl, oxazolyl, thiazolyl, isothiazolyl, thiadiazolyl (such as 1, 2, 3-thiadiazolyl, 1,2,4-thiadiazolyl, or 1,3,4-thiadiazolyl), tetrazolyl, thienyl (such as thien-2-yl, thien-3-yl), triazinyl, benzothienyl, furyl or furanyl, benzofuryl, benzoimidazolyl, indolyl, isoindolyl, oxadiazolyl (such as 1, 2, 3-oxadiazolyl, 1,2,4-oxadiazolyl, or 1,3,4-oxadiazolyl), phthalazinyl, pyrazinyl, pyridazinyl, pyrrolyl, triazolyl (such as 1, 2, 3-triazolyl, 1,2,4-triazolyl, or 1,3,4-triazolyl), quinolinyl, isoquinolinyl, pyrazolyl, pyrrolopyridinyl (such as 1H-pyrrolo[2,3-b]pyridin-5-yl), pyrazolopyridinyl (such as 1H-pyrazolo[3,4-b]pyridin-5-yl), benzoxazolyl (such as benzo[d]oxazol-6-yl), pteridinyl, purinyl, 1-oxa-2,3-diazolyl, 1-oxa-2,4-diazolyl, 1-oxa-2,5-diazolyl, 1-oxa-3,4-diazolyl, 1-thia-2,3-diazolyl, 1-thia-2,4-diazolyl, 1-thia-2,5-diazolyl, 1-thia-3,4-diazolyl, furazanyl (such as furazan-2-yl, furazan-3-yl), benzofurazanyl, benzothiophenyl, benzothiazolyl, benzoxazolyl, quinazolinyl, quinoxalinyl, naphthyridinyl, furopyridinyl, benzothiazolyl (such as benzo[d]thiazol-6-yl), and indazolyl (such as 1H-indazol-5-yl).

"Aromatic ring" refers to aromatic carbocycles (e.g., the above-mentioned aryl) and aromatic heterocycles (e.g., the above-mentioned heteroaryl).

"Heterocyclyl", "heterocycle" or "heterocyclic" are interchangeable and refer to a non-aromatic heterocyclyl group comprising one or more heteroatoms selected from nitrogen, oxygen or optionally oxidized sulfur as ring members, with the remaining ring members being carbon, including monocyclic, fused, bridged, and spiro ring, i.e., containing monocyclic heterocyclyl, bridged heterocyclyl, spiro heterocyclyl, and fused heterocyclic groups.

The term "optionally oxidized sulfur" used herein refer to S, SO or $SO_2$.

The term "monocyclic heterocyclyl" refers to monocyclic groups in which at least one ring member (e.g., 1-3 heteroatoms, 1 or 2 heteroatom(s)) is a heteroatom selected from nitrogen, oxygen or optionally oxidized sulfur. A heterocycle may be saturated or partially saturated.

Exemplary monocyclic 4 to 9-membered heterocyclyl groups include without limitation to pyrrolidin-1-yl, pyrrolidin-2-yl, pyrrolidin-3-yl, imidazolidin-2-yl, imidazolidin-4-yl, pyrazolidin-2-yl, pyrazolidin-3-yl, piperidin-1-yl, piperidin-2-yl, piperidin-3-yl, piperidin-4-yl, 2,5-piperazinyl, pyranyl, morpholinyl, morpholino, morpholin-2-yl, morpholin-3-yl, oxiranyl, aziridin-1-yl, aziridin-2-yl, azocan-1-yl, azocan-2-yl, azocan-3-yl, azocan-4-yl, azocan-5-yl, thiiranyl, azetidin-1-yl, azetidin-2-yl, azetidin-3-yl, oxetanyl, thietanyl, 1,2-dithietanyl, 1,3-dithietanyl, dihydropyridinyl, tetrahydropyridinyl, thiomorpholinyl, thioxanyl, piperazinyl, homopiperazinyl, homopiperidinyl, azepan-1-yl, azepan-2-yl, azepan-3-yl, azepan-4-yl, oxepanyl, thiepanyl, 1,4-oxathianyl, 1,4-dioxepanyl, 1,4-oxathiepanyl, 1,4-oxaazepanyl, 1,4-dithiepanyl, 1,4-thiazepanyl and 1,4-diazepanyl, 1,4-dithianyl, 1,4-azathianyl, oxazepinyl, diazepinyl, thiazepinyl, dihydrothienyl, dihydropyranyl, dihydrofuranyl, tetrahydrofuranyl, tetrahydrothienyl, tetrahydropyranyl, tetrahydrothiopyranyl, 1-pyrrolinyl, 2-pyrrolinyl, 3-pyrrolinyl, indolinyl, 2H-pyranyl, 4H-pyranyl, 1,4-dioxanyl, 1,3-dioxolanyl, pyrazolinyl, pyrazolidinyl, dithianyl, dithiolanyl, pyrazolidinyl, imidazolinyl, pyrimidinonyl, or 1,1-dioxo-thiomorpholinyl.

The term "spiro heterocyclyl" refers to a 5 to 20-membered polycyclic heterocyclyl with rings connected through one common carbon atom (called a spiro atom), comprising one or more heteroatoms selected from nitrogen, oxygen or optionally oxidized sulfur as ring members, with the remaining ring members being carbon. One or more rings of a spiro heterocyclyl group may contain one or more double bonds, but none of the rings has a completely conjugated pi-electron system. Preferably a spiro heterocyclyl is 6 to 14-membered, and more preferably 7 to 12-membered. According to the number of common spiro atoms, a spiro heterocyclyl could be mono-spiro heterocyclyl, di-spiro heterocyclyl, or poly-spiro heterocyclyl, and preferably refers to mono-spiro heterocyclyl or di-spiro heterocyclyl, and more preferably 4-membered/3-membered, 4-membered/4-membered, 3-membered/5-membered, 4-membered/5-membered, 4-membered/6-membered, 5-membered/5-membered, or 5-membered/6-membered mono-spiro heterocyclyl. Representative examples of spiro heterocyclyls include without limitation to the following groups: 2,3-dihydrospiro[indene-1,2'-pyrrolidine](e.g., 2,3-dihydrospiro[indene-1,2'-pyrrolidine]-1'-yl), 1,3-dihydrospiro[indene-2,2'-pyrrolidine](e.g., 1,3-dihydrospiro[indene-2,2'-pyrrolidine]-1'-yl), azaspiro[2.4]heptane (e.g., 5-azaspiro[2.4]heptane-5-yl), 2-oxa-6-azaspiro[3.3]heptane (e.g., 2-oxa-6-azaspiro[3.3]heptan-6-yl), azaspiro [3.4]octane (e.g., 6-azaspiro [3.4]octane-6-yl), 2-oxa-6-azaspiro [3.4]octane (e.g., 2-oxa-6-azaspiro [3.4]octane-6-yl), azaspiro [3.4]octane (e.g., 6-azaspiro[3.4]octan-6-yl), azaspiro [3.4]octane (e.g., 6-azaspiro[3.4]octan-6-yl), 1,7-dioxaspiro[4.5]decane, 2-oxa-7-aza-spiro[4.4]nonane (e.g., 2-oxa-7-aza-spiro[4.4]non-7-yl), 7-oxa-spiro[3.5]nonyl and 5-oxa-spiro[2.4]heptyl.

The term "fused heterocyclyl" refers to a 5 to 20-membered polycyclic heterocyclyl group, wherein each ring in the system shares an adjacent pair of atoms (carbon and carbon atoms or carbon and nitrogen atoms) with another ring, comprising one or more heteroatoms selected from nitrogen, oxygen or optionally oxidized sulfur as ring members, with the remaining ring members being carbon. One or more rings of a fused heterocyclic group may contain one or more double bonds, but the fused heterocyclic group does not have a completely conjugated pi-electron system. Preferably, a fused heterocyclyl is 6 to 14-membered, and more preferably 7 to 12-membered, or 7- to 10-membered. According to the number of membered rings, a fused heterocyclyl could be bicyclic, tricyclic, tetracyclic, or polycyclic fused heterocyclyl. The group can be attached to the remainder of the molecule through either ring.

Specifically, the term "bicyclic fused heterocyclyl" refers to a 7 to 12-membered, preferably 7- to 10-membered, more preferably 9- or 10-membered fused heterocyclyl as defined herein comprising two fused rings and comprising 1 to 4 heteroatoms selected from nitrogen, oxygen or optionally oxidized sulfur as ring members. Typically, a bicyclic fused heterocyclyl is 5-membered/5-membered, 5-membered/6-membered, 6-membered/6-membered, or 6-membered/7-membered bicyclic fused heterocyclyl. Representative examples of (bicyclic) fused heterocycles include without limitation to the following groups: octahydrocyclopenta[c]pyrrole, octahydropyrrolo[3,4-c]pyrrolyl, octahydroisoindolyl, isoindolinyl, octahydro-benzo[b][1, 4]dioxin, indolinyl, isoindolinyl, benzopyranyl, dihydrothiazolopyrimidinyl, tetrahydroquinolyl, tetrahydroisoquinolyl (or tetrahydroisoquinolinyl), dihydrobenzofuranyl, dihydrobenzoxazinyl, dihydrobenzoimidazolyl, tetrahydrobenzothienyl, tetrahydrobenzofuranyl, benzodioxolyl, benzodioxonyl, chromanyl, chromenyl, octahydrochromenyl, dihydrobenzodioxynyl, dihydrobenzoxezinyl, dihydrobenzodioxepinyl, dihydrothienodioxynyl, dihydrobenzooxazepinyl, tetrahydrobenzooxazepinyl, dihydrobenzoazepinyl, tetrahydrobenzoazepinyl, isochromanyl, chromanyl, or tetrahydropyrazolopyrimidinyl (e.g., 4, 5, 6, 7-tetrahydropyrazolo[1,5-a]pyrimidin-3-yl).

The term a "benzo fused heterocyclyl" is a bicyclic fused heterocyclyl in which a monocyclic 4 to 9-membered heterocyclyl as defined herein (preferably 5- or 6-membered) fused to a benzene ring.

The term "bridged heterocyclyl" refers to a 5 to 14-membered polycyclic heterocyclic alkyl group, wherein every two rings in the system share two disconnected atoms, comprising one or more heteroatoms selected from nitrogen, oxygen or optionally oxidized sulfur as ring members, with the remaining ring members being carbon. One or more rings of a bridged heterocyclyl group may contain one or more double bonds, but none of the rings has a completely conjugated pi-electron system. Preferably, a bridged heterocyclyl is 6 to 14-membered, and more preferably 7 to 10-membered. According to the number of membered rings, a bridged heterocyclyl could be bicyclic, tricyclic, tetracyclic or polycyclic bridged heterocyclyl, and preferably refers to bicyclic, tricyclic or tetracyclic bridged heterocyclyl, and more preferably bicyclic or tricyclic bridged heterocyclyl. Representative examples of bridged heterocyclyls include without limitation to the following groups: 2-azabicyclo[2.2.1]heptyl, azabicyclo[3.1.0]hexyl, 2-azabicyclo[2.2.2]octyl and 2-azabicyclo[3.3.2]decyl.

The term "at least one substituent" disclosed herein includes, for example, from 1 to 4, such as from 1 to 3, further as 1 or 2, substituents, provided that the theory of valence is met. For example, "at least one substituent $R^{6d}$" disclosed herein includes from 1 to 4, such as from 1 to 3, further as 1 or 2, substituents selected from the list of $R^{6d}$ as disclosed herein.

Compounds disclosed herein may contain an asymmetric center and may thus exist as enantiomers. "Enantiomers" refer to two stereoisomers of a compound which are non-superimposable mirror images of one another. Where the compounds disclosed herein possess two or more asymmetric centers, they may additionally exist as diastereomers. Enantiomers and diastereomers fall within the broader class of stereoisomers. All such possible stereoisomers as substantially pure resolved enantiomers, racemic mixtures thereof, as well as mixtures of diastereomers are intended to be included. All stereoisomers of the compounds disclosed herein and/or pharmaceutically acceptable salts thereof are intended to be included. Unless specifically mentioned otherwise, reference to one isomer applies to any of the possible isomers. Whenever the isomeric composition is unspecified, all possible isomers are included.

The term "substantially pure" as used herein means that the target stereoisomer contains no more than 35%, such as no more than 30%, further such as no more than 25%, even further such as no more than 20%, by weight of any other stereoisomer(s). In some embodiments, the term "substantially pure" means that the target stereoisomer contains no more than 10%, for example, no more than 5%, such as no more than 1%, by weight of any other stereoisomer(s).

When compounds disclosed herein contain olefinic double bonds, unless specified otherwise, such double bonds are meant to include both E and Z geometric isomers.

When compounds disclosed herein contain a di-substituted cyclic ring system, substituents found on such ring system may adopt cis and trans formations. Cis formation means that both substituents are found on the upper side of the 2 substituent placements on the carbon, while trans would mean that they were on opposing sides. For example, the di-substituted cyclic ring system may be cyclohexyl or cyclobutyl ring.

It may be advantageous to separate reaction products from one another and/or from starting materials. The desired products of each step or series of steps is separated and/or purified (hereinafter separated) to the desired degree of homogeneity by the techniques common in the art. Typically such separations involve multiphase extraction, crystallization from a solvent or solvent mixture, distillation, sublimation, or chromatography. Chromatography can involve any number of methods including, for example: reverse-phase and normal phase; size exclusion; ion exchange; high, medium and low pressure liquid chromatography methods and apparatus; small scale analytical; simulated moving bed ("SMB") and preparative thin or thick layer chromatography, as well as techniques of small scale thin layer and flash chromatography. One skilled in the art will apply techniques most likely to achieve the desired separation.

"Diastereomers" refer to stereoisomers of a compound with two or more chiral centers but which are not mirror images of one another. Diastereomeric mixtures can be separated into their individual diastereomers on the basis of their physical or chemical differences by methods well known to those skilled in the art, such as by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereoisomers to the corresponding pure enantiomers. Enantiomers and diastereomers can also be separated by the use of a chiral HPLC column.

A single stereoisomer, e.g., a substantially pure enantiomer, may be obtained by resolution of the racemic mixture using a method such as formation of diastereomers using optically active resolving agents (Eliel, E. and Wilen, S. *Stereochemistry of Organic Compounds.* New York: John Wiley & Sons, Inc., 1994; Lochmuller, C. H., et al. "*Chromatographic resolution of enantiomers: Selective review.*" *J. Chromatogr.*, 113(3) (1975): pp. 283-302). Racemic mixtures of chiral compounds of the invention can be separated and isolated by any suitable method, including: (1) formation of ionic, diastereomeric salts with chiral compounds and separation by fractional crystallization or other methods, (2) formation of diastereomeric compounds with chiral derivatizing reagents, separation of the diastereomers, and conversion to the pure stereoisomers, and (3) separation of the substantially pure or enriched stereoisomers directly under chiral conditions. See: Wainer, Irving W., Ed. *Drug Stereochemistry: Analytical Methods and Pharmacology.* New York: Marcel Dekker, Inc., 1993.

"Pharmaceutically acceptable salts" refer to those salts which are, within the scope of sound medical judgment, suitable for use in contact with the tissues of humans and animals without undue toxicity, irritation, allergic response and the like, and are commensurate with a reasonable benefit/risk ratio. A pharmaceutically acceptable salt may be prepared in situ during the final isolation and purification of the compounds disclosed herein, or separately by reacting the free base function with a suitable organic acid or by reacting the acidic group with a suitable base.

In addition, if a compound disclosed herein is obtained as an acid addition salt, the free base can be obtained by basifying a solution of the acid salt. Conversely, if the product is a free base, an addition salt, such as a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used without undue experimentation to prepare non-toxic pharmaceutically acceptable addition salts.

As defined herein, "a pharmaceutically acceptable salt thereof" includes salts of at least one compound of Formula (I), and salts of the stereoisomers of the compound of Formula (I), such as salts of enantiomers, and/or salts of diastereomers.

The terms "administration", "administering", "treating" and "treatment" herein, when applied to an animal, human, experimental subject, cell, tissue, organ, or biological fluid, mean contact of an exogenous pharmaceutical, therapeutic, diagnostic agent, or composition to the animal, human, subject, cell, tissue, organ, or biological fluid. Treatment of a cell encompasses contact of a reagent to the cell, as well as contact of a reagent to a fluid, where the fluid is in contact with the cell. The term "administration" and "treatment" also means in vitro and ex vivo treatments, e.g., of a cell, by a reagent, diagnostic agent, binding compound, or by another cell. The term "subject" herein includes any organism, preferably an animal, more preferably a mammal (e.g., rat, mouse, dog, cat, and rabbit) and most preferably a human.

The term "effective amount" or "therapeutically effective amount" refers to an amount of the active ingredient, such as compound that, when administered to a subject for treating a disease, or at least one of the clinical symptoms of a disease or disorder, is sufficient to affect such treatment for the disease, disorder, or symptom. The "therapeutically effective amount" can vary with the compound, the disease, disorder, and/or symptoms of the disease or disorder, severity of the disease, disorder, and/or symptoms of the disease or disorder, the age of the subject to be treated, and/or the weight of the subject to be treated. An appropriate amount in any given instance can be apparent to those skilled in the art or can be determined by routine experiments. In some embodiments, "therapeutically effective amount" is an amount of at least one compound and/or at least one stereoisomer thereof, and/or at least one pharmaceutically acceptable salt thereof disclosed herein effective to "treat" as defined herein, a disease or disorder in a subject. In the case of combination therapy, the "therapeutically effective amount" refers to the total amount of the combination objects for the effective treatment of a disease, a disorder or a condition.

The pharmaceutical composition comprising the compound disclosed herein can be administrated via oral, inhalation, rectal, parenteral or topical route to a subject in need thereof. For oral administration, the pharmaceutical composition may be a regular solid formulation such as tablets, powder, granule, capsules and the like, a liquid formulation such as water or oil suspension or other liquid formulation such as syrup, solution, suspension or the like; for parenteral administration, the pharmaceutical composition may be solution, water solution, oil suspension concentrate, lyophilized powder or the like. Preferably, the formulation of the pharmaceutical composition is selected from tablet, coated tablet, capsule, suppository, nasal spray or injection, more preferably tablet or capsule. The pharmaceutical composition can be a single unit administration with an accurate dosage. In addition, the pharmaceutical composition may further comprise additional active ingredients.

All formulations of the pharmaceutical composition disclosed herein can be produced by the conventional methods in the pharmaceutical field. For example, the active ingredient can be mixed with one or more excipients, then to make the desired formulation. The "pharmaceutically acceptable excipient" refers to conventional pharmaceutical carriers suitable for the desired pharmaceutical formulation, for example: a diluent, a vehicle such as water, various organic solvents, etc., a filler such as starch, sucrose, etc., a binder such as cellulose derivatives, alginates, gelatin and polyvinylpyrrolidone (PVP); a wetting agent such as glycerol; a disintegrating agent such as agar, calcium carbonate and sodium bicarbonate; an absorption enhancer such as quaternary ammonium compound; a surfactant such as hexadecanol; an absorption carrier such as Kaolin and soap clay; a lubricant such as talc, calcium stearate, magnesium stearate, polyethylene glycol, etc. In addition, the pharmaceutical composition further comprises other pharmaceutically acceptable excipients such as a decentralized agent, a stabilizer, a thickener, a complexing agent, a buffering agent, a permeation enhancer, a polymer, an aromatic, a sweetener, a dye and etc.

The term "disease" refers to any disease, discomfort, illness, symptoms or indications, and can be interchangeable with the term "disorder" or "condition".

Throughout this specification and the claims which follow, unless the context requires otherwise, the term "comprise", and variations such as "comprises" and "comprising" are intended to specify the presence of the features thereafter, but do not exclude the presence or addition of one or more other features. When used herein the term "comprising" can be substituted with the term "containing", "including" or sometimes "having".

Throughout this specification and the claims which follow, the term "$C_{n-m}$" indicates a range which includes the endpoints, wherein n and m are integers and indicate the number of carbons. Examples include $C_{1-8}$, $C_{1-6}$, and the like.

Unless specifically defined elsewhere in this document, all other technical and scientific terms used herein have the meaning commonly understood by one of ordinary skill in the art to which this invention belongs.

EXAMPLES

The examples below are intended to be purely exemplary and should not be considered to be limiting in any way. Efforts have been made to ensure accuracy with respect to numbers used (for example, amounts, temperature, etc.), but some experimental errors and deviations should be accounted for. Unless indicated otherwise, temperature is in degrees Centigrade. Reagents were purchased from commercial suppliers such as Sigma-Aldrich, Alfa Aesar, or TCI, and were used without further purification unless indicated otherwise. Unless indicated otherwise, the reactions set forth below were performed under a positive pressure of nitrogen or argon or with a drying tube in anhydrous solvents; the reaction flasks were fitted with rubber septa for the introduction of substrates and reagents via syringe; and glassware was oven dried and/or heat dried.

$^1$H NMR spectra were recorded on a Agilent instrument operating at 400 MHz.

$^1$HNMR spectra were obtained using $CDCl_3$, $CD_2Cl_2$, $CD_3OD$, $D_2O$, $d_6$-DMSO, $d_6$-acetone or $(CD_3)_2CO$ as solvent and tetramethylsilane (0.00 ppm) or residual solvent ($CDCl_3$: 7.25 ppm; $CD_3OD$: 3.31 ppm; $D_2O$: 4.79 ppm; $d_6$-DMSO: 2.50 ppm; $d_6$-acetone: 2.05; $(CD_3)_3CO$: 2.05) as the reference standard. When peak multiplicities are reported, the following abbreviations are used: s (singlet), d (doublet), t (triplet), q (quartet), qn (quintuplet), sx (sextuplet), m (multiplet), br (broadened), dd (doublet of doublets), dt (doublet of triplets). Coupling constants, when given, are reported in Hertz (Hz).

LCMS-1: LC-MS spectrometer (Agilent 1260 Infinity) Detector: MWD (190-400 nm), Mass detector: 6120 SQ Mobile phase: A: water with 0.1% Formic acid, B: acetonitrile with 0.1% Formic acid Column: Poroshell 120 EC-C18, 4.6×50 mm, 2.7 pm Gradient method: Flow: 1.8 mL/min Time (min) A (%) B (%)

| Time (min) | A (%) | B (%) |
| --- | --- | --- |
| 0.00 | 95 | 5 |
| 1.5 | 5 | 95 |
| 2.0 | 5 | 95 |
| 2.1 | 95 | 5 |
| 3.0 | 95 | 5 |

LCMS, LCMS-3: LC-MS spectrometer (Agilent 1260 Infinity II) Detector: MWD (190-400 nm), Mass detector: G6125C SQ Mobile phase: A: water with 0.1% Formic acid, B: acetonitrile with 0.1% Formic acid Column: Poroshell 120 EC-C18, 4.6×50 mm, 2.7 pm Gradient method: Flow: 1.8 mL/min Time (min) A (%) B (%)

| Time (min) | A (%) | B (%) |
| --- | --- | --- |
| 0.00 | 95 | 5 |
| 1.5 | 5 | 95 |
| 2.0 | 5 | 95 |
| 2.1 | 95 | 5 |
| 3.0 | 95 | 5 |

LCMS-2: LC-MS spectrometer (Agilent 1290 Infinity II) Detector: MWD (190-400 nm), Mass detector: G6125C SQ Mobile phase: A: water with 0.1% Formic acid, B: acetonitrile with 0.1% Formic acid Column: Poroshell 120 EC-C18, 4.6×50 mm, 2.7 pm Gradient method: Flow: 1.2 mL/min Time (min) A % B %

| Time (min) | A (%) | B (%) |
| --- | --- | --- |
| 0.00 | 90 | 10 |
| 1.5 | 5 | 95 |
| 2.0 | 5 | 95 |
| 2.1 | 90 | 10 |
| 3.0 | 90 | 10 |

Preparative HPLC was conducted on any commercially available column (e.g., 150×21.2 mm ID, 5 pm, Gemini NXC 18, Waters Xselect CSH C18, or Waters Xbridge C18) at a flow rate of 20 ml/min, injection volume of 2 ml, at room temperature and UV Detection at 214 nm and 254 nm. Mobile phase A is ACN (optionally with 0.1% FA); Mobile phase B is water (optionally with 0.1% FA or 0.03% $NH_3 \cdot H_2O$). Gradient Table: Mobile Phase A (20%-90%, 30%-90%, 40%-90% or 50%-90%), Time (min): 0-15 min, 0-17 min, or 0-20 min.

In the following examples, the abbreviations below are used:

| | |
|---|---|
| AcOH | Acetic acid |
| AcOK | Potassium acetate |
| Aq | Aqueous |
| ACN | Acetonitrile |
| Brine | Saturated aqueous sodium chloride solution |
| Bn | Benzyl |
| BnBr | Benzyl Bromide |
| Boc | Tert-butyloxycarbonyl |
| (Bpin)$_2$ | 4,4,4',4',5,5,5',5'-octamethyl-2,2'-bi(1,3,2-dioxaborolane) |
| BPO | Dibenzoyl peroxide |
| BINAP | (±)-2,2'-Bis(diphenylphosphino)-1,1'-binaphthalene |
| Cbz | benzyloxycarbonyl |
| CH$_2$Cl$_2$ | Dichloromethane |
| CoCl$_2$ | Cobalt chloride |
| DCE | dichloroethane |
| DMF | N,N-Dimethylformamide |
| Dppf | 1,1''-bis(diphenylphosphino)ferrocene |
| DBU | 1,8-diazabicyclo[5.4.0]undec-7-ene |
| DCM | Dichloromethane |
| DIAD | Diisopropyl azodicarboxylate |
| DIEA or DIPEA | N,N-diisopropylethylamine |
| DIBAL-H | Diisobutylaluminium hydride |
| DMAP | 4-N,N-dimethylaminopyridine |
| DMF | N,N-dimethylformamide |
| DMSO | Dimethyl sulfoxide |
| EA or EtOAc | Ethyl acetate |
| EtOH | Ethanol |
| Et$_2$O or ether | Diethyl ether |
| FA | Formic acid |
| g | Grams |
| h or hr | Hour |
| HATU | O-(7-Azabenzotriazol-1-yl)-N,N,N',N'-tetramethyluronium hexafluorophosphate |
| HBTU | 2-(1H-Benzotriazole-1-yl)-1,1,3,3-tetramethylaminium hexafluorophosphate |
| HCl | Hydrochloric acid |
| Hex | Hexane |
| HPLC | High-performance liquid chromatography |
| IBX | 2-iodoxybenzoic acid |
| IPA | 2-propanol |
| i-PrOH | Isopropyl alcohol |
| LiHMDS | lithium bis(trimethylsilyl)azanide |
| mg | Milligrams |
| mL | Milliliters |
| Mmol | Millimole |
| MeCN | Acetonitrile |
| MeOH | Methanol |
| Min | Minutes |
| ms or MS | Mass spectrum |
| MsCl | methanesulfonyl chloride |
| MsOH | Methanesulfonic acid |
| Na$_2$SO$_4$ | Sodium sulfate |
| NBS | N-Bromosuccinimide |
| NMP | N-Methyl pyrrolidone |
| PE | Petroleum ether |
| Ph$_3$PO | Triphenyl phosphorus oxide |
| PhMe | Toluene |
| PPh$_3$ | triphenylphosphine |
| PPA | Polyphosphoric acid |
| PIN | pinacol |
| Rt | Retention time |
| R.T. or r.t. | Room temperature |
| Ruphos | 2-Dicyclohexylphosphino-2',6'-diisopropoxybiphenyl |
| SM | Starting material |
| STAB | Sodium triacetoxyborohydride |
| T$_3$P | Propylphosphonic anhydride |
| TBAF | Tetra-butyl ammonium fluoride |
| TBSCl | tert-Butyldimethylsilyl chloride |
| TEA | Triethanolamine |
| TFA | Trifluoroacetic acid |
| Tf$_2$O | Triflic anhydride |
| THF | Tetrahydrofuran |
| TLC | thin layer chromatography |
| TMSOK | trimethyl(potassiooxy)silane |
| Ts | para-toluenesulfonyl |
| Ts Cl | p-Toluenesulfonyl chloride |
| TsOH | 4-toluene sulfonic acid |
| TBS | tert-butyldimethylsilyl |
| μL | Microliters |
| Brettphos | Dicyclohexyl[3,6-dimethoxy-2',4',6'-tris(1-methylethyl)[1,1'-biphenyl]-2-yl]phosphine |
| Pd$_2$(dba)$_2$ | Di(dibenzylideneacetone)dipalladium |
| Prep-HPLC | preparative high performance liquid chromatography |
| Prep-TLC | preparative thin layer chromatography |

Example 1: (R)-3-(tert-butyl)-N-(1-(4-(6-((4-(4-((1-(4-(2,4-dioxotetrahydropyrimidin-1(2H)-yl)phenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide Step 1: (R)-3-(tert-butyl)-N-(1-(5-fluoro-2-methyl-4-(4,4,5,5-tetramethyl-1,3,2-dioxaborolan-2-yl)phenyl)ethyl)-1,2,4-oxadiazole-5-carboxamide

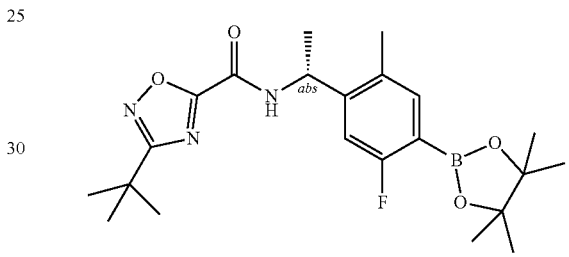

A mixture of (R)-1-(5-fluoro-2-methyl-4-(4,4,5,5-tetramethyl-1,3,2-dioxaborolan-2-yl)phenyl)ethan-1-amine hydrochloride (2 g, 6.3 mmol), ethyl 3-(tert-butyl)-1,2,4-oxadiazole-5-carboxylate (2.5 g, 12.6 mmol) and K$_2$CO$_3$ (2.6 g, 18.9 mmol) in EtOH (50 mL) was stirred at 80° C. for 16 h. The mixture was cooled and concentrated under reduced pressure. The residue was purified by silica gel column chromatography, eluted with hexane/EtOAc (1:1) to afford the product (660 mg, 24%). [M+H]$^+$=432.3.

Step 2: tert-butyl 4-(4-((6-chloropyrimidin-4-yl)amino)phenyl)piperazine-1-carboxylate

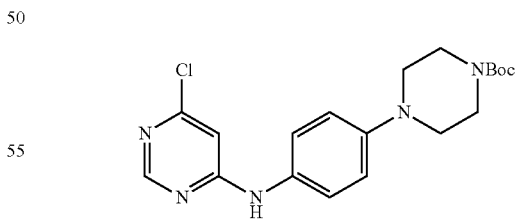

A mixture of 4,6-dichloropyrimidine (1 g, 6.76 mmol), tert-butyl 4-(4-aminophenyl)piperazine-1-carboxylate (1.87 g, 6.76 mmol) and DIEA (1.74 g, 13.52 mmol) in dioxane (25 mL) was stirred at 102° C. for 16 h. The mixture was cooled and concentrated under reduced pressure. The residue was purified by silica gel column chromatography, eluted with DCM/MeOH (10:1) to afford the product (2.2 g, 84%). [M+H]$^+$=390.2.

Step 3: tert-butyl (R)-4-(4-((6-(4-(1-(3-(tert-butyl)-1,2,4-oxadiazole-5-carboxamido)ethyl)-2-fluoro-5-methylphenyl)pyrimidin-4-yl)amino)phenyl)piperazine-1-carboxylate

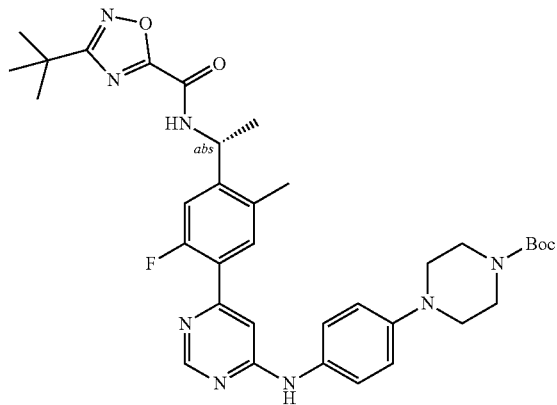 [SMILES: Cc1cc(-c2cc(Nc3ccc(N4CCN(C(=O)OC(C)(C)C)CC4)cc3)ncn2)c(F)cc1[C@@H](C)NC(=O)c1nc(C(C)(C)C)no1]

A mixture of tert-butyl 4-(4-((6-chloropyrimidin-4-yl)amino)phenyl)piperazine-1-carboxylate (500 mg, 1.28 mmol), (R)-3-(tert-butyl)-N-(1-(5-fluoro-2-methyl-4-(4,4,5,5-tetramethyl-1,3,2-dioxaborolan-2-yl)phenyl)ethyl)-1,2,4-oxadiazole-5-carboxamide (660 mg, 1.54 mmol), Pd(dppf)Cl$_2$ (93.6 mg, 0.128 mmol) and K$_2$CO$_3$ (530 mg, 3.84 mmol) in dioxane (30 mL) and water (7 mL) was stirred for 16 hours at 100° C. under N2 atmosphere. The mixture was cooled. To the resulting mixture was added water (25 mL) and extracted with DCM (3×20 mL). The combined organic layers were washed with sat. NaCl (25 mL) and dried over anhydrous Na$_2$SO$_4$. After filtration, the filtrate was concentrated under reduced pressure. The resulting residue was purified by silica gel column chromatography, eluted with DCM/MeOH (10:1) to afford the product (0.8 g, 95%). [M+H]$^+$=659.5.

Step 4: (R)-3-(tert-butyl)-N-(1-(5-fluoro-2-methyl-4-(6-((4-(piperazin-1-yl)phenyl)amino)pyrimidin-4-yl)phenyl)ethyl)-1,2,4-oxadiazole-5-carboxamide 2,2,2-trifluoroacetate

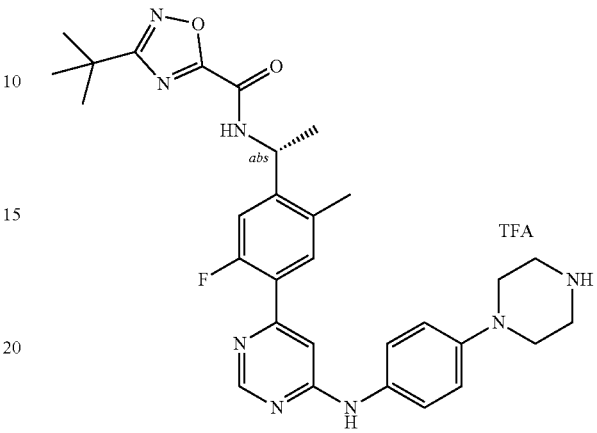

To a stirred solution of tert-butyl (R)-4-(4-((6-(4-(1-(3-(tert-butyl)-1,2,4-oxadiazole-5-carboxamido)ethyl)-2-fluoro-5-methylphenyl)pyrimidin-4-yl)amino)phenyl)piperazine-1-carboxylate (800 mg, 1.21 mmol) in DCM (10 mL) was added TFA (10 mL) at room temperature. The resulting solution was stirred for 2 h at room temperature and concentrated under vacuum to afford the product (800 mg, 100%). [M+H]$^+$=559.6.

Step 5: (R)-3-(tert-butyl)-N-(1-(4-(6-((4-(4-((1-(4-(2,4-dioxotetrahydropyrimidin-1(2H)-yl)phenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide

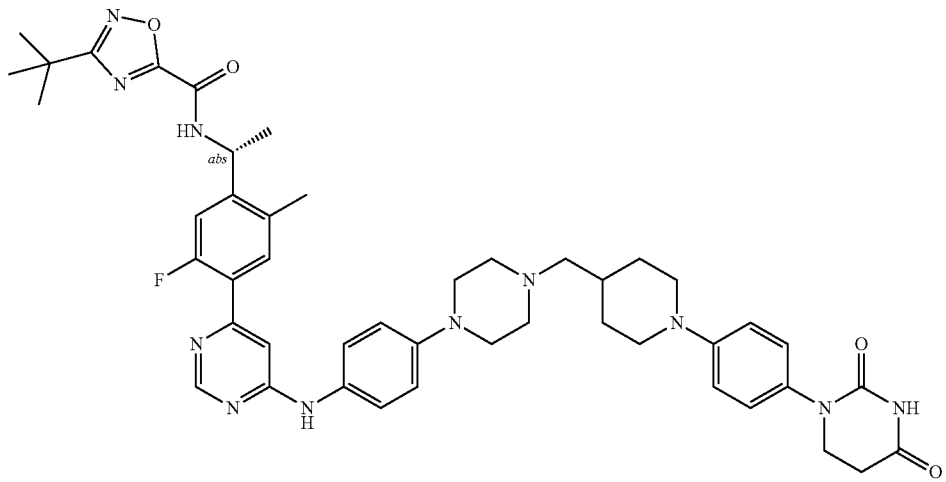 [SMILES: Cc1cc(-c2cc(Nc3ccc(N4CCN(CC5CCN(c6ccc(N7CCC(=O)NC7=O)cc6)CC5)CC4)cc3)ncn2)c(F)cc1[C@@H](C)NC(=O)c1nc(C(C)(C)C)no1]

To a stirred solution of (R)-3-(tert-butyl)-N-(1-(5-fluoro-2-methyl-4-(6-((4-(piperazin-1-yl)phenyl)amino)pyrimidin-4-yl)phenyl)ethyl)-1,2,4-oxadiazole-5-carboxamide 2,2,2-trifluoroacetate (100 mg, 0.149 mmol) and 1-(4-(2,4-dioxotetrahydropyrimidin-1(2H)-yl)phenyl)piperidine-4-carbaldehyde (67.4 mg, 0.224 mmol) in THF/DMF (2:1, 6 mL), titanium tetraisopropanolate (1.0 mL) was added in portions. The resulting mixture was stirred at room temperature for 16 h. The mixture was then cooled. Sodium triacetoxyborohydride (158 mg, 0.745 mmol) was added and stirred at room temperature for 2 h. The mixture was concentrated and purified with SiO$_2$-gel column (DCM:MeOH=10:1). The residue was purified by reverse phase flash chromatography with the following conditions: column, C18; mobile phase A, 0.1% FA in water, mobile phase B, ACN, 10% to 50% gradient in 25 min; detector, UV 214 nm. This gave the product (17 mg, 14%). $^1$H NMR (500 MHz, DMSO) δ 10.19 (s, 1H), 9.79 (d, J=7.9 Hz, 1H), 9.44 (s, 1H), 8.56 (s, 1H), 7.81 (d, J=8.0 Hz, 1H), 7.42 (d, J=6.5 Hz, 2H), 7.35 (d, J=13.0 Hz, 1H), 7.06 (d, J=9.0 Hz, 3H), 6.86 (dd, J=8.8, 3.8 Hz, 4H), 5.21-5.25 (m, 1H), 3.63-3.59 (m, 4H), 3.11-2.94 (m, 4H), 2.62-2.56 (m, 4H), 2.48-2.43 (m, 3H), 2.34 (s, 3H), 2.18-2.11 (m, 2H), 1.76-1.70 (m, 2H), 1.69-1.57 (m, 1H), 1.44-1.42 (d, J=7.0 Hz, 3H), 1.30 (s, 9H), 1.21-1.09 (m, 3H); [M+H]+=844.6.

Example 2: (R)-3-(tert-butyl)-N-(1-(4-(6-((4-(4-((1-(4-(2,4-dioxotetrahydropyrimidin-1(2H)-yl)-3-fluorophenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide

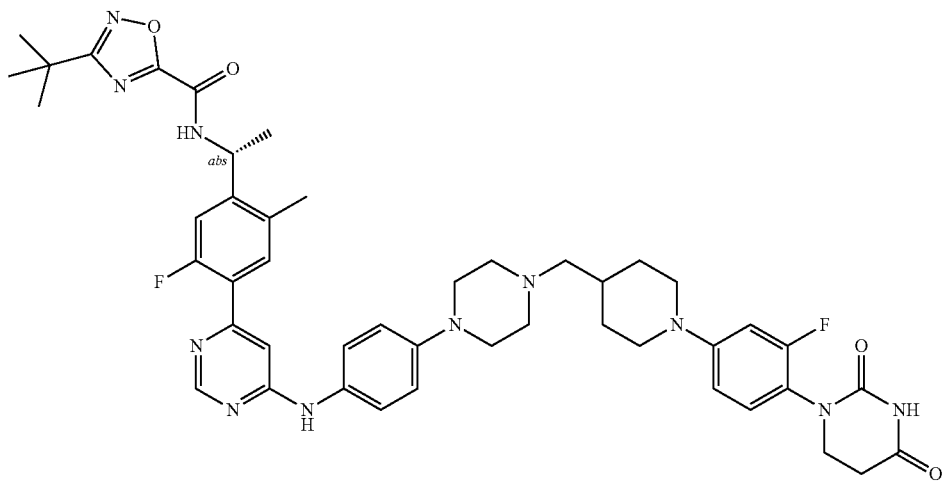 [SMILES: Cc1cc(-c2cc(Nc3ccc(N4CCN(CC5CCN(c6ccc(N7CCC(=O)NC7=O)c(F)c6)CC5)CC4)cc3)ncn2)c(F)cc1[C@@H](C)NC(=O)c1nc(C(C)(C)C)no1]

A mixture of (R)-3-(tert-butyl)-N-(1-(5-fluoro-2-methyl-4-(6-((4-(piperazin-1-yl)phenyl)amino)pyrimidin-4-yl)phenyl)ethyl)-1,2,4-oxadiazole-5-carboxamide 2,2,2-trifluoroacetate (80 mg, 0.12 mmol), 1-(2-fluoro-4-(4-(hydroxymethyl)piperidin-1-yl)phenyl)dihydropyrimidine-2,4(1H,3H)-dione (76 mg, 0.24 mmol), (cyanomethyl)trimethylphosphonium iodide (58 mg, 0.24 mmol) and DIEA (46 mg, 0.36 mmol) in MeCN (10 mL) was stirred at 100° C. for 16 h under N2 atmosphere. The mixture was cooled and concentrated under reduced pressure. The mixture was purified with SiO$_2$-gel column (DCM:MeOH=10:1) and prep-TLC (DCM:MeOH=7:1) to afford the product (30 mg, 29%). $^1$H NMR (500 MHz, DMSO) δ 10.34 (d, J=22.8 Hz, 1H), 9.85 (d, J=7.8 Hz, 1H), 9.62-9.44 (m, 1H), 8.63 (s, 1H), 7.88 (d, J=8.0 Hz, 1H), 7.60-7.44 (m, 2H), 7.42 (d, J=13.0 Hz, 1H), 7.20-7.09 (m, 2H), 6.97-6.93 (m, 2H), 6.56-6.43 (m, 2H), 5.29 (t, J=7.3 Hz, 1H), 3.82-3.67 (m, 1H), 3.66-3.42 (m, 3H), 3.40-3.38 (m, 1H), 3.22-3.20 (m, 2H), 3.12-3.08 (m, 3H), 3.03-2.85 (m, 2H), 2.79-2.63 (m, 2H), 2.40-2.38 (m, 5H), 2.27-2.14 (m, 1H), 2.13-2.01 (m, 1H), 1.92-1.73 (m, 1H), 1.60-1.57 (m, 2H), 1.50 (d, J=6.9 Hz, 3H), 1.37 (s, 9H), 1.27-1.24 (m, 2H); [M+H]+=862.6.

Example 3: (R)-3-(tert-butyl)-N-(1-(4-(6-((4-(4-((1-(4-(2,4-dioxotetrahydropyrimidin-1(2H)-yl)-2-fluorophenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide

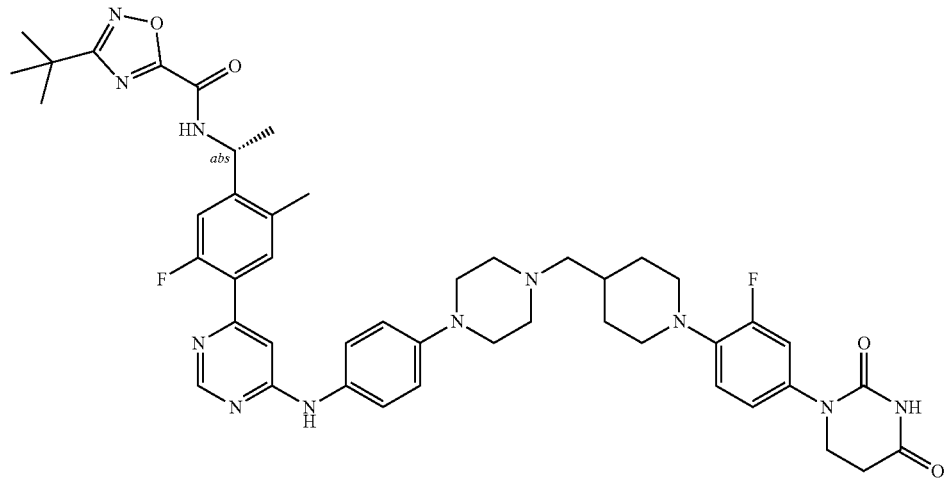 [SMILES: Cc1cc(-c2cc(Nc3ccc(N4CCN(CC5CCN(c6ccc(N7CCC(=O)NC7=O)cc6F)CC5)CC4)cc3)ncn2)c(F)cc1[C@@H](C)NC(=O)c1nc(C(C)(C)C)no1]

The titled compound was synthesized in the procedures similar to Example 2. $^1$H NMR (500 MHz, DMSO) δ 10.30 (s, 1H), 9.85 (d, J=7.9 Hz, 1H), 9.54 (d, J=40.6 Hz, 1H), 8.64 (s, 1H), 7.88 (d, J=8.1 Hz, 1H), 7.52 (d, J=35.4 Hz, 2H), 7.42 (d, J=13.0 Hz, 1H), 7.13 (d, J=29.7 Hz, 2H), 7.01 (dd, J=20.7, 12.9 Hz, 3H), 6.71 (s, 1H), 5.31-5.27 (m, 1H), 3.85-3.57 (m, 5H), 3.55-3.44 (m, 1H), 3.43-3.34 (m, 2H), 3.30-3.12 (m, 4H), 3.13-3.00 (m, 3H), 3.00-2.89 (m, 1H), 2.72-2.61 (m, 2H), 2.41 (s, 3H), 2.30-2.19 (m, 1H), 2.18-2.05 (m, 1H), 1.90-1.78 (m, 1H), 1.70-1.55 (m, 2H), 1.50 (d, J=7.0 Hz, 3H), 1.37 (s, 9H); [M+H]$^+$=862.6.

Example 4: 3-(tert-butyl)-N-((1R)-1-(4-(6-((4-(4-(2-(1-(4-(2,6-dioxopiperidin-3-yl)-3-fluorophenyl)piperidin-4-yl)ethyl)piperazin-1-yl)phenyl)amino)pyrimidin-4-yl)-5-fluoro-2-methylphenyl)ethyl)-1,2,4-oxadiazole-5-carboxamide

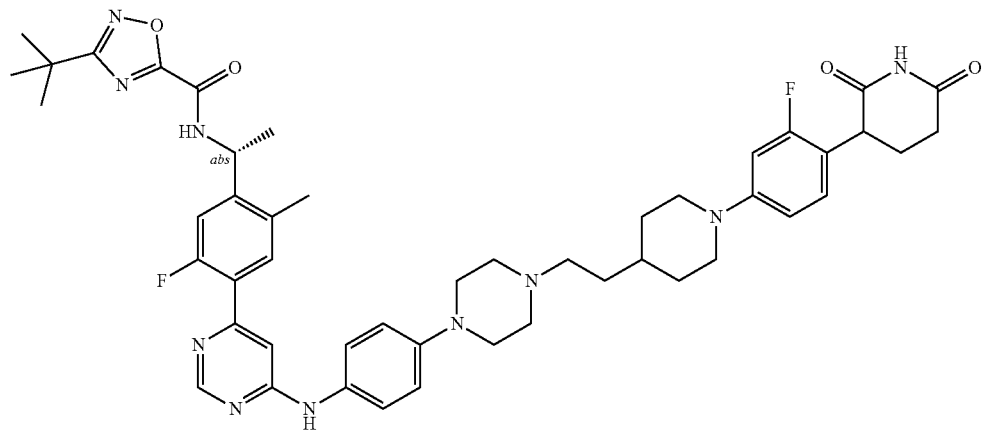 [SMILES: Cc1cc(-c2cc(Nc3ccc(N4CCN(CCC5CCN(c6ccc(C7CCC(=O)NC7=O)c(F)c6)CC5)CC4)cc3)ncn2)c(F)cc1[C@@H](C)NC(=O)c1nc(C(C)(C)C)no1]

The titled compound was synthesized in the procedures similar to Example 2. $^1$H NMR (500 MHz, DMSO) δ 10.80 (s, 1H), 9.85 (d, J=7.8 Hz, 1H), 9.50 (s, 1H), 8.63 (s, 1H), 7.88 (d, J=8.0 Hz, 1H), 7.49 (s, 2H), 7.42 (d, J=13.1 Hz, 1H), 7.13 (s, 1H), 7.06 (t, J=8.7 Hz, 1H), 6.94 (s, 2H), 6.71 (d, J=10.5 Hz, 2H), 5.33-5.24 (m, 1H), 3.87 (dd, J=12.2, 4.8 Hz, 1H), 3.76-3.65 (m, 2H), 3.18-3.00 (m, 4H), 2.77-2.60 (m, 4H), 2.59-2.53 (m, 2H), 2.44-2.31 (m, 5H), 2.17-2.09 (m, 1H), 1.98-1.91 (m, 1H), 1.75 (d, J=11.5 Hz, 2H), 1.50 (d, J=6.9 Hz, 3H), 1.48-1.41 (m, 3H), 1.37 (s, 9H), 1.30-1.18 (m, 4H); [M+H]$^+$=875.6.

Example 5: (R)-3-(tert-butyl)-N-(1-(4-(6-((3-(4-((1-(4-(2,4-dioxotetrahydropyrimidin-1(2H)-yl)phenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide Step 1: tert-butyl 4-(3-((6-chloropyrimidin-4-yl)amino)phenyl)piperazine-1-carboxylate

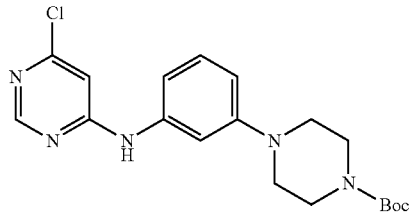 [SMILES: CC(C)(C)OC(=O)N1CCN(c2cccc(Nc3cc(Cl)ncn3)c2)CC1]

To a stirred mixture of tert-butyl 4-(3-aminophenyl)piperazine-1-carboxylate (1.5 g, 5.41 mmol) and 4,6-dichloropyrimidine (0.926 g, 5.95 mmol) in ethanol (30 mL) was added DIEA (2.1 g, 16.23 mmol) at room temperature. The resulting mixture was stirred for 6 h at 78° C. under nitrogen atmosphere and concentrated under reduced pressure. The residue was purified by silica gel column chromatography, eluted with 5%-50% EtOAc in petroleum ether to afford the product (1.4 g, 65%). [M+H]$^+$=390.1.

Step 2: tert-butyl (R)-4-(3-((6-(4-(1-(3-(tert-butyl)-1,2,4-oxadiazole-5-carboxamido)ethyl)-2-fluoro-5-methylphenyl)pyrimidin-4-yl)amino)phenyl)piperazine-1-carboxylate

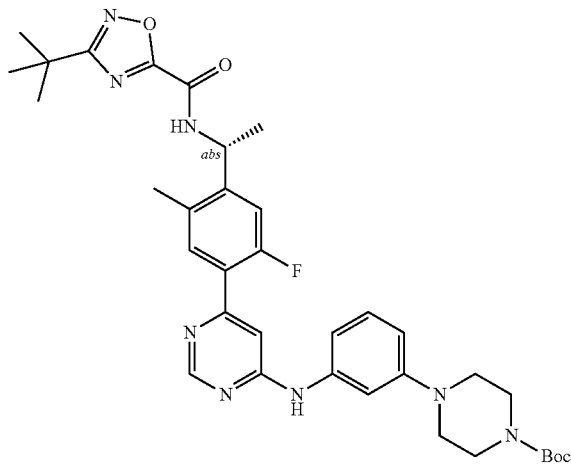 [SMILES: Cc1cc(-c2cc(Nc3cccc(N4CCN(C(=O)OC(C)(C)C)CC4)c3)ncn2)c(F)cc1[C@@H](C)NC(=O)c1nc(C(C)(C)C)no1]

To a stirred mixture of tert-butyl 4-(3-((6-chloropyrimidin-4-yl)amino)phenyl)piperazine-1-carboxylate (296 mg, 0.759 mmol) and (R)-3-(tert-butyl)-N-(1-(5-fluoro-2-methyl-4-(4,4,5,5-tetramethyl-1,3,2-dioxaborolan-2-yl)phenyl)ethyl)-1,2,4-oxadiazole-5-carboxamide (360 mg, 0.835 mmol) in dioxane (12 mL) and H$_2$O (3 mL) were added K$_2$CO$_3$ (210 mg, 1.52 mmol) and Pd(dppf)Cl$_2$ (31 mg, 0.038 mmol) at room temperature under nitrogen atmosphere. The resulting mixture was stirred for 16 h at 89° C. under nitrogen atmosphere. The mixture was allowed to cool down to room temperature and concentrated under reduced pressure. The residue was purified by silica gel column chromatography, eluted with 10%-90% EtOAc in petroleum ether to afford the product (290 mg, 58%). [M+H]$^+$=659.3.

Step 3: (R)-3-(tert-butyl)-N-(1-(5-fluoro-2-methyl-4-(6-((3-(piperazin-1-yl)phenyl)amino)pyrimidin-4-yl)phenyl)ethyl)-1,2,4-oxadiazole-5-carboxamide

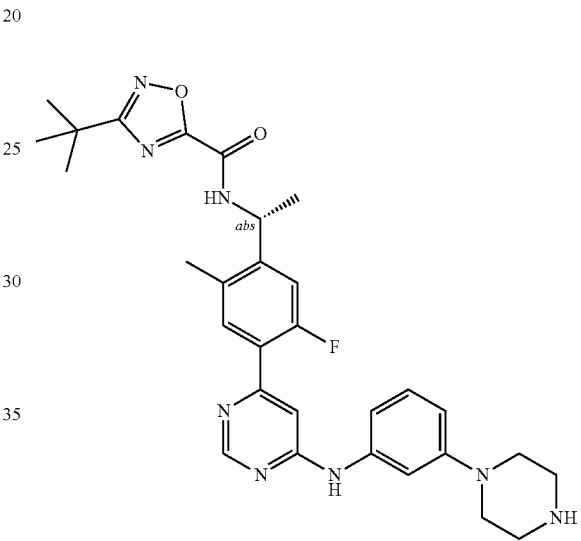

To a stirred solution of tert-butyl (R)-4-(3-((6-(4-(1-(3-(tert-butyl)-1,2,4-oxadiazole-5-carboxamido)ethyl)-2-fluoro-5-methylphenyl)pyrimidin-4-yl)amino)phenyl)piperazine-1-carboxylate (290 mg, 0.44 mmol) in DCM (5 mL) was added TFA (5 mL) at room temperature. The resulting solution was stirred for 2 h at room temperature and concentrated under vacuum. The residue (234 mg, crude) was used directly for next step without any further purification. [M+H]$^+$=559.3.

Step 4: (R)-3-(tert-butyl)-N-(1-(4-(6-((3-(4-((1-(4-(2,4-dioxotetrahydropyrimidin-1(2H)-yl)phenyl)piperidin-4-yl)methyl)piperazin-1-yl)phenyl)amino)pyrimidin-4-yl)-5-fluoro-2-methylphenyl)ethyl)-1,2,4-oxadiazole-5-carboxamide

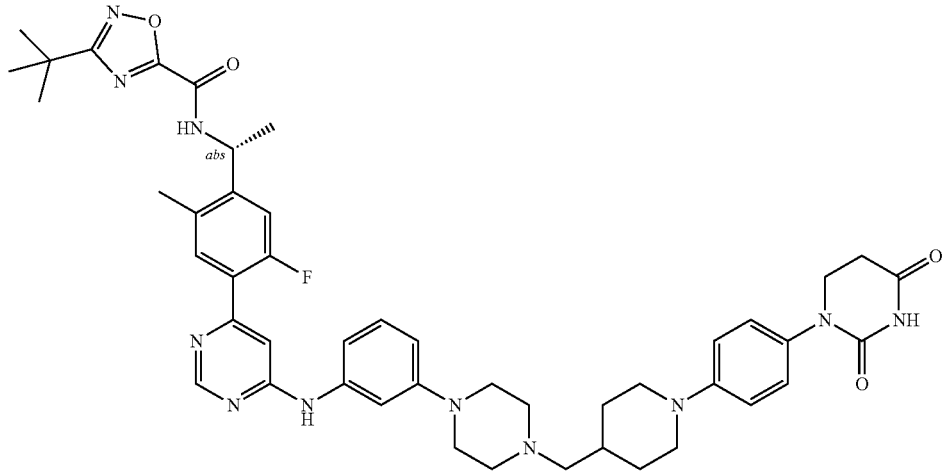 [SMILES: Cc1cc(-c2cc(Nc3cccc(N4CCN(CC5CCN(c6ccc(N7CCC(=O)NC7=O)cc6)CC5)CC4)c3)ncn2)c(F)cc1[C@@H](C)NC(=O)c1nc(C(C)(C)C)no1]

A mixture of (R)-3-(tert-butyl)-N-(1-(5-fluoro-2-methyl-4-(6-((3-(piperazin-1-yl)phenyl)amino)pyrimidin-4-yl)phenyl)ethyl)-1,2,4-oxadiazole-5-carboxamide (0.234 g, 0.418 mmol) and 1-(4-(2,4-dioxotetrahydropyrimidin-1(2H)-yl)phenyl)piperidine-4-carbaldehyde (0.189 g, 0.628 mmol) in 1,2-dichloroethane (8 mL) and HOAc (25 mg) was stirred in a round bottom flask at room temperature for 0.5 hour. To the mixture was added NaBH(OAc)$_3$ (0.222 g, 1.04 mmol) and stirred at room temperature for 12 hours. Then the mixture was evaporated in vacuum to afford the crude product, which was purified by pre-HPLC to afford the product (0.097 g, 27%). $^1$H NMR (500 MHz, DMSO) δ 10.25 (s, 1H), 9.85 (d, J=7.9 Hz, 1H), 9.62 (s, 1H), 8.70 (s, 1H), 7.91 (d, J=8.1 Hz, 1H), 7.43 (d, J=13.1 Hz, 1H), 7.25 (d, J=11.5 Hz, 2H), 7.19-7.08 (m, 4H), 6.93 (d, J=9.1 Hz, 2H), 6.65 (d, J=7.1 Hz, 1H), 5.30 (t, J=7.1 Hz, 1H), 3.69 (t, J=6.7 Hz, 4H), 3.19-3.10 (m, 4H), 2.69-2.65 (m, 4H), 2.39 (s, 4H), 2.22 (d, J=7.1 Hz, 2H), 1.87-1.65 (m, 4H), 1.50 (d, J=7.0 Hz, 3H), 1.37 (s, 9H), 1.29-1.15 (m, 4H), 0.87-0.71 (m, 1H); [M+H]$^+$=844.6.

Example 6: 3-(tert-butyl)-N-((1R)-1-(4-(6-((3-(4-(3-(4-((2,6-dioxopiperidin-3-yl)amino)phenyl)cyclobutyl)piperazin-1-yl)phenyl)amino)pyrimidin-4-yl)-5-fluoro-2-methylphenyl)ethyl)-1,2,4-oxadiazole-5-carboxamide

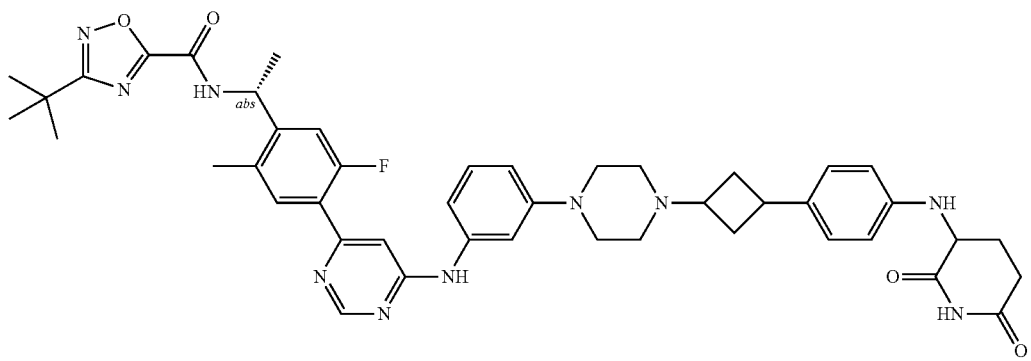 [SMILES: Cc1cc(-c2cc(Nc3cccc(N4CCN(C5CC(c6ccc(NC7CCC(=O)NC7=O)cc6)C5)CC4)c3)ncn2)c(F)cc1[C@@H](C)NC(=O)c1nc(C(C)(C)C)no1]

The titled compound was synthesized in the procedures similar to Example 5. $^1$H NMR (500 MHz, DMSO) δ 10.76 (s, 1H), 9.85 (d, J=7.9 Hz, 1H), 9.62 (s, 1H), 8.70 (s, 1H), 7.91 (d, J=8.1 Hz, 1H), 7.43 (d, J=13.1 Hz, 1H), 7.24 (s, 2H), 7.16 (d, J=4.9 Hz, 2H), 6.97 (d, J=8.5 Hz, 2H), 6.67-6.59 (m, 3H), 5.67 (d, J=7.6 Hz, 1H), 5.30 (t, J=7.3 Hz, 1H), 4.31-4.24 (m, 1H), 3.15 (s, 4H), 2.98 (t, J=7.8 Hz, 1H), 2.78-2.54 (m, 3H), 2.48-2.32 (m, 9H), 2.14-2.06 (m, 1H), 1.89-1.77 (m, 2H), 1.50 (d, J=7.0 Hz, 3H), 1.37 (s, 9H); [M+H]$^+$=815.5.

Example 7: (R)-3-(tert-butyl)-N-(1-(4-(6-((4-(4-((1-(4-(2,4-dioxotetrahydropyrimidin-1(2H)-yl)phenyl)piperidin-4-yl)methyl)piperazin-1-yl)phenyl)amino)pyrimidin-4-yl)-2-methylphenyl)ethyl)-1,2,4-oxadiazole-5-carboxamide

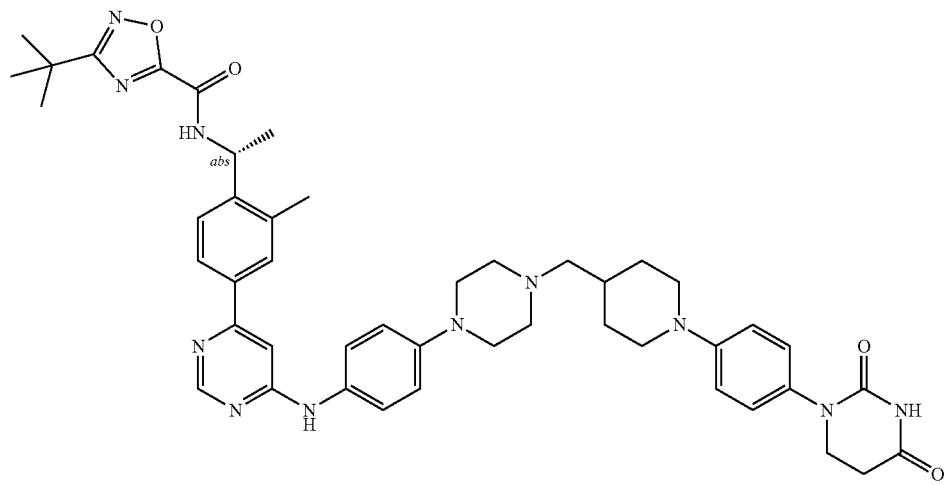 [SMILES: Cc1cc(-c2cc(Nc3ccc(N4CCN(CC5CCN(c6ccc(N7CCC(=O)NC7=O)cc6)CC5)CC4)cc3)ncn2)ccc1[C@@H](C)NC(=O)c1nc(C(C)(C)C)no1]

The titled compound was synthesized in the procedures similar to Example 1. $^1$H NMR (500 MHz, DMSO) δ 10.18 (s, 1H), 9.80 (d, J=7.8 Hz, 1H), 9.34 (s, 1H), 8.53 (s, 1H), 7.74 (s, 2H), 7.52 (d, J=8.1 Hz, 1H), 7.42 (d, J=8.5 Hz, 2H), 7.10-6.97 (m, 3H), 6.86 (dd, J=8.2, 5.8 Hz, 4H), 5.28-5.24 (m, 1H), 3.63-3.60 (m, 4H), 3.39-3.15 (m, 4H), 3.09-2.96 (m, 4H), 2.62-2.57 (m, 4H), 2.39 (s, 3H), 2.15 (d, J=6.8 Hz, 2H), 1.74 (d, J=12.3 Hz, 2H), 1.70-1.59 (m, 1H), 1.44 (d, J=6.9 Hz, 3H), 1.29 (s, 9H), 1.21-1.10 (m, 2H); [M+H]$^+$=826.6.

Example 8: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-5-fluoro-2-methylphenyl)ethyl)-1,2,4-oxadiazole-5-carboxamide

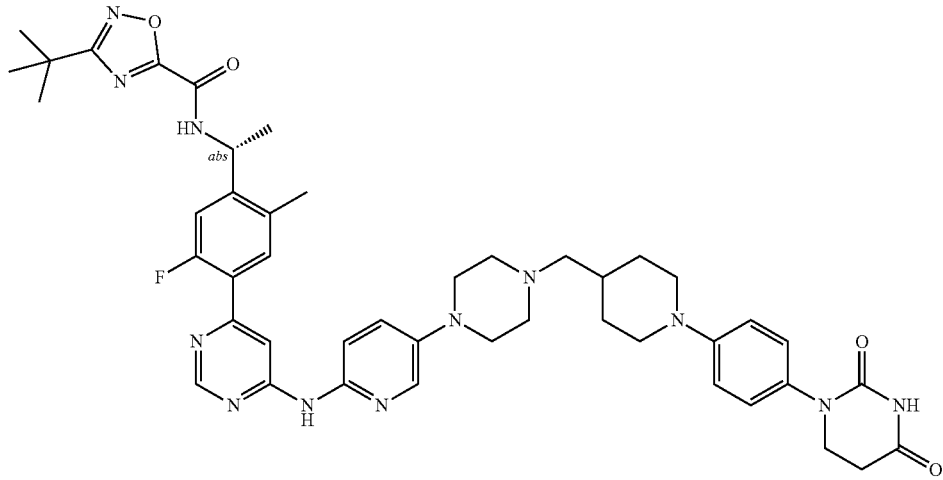 [SMILES: Cc1cc(-c2cc(Nc3ccc(N4CCN(CC5CCN(c6ccc(N7CCC(=O)NC7=O)cc6)CC5)CC4)cn3)ncn2)c(F)cc1[C@@H](C)NC(=O)c1nc(C(C)(C)C)no1]

The titled compound was synthesized in the procedures similar to Example 1. ¹H NMR (500 MHz, DMSO) δ 10.19 (s, 1H), 10.03 (s, 1H), 9.81 (d, J=7.8 Hz, 1H), 8.66 (s, 1H), 7.94 (d, J=2.3 Hz, 2H), 7.76 (d, J=8.0 Hz, 1H), 7.64 (s, 1H), 7.37 (t, J=11.7 Hz, 2H), 7.06 (d, J=8.8 Hz, 2H), 6.86 (d, J=8.9 Hz, 2H), 5.25-5.21 (m, 1H), 3.63-3.60 (m, 4H), 3.14-3.02 (m, 4H), 2.64-2.58 (m, 4H), 2.58-2.55 (m, 1H), 2.54-2.46 (m, 3H), 2.35 (s, 3H), 2.25-2.16 (m, 2H), 1.74 (d, J=12.4 Hz, 2H), 1.69-1.61 (m, 1H), 1.44 (d, J=6.9 Hz, 3H), 1.30 (s, 9H), 1.23-1.11 (m, 2H); [M+H]⁺=845.6.

Example 9: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-3-fluoro-2-methylphenyl)ethyl)-1,2,4-oxadiazole-5-carboxamide

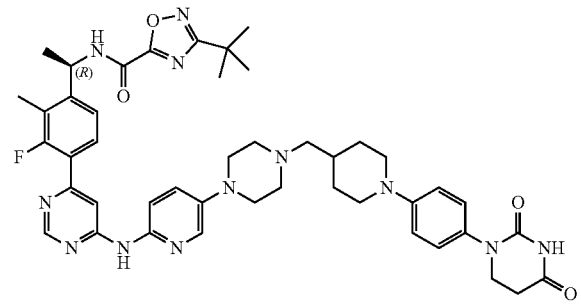

The titled compound was synthesized in the procedures similar to Example 1. ¹H NMR (500 MHz, DMSO) δ 10.25 (s, 1H), 10.08 (s, 1H), 9.93 (d, J=10.0 Hz, 1H), 8.72 (s, 1H), 8.01-7.97 (m, 2H), 7.83-7.71 (m, 2H), 7.46-7.43 (m, 2H), 7.13 (d, J=10.0 Hz, 2H), 6.92 (d, J=10.0 Hz, 2H), 5.35-5.32 (m, 1H), 3.70-3.67 (m, 4H), 3.13 (s, 4H), 2.69-2.64 (m, 4H), 2.53-2.52 (m, 3H), 2.36 (s, 3H), 2.23-2.22 (m, 2H), 1.82-1.71 (m, 3H), 1.51 (d, J=5.0 Hz, 3H), 1.38-1.34 (m, 9H), 1.26-1.22 (m, 3H); [M+H]⁺=845.7.

Example 10: (R)—N-(1-(4-(6-((6-(4-((1-(4-(2,4-dioxotetrahydropyrimidin-1(2H)-yl)phenyl)piperidin-4-yl)methyl)piperazin-1-yl)pyridin-3-yl)amino)pyrimidin-4-yl)-2-methylphenyl)ethyl)-3-(1-methylcyclopropyl)-1,2,4-oxadiazole-5-carboxamide

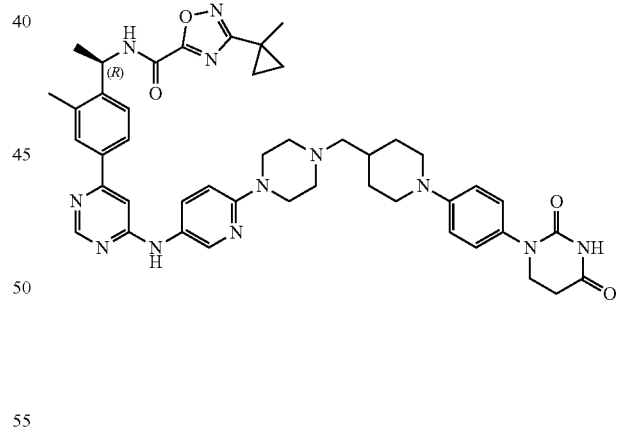

The titled compound was synthesized in the procedures similar to Example 1. ¹H NMR (500 MHz, DMSO) δ 10.25 (s, 1H), 9.80 (d, J=7.8 Hz, 1H), 9.42 (s, 1H), 8.59 (s, 1H), 8.32 (s, 1H), 7.87-7.75 (m, 3H), 7.56 (d, J=5.0 Hz, 1H), 7.14-7.08 (m, 3H), 6.93 (d, J=10.0 Hz, 2H), 6.86 (d, J=5.0 Hz, 1H), 5.30 (q, J=5.0 Hz, 1H), 3.71-3.68 (m, 4H), 3.44 (s, 4H), 2.69-2.65 (m, 4H), 2.47-2.44 (m, 6H), 2.22 (d, J=5.0 Hz, 2H), 1.83-1.72 (m, 3H), 1.49-1.48 (m, 6H), 1.23-1.19 (m, 5H), 0.99-0.97 (m, 2H); [M+H]⁺=825.6.

Example 11: (R)—N-(1-(4-(6-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-2-methylphenyl)ethyl)-3-(1-methylcyclopropyl)-1,2,4-oxadiazole-5-carboxamide Step 1: (R)—N-(1-(2-methyl-4-(4,4,5,5-tetramethyl-1,3,2-dioxaborolan-2-yl)phenyl)ethyl)-3-(1-methylcyclopropyl)-1,2,4-oxadiazole-5-carboxamide

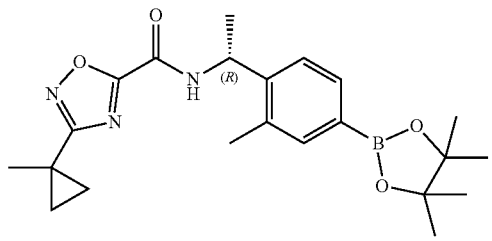

To a solution of ethyl 3-(1-methylcyclopropyl)-1,2,4-oxadiazole-5-carboxylate (1.0 g, 5.1 mmol) in EtOH (20 mL) was added (R)-1-(2-methyl-4-(4,4,5,5-tetramethyl-1,3,2-dioxaborolan-2-yl)phenyl)ethan-1-amine hydrochloride (1.52 g, 5.1 mmol). The mixture was stirred overnight at 90° C. under N2. The mixture was purified by combi flash, eluted with EA:PE=1:2 to give the product (1.8 g, 86%). [M+H]⁺=412.2.

Step 2: tert-butyl (R)-4-(6-((6-(3-methyl-4-(1-(3-(1-methylcyclopropyl)-1,2,4-oxadiazole-5-carboxamido)ethyl)phenyl)pyrimidin-4-yl)amino)pyridin-3-yl)piperazine-1-carboxylate

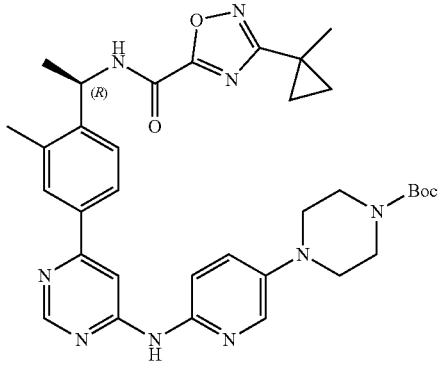

To a solution of (R)—N-(1-(2-methyl-4-(4,4,5,5-tetramethyl-1,3,2-dioxaborolan-2-yl)phenyl)ethyl)-3-(1-methylcyclopropyl)-1,2,4-oxadiazole-5-carboxamide (200 mg, 0.49 mmol) in 1,4-dioxane (20 mL) and H₂O (4 mL) were added tert-butyl 4-(6-((6-chloropyrimidin-4-yl)amino)pyridin-3-yl)piperazine-1-carboxylate (the compound was obtained through the similar way of example 5) (192 mg, 0.49 mmol) Pd(dppf)Cl₂ (54 mg, 0.0735 mmol) and K₂CO₃ (133 mg, 0.98 mmol). The resulting mixture was stirred for 2 h at 100° C. under N2 atmosphere. The mixture was purified by silica gel column chromatography, eluted with EtOAc to afford the product (100 mg, 32%). [M+H]⁺=640.3.

Step 3: (R)—N-(1-(2-methyl-4-(6-((5-(piperazin-1-yl)pyridin-2-yl)amino)pyrimidin-4-yl)phenyl)ethyl)-3-(1-methylcyclopropyl)-1,2,4-oxadiazole-5-carboxamide hydrochloride

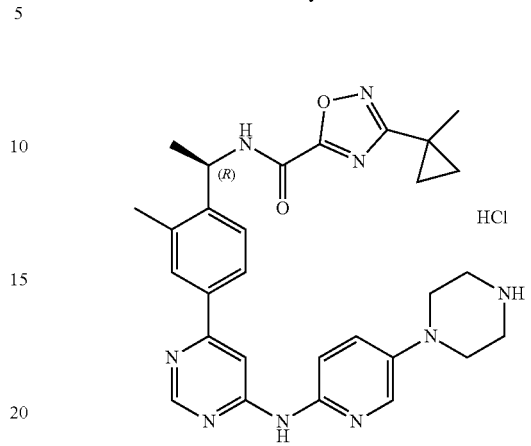

To a stirred solution of tert-butyl (R)-4-(6-((6-(3-methyl-4-(1-(3-(1-methylcyclopropyl)-1,2,4-oxadiazole-5-carboxamido)ethyl)phenyl)pyrimidin-4-yl)amino)pyridin-3-yl)piperazine-1-carboxylate (100 mg, 0.156 mmol) in DCM (10 mL) was added a solution of HCl in 1,4-dioxane (4 N, 10 mL) at room temperature. The resulting solution was stirred overnight at room temperature. The resulting mixture was concentrated under vacuum to afford the product (80 mg, 89%). [M+H]⁺=540.3.

Step 4: (R)—N-(1-(4-(6-((5-(4-((1-(4-(2,4-dioxotetrahydropyrimidin-1(2H)-yl)phenyl)piperidin-4-vl)methyl)piperazin-1-yl)pyridin-2-yl)amino)pyrimidin-4-yl)-2-methylphenyl)ethyl)-3-(1-methylcyclopropyl)-1,2,4-oxadiazole-5-carboxamide

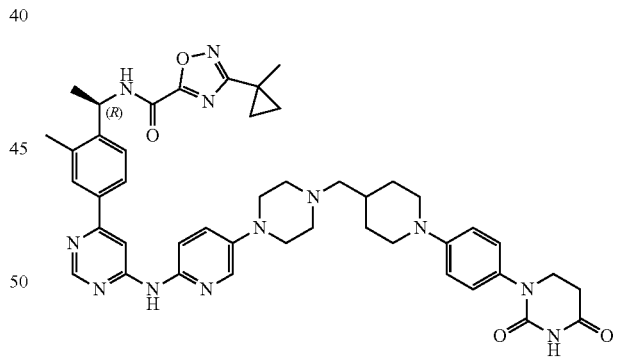

To a solution of (R)—N-(1-(2-methyl-4-(6-((5-(piperazin-1-yl)pyridin-2-yl)amino)pyrimidin-4-yl)phenyl)ethyl)-3-(1-methylcyclopropyl)-1,2,4-oxadiazole-5-carboxamide hydrochloride (100 mg, 0.174 mmol) in DCM (20 mL), MeOH (4 mL) and AcOH (0.3 mL) was added 1-(4-(2,4-dioxotetrahydropyrimidin-1(2H)-yl)phenyl)piperidine-4-carbaldehyde (63 mg, 0.2088 mmol). The mixture was stirred overnight at r.t. To the mixture was added NaBH(OAc)₃ (74 mg, 0.348 mmol) and then stirred for another 2 h at r.t. The reaction was quenched by Na₂CO₃ (aq., saturated, 20 mL) and extracted with DCM (30 mL×3). The organic layer was purified by combi flash, eluted with a gradient of DCM:MeOH from 1:0 to 10:1 to afford the product (30 mg, 21%). $^1$H NMR (500 MHz, DMSO) δ 10.25 (s, 1H), 9.98 (s, 1H), 9.81 (d, J=10.0 Hz, 1H), 8.70 (s, 1H), 8.04-8.01 (m, 2H), 7.82 (s, 2H), 7.68 (s, 1H), 7.58 (d, J=10.0 Hz, 1H), 7.46 (dd, J=5.0 Hz, 1H), 7.13 (d, J=10.0 Hz, 2H), 6.93 (d, J=10.0 Hz, 2H), 5.32-5.30 (m, 1H), 3.71-3.68 (m, 4H), 3.14 (s, 4H), 2.69-2.66 (m, 4H), 2.53-2.52 (m, 3H), 2.46 (s, 3H), 2.23-2.22 (m, 2H), 1.82-1.72 (m, 3H), 1.50-1.48 (m, 6H), 1.26-1.16 (m, 5H), 0.99-0.98 (m, 2H); [M+H]$^+$=825.6.

Example 12: (R)—N-(1-(4-(6-((5-(4-(1-(4-(2,4-dioxotetrahydropyrimidin-1(2H)-yl)phenyl)azetidin-3-yl)piperazin-1-yl)pyridin-2-yl)amino)pyrimidin-4-yl)-2-methylphenyl)ethyl)-3-(1-methylcyclopropyl)-1,2,4-oxadiazole-5-carboxamide

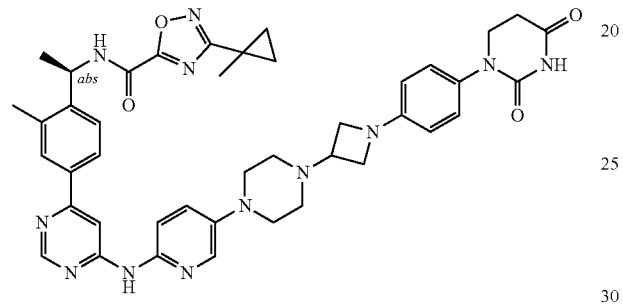

The titled compound was synthesized in the procedures similar to Example 11. $^1$H NMR (500 MHz, DMSO) δ 10.23 (s, 1H), 9.99 (s, 1H), 9.81 (d, J=7.8 Hz, 1H), 8.70 (s, 1H), 8.04 (t, J=7.1 Hz, 2H), 7.82 (s, 2H), 7.69 (s, 1H), 7.60-7.55 (m, 1H), 7.46 (dd, J=9.1, 2.9 Hz, 1H), 7.12 (d, J=8.7 Hz, 2H), 6.45 (d, J=8.7 Hz, 2H), 5.31 (t, J=7.3 Hz, 1H), 3.95 (t, J=7.1 Hz, 2H), 3.69-3.60 (m, 4H), 3.16 (s, 4H), 2.68 (t, J=6.7 Hz, 2H), 2.55-2.50 (m, 5H), 2.46 (s, 3H), 1.51-1.46 (m, 6H), 1.19 (d, J=2.6 Hz, 2H), 0.98 (q, J=4.3 Hz, 2H); [M+H]$^+$=783.0.

Example 13: (R)-3-(tert-butyl)-N-(1-(4-(6-((6-(4-((1-(4-(2,4-dioxotetrahydropyrimidin-1(2H)-yl)phenyl)piperidin-4-yl)methyl)piperazin-1-yl)pyridin-3-yl)amino)pyrimidin-4-yl)-2-methylphenyl)ethyl)-1,2,4-oxadiazole-5-carboxamide Step 1: tert-butyl 4-(5-nitropyridin-2-yl)piperazine-1-carboxylate

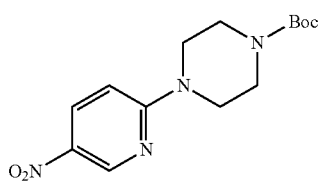 [SMILES: CC(C)(C)OC(=O)N1CCN(c2ccc([N+](=O)[O-])cn2)CC1]

To a stirred solution of 2-fluoro-5-nitropyridine (4 g, 28.15 mmol) and tert-butyl piperazine-1-carboxylate (5.77 g, 31.02 mmol) in THF (100 mL) was added DIEA (10.92 g, 84.45 mmol) at room temperature under nitrogen atmosphere. The resulting mixture was stirred for 3 h at 35° C. under nitrogen atmosphere and allowed to cool down to ambient temperature. The resulting mixture was diluted with brine (100 mL) and the aqueous layer was extracted with EtOAc (3×100 mL). The resulting organic layers were dried over Na$_2$SO$_4$. The resulting mixture was concentrated under reduced pressure. The product (7.84 g, crude) was used in the next step directly without further purification. [M+H]$^+$=309.2.

Step 2: tert-butyl 4-(5-aminopyridin-2-yl)piperazine-1-carboxylate

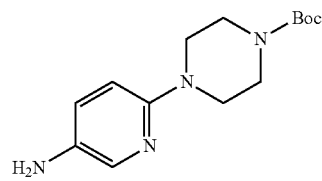

To a stirred solution of tert-butyl 4-(5-nitropyridin-2-yl)piperazine-1-carboxylate (7.8 g, 25.30 mmol) in AcOH (200 mL) was added Fe (14.13 g, 252.97 mmol) at room temperature under nitrogen atmosphere. The resulting mixture was stirred for 16 h at ambient temperature and concentrated under reduced pressure. The residue was dissolved in water (100 mL) and the resulting mixture was extracted with EtOAc (3×100 mL). The combined organic layers were washed with brine (3×100 mL) and dried over anhydrous Na$_2$SO$_4$. After filtration, the filtrate was concentrated under reduced pressure. The residue was purified by silica gel column chromatography, eluted with CH$_2$Cl$_2$/MeOH (10:1) to afford the product (3 g, 43%). [M+H]$^+$=279.1.

Step 3: tert-butyl (R)-4-(5-((6-(4-(1-(3-(tert-butyl)-1,2,4-oxadiazole-5-carboxamido)ethyl)-3-methylphenyl)pyrimidin-4-yl)amino)pyridin-2-yl)piperazine-1-carboxylate

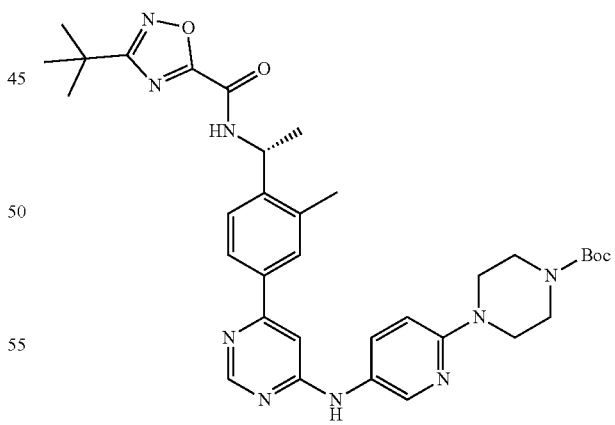

To a stirred solution of (R)-3-(tert-butyl)-N-(1-(4-(6-chloropyrimidin-4-yl)-2-methylphenyl)ethyl)-1,2,4-oxadiazole-5-carboxamide (the compound was obtained through the similar way of example 5) (1 g, 2.50 mmol) and tert-butyl 4-(5-aminopyridin-2-yl)piperazine-1-carboxylate (0.84 g, 3.00 mmol) in dioxane (20 mL) were added Pd(OAc)$_2$ (0.06 g, 0.25 mmol), BINAP (0.31 g, 0.50 mmol) and Cs$_2$CO$_3$ (1.63 g, 5.00 mmol) at room temperature under nitrogen atmosphere. The resulting mixture was stirred overnight at 100° C. under nitrogen atmosphere and concentrated under reduced pressure. The residue was purified by silica gel column chromatography, eluted with 1-60% EtOAc in petroleum ether to afford the product (280 mg, 18%). [M+H]⁺=642.0.

Step 4: (R)-3-(tert-butyl)-N-(1-(2-methyl-4-(6-((6-(piperazin-1-yl)pyridin-3-yl)amino)pyrimidin-4-yl)phenyl)ethyl)-1,2,4-oxadiazole-5-carboxamide hydrochloride

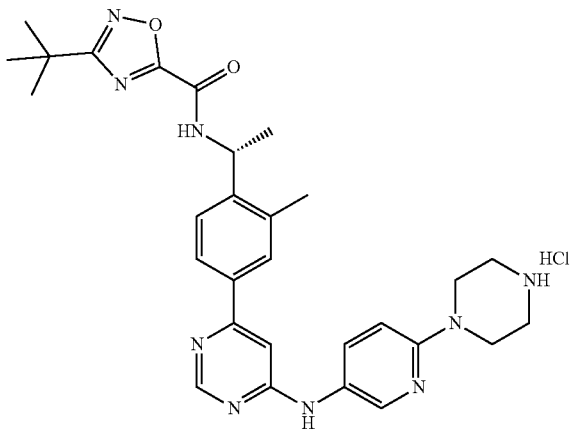 [SMILES: Cc1cc(-c2cc(Nc3ccc(N4CCNCC4)nc3)ncn2)ccc1[C@@H](C)NC(=O)c1nc(C(C)(C)C)no1 ; Cl]

A mixture of tert-butyl (R)-4-(5-((6-(4-(1-(3-(tert-butyl)-1,2,4-oxadiazole-5-carboxamido)ethyl)-3-methylphenyl)pyrimidin-4-yl)amino)pyridin-2-yl)piperazine-1-carboxylate (280 mg, 0.436 mmol) in DCM (10 mL) and 4 M HCl in 1,4-dioxane (3 mL) was stirred for 2 h at ambient temperature. The resulting mixture was concentrated under reduced pressure. The residue was purified by trituration with Et₂O (40 mL) to give the product (204 mg, 81%). ¹H NMR (400 MHz, DMSO) δ 11.75 (s, 1H), 9.98 (d, J=7.6 Hz, 1H), 9.54 (s, 2H), 8.87 (s, 1H), 8.51 (s, 1H), 8.02 (d, J=8.8 Hz, 1H), 7.79 (s, 2H), 7.70 (d, J=8.0 Hz, 1H), 7.41 (s, 1H), 7.16 (d, J=9.2 Hz, 1H), 5.36-5.32 (m, 1H), 3.84 (t, J=5.2 Hz, 4H), 3.20 (d, J=7.2 Hz, 4H), 2.50 (s, 3H), 1.52 (d, J=7.2 Hz, 3H), 1.37 (s, 9H); [M+H]⁺=542.4.

Step 5: (R)-3-(tert-butyl)-N-(1-(4-(6-((6-(4-((1-(4-(2,4-dioxotetrahydropyrimidin-1(2H)-yl)phenyl)piperidin-4-yl)methyl)piperazin-1-yl)pyridin-3-yl)amino)pyrimidin-4-yl)-2-methylphenyl)ethyl)-1,2,4-oxadiazole-5-carboxamide

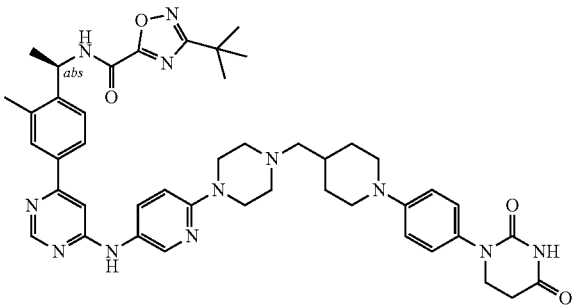 [SMILES: Cc1cc(-c2cc(Nc3ccc(N4CCN(CC5CCN(c6ccc(N7CCC(=O)NC7=O)cc6)CC5)CC4)nc3)ncn2)ccc1[C@@H](C)NC(=O)c1nc(C(C)(C)C)no1]

A mixture of (R)-3-(tert-butyl)-N-(1-(2-methyl-4-(6-((6-(piperazin-1-yl)pyridin-3-yl)amino)pyrimidin-4-yl)phenyl)ethyl)-1,2,4-oxadiazole-5-carboxamide hydrochloride (0.05 g, 0.086 mmol) and 1-(4-(2,4-dioxotetrahydropyrimidin-1(2H)-yl)phenyl)piperidine-4-carbaldehyde (0.039 g, 0.129 mmol) in 1,2-dichloroethane (5 mL) and HOAc (5.2 mg) was stirred in a round bottom flask at room temperature for 0.5 hour. To the mixture was added NaBH(OAc)₃ (0.046 g, 0.215 mmol) and stirred at room temperature for 3 hours. Then the mixture was evaporated in vacuum to afford the crude product, which was purified by pre-HPLC to afford the product (47.78 mg, 67%). ¹H NMR (500 MHz, DMSO) δ 10.26 (s, 1H), 9.88 (d, J=7.7 Hz, 1H), 9.62 (s, 1H), 9.55 (s, 1H), 8.61 (s, 1H), 8.42 (s, 1H), 7.95 (s, 1H), 7.83 (d, J=8.2 Hz, 2H), 7.59 (d, J=7.8 Hz, 1H), 7.18-7.08 (m, 3H), 6.98 (dd, J=22.6, 8.6 Hz, 3H), 5.33 (t, J=7.3 Hz, 1H), 4.29 (d, J=13.1 Hz, 2H), 3.76-3.57 (m, 6H), 3.30-3.05 (m, 4H), 2.77-2.62 (m, 4H), 2.54 (s, 3H), 2.46 (s, 2H), 2.10-1.81 (m, 3H), 1.51 (d, J=6.9 Hz, 3H), 1.40-1.27 (m, 11H); [M+H]⁺=827.7.

Example 14: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)pyrimidin-2-yl)amino)pyrimidin-4-yl)-2-methylphenyl)ethyl)-1,2,4-oxadiazole-5-carboxamide Step 1: 5-bromo-N,N-bis(4-methoxybenzyl)pyrimidin-2-amine

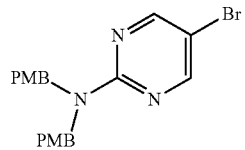

To a stirred mixture of 5-bromopyrimidin-2-amine (9.0 g, 51.72 mmol) in THF (180 mL) was added NaH (6.2 g, 155.17 mmol, 60% in mineral oil) in portions at 0° C. under nitrogen atmosphere. The resulting mixture was stirred for 1 h at 0° C. under nitrogen atmosphere. To the above mixture was added PMBCl (24.3 g, 155.17 mmol) dropwise at 0° C. The resulting mixture was stirred for additional 16 h at 75° C. The mixture was allowed to cool down to room temperature and quenched with sat. NH₄Cl (aq.) at 0° C. The resulting mixture was extracted with EtOAc (3×500 mL). The combined organic layers were washed with brine (3×400 mL) and dried over anhydrous Na₂SO₄. After filtration, the filtrate was concentrated under reduced pressure. The residue was purified by silica gel column chromatography, eluted with 3%-10% EtOAc in petroleum ether to afford the product (8.6 g, 40%). [M+H]⁺=414.0.

Step 2: tert-butyl 4-(2-(bis(4-methoxybenzyl)amino) pyrimidin-5-yl)piperazine-1-carboxylate

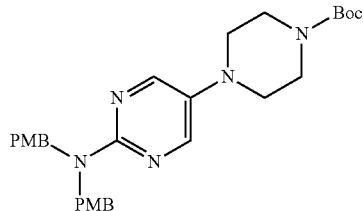

To a stirred mixture of 5-bromo-N,N-bis(4-methoxybenzyl)pyrimidin-2-amine (8.6 g, 20.76 mmol) and tert-butyl piperazine-1-carboxylate (4.6 g, 24.91 mmol) in toluene (160 mL) were added t-BuONa (3.0 g, 31.14 mmol), BINAP (1.3 g, 2.08 mmol) and Pd$_2$(dba)$_3$ (0.95 g, 1.04 mmol) at room temperature under nitrogen atmosphere. The resulting mixture was stirred for 16 h at 80° C. under nitrogen atmosphere. The mixture was allowed to cool down to room temperature and concentrated under reduced pressure. The residue was purified by silica gel column chromatography, eluted with 10%-30% EtOAc in petroleum ether to afford the product (10.4 g, 96%). [M+H]$^+$=520.3.

Step 3: 5-(piperazin-1-yl)pyrimidin-2-amine bis(2,2,2-trifluoroacetate) salt

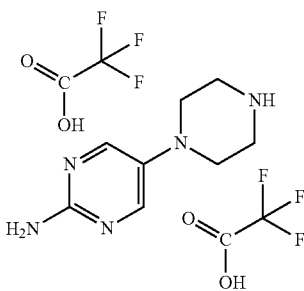

A solution of tert-butyl 4-(2-(bis(4-methoxybenzyl)amino)pyrimidin-5-yl)piperazine-1-carboxylate (10.4 g, 20.014 mmol) in TFA (100 mL) was stirred for 1 h at 75° C. The mixture was allowed to cool down to room temperature and concentrated under reduced pressure. The residue was triturated with Et$_2$O (200 mL). The resulting mixture was filtered and the filter cake was washed with Et$_2$O (3×50 mL). The solid was dried under vacuum. This resulted in the product (8.1 g, 99%). [M+H]$^+$=180.1.

Step 4: tert-butyl 4-(2-aminopyrimidin-5-yl)piperazine-1-carboxylate

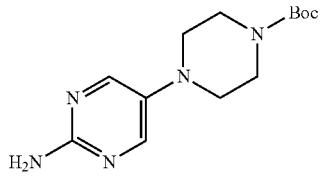 [SMILES: CC(C)(C)OC(=O)N1CCN(c2cnc(N)nc2)CC1]

To a stirred mixture of 5-(piperazin-1-yl)pyrimidin-2-amine bis(2,2,2-trifluoroacetate) salt (4.0 g, 9.821 mmol) and TEA (4.1 mL) in CH$_2$Cl$_2$ (80 mL) was added Boc$_2$O (2.6 g, 12.04 mmol) at 0° C. The resulting mixture was stirred for 1 h at room temperature and concentrated under reduced pressure. The residue was purified by silica gel column chromatography, eluted with 4%-8% MeOH in DCM to afford the product (2.0 g, 73%). [M+H]$^+$=280.2.

Step 5: tert-butyl (R)-4-(2-((6-(4-(1-(3-(tert-butyl)-1,2,4-oxadiazole-5-carboxamido)ethyl)-3-methylphenyl)pyrimidin-4-yl)amino)pyrimidin-5-yl)piperazine-1-carboxylate

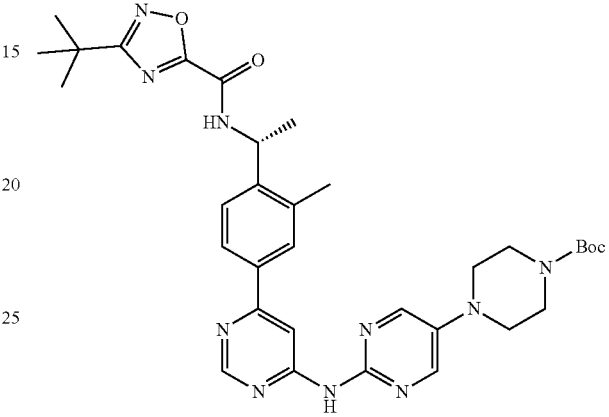

To a stirred mixture of (R)-3-(tert-butyl)-N-(1-(4-(6-chloropyrimidin-4-yl)-2-methylphenyl)ethyl)-1,2,4-oxadiazole-5-carboxamide (800 mg, 2.00 mmol) and tert-butyl 4-(2-aminopyrimidin-5-yl)piperazine-1-carboxylate (670 mg, 2.40 mmol) in 1,4-dioxane (16 mL) were added Cs$_2$CO$_3$ (1.30 g, 4.00 mmol), XPhos (287 mg, 0.60 mmol) and XPhos Pd G3 (254 mg, 0.30 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with 30%-60% EtOAc in CH$_2$Cl$_2$ to afford the product (800 mg, 62%). [M+H]$^+$=643.4.

Step 6: (R)-3-(tert-butyl)-N-(1-(2-methyl-4-(6-((5-(piperazin-1-yl)pyrimidin-2-yl)amino)pyrimidin-4-yl)phenyl)ethyl)-1,2,4-oxadiazole-5-carboxamide

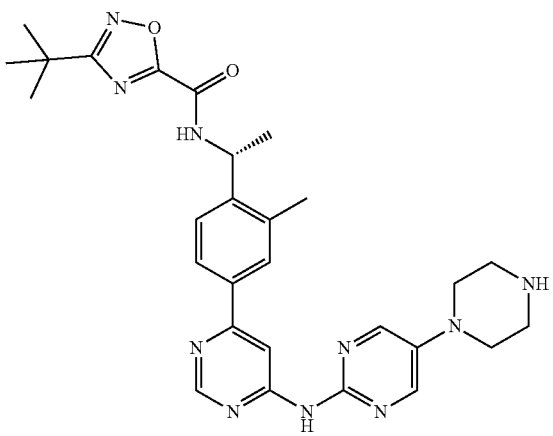 [SMILES: Cc1cc(-c2cc(Nc3ncc(N4CCNCC4)cn3)ncn2)ccc1[C@@H](C)NC(=O)c1nc(C(C)(C)C)no1]

To a stirred solution of tert-butyl (R)-4-(2-((6-(4-(1-(3-(tert-butyl)-1,2,4-oxadiazole-5-carboxamido)ethyl)-3-methylphenyl)pyrimidin-4-yl)amino)pyrimidin-5-yl)piperazine-1-carboxylate (800 mg, 1.25 mmol) in CH$_2$C$_2$ (8 mL) was added 4 M HCl in 1,4-dioxane (8 mL) dropwise at room temperature. The resulting mixture was stirred for 1 h at room temperature and concentrated under reduced pressure. The residue was triturated with Et$_2$O (80 mL). The resulting mixture was filtered and the filter cake was washed with Et$_2$O (3×10 mL). The solid was dried under infrared light. This resulted in the product (643 mg, 89%). $^1$H NMR (400 MHz, DMSO) δ 11.51 (s, 1H), 9.98 (d, J=7.6 Hz, 1H), 9.50 (s, 2H), 8.96 (d, J=2.8 Hz, 1H), 8.65-8.56 (m, 3H), 7.91-7.84 (m, 2H), 7.68 (d, J=8.1 Hz, 1H), 5.38-5.30 (m, 1H), 3.51 (s, 4H), 3.24 (s, 4H), 2.51-2.50 (m, 3H), 1.53 (d, J=7.0 Hz, 3H), 1.37 (s, 9H); [M+H]$^+$=543.4.

Step 7: (R)-3-(tert-butyl)-N-(1-(4-(6-((5-(4-((1-(4-(2,4-dioxotetrahydropyrimidin-1(2H)-yl)phenyl) piperidin-4-yl)methyl)piperazin-1-yl)pyrimidin-2-yl) amino)pyrimidin-4-yl)-2-methylphenyl)ethyl)-1,2,4-oxadiazole-5-carboxamide

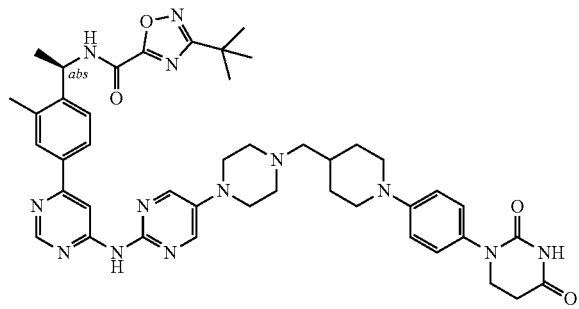 [SMILES: Cc1cc(-c2cc(Nc3ncc(N4CCN(CC5CCN(c6ccc(N7CCC(=O)NC7=O)cc6)CC5)CC4)cn3)ncn2)ccc1[C@@H](C)NC(=O)c1nc(C(C)(C)C)no1]

A mixture of (R)-3-(tert-butyl)-N-(1-(2-methyl-4-(6-((5-(piperazin-1-yl)pyrimidin-2-yl)amino)pyrimidin-4-yl)phenyl)ethyl)-1,2,4-oxadiazole-5-carboxamide (0.08 g, 0.138 mmol) and 1-(4-(2,4-dioxotetrahydropyrimidin-1(2H)-yl) phenyl)piperidine-4-carbaldehyde (0.063 g, 0.207 mmol) in 1,2-dichloroethane (6 mL) and HOAc (8.3 mg) was stirred in a round bottom flask at room temperature for 0.5 hour. To the mixture was added NaBH(OAc)$_3$ (0.073 g, 0.345 mmol) and stirred at room temperature for 3 hours. Then the mixture was evaporated in vacuum to afford the crude product, which was purified by pre-HPLC to afford the product (63.71 mg, 56%). $^1$H NMR (500 MHz, DMSO) δ 10.26 (d, J=9.0 Hz, 2H), 9.90 (d, J=7.7 Hz, 1H), 8.75 (d, J=0.9 Hz, 1H), 8.66 (s, 1H), 8.46 (s, 2H), 7.88 (d, J=9.1 Hz, 2H), 7.61 (d, J=8.0 Hz, 1H), 7.13 (d, J=8.9 Hz, 2H), 6.93 (d, J=9.0 Hz, 2H), 5.37-5.29 (m, 1H), 3.69 (t, J=6.7 Hz, 4H), 3.19 (s, 4H), 2.71-2.61 (m, 4H), 2.53 (s, 3H), 2.48 (s, 4H), 2.23 (d, J=6.7 Hz, 2H), 1.78 (t, J=24.7 Hz, 3H), 1.52 (d, J=7.0 Hz, 3H), 1.36 (s, 9H), 1.28-1.15 (m, 3H); [M+H]$^+$=828.6.

Example 15: (R)-3-(tert-butyl)-N-(1-(4-(2-((6-(4-((1-(4-(2,4-dioxotetrahydropyrimidin-1(2H)-yl)phenyl)piperidin-4-yl)methyl)piperazin-1-yl)pyridazin-3-yl)amino)pyrimidin-4-yl)-2-methylphenyl)ethyl)-1,2,4-oxadiazole-5-carboxamide Step 1: tert-butyl 4-(6-chloropyridazin-3-yl)piperazine-1-carboxylate

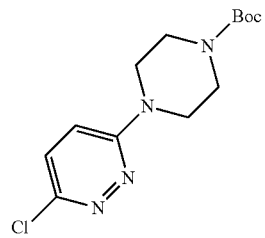 [SMILES: CC(C)(C)OC(=O)N1CCN(c2ccc(Cl)nn2)CC1]

To a stirred solution of 3,6-dichloropyridazine (5 g, 33.56 mmol) and tert-butyl piperazine-1-carboxylate (9.4 g, 50.35 mmol) in DMF (100 mL) was added TEA (10.2 g, 100.69 mmol) dropwise at room temperature. The resulting mixture was stirred for 16 h at 80° C. and diluted with water (500 mL). The resulting mixture was extracted with EtOAc (3×300 mL). The combined organic layers were washed with brine (2×200 mL) and dried over anhydrous Na$_2$SO$_4$. After filtration, the filtrate was concentrated under reduced pressure. The residue was purified by silica gel column chromatography to give the titled product (8.1 g, 81%). [M+H]$^+$=299.1.

Step 2: tert-butyl 4-(6-((diphenylmethylene)amino) pyridazin-3-yl)piperazine-1-carboxylate

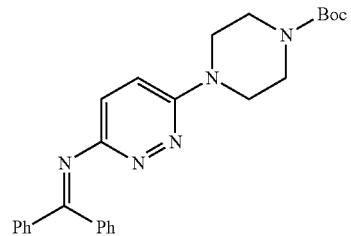 [SMILES: CC(C)(C)OC(=O)N1CCN(c2ccc(N=C(c3ccccc3)c3ccccc3)nn2)CC1]

To a stirred mixture of tert-butyl 4-(6-chloropyridazin-3-yl)piperazine-1-carboxylate (2 g, 6.69 mmol) and diphenylmethanimine (1.8 g, 10.04 mmol) in toluene (40.00 mL) were added Pd$_2$(dba)$_3$ (0.31 g, 0.34 mmol), BINAP (0.42 g, 0.67 mmol) and Cs$_2$CO$_3$ (4.36 g, 13.39 mmol) in portions at room temperature. The resulting mixture was stirred for 16 h at 100° C. under nitrogen atmosphere and concentrated under vacuum. The residue was purified by silica gel column chromatography to give the titled product (1.4 g, 47%). [M+H]$^+$=444.2.

Step 3: tert-butyl 4-(6-aminopyridazin-3-yl)piperazine-1-carboxylate

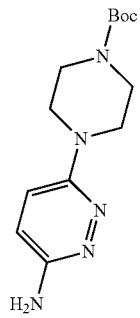

To a stirred mixture of tert-butyl 4-(6-((diphenylmethylene)amino)pyridazin-3-yl)piperazine-1-carboxylate (1.35 g, 3.04 mmol) and citric acid (13.5 mL, 70.27 mmol) in THF (20 mL) was added H₂O (13.5 mL) dropwise at room temperature. The resulting mixture was stirred overnight at room temperature and concentrated under vacuum. The residue was purified by silica gel column chromatography to give the titled product (710 mg, 83%). [M+H]⁺=280.2.

Step 4: tert-butyl (R)-4-(6-(((6-(4-(1-(3-(tert-butyl)-1,2,4-oxadiazole-5-carboxamido)ethyl)-3-methylphenyl)pyrimidin-4-yl)amino)pyridazin-3-yl)piperazine-1-carboxylate

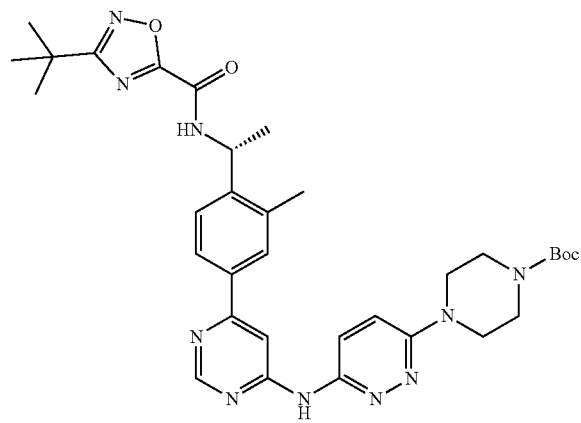

To a stirred mixture of tert-butyl 4-(6-aminopyridazin-3-yl)piperazine-1-carboxylate (500 mg, 1.79 mmol) and (R)-3-(tert-butyl)-N-(1-(4-(6-chloropyrimidin-4-yl)-2-methylphenyl)ethyl)-1,2,4-oxadiazole-5-carboxamide (858.90 mg, 2.15 mmol) in dioxane (10 mL) were added XPhos (170.66 mg, 0.36 mmol), XPhos Pd G3 (151.51 mg, 0.18 mmol) and Cs₂CO₃ (1.17 g, 3.58 mmol) in portions at room temperature. The resulting mixture was stirred for 16 h at 100° C. under nitrogen atmosphere and concentrated under vacuum. The residue was purified by silica gel column chromatography to give the titled product (314 mg, 27%). [M+H]⁺=643.2.

Step 5: (R)-3-(tert-butyl)-N-(1-(2-methyl-4-(6-((6-(piperazin-1-yl)pyridazin-3-yl)amino)pyrimidin-4-yl)phenyl)ethyl)-1,2,4-oxadiazole-5-carboxamide

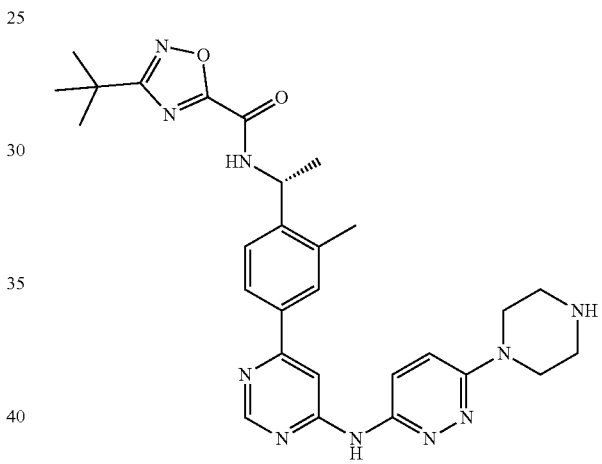

A solution of tert-butyl (R)-4-(6-(((6-(4-(1-(3-(tert-butyl)-1,2,4-oxadiazole-5-carboxamido)ethyl)-3-methylphenyl)pyrimidin-4-yl)amino)pyridazin-3-yl)piperazine-1-carboxylate (314 mg, 0.49 mmol) and HCl in 1,4-dioxane (6 mL) in DCM (6 mL) was stirred for 1 h at room temperature. The resulting mixture was concentrated under vacuum. The residue was triturated with Et₂O to afford the titled product (254 mg, 89%). [M+H]⁺=543.3.

Step 6: (R)-3-(tert-butyl)-N-(1-(4-(2-((6-(4-((1-(4-(2,4-dioxotetrahydropyrimidin-1(2H)-yl)phenyl)piperidin-4-yl)methyl)piperazin-1-yl)pyridazin-3-yl)amino)pyrimidin-4-yl)-2-methylphenyl)ethyl)-1,2,4-oxadiazole-5-carboxamide

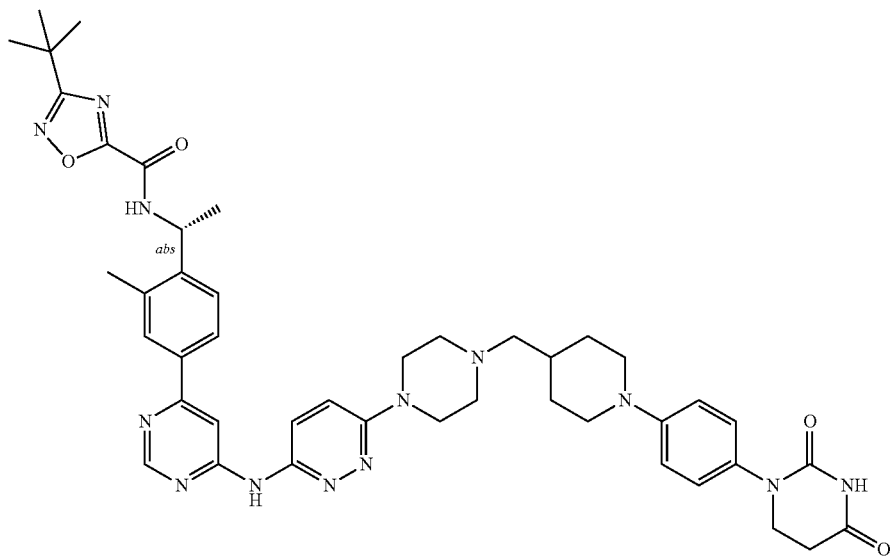 [SMILES: Cc1cc(-c2cc(Nc3ccc(N4CCN(CC5CCN(c6ccc(N7CCC(=O)NC7=O)cc6)CC5)CC4)nn3)ncn2)ccc1[C@@H](C)NC(=O)c1nc(C(C)(C)C)no1]

A mixture of (R)-3-(tert-butyl)-N-(1-(2-methyl-4-(6-((6-(piperazin-1-yl)pyridazin-3-yl)amino)pyrimidin-4-yl)phenyl)ethyl)-1,2,4-oxadiazole-5-carboxamide (100 mg, 0.17 mmol), 1-(4-(2,4-dioxotetrahydropyrimidin-1(2H)-yl)phenyl)piperidine-4-carbaldehyde (60 mg, 0.2 mmol), NaBH(OAc)$_3$ (106 mg, 0.5 mmol) and NaOAc (82 mg, 1.0 mmol) in DCE was stirred at room temperature for 16 h. The mixture was concentrated and purified by silica gel column chromatography to give the titled product (50 mg, 36%). $^1$H NMR (500 MHz, DMSO) δ 10.24 (d, J=5.3 Hz, 2H), 9.89 (d, J=7.8 Hz, 1H), 8.72 (s, 1H), 8.05-7.79 (m, 4H), 7.62 (d, J=8.6 Hz, 1H), 7.40 (d, J=9.9 Hz, 1H), 7.13 (d, J=8.7 Hz, 2H), 6.93 (d, J=8.9 Hz, 2H), 5.39-5.29 (m, 1H), 3.74-3.64 (m, 4H), 3.52 (s, 4H), 2.71-2.61 (m, 4H), 2.51-2.44 (m, 7H), 2.23 (d, J=7.1 Hz, 2H), 1.82 (d, J=11.7 Hz, 2H), 1.78-1.68 (m, 1H), 1.51 (d, J=6.9 Hz, 3H), 1.36 (s, 9H), 1.30-1.26 (m, 2H); [M+H]$^+$=828.6

Example 16: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-2-methylphenyl)ethyl)-1,2,4oxadiazole-5-carboxamide

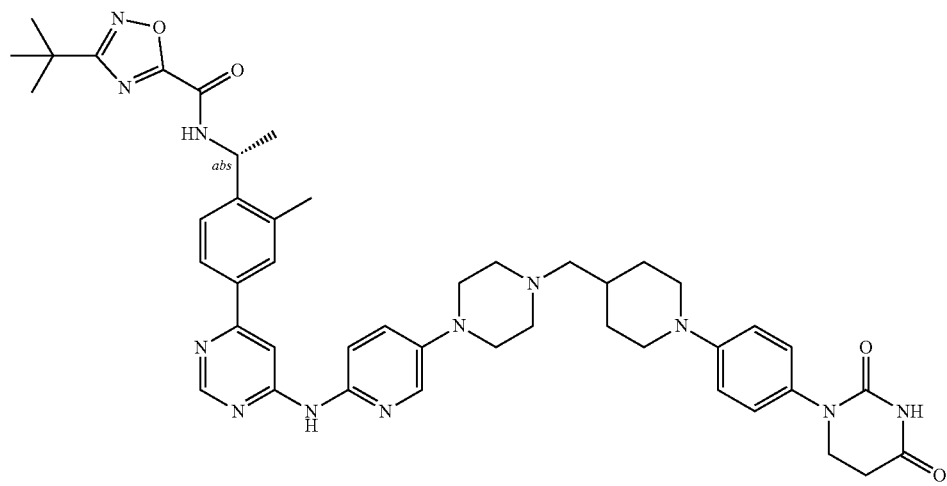 [SMILES: Cc1cc(-c2cc(Nc3ccc(N4CCN(CC5CCN(c6ccc(N7CCC(=O)NC7=O)cc6)CC5)CC4)cn3)ncn2)ccc1[C@@H](C)NC(=O)c1nc(C(C)(C)C)no1]

The titled compound was synthesized in the procedures similar to Example 15. $^1$H NMR (500 MHz, DMSO) δ 10.25 (s, 1H), 9.98 (s, 1H), 9.88 (d, J=7.8 Hz, 1H), 8.70 (s, 1H), 8.04 (d, J=2.8 Hz, 2H), 7.84 (d, J=6.0 Hz, 2H), 7.69 (s, 1H), 7.61 (d, J=8.7 Hz, 1H), 7.45 (dd, J=9.1, 2.8 Hz, 1H), 7.13 (d, J=8.9 Hz, 2H), 6.92 (d, J=8.9 Hz, 2H), 5.35-5.31 (m, 1H), 3.72-3.63 (m, 4H), 3.17-3.08 (m, 4H), 2.69-2.64 (m, 4H), 2.54-2.50 (m, 4H), 2.47 (s, 3H), 2.23 (d, J=7.1 Hz, 2H), 1.81 (d, J=12.1 Hz, 2H), 1.75-1.67 (m, 1H), 1.51 (d, J=7.0 Hz, 3H), 1.36 (s, 9H), 1.26-1.18 (m, 2H); [M+H]$^+$=827.6.

Example 17: (R)-3-(tert-butyl)-N-(1-(4-(6-((5-(4-((1-(4-(2,4-dioxotetrahydropyrimidin-1(2H)-yl)-3-fluorophenyl)piperidin-4-yl)methyl)piperazin-1-yl)pyridin-2-yl)amino)pyrimidin-4-yl)-2-methylphenyl)ethyl)-1,2,4-oxadiazole-5-carboxamide

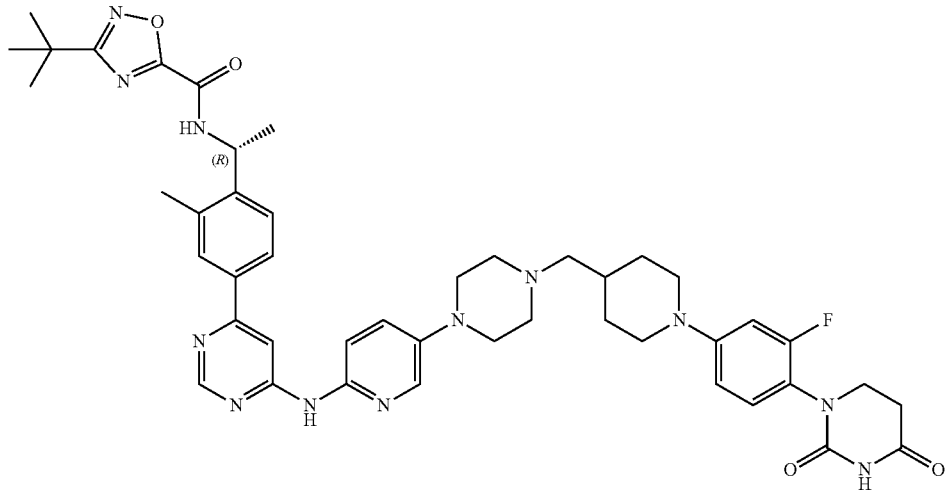

The titled compound was synthesized in the procedures similar to Example 15. $^1$H NMR (500 MHz, DMSO) δ 10.32 (s, 1H), 9.98 (s, 1H), 9.87 (d, J=5.0 Hz, 1H), 8.70 (s, 1H), 8.04-8.02 (m, 2H), 7.84-7.83 (m, 2H), 7.68 (s, 1H), 7.61 (d, J=5.0 Hz, 1H), 7.45 (d, J=5.0 Hz, 1H), 7.14 (t, J=10.0 Hz, 2H), 6.37-6.32 (m, 2H), 5.36-5.30 (m, 1H), 3.59 (t, J=5.0 Hz, 2H), 3.43 (t, J=5.0 Hz, 1H), 3.24-3.19 (m, 1H), 3.14 (s, 4H), 2.88 (t, J=10.0 Hz, 1H), 2.68 (t, J=5.0 Hz, 1H), 2.55-2.54 (m, 3H), 2.47 (s, 3H), 2.43-2.40 (m, 2H), 2.31-2.28 (m, 1H), 2.16-2.13 (m, 1H), 1.67-1.61 (m, 3H), 1.51 (d, J=5.0 Hz, 3H), 1.36 (s, 9H), 1.27-1.19 (m, 2H); [M+H]$^+$=845.7.

Example 18: (R)-3-(tert-butyl)-N-(1-(4-(6-((5-(4-((1-(4-(2,4-dioxotetrahydropyrimidin-1(2H)-yl)-3-methylphenyl)piperidin-4-yl)methyl)piperazin-1-yl)pyridin-2-yl)amino)pyrimidin-4-yl)-2-methylphenyl)ethyl)-1,2,4-oxadiazole-5-carboxamide

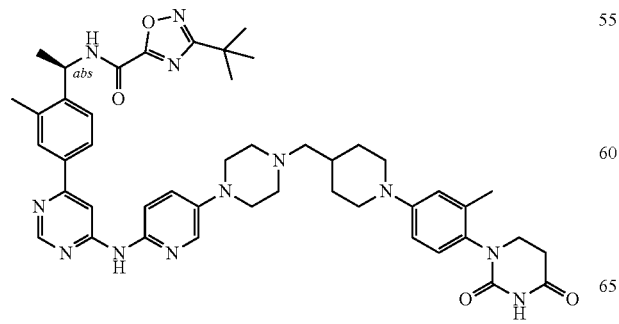

The titled compound was synthesized in the procedures similar to Example 15. ¹H NMR (500 MHz, DMSO) δ 10.23 (s, 1H), 9.98 (s, 1H), 9.88 (d, J=7.8 Hz, 1H), 8.70 (s, 1H), 8.04 (d, J=2.7 Hz, 2H), 7.83 (d, J=5.9 Hz, 2H), 7.68 (s, 1H), 7.61 (d, J=8.7 Hz, 1H), 7.45 (dd, J=9.1, 2.8 Hz, 1H), 7.04 (d, J=8.6 Hz, 1H), 6.81 (d, J=2.3 Hz, 1H), 6.77 (dd, J=8.8, 2.4 Hz, 1H), 5.33 (t, J=7.2 Hz, 1H), 3.72-3.63 (m, 3H), 3.46 (dt, J=12.4, 6.2 Hz, 1H), 3.14 (s, 4H), 2.75-2.62 (m, 4H), 2.55-2.50 (m, 4H), 2.47 (s, 3H), 2.23 (d, J=7.1 Hz, 2H), 2.12 (s, 3H), 1.85-1.65 (m, 3H), 1.51 (d, J=8.1 Hz, 3H), 1.36 (s, 9H), 1.25-1.15 (m, 2H); [M+H]⁺=841.6.

Example 19: 3-(tert-butyl)-N-((1R)-1-(4-(6-((5-(4-((1-(4-(2,6-dioxopiperidin-3-yl)phenyl)azetidin-3-yl)methyl)piperazin-1-yl)pyridin-2-yl)amino)pyrimidin-4-yl)-2-methylphenyl)ethyl)-1,2,4-oxadiazole-5-carboxamide

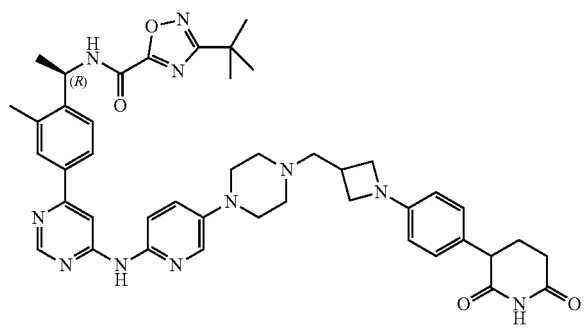

The titled compound was synthesized in the procedures similar to Example 15. ¹H NMR (500 MHz, DMSO) δ 10.75 (s, 1H), 9.99 (s, 1H), 9.89 (d, J=5.0 Hz, 1H), 8.70 (s, 1H), 8.04-8.01 (m, 2H), 7.84-7.83 (m, 2H), 7.68 (s, 1H), 7.61 (d, J=5.0 Hz, 1H), 7.46 (dd, J=5.0 Hz, 10.0 Hz, 1H), 7.00 (d, J=10.0 Hz, 2H), 6.39 (d, J=10.0 Hz, 2H), 5.36-5.32 (m, 1H), 3.94-3.91 (m, 2H), 3.71-3.68 (m, 1H), 3.47-3.44 (m, 2H), 3.13 (s, 4H), 2.97-2.94 (m, 1H), 2.64-2.60 (m, 3H), 2.56-2.54 (m, 4H), 2.47-2.43 (m, 4H), 2.12-1.98 (m, 2H), 1.52 (d, J=5.0 Hz, 3H), 1.36 (s, 9H); [M+H]⁺=798.6.

Example 20: (R)-3-(tert-butyl)-N-(1-(4-(6-((5-(3-((4-(4-(2,4-dioxotetrahydropyrimidin-1(2H)-yl)phenyl)piperazin-1-yl)methyl)azetidin-1-yl)pyridin-2-yl)amino)pyrimidin-4-yl)-2-methylphenyl)ethyl)-1,2,4-oxadiazole-5-carboxamide Step 1: (1-(6-nitropyridin-3-yl)azetidin-3-yl)methanol

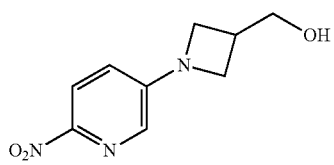

To a stirred solution of 5-bromo-2-nitropyridine (6 g, 29.557 mmol) and azetidin-3-ylmethanol hydrochloride (4.38 g, 35.468 mmol) in dioxane (200 mL) were added Pd₂(dba)₃ (2.71 g, 2.956 mmol), DavePhos (2.33 g, 5.911 mmol) and Cs₂CO₃ (19.26 g, 59.114 mmol) at room temperature under nitrogen atmosphere. The resulting mixture was stirred overnight at 100° C. under nitrogen atmosphere. The residue was purified by silica gel column chromatography, eluted with 1-60% EtOAc in PE to afford the product (3.6 g, 58%). [M+H]⁺=210.2.

Step 2: (1-(6-aminopyridin-3-yl)azetidin-3-yl)methanol

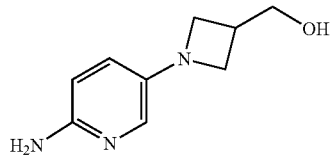 [SMILES: Nc1ccc(N2CC(CO)C2)cn1]

To a solution of (1-(6-nitropyridin-3-yl)azetidin-3-yl)methanol (3.6 g, 17.208 mmol) in MeOH (40 mL) was added Pd/C (10%, 2 g). The mixture was hydrogenated at room temperature using hydrogen balloon for 10 h, filtered through a Celite pad and concentrated under reduced pressure to give the product (3 g, 97%). [M+H]⁺=180.1.

Step 3: (R)-3-(tert-butyl)-N-(1-(4-(6-((5-(3-(hydroxymethyl)azetidin-1-yl)pyridin-2-yl)amino)pyrimidin-4-yl)-2-methylphenyl)ethyl)-1,2,4-oxadiazole-5-carboxamide

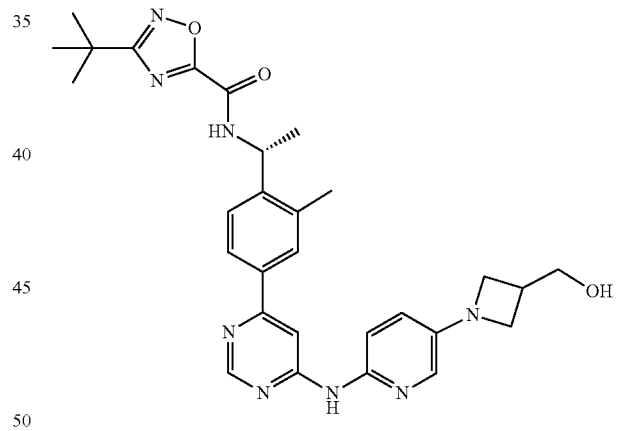

To a solution of (R)-3-(tert-butyl)-N-(1-(4-(6-chloropyrimidin-4-yl)-2-methylphenyl)ethyl)-1,2,4-oxadiazole-5-carboxamide (1.75 g, 9.753 mmol) and (1-(6-aminopyridin-3-yl)azetidin-3-yl)methanol in dioxane (100 mL) were added XPhos Pd G3 (0.64 g, 0.750 mmol), Cs₂CO₃ (4.89 g, 15.004 mmol) and XPhos (0.72 g, 1.500 mmol). After stirring overnight at 100° C. under nitrogen atmosphere, the resulting mixture was concentrated under reduced pressure. The residue was purified by silica gel column chromatography, eluted with 1-70% EtOAc in CH₂Cl₂ to afford the product (1.001 g, 25%). ¹H NMR (400 MHz, DMSO) δ 9.90-9.88 (m, 2H), 8.68 (s, 1H), 7.95 (s, 1H), 7.85-7.81 (m, 2H), 7.70-7.55 (m, 3H), 6.94 (dd, J=8.9, 3.0 Hz, 1H), 5.36-5.32 (m, 1H), 4.77 (t, J=5.3 Hz, 1H), 3.86 (t, J=7.5 Hz, 2H), 3.59 (q, J=6.4 Hz, 4H), 2.83-2.76 (m, 1H), 2.47 (s, 3H), 1.52 (d, J=6.9 Hz, 3H), 1.37 (s, 9H); [M+H]⁺=543.2.

Step 4: (R)-3-(tert-butyl)-N-(1-(4-(6-((5-(3-formylazetidine-1-yl)pyridin-2-yl)amino)pyrimidin-4-yl)-2-methylphenyl)ethyl)-1,2,4-oxadiazole-5-carboxamide

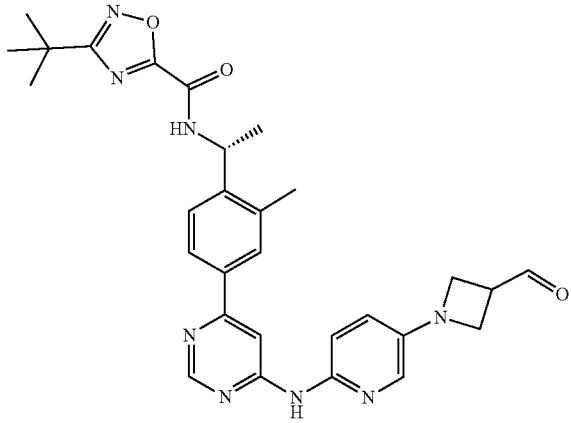 [SMILES: Cc1cc(-c2cc(Nc3ccc(N4CC(C=O)C4)cn3)ncn2)ccc1[C@@H](C)NC(=O)c1nc(C(C)(C)C)no1]

To a stirred solution of DMSO (60 mg, 0.774 mmol) in dichloromethane (10 mL), oxalyl chloride in dichloromethane (2 N, 0.22 mL) was added at −78° C. under nitrogen atmosphere. The resulting mixture was stirred for 0.5 hour. (R)-3-(tert-butyl)-N-(1-(4-(6-((5-(3-(hydroxymethyl)azetidin-1-yl)pyridin-2-yl)amino)pyrimidin-4-yl)-2-methylphenyl)ethyl)-1,2,4-oxadiazole-5-carboxamide (200 mg, 0.369 mmol) in dichloromethane (2 mL) was added at −78° C. and the mixture was stirred for 1 hour. TEA (186 mg, 1.84 mmol) was added at −78° C. and the mixture was allowed to stir at 0° C. The reaction was quenched with sat. NH$_4$Cl (aq.) at 0° C. The resulting mixture was extracted with dichloromethane (3×15 mL). The combined organic layers were washed with brine (3×30 mL) and dried over anhydrous Na$_2$SO$_4$. After filtration, the filtrate was concentrated under reduced pressure to afford the product (180 mg, crude), which was used directly for next step without any further purification. [M+H]$^+$=541.2.

Step 5: (R)-3-(tert-butyl)-N-(1-(4-(6-((5-(3-((4-(4-(2,4-dioxotetrahydropyrimidin-1(2H)-yl)phenyl)piperazin-1-yl)methyl)azetidin-1-yl)pyridin-2-yl)amino)pyrimidin-4-yl)-2-methylphenyl)ethyl)-1,2,4-oxadiazole-5-carboxamide

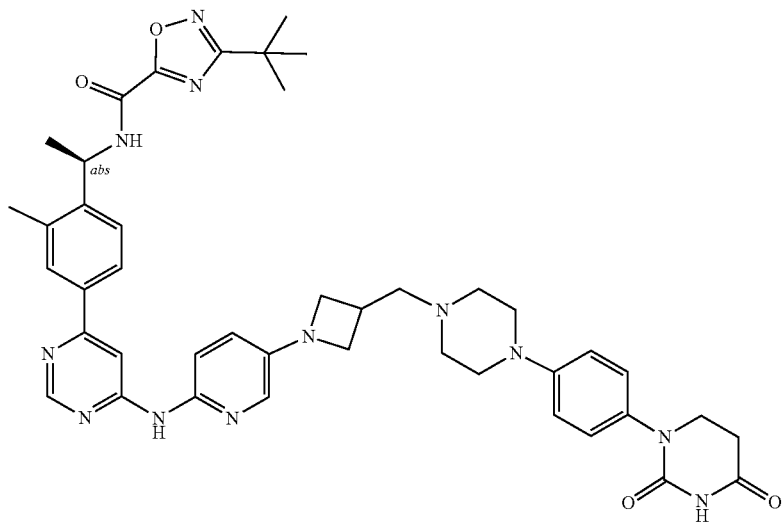 [SMILES: Cc1cc(-c2cc(Nc3ccc(N4CC(CN5CCN(c6ccc(N7CCC(=O)NC7=O)cc6)CC5)C4)cn3)ncn2)ccc1[C@@H](C)NC(=O)c1nc(C(C)(C)C)no1]

A mixture of (R)-3-(tert-butyl)-N-(1-(4-(6-((5-(3-formylazetidine-1-yl)pyridin-2-yl)amino)pyrimidin-4-yl)-2-methylphenyl)ethyl)-1,2,4-oxadiazole-5-carboxamide (0.10 g, 0.185 mmol) and 1-(4-(piperazin-1-yl)phenyl)-dihydropyrimidine-2,4(1H,3H)-dione (0.051 g, 0.185 mmol) in dichloromethane (10 mL) and HOAc (20 mg) was stirred in a round bottom flask at room temperature for 0.5 hour. To the mixture was added NaBH(OAc)$_3$ (0.059 g, 0.277 mmol) and stirred at room temperature for 1 hour. Then the mixture was evaporated in vacuum to afford the crude product, which was purified by pre-HPLC to afford the product (66.82 mg, 45%). $^1$H NMR (500 MHz, DMSO) δ 10.26 (s, 1H), 9.91-9.85 (m, 2H), 8.67 (s, 1H), 7.94 (s, 1H), 7.82 (d, J=5.5 Hz, 2H), 7.68-7.57 (m, 3H), 7.15 (d, J=8.9 Hz, 2H), 6.95 (dd, J=14.5, 5.9 Hz, 3H), 5.33 (t, J=7.3 Hz, 1H), 3.97 (t, J=7.4 Hz, 2H), 3.70 (t, J=6.7 Hz, 2H), 3.52 (t, J=6.4 Hz, 2H), 3.13 (s, 4H), 3.04-2.96 (m, 1H), 2.71-2.62 (m, 4H), 2.54 (s, 4H), 2.47 (s, 3H), 1.50 (d, J=7.9 Hz, 3H), 1.36 (s, 9H); [M+H]$^+$=799.6.

Example 21: (R)-3-(tert-butyl)-N-(1-(4-(6-((5-(4-((4-(4-(2,4-dioxotetrahydropyrimidin-1(2H)-yl)phenyl)piperazin-1-yl)methyl)piperidin-1-yl)pyridin-2-yl)amino)pyrimidin-4-yl)-2-methylphenyl)ethyl)-1,2,4-oxadiazole-5-carboxamide Step 1: benzyl 4-(1,3-dioxolan-2-yl)piperidine-1-carboxylate

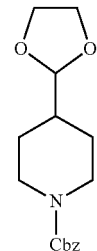 [SMILES: O=C(OCc1ccccc1)N1CCC(C2OCCO2)CC1]

To a stirred solution of benzyl 4-formylpiperidine-1-carboxylate (15.0 g, 60.657 mmol) and ethylene glycol (15.1 g, 242.628 mmol) in toluene (300 mL) was added TsOH (1.0 g, 6.06 mmol) at room temperature. The resulting mixture was stirred for 16 h at 110° C. The mixture was allowed to cool down to room temperature and concentrated under reduced pressure. To the resulting mixture was added water (300 mL) and extracted with EtOAc (3×300 mL). The combined organic layers were washed with brine (3×200 mL) and dried over anhydrous $Na_2SO_4$. After filtration, the filtrate was concentrated under reduced pressure. The residue was purified by silica gel column chromatography, eluted with EtOAc in PE (10%-30%) to afford the product (15.9 g, 90%). $[M+H]^+=292.1$.

Step 2: 4-(1,3-dioxolan-2-yl)piperidine

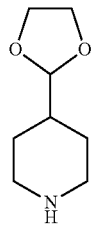

To a solution of benzyl 4-(1,3-dioxolan-2-yl)piperidine-1-carboxylate (10.8 g, 37.069 mmol) in 200 mL MeOH was added Pd/C (10%, 10 g) under nitrogen atmosphere in a 500 mL round-bottom flask. The mixture was hydrogenated at room temperature for 16 h under hydrogen atmosphere using a hydrogen balloon, filtered through Celite pad, and concentrated under reduced pressure. This resulted in the product (5.5 g, 94%). $[M+H]^+=158.1$.

Step 3: 5-(4-(1,3-dioxolan-2-yl)piperidin-1-yl)-2-nitropyridine

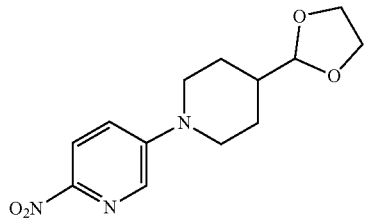 [SMILES: Nc1ccc(N2CCC(C3OCCO3)CC2)cn1]

To a stirred mixture of 5-bromo-2-nitropyridine (4.5 g, 22.168 mmol) and 4-(1,3-dioxolan-2-yl)piperidine (4.2 g, 26.602 mmol) in dioxane (90 mL) were added XPhos Pd G3 (1.9 g, 2.217 mmol), XPhos (2.1 g, 4.434 mmol) and $Cs_2CO_3$ (14.4 g, 44.336 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with EtOAc in PE (20%-60%) to afford the product (3.1 g, 50%). $[M+H]^+=280.1$.

Step 4: 5-(4-(1,3-dioxolan-2-yl)piperidin-1-yl)pyridin-2-amine

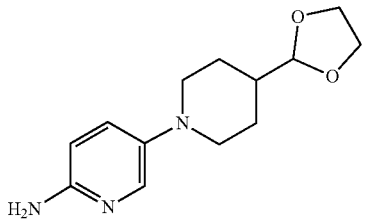

To a solution of 5-(4-(1,3-dioxolan-2-yl)piperidin-1-yl)-2-nitropyridine (3.1 g, 11.099 mmol) in 60 mL MeOH was added Pd/C (10%, 3 g) under nitrogen atmosphere in a 100 mL round-bottom flask. The mixture was hydrogenated at room temperature for 16 h under hydrogen atmosphere using a hydrogen balloon, filtered through a Celite pad, and concentrated under reduced pressure. This resulted in the product (2.5 g, 90%). $[M+H]^+=250.1$.

Step 5: (R)—N-(1-(4-(6-((5-(4-(1,3-dioxolan-2-yl)piperidin-1-yl)pyridin-2-yl)amino)pyrimidin-4-yl)-2-methylphenyl)ethyl)-3-(tert-butyl)-1,2,4-oxadiazole-5-carboxamide

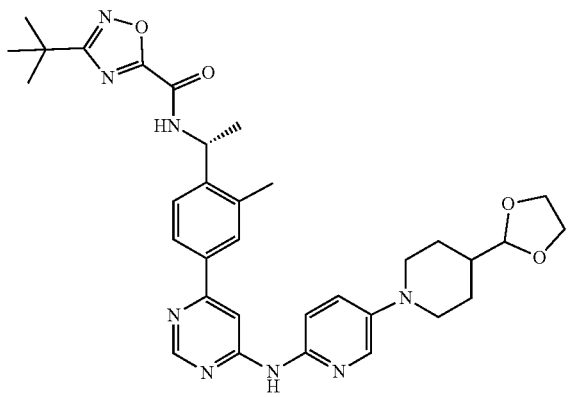

To a stirred mixture of (R)-3-(tert-butyl)-N-(1-(4-(6-chloropyrimidin-4-yl)-2-methylphenyl)ethyl)-1,2,4-oxadiazole-5-carboxamide (2.0 g, 5.002 mmol) and 5-(4-(1,3-dioxolan-2-yl)piperidin-1-yl)pyridin-2-amine (1.5 g, 6.002 mmol) in dioxane (40 mL) were added XPhos Pd G3 (635 mg, 0.750 mmol), XPhos (715 mg, 1.501 mmol) and $Cs_2CO_3$ (3.3 g, 10.004 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with EtOAc in DCM (30%-70%) to afford the product (1.5 g, 48%). $^1H$ NMR (400 MHz, $CDCl_3$) δ 8.82 (s, 1H), 8.05 (d, J=3.0 Hz, 1H), 7.93-7.87 (m, 2H), 7.82 (s, 1H), 7.56-7.50 (m, 2H), 7.37 (dd, J=9.0, 3.0 Hz, 1H), 7.26 (d, J=8.0 Hz, 1H), 5.56-5.52 (m, 1H), 4.73 (d, J=4.9 Hz, 1H), 4.05-3.85 (m, 4H), 3.72-3.64 (m, 2H), 2.75 (td, J=12.0, 2.6 Hz, 2H), 2.53 (s, 3H), 1.92 (d, J=12.3 Hz, 2H), 1.76-1.55 (m, 7H), 1.41 (s, 9H); $[M+H]^+=613.4$.

Step 6: (R)-3-(tert-butyl)-N-(1-(4-(6-((5-(4-form-ylpiperidin-1-yl)pyridin-2-yl)amino)pyrimidin-4-yl)-2-methylphenyl)ethyl)-1,2,4-oxadiazole-5-carboxamide

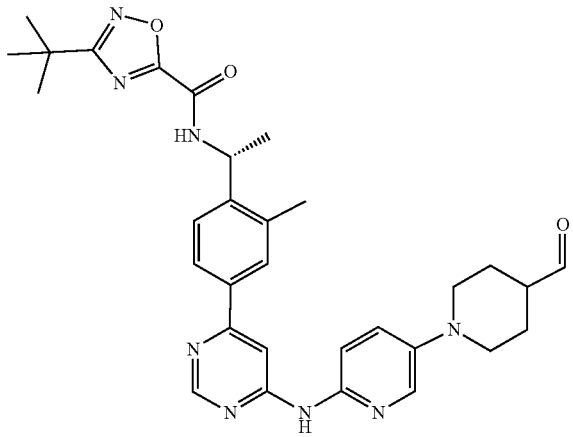

To a stirred solution of (R)—N-(1-(4-(6-((5-(4-(1,3-dioxolan-2-yl)piperidin-1-yl)pyridin-2-yl)amino)pyrimidin-4-yl)-2-methylphenyl)ethyl)-3-(tert-butyl)-1,2,4-oxadiazole-5-carboxamide (450 mg, 0.734 mmol) in dioxane (5 mL), conc. HCl (3 mL) was added at room temperature. The resulting mixture was stirred for 3 hours. The reaction was quenched by NaHCO₃(aq.) at 0° C. to PH=7. The mixture was lyophilized to afford the product (400 mg, crude), which was used directly for next step without any further purification. [M+H]⁺=569.2.

Step 7: (R)-3-(tert-butyl)-N-(1-(4-(6-((5-(4-((4-(4-(2,4-dioxotetrahydropyrimidin-1(2H)-yl)phenyl)piperazin-1-yl)methyl)piperidin-1-yl)pyridin-2-yl)amino)pyrimidin-4-yl)-2-methylphenyl)ethyl)-1,2,4-oxadiazole-5-carboxamide

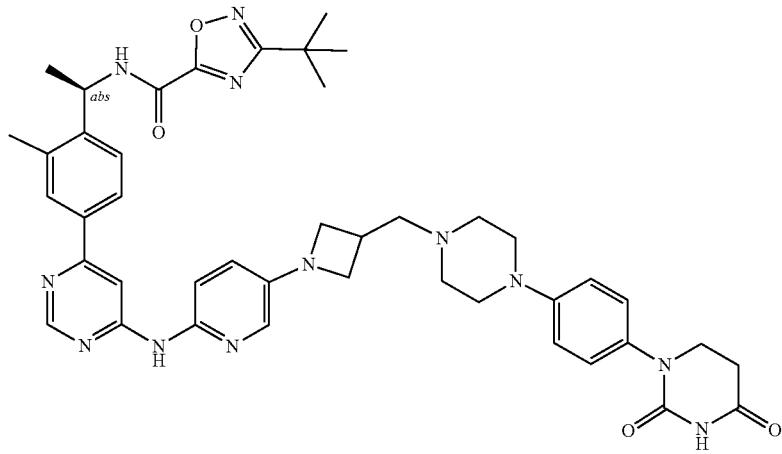 [SMILES: Cc1cc(-c2cc(Nc3ccc(N4CC(CN5CCN(c6ccc(N7CCC(=O)NC7=O)cc6)CC5)C4)cn3)ncn2)ccc1[C@@H](C)NC(=O)c1nc(C(C)(C)C)no1]

A mixture of (R)-3-(tert-butyl)-N-(1-(4-(6-((5-(4-form-ylpiperidin-1-yl)pyridin-2-yl)amino)pyrimidin-4-yl)-2-methylphenyl)ethyl)-1,2,4-oxadiazole-5-carboxamide (0.10 g, 0.176 mmol) and 1-(4-(piperazin-1-yl)phenyl)-dihydro-pyrimidine-2,4(1H,3H)-dione (0.06 g, 0.211 mmol) in 1,2-dichloroethane (5 mL) and HOAc (25 mg) was stirred in a round bottom flask at room temperature for 0.5 hour. To the mixture was added NaBH(OAc)₃ (0.056 g, 0.264 mmol) and stirred at room temperature for 12 hours. Then the mixture was evaporated in vacuum to afford the crude product, which was purified by pre-HPLC to afford the product (62.9 mg, 43%). ¹H NMR (500 MHz, DMSO) δ 10.26 (s, 1H), 9.97 (s, 1H), 9.88 (d, J=7.8 Hz, 1H), 8.70 (d, J=0.8 Hz, 1H), 8.03 (t, J=5.6 Hz, 2H), 7.83 (d, J=5.8 Hz, 2H), 7.67 (s, 1H), 7.60 (d, J=8.7 Hz, 1H), 7.44 (dd, J=9.2, 2.9 Hz, 1H), 7.15 (d, J=8.9 Hz, 2H), 6.93 (d, J=9.1 Hz, 2H), 5.37-5.28 (m, 1H), 3.73-3.60 (m, 4H), 3.14 (s, 4H), 2.67 (dd, J=16.0, 9.2 Hz, 4H), 2.55-2.45 (m, 7H), 2.23 (d, J=7.2 Hz, 2H), 1.83 (d, J=12.0 Hz, 2H), 1.75-1.65 (m, 1H), 1.51 (d, J=7.0 Hz, 3H), 1.36 (s, 9H), 1.27 (t, J=10.6 Hz, 2H); [M+H]⁺=827.6.

Example 22: (R)-3-(tert-butyl)-N-(1-(4-(6-((5-(4-((1-(4-(2,4-dioxotetrahydropyrimidin-1(2H)-yl)phenyl)azetidin-3-yl)methyl)piperazin-1-yl)pyridin-2-yl)amino)pyrimidin-4-yl)-2-methylphenyl)ethyl)-1,2,4-oxadiazole-5-carboxamide Step 1: 4-(2,4-dioxo-3-((2-(trimethylsilyl)ethoxy)methyl)tetrahydropyrimidin-1(2H)-yl)phenyl trifluoromethanesulfonate

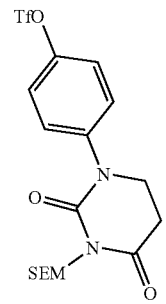 [SMILES: C[Si](C)(C)CCOCN1C(=O)CCN(c2ccc(OS(=O)(=O)C(F)(F)F)cc2)C1=O]

To a solution of 1-(4-hydroxyphenyl)-3-((2-(trimethylsilyl)ethoxy)methyl)dihydropyrimidine-2,4(1H,3H)-dione (the compound was obtained through the same way in WO2021219070A)(500 mg, 1.49 mmol) in DCM, pyridine (235 mg, 2.98 mmol) was added. Then Tf$_2$O (630 mg, 2.24 mmol) was added dropwise at 0° C. to 5° C. The mixture was stirred from 0° C. to room temperature and then stirred at room temperature for 3 h. The resulting mixture was concentrated under reduced pressure. The residue was purified by silica gel column chromatography, eluted with PE/EtOAc (100%:0% to 50%:50%) to afford the product (644 mg, 92%). [M+H]$^+$=469.5.

Step 2: 1-(4-(3-(hydroxymethyl)azetidin-1-yl)phenyl)-3-((2-(trimethylsilyl)ethoxy)methyl)dihydropyrimidine-2,4(1H,3H)-dione

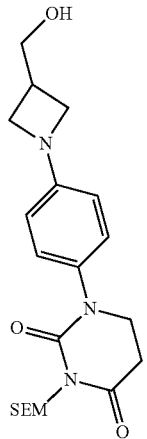

A mixture of 4-(2,4-dioxo-3-((2-(trimethylsilyl)ethoxy)methyl)tetrahydropyrimidin-1(2H)-yl)phenyl trifluoromethanesulfonate (100 mg, 0.213 mmol), azetidin-3-ylmethanol hydrochloride (39 mg, 0.320 mmol), Pd$_2$(dba)$_3$ (19.5 mg, 0.0213 mmol), RuPhos (20 mg, 0.0426 mmol) and Cs$_2$CO$_3$ (138 mg, 0.426 mmol) in dioxane (10 mL) was stirred at 100° C. overnight under nitrogen. After the reaction was completed determined by LCMS, the mixture was allowed to cool down to room temperature, and concentrated in vacuo. The residue was purified by silica gel column chromatography, eluted with PE/EA (100%:0% to 50%:50%) to afford the product (67 mg, 78%). [M+H]$^+$=407.4.

Step 3: 1-(4-(2,4-dioxo-3-((2-(trimethylsilyl)ethoxy)methyl)tetrahydropyrimidin-1(2H)-yl)phenyl)azetidine-3-carbaldehyde

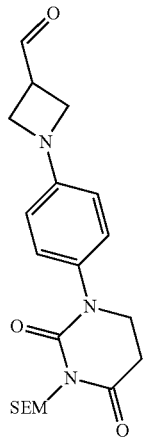

To a solution of 1-(4-(3-(hydroxymethyl)azetidin-1-yl)phenyl)-3-((2-(trimethylsilyl)ethoxy)methyl)dihydropyrimidine-2,4(1H,3H)-dione (132 mg, 0.325 mmol) in DMSO (10 mL), IBX (114 mg, 0.406 mmol) was added. The mixture was stirred at room temperature overnight. The resulting mixture was extracted with EA (50 mL*3), washed with brine (100 mL), dried over Na$_2$SO$_4$, and concentrated under reduced pressure to afford the product (140 mg, crude). [M+H]$^+$=405.5.

Step 4: (R)-3-(tert-butyl)-N-(1-(4-(6-((5-(4-((1-(4-(2,4-dioxo-3-((2-(trimethylsilyl)ethoxy)methyl)tetrahydropyrimidin-1(2H)-yl)phenyl)azetidin-3-yl)methyl)piperazin-1-yl)pyridin-2-yl)amino)pyrimidin-4-yl)-2-methylphenyl)ethyl)-1,2,4-oxadiazole-5-carboxamide

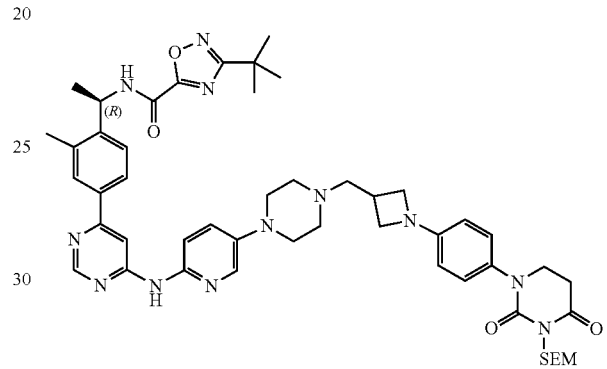

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (the compound was obtained through the similar way in example 21) (201 mg, 0.373 mmol), 1-(4-(2,4-dioxo-3-((2-(trimethylsilyl)ethoxy)methyl)tetrahydropyrimidin-1(2H)-yl)phenyl)azetidine-3-carbaldehyde (150 mg, 0.37 mmol) in dichloromethane (20 mL) and MeOH (5 mL) was stirred at room temperature for 5 mins. Then HOAc (0.06 mL) was added. The mixture was stirred at room temperature overnight. Then NaBH(OAc)$_3$ (157 mg, 0.74 mmol) was added and stirred at room temperature for 2 hours. The reaction mixture was concentrated in vacuum, and the residue was purified by silica gel column chromatography (DCM:MeOH=100%: 0%-90%: 10% gradient elution) to give the product (140 mg, crude). [M+H]$^+$=929.4.

Step 5: (R)-3-(tert-butyl)-N-(1-(4-(6-((5-(4-((1-(4-(2,4-dioxotetrahydropyrimidin-1(2H)-yl)phenyl)azetidin-3-yl)methyl)piperazin-1-yl)pyridin-2-yl)amino)pyrimidin-4-yl)-2-methylphenyl)ethyl)-1,2,4-oxadiazole-5-carboxamide

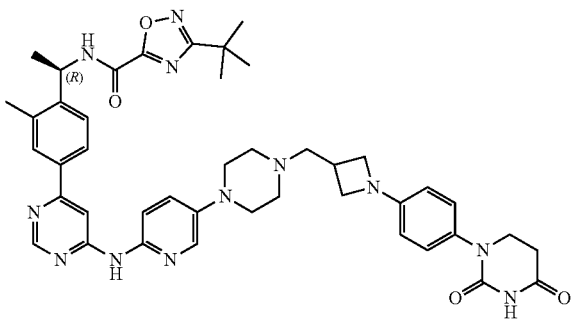

To a solution of (R)-3-(tert-butyl)-N-(1-(4-(6-((5-(4-((1-(4-(2,4-dioxo-3-((2-(trimethylsilyl)ethoxy)methyl)tetrahydropyrimidin-1(2H)-yl)phenyl)azetidin-3-yl)methyl)piperazin-1-yl)pyridin-2-yl)amino)pyrimidin-4-yl)-2-methylphenyl)ethyl)-1,2,4-oxadiazole-5-carboxamide (140 mg, crude) in dichloromethane (5 mL), TFA (5 mL) was added. The mixture was stirred at room temperature overnight. The reaction mixture was concentrated in vacuum, and the residue was diluted with MeOH (5 mL). NH$_3$·H$_2$O (0.5 mL) was added dropwise, and the mixture was stirred at room temperature for 0.5 h. Then the mixture was concentrated in vacuo and the residue was purified by prep-TLC (DCM:MeOH=10:1) to afford desired product (118 mg, 98%). $^1$HNMR (500 MHz, DMSO) δ 10.23 (s, 1H), 9.99 (s, 1H), 9.89 (d, J=5.0 Hz, 1H), 8.70 (s, 1H), 8.04-8.01 (m, 2H), 7.84-7.83 (m, 2H), 7.68 (s, 1H), 7.61 (d, J=5.0 Hz, 1H), 7.46 (d, J=5.0 Hz, 1H), 7.10 (d, J=10.0 Hz, 2H), 6.42 (d, J=10.0 Hz, 2H), 5.36-5.32 (m, 1H), 3.96-3.93 (m, 2H), 3.68-3.65 (m, 2H), 3.49-3.46 (m, 2H), 3.13 (s, 4H), 2.98-2.95 (m, 1H), 2.67-2.63 (m, 4H), 2.56-2.54 (m, 4H), 2.47 (s, 3H), 1.52 (d, J=5.0 Hz, 3H), 1.36 (s, 9H); [M+H]$^+$=799.6.

Example 23: (R)-3-(tert-butyl)-N-(1-(4-(6-((5-(1-((1-(4-(2,4-dioxotetrahydropyrimidin-1(2H)-yl)phenyl)piperidin-4-yl)methyl)azetidin-3-yl)pyridin-2-yl)amino)pyrimidin-4-yl)-2-methylphenyl)ethyl)-1,2,4-oxadiazole-5-carboxamide Step 1: tert-butyl 3-(6-((6-chloropyrimidin-4-yl)amino)pyridin-3-yl)azetidine-1-carboxylate

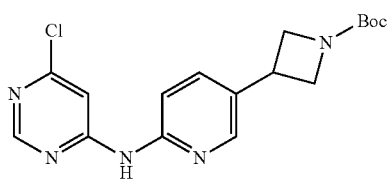 [SMILES: CC(C)(C)OC(=O)N1CC(c2ccc(Nc3cc(Cl)ncn3)nc2)C1]

To a stirred mixture of 4,6-dichloropyrimidine (0.594 g, 4.01 mmol) and tert-butyl 3-(6-aminopyridin-3-yl)azetidine-1-carboxylate (1 g, 4.01 mmol) in dioxane (20 mL) were added Pd$_2$(dba)$_3$ (201 mg, 0.22 mmol), XantPhos (255 mg, 0.44 mmol) and Na$_2$CO$_3$ (0.723 g, 6.82 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with EtOAc in DCM (30%-70%) to afford the product (0.29 g, 20%). [M+H]$^+$=362.1.

Step 2: tert-butyl (R)-3-(6-((6-(4-(1-(3-(tert-butyl)-1,2,4-oxadiazole-5-carboxamido)ethyl)-3-methylphenyl)pyrimidin-4-yl)amino)pyridin-3-yl)azetidine-1-carboxylate

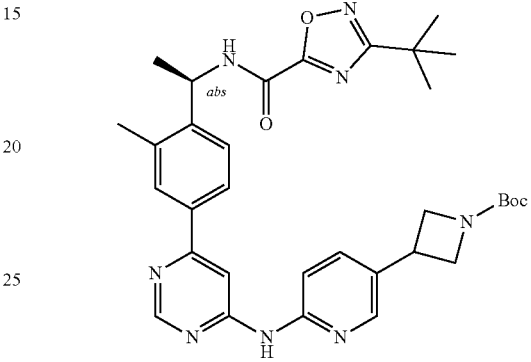

To a stirred mixture of tert-butyl 3-(6-((6-chloropyrimidin-4-yl)amino)pyridin-3-yl)azetidine-1-carboxylate (0.29 g, 0.8 mmol) and (R)-3-(tert-butyl)-N-(1-(2-methyl-4-(4,4,5,5-tetramethyl-1,3,2-dioxaborolan-2-yl)phenyl)ethyl)-1,2,4-oxadiazole-5-carboxamide (the compound was obtained through the same way in WO2021219070A) (0.365 g, 0.88 mmol) in dioxane (12 mL) and water (3 mL) were added Pd(dppf)Cl$_2$ (33 mg, 0.04 mmol) and K$_2$CO$_3$ (0.221 g, 1.6 mmol) at room temperature under nitrogen atmosphere. The resulting mixture was stirred for 15 h at 100° C. under nitrogen atmosphere. The mixture was allowed to cool down to room temperature and concentrated under reduced pressure. The residue was purified by silica gel column chromatography, eluted with EtOAc in DCM (30%-70%) to afford the product (0.3 g, 61%). [M+H]$^+$=613.3.

Step 3: (R)—N-(1-(4-(6-((5-(azetidin-3-yl)pyridin-2-yl)amino)pyrimidin-4-yl)-2-methylphenyl)ethyl)-3-(tert-butyl)-1,2,4-oxadiazole-5-carboxamide

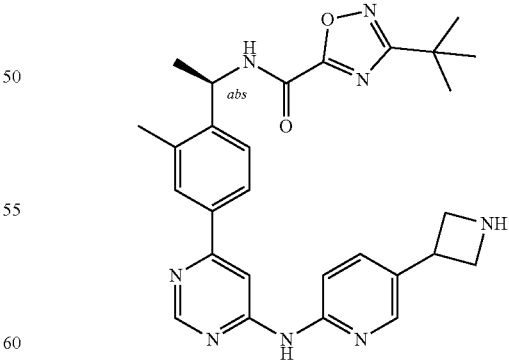

To a stirred solution of tert-butyl (R)-3-(6-((6-(4-(1-(3-(tert-butyl)-1,2,4-oxadiazole-5-carboxamido)ethyl)-3-methylphenyl)pyrimidin-4-yl)amino)pyridin-3-yl)azetidine-1-carboxylate (150 mg, 0.245 mmol) in DCM (5 mL) was added TFA (4 mL) at room temperature. The resulting solution was stirred for 1 h at room temperature and concentrated under vacuum. The residue (150 mg, crude) was used directly for next step without any further purification. [M+H]⁺=513.2.

Step 4: (R)-3-(tert-butyl)-N-(1-(4-(6-((5-(1-((1-(4-(2,4-dioxotetrahydropyrimidin-1(2H)-yl)phenyl)piperidin-4-yl)methyl)azetidin-3-yl)pyridin-2-yl)amino)pyrimidin-4-yl)-2-methylphenyl)ethyl) 1,2,4-oxadiazole-5-carboxamide

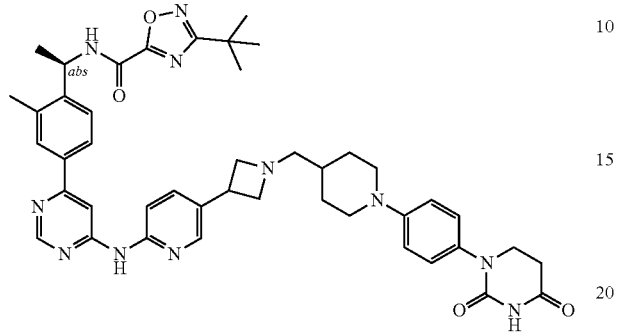

A mixture of (R)—N-(1-(4-(6-((5-(azetidin-3-yl)pyridin-2-yl)amino)pyrimidin-4-yl)-2-methylphenyl)ethyl)-3-(tert-butyl)-1,2,4-oxadiazole-5-carboxamide (0.05 g, 0.098 mmol) and 1-(4-(2,4-dioxotetrahydropyrimidin-1(2H)-yl)phenyl)piperidine-4-carbaldehyde (0.038 g, 0.12 mmol) in 1,2-dichloroethane (3 mL) and HOAc (25 mg) was stirred in a round bottom flask at room temperature for 0.5 hour. To the mixture was added NaBH(OAc)₃ (0.032 g, 0.15 mmol) and stirred at room temperature for 1 hour. Then the mixture was evaporated in vacuum to afford the crude product, which was purified by pre-HPLC to afford the product (43.57 mg, 56%). ¹H NMR (500 MHz, DMSO) δ 10.24 (d, J=13.6 Hz, 2H), 9.89 (d, J=7.7 Hz, 1H), 8.76 (s, 1H), 8.31 (s, 1H), 8.17 (d, J=6.2 Hz, 2H), 7.82 (dt, J=31.6, 7.5 Hz, 4H), 7.62 (d, J=8.5 Hz, 1H), 7.13 (d, J=8.7 Hz, 2H), 6.92 (d, J=8.8 Hz, 2H), 5.34 (t, J=7.2 Hz, 1H), 3.73-3.57 (m, 7H), 3.19 (s, 2H), 2.71-2.59 (m, 4H), 2.48 (s, 3H), 2.44 (d, J=6.5 Hz, 2H), 1.79 (d, J=12.1 Hz, 2H), 1.55-1.45 (m, 4H), 1.36 (s, 9H), 1.30-1.17 (m, 2H); [M+H]⁺=798.7.

Example 24: 3-(tert-butyl)-N—((R)-1-(4-(6-((5-(4-(((S)-1-(4-(2,4-dioxotetrahydropyrimidin-1(2H)-yl)phenyl)pyrrolidin-3-yl)methyl)piperazin-1-yl)pyridin-2-yl)amino)pyrimidin-4-yl)-2-methylphenyl)ethyl)-1,2,4-oxadiazole-5-carboxamide

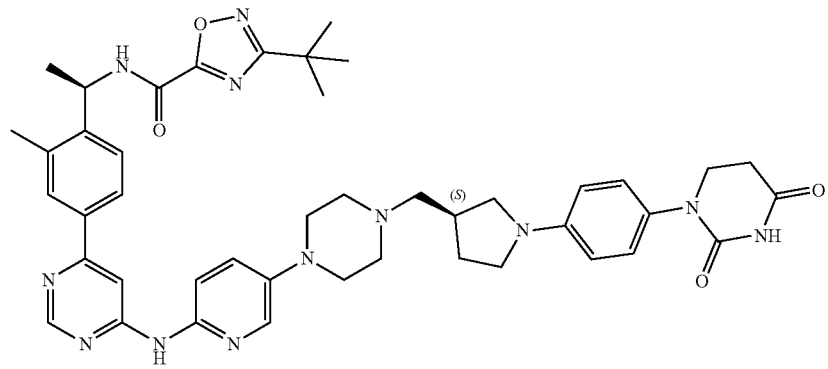

The titled compound was synthesized in the procedures similar to Example 22. 1H NMR (500 MHz, DMSO) δ 10.20 (s, 1H), 9.99 (s, 1H), 9.88 (d, J=5.0 Hz, 1H), 8.70 (s, 1H), 8.05-8.03 (m, 2H), 7.84-7.83 (m, 2H), 7.69 (s, 1H), 7.61 (d, J=10.0 Hz, 1H), 7.46 (dd, J=10.0 Hz, 5.0 Hz, 1H), 7.09 (d, J=10.0 Hz, 2H), 6.51 (d, J=10.0 Hz, 2H), 5.35-5.32 (m, 1H), 3.66 (t, J=5.0 Hz, 2H), 3.40-3.36 (m, 2H), 3.30-3.29 (m, 1H), 3.15 (s, 4H), 3.02-2.98 (m, 1H), 2.69-2.66 (m, 2H), 2.64-2.54 (m, 4H), 2.47 (s, 3H), 2.43-2.39 (m, 2H), 2.15-2.11 (m, 1H), 1.76-1.72 (m, 1H), 1.52 (d, J=5.0 Hz, 3H), 1.36 (s, 9H); [M+H]⁺=813.1.

Example 25: (R)-3-(tert-butyl)-N-(1-(4-(6-((5-(4-(1-(4-(2,4-dioxotetrahydropyrimidin-1(2H)-yl)phenyl)azetidine-3-carbonyl)piperazin-1-yl)pyridin-2-yl)amino)pyrimidin-4-yl)-2-methylphenyl)ethyl)-1,2,4-oxadiazole-5-carboxamide Step 1: tert-butyl 1-(4-(2,4-dioxo-3-((2-(trimethylsilyl)ethoxy)methyl)tetrahydropyrimidin-1(2H)-yl)phenyl)azetidine-3-carboxylate

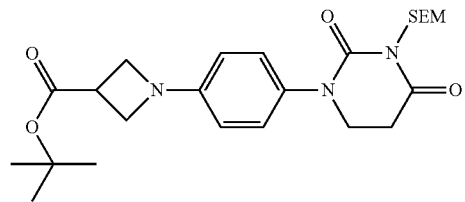 [SMILES: CC(C)(C)OC(=O)C1CN(c2ccc(N3CCC(=O)N(COCC[Si](C)(C)C)C3=O)cc2)C1]

A mixture of 4-(2,4-dioxo-3-((2-(trimethylsilyl)ethoxy)methyl)tetrahydropyrimidin-1(2H)-yl)phenyl trifluoromethanesulfonate (468 mg, 1.0 mmol), tert-butyl azetidine-3-carboxylate hydrochloride (188 mg, 1.2 mmol), Pd₂(dba)₃ (92 mg, 0.1 mmol), RuPhos (93.4 mg, 0.2 mmol) and Cs₂CO₃ (652 mg, 2.0 mmol) in dioxane (50 mL) was stirred at 90° C. overnight under nitrogen. After the reaction was completed determined by LCMS, the mixture was allowed to cool down to room temperature and concentrated in vacuo. The residue was purified by silica gel column chromatography, eluted with PE/EA (100%:0% to 50%:50%) to afford the product (460 mg, 97%). [M+H]⁺=476.2.

Step 2: 1-(4-(2,4-dioxotetrahydropyrimidin-1(2H)-yl)phenyl)azetidine-3-carboxylic acid

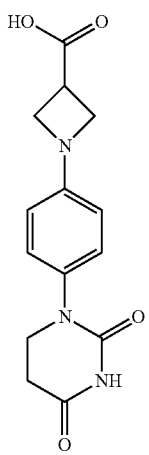 [SMILES: O=C1CCN(c2ccc(N3CC(C(=O)O)C3)cc2)C(=O)N1]

To a solution of tert-butyl 1-(4-(2,4-dioxo-3-((2-(trimethylsilyl)ethoxy)methyl)tetrahydropyrimidin-1(2H)-yl)phenyl)azetidine-3-carboxylate (460 mg, 0.97 mmol) in dichloromethane (10 mL), TFA (10 mL) was added. The mixture was stirred at room temperature overnight. The reaction mixture was concentrated in vacuum, and the residue was diluted with MeOH (20 mL). NH$_3$·H$_2$O (0.5 mL) was added dropwise, and the mixture was stirred at room temperature for 0.5 h. Then the mixture was concentrated in vacuo to afford desired product (260 mg, 93%). [M+H]$^+$=290.1.

Step 3: (R)-3-(tert-butyl)-N-(1-(4-(6-((5-(4-(1-(4-(2,4-dioxotetrahydropyrimidin-1(2H)-yl)phenyl)azetidine-3-carbonyl)piperazin-1-yl)pyridin-2-yl)amino)pyrimidin-4-yl)-2-methylphenyl)ethyl)-1,2,4-oxadiazole-5-carboxamide

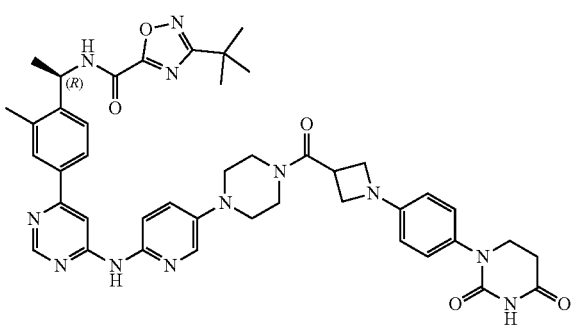

To a solution of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (35 mg, 0.065 mmol) in DMF (6 mL) were added 1-(4-(2,4-dioxotetrahydropyrimidin-1(2H)-yl)phenyl)azetidine-3-carboxylic acid (23 mg, 0.078 mmol), HATU (37 mg, 0.0975 mmol) and DIEA (0.5 mL). The mixture was stirred at room temperature overnight and concentrated in vacuum. To the residue was added H$_2$O (30 mL), and extracted with DCM (30 mL×3). The organic layer was purified by combi flash, eluted with a gradient of DCM:MeOH 1:0 to 10:1 to afford the product (21 mg, 40%). $^1$H NMR (500 MHz, DMSO) δ 10.23 (s, 1H), 10.03 (s, 1H), 9.89 (s, 1H), 8.71 (s, 1H), 8.08-8.04 (m, 2H), 7.84-7.83 (m, 2H), 7.72 (s, 1H), 7.61 (d, J=10.0 Hz, 1H), 7.51 (dd, J=5.0 Hz, 10.0 Hz, 1H), 7.12 (d, J=10.0 Hz, 2H), 6.46 (d, J=10.0 Hz, 2H), 5.35-5.31 (m, 1H), 4.06-4.04 (m, 2H), 3.93-3.89 (m, 3H), 3.68-3.66 (m, 4H), 3.51 (s, 2H), 3.16-3.12 (m, 4H), 2.69-2.66 (m, 2H), 2.47 (s, 3H), 1.52 (d, J=5.0 Hz, 3H), 1.36 (s, 9H); [M+H]$^+$=813.7.

Example 26: 3-(tert-butyl)-N-((1R)-1-(4-(6-((5-(4-(1-(4-(2,6-dioxopiperidin-3-yl)phenyl)azetidine-3-carbonyl)piperazin-1-yl)pyridin-2-yl)amino)pyrimidin-4-yl)-2-methylphenyl)ethyl)-1,2,4-oxadiazole-5-carboxamide

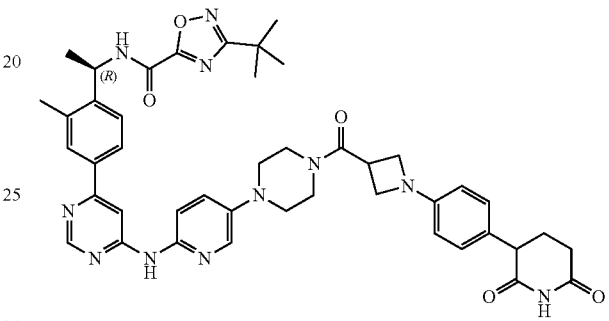

The titled compound was synthesized in the procedures similar to Example 25. $^1$H NMR (500 MHz, DMSO) δ 10.75 (s, 1H), 10.03 (s, 1H), 9.89 (d, J=5.0 Hz, 1H), 8.71 (s, 1H), 8.08 (d, J=5.0 Hz, 1H), 8.04 (s, 1H), 7.84-7.83 (m, 2H), 7.72 (s, 1H), 7.61 (d, J=10.0 Hz, 1H), 7.50 (dd, J=10.0 Hz, 5.0 Hz, 1H), 7.02 (d, J=10.0 Hz, 2H), 6.43 (d, J=10.0 Hz, 2H), 5.35-5.31 (m, 1H), 4.03 (s, 2H), 3.89 (s, 2H), 3.72-3.64 (m, 3H), 3.52-3.51 (m, 2H), 3.16-3.11 (m, 4H), 2.66-2.60 (m, 1H), 2.47 (s, 3H), 2.45-2.43 (m, 2H), 2.15-1.97 (m, 2H), 1.52 (d, J=5.0 Hz, 3H), 1.36 (s, 9H); [M+H]$^+$=812.7.

Example 27: 3-(tert-butyl)-N-((1R)-1-(4-(6-((5-(4-(1-(4-(2,6-dioxopiperidin-3-yl)-3,5-difluorophenyl)azetidine-3-carbonyl)piperazin-1-yl)pyridin-2-yl)amino)pyrimidin-4-yl)-2-methylphenyl)ethyl)-1,2,4-oxadiazole-5-carboxamide

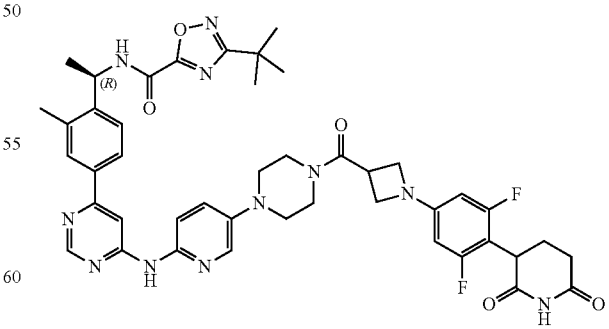

The titled compound was synthesized in the procedures similar to Example 25. $^1$H NMR (500 MHz, DMSO) δ 10.85 (s, 1H), 10.03 (s, 1H), 9.89 (s, 1H), 8.71 (s, 1H), 8.08 (d, J=5.0 Hz, 1H), 8.04 (s, 1H), 7.84-7.83 (m, 2H), 7.72 (s, 1H), 7.61 (d, J=10.0 Hz, 1H), 7.50 (dd, J=10.0 Hz, 5.0 Hz, 1H), 6.17 (d, J=10.0 Hz, 2H), 5.36-5.31 (m, 1H), 4.08-3.89 (m, 6H), 3.66 (s, 2H), 3.49 (s, 2H), 3.15-3.12 (m, 4H), 2.78-2.74 (m, 1H), 2.49-2.47 (m, 4H), 2.09-2.04 (m, 1H), 1.96-1.93 (m, 1H), 1.52 (d, J=5.0 Hz, 3H), 1.36 (s, 9H); [M+H]⁺=848.5.

Example 28: (R)-3-(tert-butyl)-N-(1-(4-(6-((5-(4-(1-(4-(2,4-dioxotetrahydropyrimidin-1(2H)-yl)phenyl)piperidine-4-carbonyl)piperazin-1-yl)pyridin-2-yl)amino)pyrimidin-4-yl)-2-methylphenyl)ethyl)-1,2,4-oxadiazole-5-carboxamide

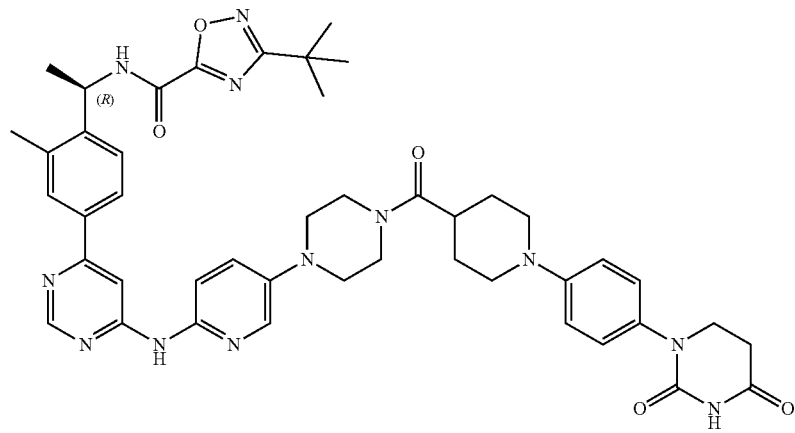

The titled compound was synthesized in the procedures similar to Example 25. 1H NMR (500 MHz, DMSO) δ 10.26 (s, 1H), 10.03 (s, 1H), 9.89 (d, J=5.0 Hz, 1H), 8.71 (s, 1H), 8.08 (d, J=5.0 Hz, 1H), 8.04 (s, 1H), 7.84-7.83 (m, 2H), 7.72 (s, 1H), 7.61 (d, J=10.0 Hz, 1H), 7.50 (dd, J=10.0 Hz, 5.0 Hz, 1H), 7.14 (d, J=10.0 Hz, 2H), 6.94 (d, J=10.0 Hz, 2H), 5.35-5.32 (m, 1H), 3.71-3.64 (m, 8H), 3.61-3.10 (m, 4H), 2.87 (s, 1H), 2.80-2.67 (m, 4H), 2.47 (s, 3H), 1.72-1.70 (m, 4H), 1.52 (d, J=5.0 Hz, 3H), 1.36 (s, 9H); [M+H]⁺=841.0.

Example 29: 3-(tert-butyl)-N-((1R)-1-(4-(6-((5-(4-(1-(4-(2,4-dioxotetrahydropyrimidin-1(2H)-yl)phenyl)pyrrolidine-3-carbonyl)piperazin-1-yl)pyridin-2-yl)amino)pyrimidin-4-yl)-2-methylphenyl)ethyl)-1,2,4-oxadiazole-5-carboxamide

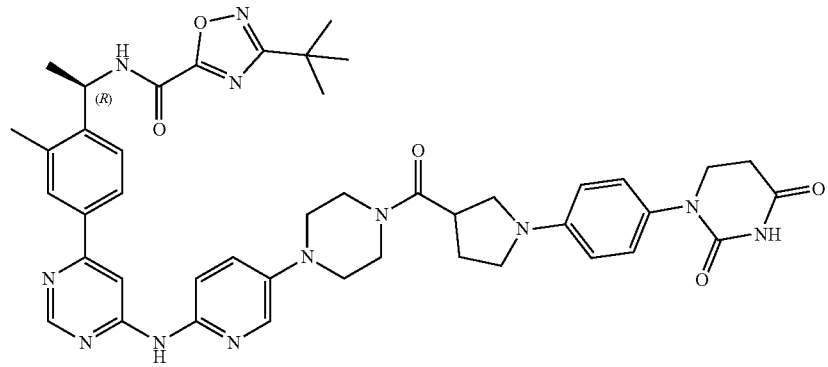

The titled compound was synthesized in the procedures similar to Example 25. $^1$H NMR (500 MHz, DMSO) δ 10.21 (s, 1H), 10.03 (s, 1H), 9.89 (d, J=5.0 Hz, 1H), 8.71 (s, 1H), 8.09 (d, J=5.0 Hz, 1H), 8.04 (s, 1H), 7.84-7.83 (m, 2H), 7.72 (s, 1H), 7.61 (d, J=10.0 Hz, 1H), 7.51 (dd, J=10.0 Hz, 5.0 Hz, 1H), 7.10 (d, J=10.0 Hz, 2H), 6.55 (d, J=10.0 Hz, 2H), 5.35-5.31 (m, 1H), 3.75 (s, 2H), 3.67-3.59 (m, 5H), 3.51-3.47 (m, 1H), 3.39-3.33 (m, 2H), 3.29-3.26 (m, 1H), 3.21-3.18 (m, 2H), 3.13-3.11 (m, 2H), 2.69-2.66 (m, 2H), 2.47 (s, 3H), 2.21-2.12 (m, 2H), 1.52 (d, J=5.0 Hz, 3H), 1.36 (s, 9H); [M+H]$^+$=827.7.

Example 30: (R)-3-(tert-butyl)-N-(1-(4-(6-((5-(6-((1-(4-(2,4-dioxotetrahydropyrimidin-1(2H)-yl)phenyl)piperidin-4-yl)methyl)-2,6-diazaspiro [3.3]heptan-2-yl)pyridin-2-yl)amino)pyrimidin-4-yl)-2-methylphenyl)ethyl)-1,2,4-oxadiazole-5-carboxamide

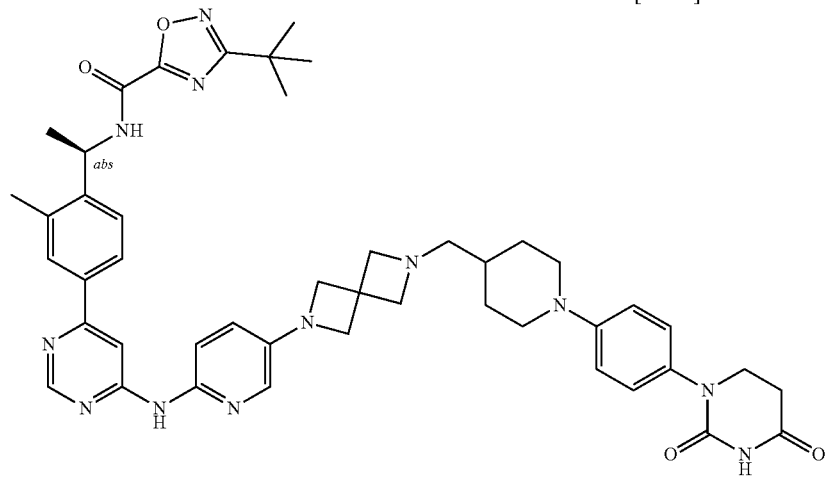

The titled compound was synthesized in the procedures similar to Example 25. $^1$H NMR (400 MHz, DMSO) δ 10.27 (s, 1H), 9.94-9.88 (m, 2H), 8.67 (s, 1H), 7.95 (s, 1H), 7.82 (s, 2H), 7.60 (d, J=8.4 Hz, 3H), 7.12 (d, J=8.9 Hz, 2H), 6.97-6.88 (m, 3H), 5.33 (t, J=7.3 Hz, 1H), 3.89 (s, 4H), 3.72-3.61 (m, 4H), 3.29 (s, 4H), 2.70-2.55 (m, 4H), 2.47 (s, 3H), 2.28 (d, J=6.5 Hz, 2H), 1.74 (d, J=11.4 Hz, 2H), 1.51 (d, J=7.0 Hz, 3H), 1.36 (s, 9H), 1.27-1.13 (m, 2H); [M+H]$^+$=839.6.

Example 31: (R)-3-(tert-butyl)-N-(1-(4-(6-((5-(2-((1-(4-(2,4-dioxotetrahydropyrimidin-1(2H)-yl)phenyl)piperidin-4-yl)methyl)-2,8-diazaspiro[4.5]decan-8-yl)pyridin-2-yl)amino)pyrimidin-4-yl)-2-methylphenyl)ethyl)-1,2,4-oxadiazole-5-carboxamide

Step 1: tert-butyl 8-(6-nitropyridin-3-yl)-2,8-diazaspiro[4.5]decane-2-carboxylate

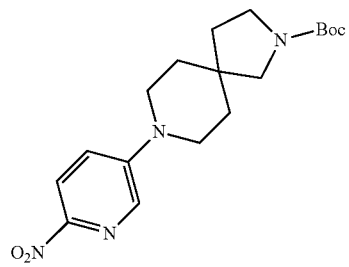 [SMILES: CC(C)(C)OC(=O)N1CCC2(CCN(c3ccc([N+](=O)[O-])nc3)CC2)C1]

To a stirred mixture of 5-bromo-2-nitropyridine (2.1 g, 10.345 mmol) and tert-butyl 2,8-diazaspiro[4.5]decane-2-carboxylate (2.98 g, 12.414 mmol) in dioxane (40 mL) were added XPhos Pd G3 (876 mg, 1.035 mmol), XPhos (986 mg, 2.069 mmol) and Cs$_2$CO$_3$ (6.74 g, 20.690 mmol) at room temperature under nitrogen atmosphere. The resulting mixture was stirred for 16 h at 80° C. under nitrogen atmosphere and concentrated under reduced pressure. The residue was purified by silica gel column chromatography, eluted with EtOAc in PE (0-50%) to afford the product (2.93 g, 63%). [M+H]$^+$=363.0.

Step 2: tert-butyl 8-(6-aminopyridin-3-yl)-2,8-diazaspiro[4.5]decane-2-carboxylate

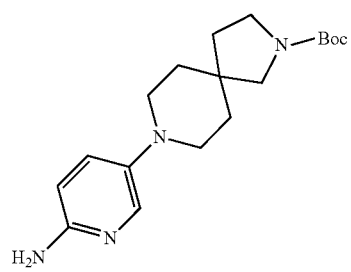

To a solution of tert-butyl 8-(6-nitropyridin-3-yl)-2,8-diazaspiro[4.5]decane-2-carboxylate (2.9 g, 8.002 mmol) in 60 mL MeOH was added Pd/C (10 wt %, 2.9 g) at room temperature under nitrogen atmosphere. The reaction system was degassed under vacuum and purged with H$_2$ several times. Then it was hydrogenated under H$_2$ balloon (2 atm) at 25° C. for 16 h. The reaction progress was monitored by TLC & LCMS. After completion of the reaction, Pd/C was filtered off through Celite and the filter cake was washed with MeOH (3×20 mL). The filtrate was concentrated under reduced pressure. This resulted in the product (2.44 g, 92%). [M+H]$^+$=333.1.

Step 3: tert-butyl (R)-8-(6-((6-(4-(1-(3-(tert-butyl)-1,2,4-oxadiazole-5-carboxamido)ethyl)-3-methylphenyl)pyrimidin-4-yl)amino)pyridin-3-yl)-2,8-diazaspiro[4.5]decane-2-carboxylate

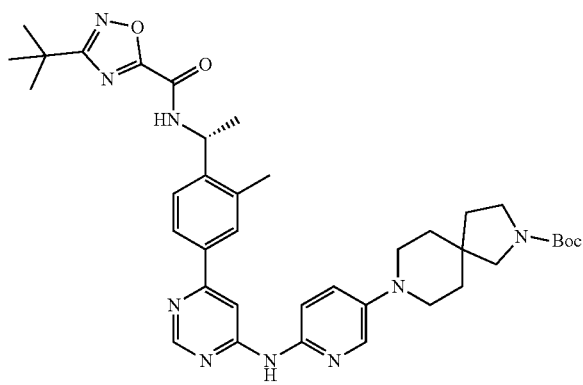 [SMILES: Cc1cc(-c2cc(Nc3ccc(N4CCC5(CCN(C(=O)OC(C)(C)C)C5)CC4)cn3)ncn2)ccc1[C@@H](C)NC(=O)c1nc(C(C)(C)C)no1]

Step 4: (R)—N-(1-(4-(6-((5-(2,8-diazaspiro[4.5]decan-8-yl)pyridin-2-yl)amino)pyrimidin-4-yl)-2-methylphenyl)ethyl)-3-(tert-butyl)-1,2,4-oxadiazole-5-carboxamide hydrochloride

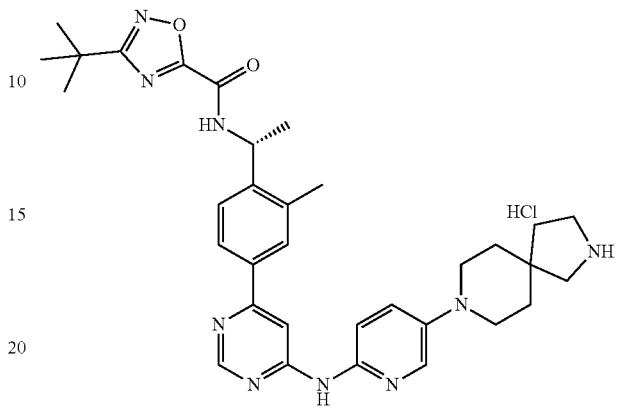

To a stirred mixture of (R)-3-(tert-butyl)-N-(1-(4-(6-chloropyrimidin-4-yl)-2-methylphenyl)ethyl)-1,2,4-oxadiazole-5-carboxamide (1.5 g, 3.751 mmol) and tert-butyl 8-(6-aminopyridin-3-yl)-2,8-diazaspiro[4.5]decane-2-carboxylate (1.5 g, 4.501 mmol) in dioxane (30 mL) were added XPhos (537 mg, 1.125 mmol), Cs$_2$CO$_3$ (2.44 g, 7.502 mmol) and XPhos Pd G3 (476 mg, 0.563 mmol) at room temperature under nitrogen atmosphere. The resulting mixture was stirred for 16 h at 100° C. under nitrogen atmosphere and concentrated under reduced pressure. The residue was purified by silica gel column chromatography, eluted with EtOAc in DCM (20%-70%) to afford the product (1.1 g, 43%). [M+H]$^+$=696.0.

To a stirred solution of tert-butyl (R)-8-(6-((6-(4-(1-(3-(tert-butyl)-1,2,4-oxadiazole-5-carboxamido)ethyl)-3-methylphenyl)pyrimidin-4-yl)amino)pyridin-3-yl)-2,8-diazaspiro[4.5]decane-2-carboxylate (1.1 g, 1.581 mmol) in DCM (10 mL) was added HCl in 1,4-dioxane (10 mL) dropwise at room temperature. The resulting mixture was stirred for 1 h at room temperature and concentrated under reduced pressure. To the residue was added Et$_2$O (80 mL) and stirred for 1 h at room temperature. The resulting mixture was filtered and the filter cake was washed with Et$_2$O (3×10 mL). The solid was dried under infrared light. This resulted in the product (926.2 mg, 93%). $^1$H NMR (400 MHz, DMSO) δ 11.71 (s, 1H), 9.96 (d, J=7.6 Hz, 1H), 9.42 (brs, 2H), 8.94 (s, 1H), 8.18 (s, 1H), 7.96 (s, 1H), 7.91-7.81 (m, 3H), 7.69-7.65 (m, 2H), 5.34 (t, J=7.2 Hz, 1H), 3.33-3.20 (m, 6H), 3.05 (t, J=6.0 Hz, 2H), 2.52 (s, 3H), 1.86 (t, J=8.4 Hz, 2H), 1.80-1.70 (m, 4H), 1.53 (d, J=7.2 Hz, 3H), 1.37 (s, 9H); [M+H]$^+$=596.5.

Step 5: (R)-3-(tert-butyl)-N-(1-(4-(6-((5-(2-((1-(4-(2,4-dioxotetrahydropyrimidin-1(2H)-yl)phenyl)piperidin-4-yl)methyl)-2,8-diazaspiro[4.5]decan-8-yl)pyridin-2-yl)amino)pyrimidin-4-yl)-2-methylphenyl)ethyl)-1,2,4-oxadiazole-5-carboxamide

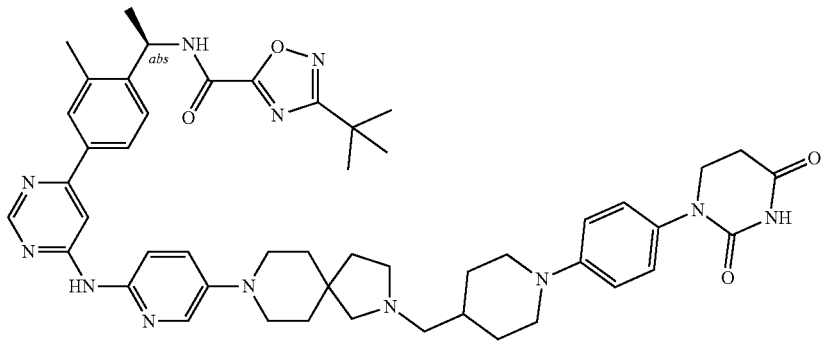 [SMILES: Cc1cc(-c2cc(Nc3ccc(N4CCC5(CCN(CC6CCN(c7ccc(N8CCC(=O)NC8=O)cc7)CC6)C5)CC4)cn3)ncn2)ccc1[C@@H](C)NC(=O)c1nc(C(C)(C)C)no1]

A mixture of (R)—N-(1-(4-(6-((5-(2,8-diazaspiro[4.5]de-can-8-yl)pyridin-2-yl)amino)pyrimidin-4-yl)-2-methylphenyl)ethyl)-3-(tert-butyl)-1,2,4-oxadiazole-5-carboxamide hydrochloride (0.10 g, 0.158 mmol) and 1-(4-(2,4-dioxotetrahydropyrimidin-1(2H)-yl)phenyl)piperidine-4-carbaldehyde (0.058 g, 0.19 mmol) in 1,2-dichloroethane (5 mL) and HOAc (25 mg) was stirred in a round bottom flask at room temperature for 0.5 hour. To the mixture was added NaBH(OAc)₃ (0.051 g, 0.237 mmol) and stirred at room temperature for 12 hours. Then the mixture was evaporated in vacuum to afford the crude product, which was purified by pre-HPLC to afford the product (61.34 mg, 44%). ¹H NMR (400 MHz, DMSO) δ 10.27 (s, 1H), 9.99 (s, 1H), 9.91 (d, J=7.7 Hz, 1H), 8.70 (s, 1H), 8.03 (t, J=6.2 Hz, 2H), 7.83 (d, J=6.1 Hz, 2H), 7.67 (s, 1H), 7.60 (d, J=8.7 Hz, 1H), 7.45 (dd, J=9.0, 2.8 Hz, 1H), 7.12 (d, J=8.8 Hz, 2H), 6.92 (d, J=8.9 Hz, 2H), 5.33 (t, J=7.2 Hz, 1H), 3.68 (dd, J=13.8, 7.2 Hz, 4H), 3.19-3.03 (m, 4H), 2.70-2.59 (m, 4H), 2.55-2.45 (m, 5H), 2.37 (s, 2H), 2.27 (d, J=7.2 Hz, 2H), 1.80 (d, J=11.3 Hz, 2H), 1.71-1.56 (m, 7H), 1.51 (d, J=7.0 Hz, 3H), 1.36 (s, 9H), 1.28-1.13 (m, 2H); [M+H]⁺=881.7.

Example 32: (R)-3-(tert-butyl)-N-(1-(4-(6-((5-(2-((1-(4-(2,4-dioxotetrahydropyrimidin-1(2H)-yl)phenyl)piperidin-4-yl)methyl)-2,7-diazaspiro [3.5] nonan-7-yl)pyridin-2-yl)amino)pyrimidin-4-yl)-2-methylphenyl)ethyl)-1,2,4-oxadiazole-5-carboxamide

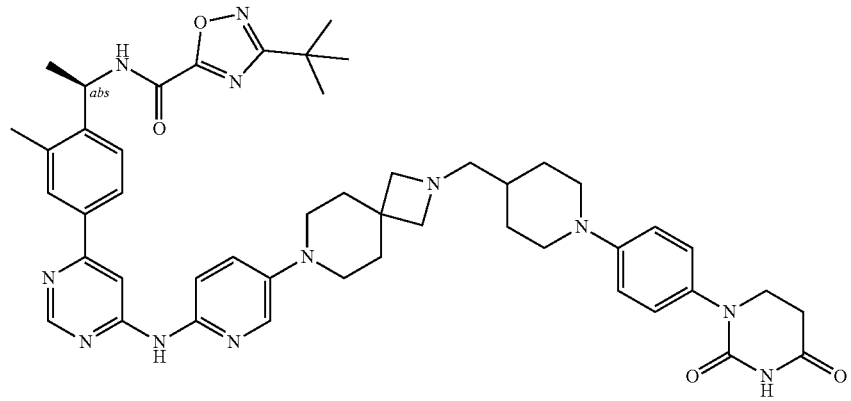 [SMILES: Cc1cc(-c2cc(Nc3ccc(N4CCC5(CC4)CN(CC4CCN(c6ccc(N7CCC(=O)NC7=O)cc6)CC4)C5)cn3)ncn2)ccc1[C@@H](C)NC(=O)c1nc(C(C)(C)C)no1]

The titled compound was synthesized in the procedures similar to Example 31. ¹H NMR (500 MHz, DMSO) δ 10.25 (s, 1H), 9.97 (s, 1H), 9.88 (d, J=7.8 Hz, 1H), 8.69 (d, J=0.8 Hz, 1H), 8.03 (t, J=6.1 Hz, 2H), 7.83 (d, J=6.5 Hz, 2H), 7.67 (s, 1H), 7.60 (d, J=8.7 Hz, 1H), 7.44 (dd, J=9.1, 3.0 Hz, 1H), 7.12 (d, J=8.9 Hz, 2H), 6.91 (d, J=9.1 Hz, 2H), 5.33 (s, 1H), 3.72-3.60 (m, 4H), 3.07 (s, 4H), 2.98 (s, 4H), 2.67 (t, J=6.7 Hz, 2H), 2.62 (d, J=12.9 Hz, 2H), 2.47 (s, 3H), 2.34 (d, J=6.5 Hz, 2H), 1.85-1.75 (m, 6H), 1.51 (d, J=7.0 Hz, 3H), 1.36 (s, 10H), 1.26-1.15 (m, 2H); [M+H]⁺=867.6.

Example 33: (R)-3-(tert-butyl)-N-(1-(4-(6-((5-(7-((1-(4-(2,4-dioxotetrahydropyrimidin-1(2H)-yl)phenyl)piperidin-4-yl)methyl)-2,7-diazaspiro [3.5] nonan-2-yl)pyridin-2-yl)amino)pyrimidin-4-yl)-2-methylphenyl)ethyl)-1,2,4-oxadiazole-5-carboxamide Step 1: tert-butyl 2-(6-nitropyridin-3-yl)-2,7-diazaspiro[3.5]nonane-7-carboxylate

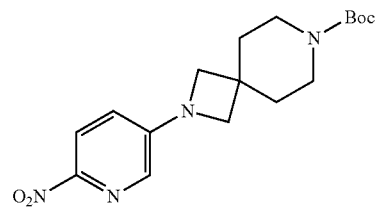

To a stirred solution of 5-bromo-2-nitropyridine (2.1 g, 10.345 mmol) and tert-butyl 2,7-diazaspiro[3.5]nonane-7-carboxylate (2.8 g, 12.414 mmol) in dioxane (40 mL) were added Cs₂CO₃ (6.7 g, 20.690 mmol), XPhos Pd G3 (0.9 g, 1.035 mmol) and XPhos (1.0 g, 2.069 mmol) in portions at room temperature under nitrogen atmosphere. The resulting mixture was stirred overnight at 100° C. under nitrogen atmosphere and concentrated under reduced pressure. The residue was purified by silica gel column chromatography, eluted with EtOAc in PE (20%-50%) to afford the product (2.5 g, 69%). [M+H]⁺=349.2.

Step 2: tert-butyl 2-(6-aminopyridin-3-yl)-2,7-diazaspiro[3.5]nonane-7-carboxylate

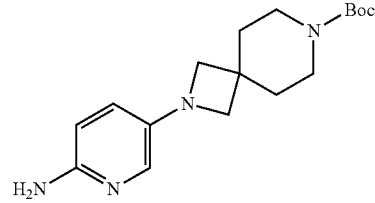 [SMILES: CC(C)(C)OC(=O)N1CCC2(CC1)CN(c1ccc([N+](=O)[O-])nc1)C2]

To a solution of tert-butyl 2-(6-nitropyridin-3-yl)-2,7-diazaspiro[3.5]nonane-7-carboxylate (2.5 g, 7.176 mmol) in 50 mL MeOH was added Pd/C (10%, 3 g) under nitrogen atmosphere in a 250 mL round-bottom flask. The mixture was hydrogenated at room temperature overnight under hydrogen atmosphere using a hydrogen balloon, filtered through a Celite pad and concentrated under reduced pressure to afford the product (1.9 g, 83%). [M+H]⁺=319.2.

Step 3: tert-butyl (R)-2-(6-((6-(4-(1-(3-(tert-butyl)-1,2,4-oxadiazole-5-carboxamido)ethyl)-3-methylphenyl)pyrimidin-4-yl)amino)pyridin-3-yl)-2,7-diazaspiro[3.5]nonane-7-carboxylate

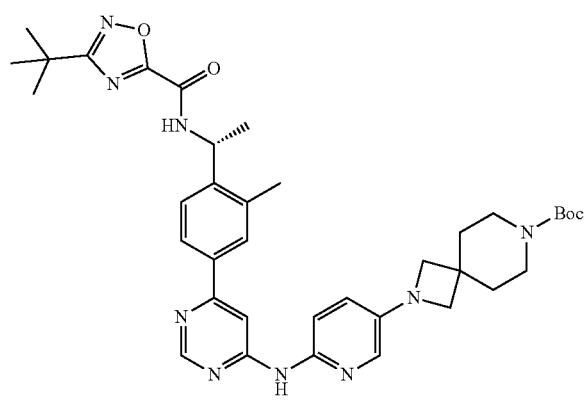 [SMILES: Cc1cc(-c2cc(Nc3ccc(N4CC5(CCN(C(=O)OC(C)(C)C)CC5)C4)cn3)ncn2)ccc1[C@@H](C)NC(=O)c1nc(C(C)(C)C)no1]

To a stirred solution of tert-butyl 2-(6-aminopyridin-3-yl)-2,7-diazaspiro[3.5]nonane-7-carboxylate (1.4 g, 4.501 mmol) and (R)-3-(tert-butyl)-N-(1-(4-(6-chloropyrimidin-4-yl)-2-methylphenyl)ethyl)-1,2,4-oxadiazole-5-carboxamide (1.5 g, 3.751 mmol) in dioxane (30 mL) were added Cs₂CO₃ (2.4 g, 7.502 mmol), XPhos Pd G3 (0.3 g, 0.375 mmol) and XPhos (0.3 g, 0.750 mmol) in portions at room temperature under nitrogen atmosphere. The resulting mixture was stirred overnight at 100° C. under nitrogen atmosphere and concentrated under reduced pressure. The residue was purified by silica gel column chromatography, eluted with petroleum ether/EtOAc to afford the product (1.6 g, 62%). [M+H]⁺=682.3.

Step 4: (R)—N-(1-(4-(6-((5-(2,7-diazaspiro[3.5]nonan-2-yl)pyridin-2-yl)amino)pyrimidin-4-yl)-2-methylphenyl)ethyl)-3-(tert-butyl)-1,2,4-oxadiazole-5-carboxamide

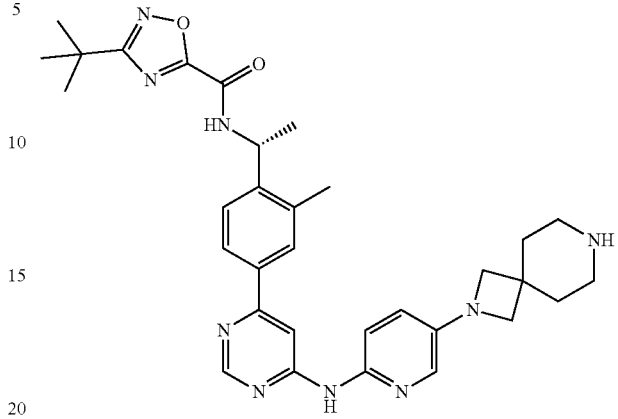

To a stirred solution of tert-butyl (R)-2-(6-((6-(4-(1-(3-(tert-butyl)-1,2,4-oxadiazole-5-carboxamido)ethyl)-3-methylphenyl)pyrimidin-4-yl)amino)pyridin-3-yl)-2,7-diazaspiro[3.5]nonane-7-carboxylate (1.5 g, 2.200 mmol) in DCM (32 mL) was added TFA (8 mL) dropwise at room temperature under nitrogen atmosphere. The resulting mixture was stirred for 1 h at room temperature under nitrogen atmosphere and concentrated under reduced pressure. The residue was purified by reverse phase flash chromatography with the following conditions: Column: Spherical C18, 20-40 μm, 330 g; Mobile Phase A: Water (plus 10 mM NH₄HCO₃); Mobile Phase B: ACN; How rate: 100 mL/min; Gradient: 5%-5% B, 10 min, 33% B-45% B gradient in 20 min; Detector: 220 nm. The fractions containing the desired product were collected at 35% B and concentrated under reduced pressure to afford the product (0.95 g, 74%). H NMR (400 MHz, DMSO) δ 9.87-9.85 (m, 2H), 8.67 (s, 1H), 7.94 (s, 1H), 7.87-7.75 (m, 2H), 7.71-7.50 (m, 3H), 6.95 (dd, J=8.9, 3.0 Hz, 1H), 5.36-5.32 (m, 1H), 3.58 (s, 4H), 2.71-2.68 (m, 4H), 2.47 (s, 3H), 2.31 (s, 1H), 1.71-1.67 (m, 4H), 1.52 (d, J=7.0 Hz, 3H), 1.37 (s, 9H); [M+H]⁺=582.5.

Step 5: (R)-3-(tert-butyl)-N-(1-(4-(6-((5-(7-((1-(4-(2,4-dioxotetrahydropyrimidin-1(2H)-yl)phenyl)piperidin-4-yl)methyl)-2,7-diazaspiro[3.5]nonan-2-yl)pyridin-2-yl)amino)pyrimidin-4-yl)-2-methylphenylethyl)-1,2,4-oxadiazole-5-carboxamide

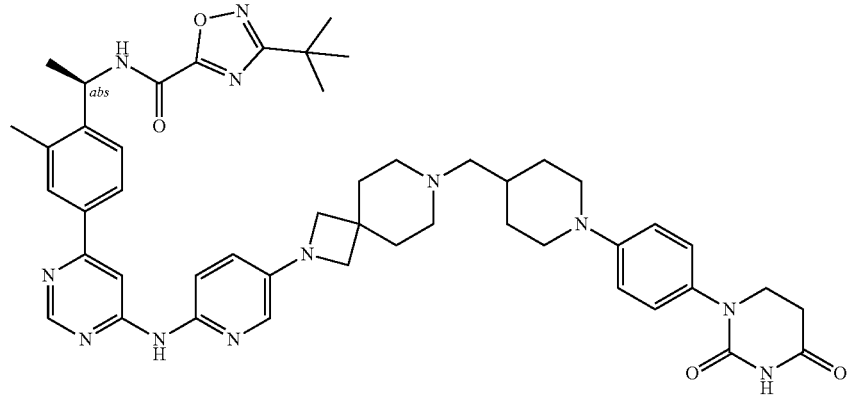 [SMILES: Cc1cc(-c2cc(Nc3ccc(N4CC5(CCN(CC6CCN(c7ccc(N8CCC(=O)NC8=O)cc7)CC6)CC5)C4)cn3)ncn2)ccc1[C@@H](C)NC(=O)c1nc(C(C)(C)C)no1]

A mixture of (R)—N-(1-(4-(6-((5-(2,7-diazaspiro[3.5]nonan-2-yl)pyridin-2-yl)amino)pyrimidin-4-yl)-2-methylphenyl)ethyl)-3-(tert-butyl)-1,2,4-oxadiazole-5-carboxamide (0.10 g, 0.172 mmol) and 1-(4-(2,4-dioxotetrahydropyrimidin-1(2H)-yl)phenyl)piperidine-4-carbaldehyde (0.062 g, 0.206 mmol) in 1,2-dichloroethane (5 mL) and HOAc (25 mg) was stirred in a round bottom flask at room temperature for 0.5 hour. To the mixture was added NaBH(OAc)$_3$ (0.055 g, 0.258 mmol) and stirred at room temperature for 12 hours. Then the mixture was evaporated in vacuum to afford the crude product, which was purified by pre-HPLC to afford the product (88.07 mg, 59%). $^1$H NMR (400 MHz, DMSO) δ 10.27 (s, 1H), 9.90 (d, J=4.3 Hz, 2H), 8.67 (s, 1H), 8.17 (s, 1H), 7.94 (s, 1H), 7.81 (s, 2H), 7.60 (d, J=8.9 Hz, 3H), 7.13 (d, J=8.7 Hz, 2H), 6.93 (t, J=10.3 Hz, 3H), 5.33 (t, J=7.3 Hz, 1H), 3.68 (dd, J=13.1, 6.7 Hz, 5H), 3.57 (s, 4H), 2.71-2.59 (m, 4H), 2.47 (s, 3H), 2.33 (s, 3H), 2.15 (d, J=6.6 Hz, 2H), 1.80-1.62 (m, 7H), 1.51 (d, J=6.9 Hz, 3H), 1.36 (s, 9H), 1.26-1.12 (m, 2H); [M+H]$^+$=867.6.

Example 34: (R)-3-(tert-butyl)-N-(1-(4-(6-((5-(9-((1-(4-(2,4-dioxotetrahydropyrimidin-1(2H)-yl)phenyl)piperidin-4-yl)methyl)-3,9-diazaspiro [5.5]undecan-3-yl)pyridin-2-yl)amino)pyrimidin-4-yl)-2-methylphenyl)ethyl)-1,2,4-oxadiazole-5-carboxamide Step 1: tert-butyl 9-(6-nitropyridin-3-yl)-3,9-diazaspiro[5.5]undecane-3-carboxylate

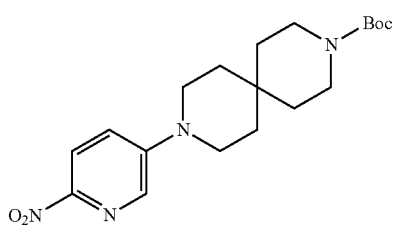 [SMILES: CC(C)(C)OC(=O)N1CCC2(CC1)CCN(c1ccc([N+](=O)[O-])nc1)CC2]

To a stirred mixture of 5-bromo-2-nitropyridine (2.5 g, 12.316 mmol) and tert-butyl 3,9-diazaspiro[5.5]undecane-3-carboxylate (3.7 g, 14.779 mmol) in dioxane (50 mL) were added XPhos (1.2 g, 2.463 mmol), XPhos Pd G3 (1.1 g, 1.232 mmol) and Cs$_2$CO$_3$ (8.0 g, 24.632 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with EtOAc in PE (20%-50%) to afford the product (2.8 g, 60%). [M+H]$^+$=377.2.

Step 2: tert-butyl 9-(6-aminopyridin-3-yl)-3,9-diazaspiro[5.5]undecane-3-carboxylate

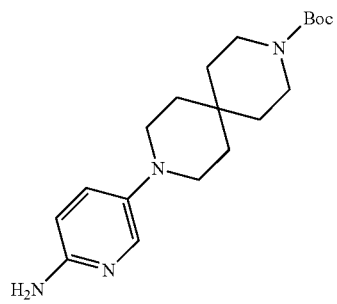 [SMILES: CC(C)(C)OC(=O)N1CCC2(CC1)CCN(c1ccc(N)nc1)CC2]

To a solution of tert-butyl 9-(6-nitropyridin-3-yl)-3,9-diazaspiro[5.5]undecane-3-carboxylate (2.8 g, 7.438 mmol) in 60 mL MeOH was added Pd/C (10%, 2.8 g) under nitrogen atmosphere in a 250 mL round-bottom flask. The mixture was hydrogenated at room temperature for 16 h under hydrogen atmosphere using a hydrogen balloon, filtered through a Celite pad, and concentrated under reduced pressure. This resulted in the product (2.3 g, 89%). [M+H]$^+$=347.1.

Step 3: tert-butyl (R)-9-(6-((6-(4-(1-(3-(tert-butyl)-1,2,4-oxadiazole-5-carboxamido)ethyl)-3-methylphenyl)pyrimidin-4-yl)amino)pyridin-3-yl)-3,9-diazaspiro[5.5]undecane-3-carboxylate

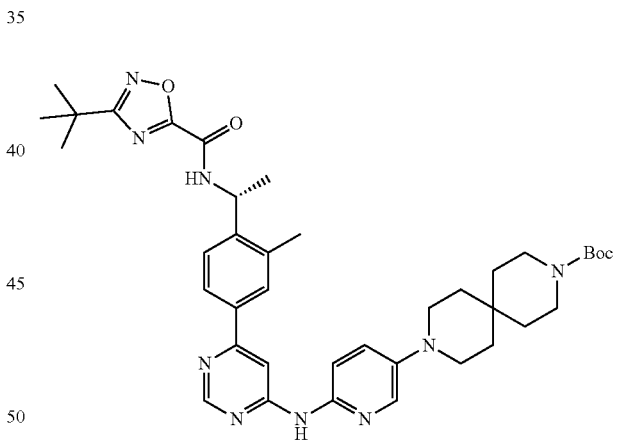

To a stirred mixture of (R)-3-(tert-butyl)-N-(1-(4-(6-chloropyrimidin-4-yl)-2-methylphenyl)ethyl)-1,2,4-oxadiazole-5-carboxamide (1.7 g, 4.251 mmol) and tert-butyl 9-(6-aminopyridin-3-yl)-3,9-diazaspiro[5.5]undecane-3-carboxylate (1.8 g, 5.101 mmol) in dioxane (34 mL) were added XPhos (608 mg, 1.275 mmol), XPhos Pd G3 (539 mg, 0.638 mmol) and Cs$_2$CO$_3$ (2770 mg, 8.502 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with EtOAc in PE (30%-70%) to afford the product (1.3 g, 43%). [M+H]$^+$=710.4.

Step 4: (R)—N-(1-(4-(6-((5-(3,9-diazaspiro[5.5]undecan-3-yl)pyridin-2-yl)amino)pyrimidin-4-yl)-2-methylphenyl)ethyl)-3-(tert-butyl)-1,2,4-oxadiazole-5-carboxamide hydrochloride

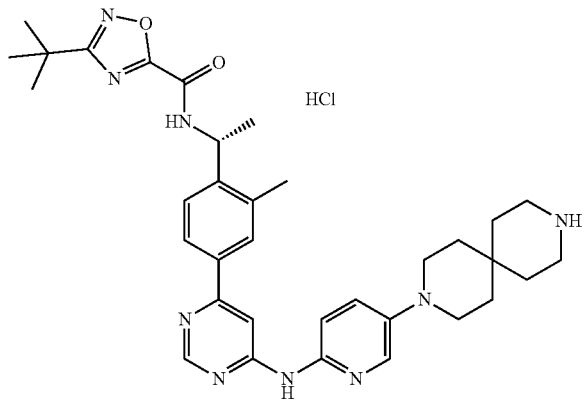 [SMILES: Cc1cc(-c2cc(Nc3ccc(N4CCC5(CCNCC5)CC4)cn3)ncn2)ccc1[C@@H](C)NC(=O)c1nc(C(C)(C)C)no1 ; Cl]

To a stirred solution of tert-butyl (R)-9-(6-(((6-(4-(1-(3-(tert-butyl)-1,2,4-oxadiazole-5-carboxamido)ethyl)-3-methylphenyl)pyrimidin-4-yl)amino)pyridin-3-yl)-3,9-diazaspiro[5.5]undecane-3-carboxylate (1.3 g, 1.831 mmol) in DCM (10 mL) was added HCl in 1,4-dioxane (10 mL) at room temperature. The resulting mixture was stirred for 1 h at room temperature and concentrated under reduced pressure. To the resulting mixture was added Et₂O (50 mL) and filtered. The filter cake was washed with Et₂O (3×10 mL). The solid was dried under infrared light. This resulted in the product (1.1 g, 92%). H NMR (400 MHz, DMSO) δ 11.51 (s, 1H), 9.93 (d, J=7.6 Hz, 1H), 8.91 (s, 1H), 8.75 (brs, 2H), 8.21 (s, 1H), 8.07-7.84 (m, 4H), 7.69-7.66 (m, 2H), 5.39-5.31 (m, 1H), 3.30-3.26 (m, 4H), 3.09-3.04 (m, 4H), 2.53 (s, 3H), 1.74-1.66 (m, 8H), 1.53 (d, J=7.0 Hz, 3H), 1.37 (s, 9H); [M+H]⁺=610.4.

Step 5: (R)-3-(tert-butyl)-N-(1-(4-(6-((5-(9-((1-(4-(2,4-dioxotetrahydropyrimidin-1(2H)-yl)phenyl)piperidin-4-yl)methyl)-3,9-diazaspiro[5.5]undecan-3-yl)pyridin-2-yl)amino)pyrimidin-4-yl)-2-methylphenyl)ethyl)-1,2,4-oxadiazole-5-carboxamide

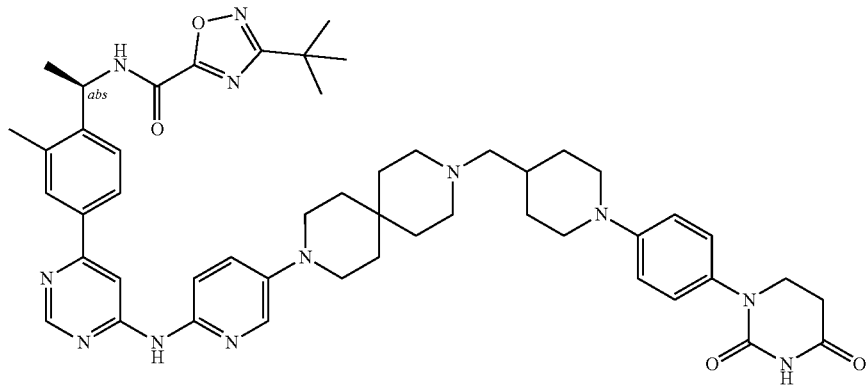 [SMILES: Cc1cc(-c2cc(Nc3ccc(N4CCC5(CCN(CC6CCN(c7ccc(N8CCC(=O)NC8=O)cc7)CC6)CC5)CC4)cn3)ncn2)ccc1[C@@H](C)NC(=O)c1nc(C(C)(C)C)no1]

A mixture of (R)—N-(1-(4-(6-((5-(3,9-diazaspiro[5.5]undecan-3-yl)pyridin-2-yl)amino)pyrimidin-4-yl)-2-methylphenyl)ethyl)-3-(tert-butyl)-1,2,4-oxadiazole-5-carboxamide hydrochloride (0.10 g, 0.155 mmol) and 1-(4-(2,4-dioxotetrahydropyrimidin-1(2H)-yl)phenyl)piperidine-4-carbaldehyde (0.056 g, 0.186 mmol) in 1,2-dichloroethane (5 mL) and HOAc (25 mg) was stirred in a round bottom flask at room temperature for 0.5 hour. To the mixture was added NaBH(OAc)₃ (0.050 g, 0.233 mmol) and stirred at room temperature for 12 hours. Then the mixture was evaporated in vacuum to afford the crude product, which was purified by pre-HPLC to afford the product (52.69 mg, 38%). ¹H NMR (400 MHz, DMSO) δ 10.27 (s, 1H), 9.98 (s, 1H), 9.91 (d, J=7.7 Hz, 1H), 8.69 (s, 1H), 8.03 (t, J=5.9 Hz, 2H), 7.83 (d, J=6.5 Hz, 2H), 7.67 (s, 1H), 7.60 (d, J=8.7 Hz, 1H), 7.45 (d, J=9.4 Hz, 1H), 7.13 (d, J=8.8 Hz, 2H), 6.92 (d, J=8.9 Hz, 2H), 5.33 (t, J=7.3 Hz, 1H), 3.68 (dd, J=14.7, 8.1 Hz, 4H), 3.11 (s, 4H), 2.72-2.60 (m, 4H), 2.47 (s, 3H), 2.35 (s, 4H), 2.17 (d, J=6.9 Hz, 2H), 1.77 (d, J=12.3 Hz, 2H), 1.71-1.46 (m, 12H), 1.36 (s, 9H), 1.25-1.10 (m, 2H); [M+H]⁺=895.8.

Example 35: (R)-3-(tert-butyl)-N-(1-(4-(6-((5-(6-(1-(4-(2,4-dioxotetrahydropyrimidin-1(2H)-yl)phenyl)azetidine-3-carbonyl)-2,6-diazaspiro[3.3]heptan-2-yl)pyridin-2-yl)amino)pyrimidin-4-yl)-2-methylphenyl)ethyl)-1,2,4-oxadiazole-5-carboxamide Step 1: tert-butyl 6-(6-nitropyridin-3-yl)-2,6-diazaspiro[3.3]heptane-2-carboxylate

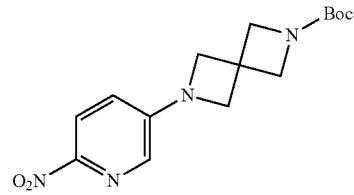

To a stirred mixture of 5-bromo-2-nitropyridine (2.9 g, 14.286 mmol) and tert-butyl 2,6-diazaspiro[3.3]heptane-2-carboxylate (3.40 g, 17.143 mmol) in dioxane (58.00 mL) were added XPhos Pd G3 (1.21 g, 1.429 mmol) and Cs₂CO₃ (9.31 g, 28.572 mmol) in portions at room temperature. The resulting mixture was stirred for 16 h at 100° C. under nitrogen atmosphere. Desired product could be detected by LCMS. The resulting mixture was concentrated under vacuum. The residue was purified by silica gel column chromatography, eluted with PE/EA (5:1 to 1:1) to afford the product (2.4 g, 52%). [M+H]⁺=321.0.

Step 2: tert-butyl 6-(6-aminopyridin-3-yl)-2,6-diazaspiro[3.3]heptane-2-carboxylate

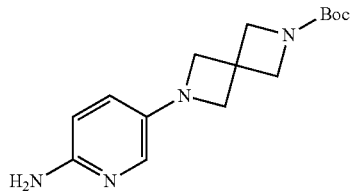 [SMILES: CC(C)(C)OC(=O)N1CC2(C1)CN(c1ccc([N+](=O)[O-])nc1)C2]

A mixture of tert-butyl 6-(6-nitropyridin-3-yl)-2,6-diazaspiro[3.3]heptane-2-carboxylate (2.4 g, 7.492 mmol) and Pd/C (10 wt %, 2 g) in MeOH (45 mL) under argon atmosphere was degassed under vacuum and purged with H₂ several times. Then it was hydrogenated under H₂ balloon (2 atm) at 25° C. for 16 h. The reaction progress was monitored by TLC & LCMS. After completion of the reaction, Pd/C was filtered off through Celite and the filter cake was washed with MeOH (2×200 mL). The filtrate was concentrated under reduced pressure. This resulted in the product (1.9 g, 87%). [M+H]⁺=291.1.

Step 3: tert-butyl (R)-6-(6-((6-(4-(1-(3-(tert-butyl)-1,2,4-oxadiazole-5-carboxamido)ethyl)-3-methylphenyl)pyrimidin-4-yl)amino)pyridin-3-yl)-2,6-diazaspiro[3.3]heptane-2-carboxylate

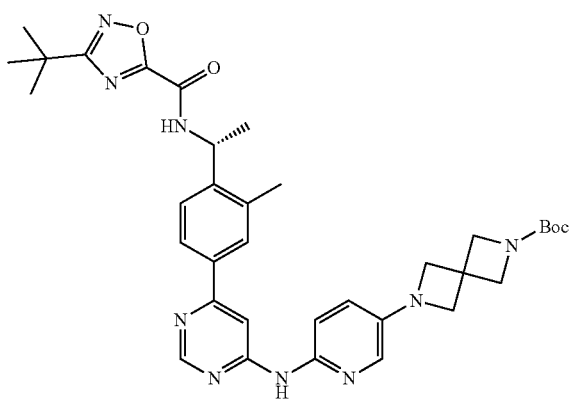 [SMILES: Cc1cc(-c2cc(Nc3ccc(N4CC5(CN(C(=O)OC(C)(C)C)C5)C4)cn3)ncn2)ccc1[C@@H](C)NC(=O)c1nc(C(C)(C)C)no1]

To a stirred solution of tert-butyl 6-(6-aminopyridin-3-yl)-2,6-diazaspiro[3.3]heptane-2-carboxylate (1.57 g, 5.401 mmol) and (R)-3-(tert-butyl)-N-(1-(4-(6-chloropyrimidin-4-yl)-2-methylphenyl)ethyl)-1,2,4-oxadiazole-5-carboxamide (1.8 g, 4.501 mmol) in 1,4-dioxane (40 mL) were added XPhos (0.43 g, 0.900 mmol), XPhos Pd G3 (0.38 g, 0.450 mmol) and Cs₂CO₃ (2.93 g, 9.002 mmol) in portions at 100° C. under nitrogen atmosphere. Desired product could be detected by LCMS. The resulting mixture was concentrated under vacuum. The residue was purified by silica gel column chromatography, eluted with PE/EA (7:1 to 2:1) to afford the product (1.4 g, 48%). [M+H]⁺=654.3.

Step 4: (R)—N-(1-(4-(6-((5-(2,6-diazaspiro[3.3] heptan-2-yl)pyridin-2-yl)amino)pyrimidin-4-yl)-2-methylphenyl)ethyl)-3-(tert-butyl)-1,2,4-oxadiazole-5-carboxamide

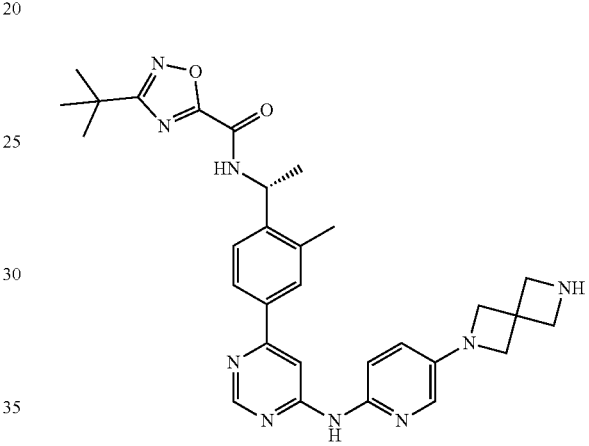

A solution of tert-butyl (R)-6-(6-((6-(4-(1-(3-(tert-butyl)-1,2,4-oxadiazole-5-carboxamido)ethyl)-3-methylphenyl)pyrimidin-4-yl)amino)pyridin-3-yl)-2,6-diazaspiro[3.3]heptane-2-carboxylate (1.3 g, 1.988 mmol) and TFA (4.64 mL) in DCM (23.21 mL) was stirred for 2 h at room temperature. Desired product could be detected by LCMS. The resulting mixture was concentrated under vacuum. The residue was purified by reverse phase flash chromatography with the following conditions: Column: Spherical C18, 20-40 μm, 330 g; Mobile Phase A: Water (plus 10 mM NH₄HCO₃); Mobile Phase B: ACN; How rate: 100 mL/min; Gradient: 5%-5% B, 10 min, 15% B-40% B gradient in 30 min; Detector: 220 nm. The fractions containing the desired product were collected at 37% B and concentrated under reduced pressure to afford the product (1.0084 g, 91%). H NMR (400 MHz, DMSO) δ 9.89-9.84 (m, 2H), 8.68 (s, 1H), 7.95 (s, 1H), 7.83-7.81 (m, 2H), 7.68-7.57 (m, 3H), 6.95 (dd, J=8.8, 3.0 Hz, 1H), 5.34 (d, J=7.2 Hz, 1H), 3.90 (s, 4H), 3.62 (s, 4H), 2.47 (s, 3H), 1.52 (d, J=7.0 Hz, 3H), 1.37 (s, 9H); [M+H]⁺=554.5.

Step 5: (R)-3-(tert-butyl)-N-(1-(4-(6-((5-(6-(1-(4-(2, 4-dioxotetrahydropyrimidin-1(2H)-yl)phenyl)azetidine-3-carbonyl)-2,6-diazaspiro[3.3]heptan-2-yl) pyridin-2-yl)amino)pyrimidin-4-yl)-2-methylphenyl) ethyl)-1,2,4-oxadiazole-5-carboxamide

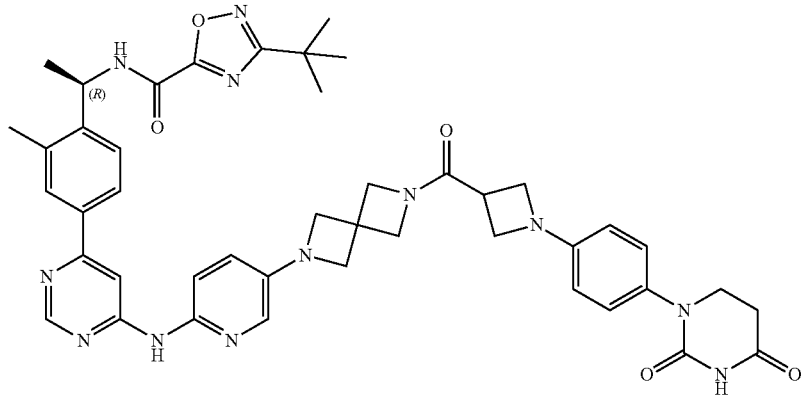

To a solution of (R)—N-(1-(4-(6-((5-(2,6-diazaspiro[3.3] heptan-2-yl)pyridin-2-yl)amino)pyrimidin-4-yl)-2-methylphenyl)ethyl)-3-(tert-butyl)-1,2,4-oxadiazole-5-carboxamide (100 mg, 0.18 mmol) in DMF (6 mL), was added 1-(4-(2,4-dioxotetrahydropyrimidin-1(2H)-yl)phenyl)azetidine-3-carboxylic acid (62 mg, 0.22 mmol), HATU (103 mg, 0.27 mmol) and DIEA (0.5 mL). The mixture was stirred at room temperature overnight and concentrated in vacuum. To the residue was added H$_2$O (30 mL) and extracted with DCM (30 mL×3). The organic layer was purified by combi flash, eluted with a gradient of DCM:MeOH 1:0 to 10:1 to afford the product (23 mg, 15%). $^1$H NMR (500 MHz, DMSO) δ 10.24 (s, 1H), 9.93 (s, 1H), 9.88 (d, J=10.0 Hz, 1H), 8.68 (s, 1H), 7.95 (s, 1H), 7.82 (s, 2H), 7.64-7.59 (m, 3H), 7.12 (d, J=10.0 Hz, 2H), 6.99 (dd, J=10.0 Hz, 5.0 Hz, 1H), 6.44 (d, J=10.0 Hz, 2H), 5.35-5.32 (m, 1H), 4.31 (s, 2H), 4.09 (s, 2H), 3.99-3.96 (m, 6H), 3.82-3.79 (m, 2H), 3.69-3.66 (m, 1H), 3.59-3.53 (m, 1H), 2.69-2.66 (m, 2H), 2.47 (s, 3H), 1.84 (s, 4H), 1.52 (d, J=5.0 Hz, 3H), 1.36 (s, 9H); [M+H]$^+$=825.8.

Example 36: (R)-3-(tert-butyl)-N-(1-(4-(6-((5-(2-(1-(4-(2,4-dioxotetrahydropyrimidin-1(2H)-yl)phenyl) azetidine-3-carbonyl)-2,7-diazaspiro [3.5]nonan-7-yl)pyridin-2-yl)amino)pyrimidin-4-yl)-2-methylphenyl)ethyl)-1,2,4-oxadiazole-5-carboxamide Step 1: tert-butyl 7-(6-nitropyridin-3-yl)-2,7-diazaspiro[3.5]nonane-2-carboxylate

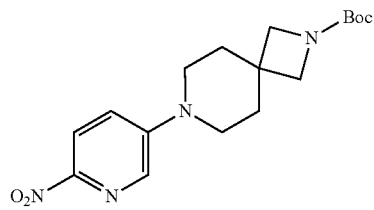 [SMILES: CC(C)(C)OC(=O)N1CC2(CCN(c3ccc([N+](=O)[O-])nc3)CC2)C1]

To a stirred solution of 5-bromo-2-nitropyridine (2.1 g, 10.345 mmol) and tert-butyl 2,7-diazaspiro[3.5]nonane-2-carboxylate (2.8 g, 12.414 mmol) in dioxane (40 mL) were added Cs$_2$CO$_3$ (6.7 g, 20.690 mmol), XPhos Pd G3 (0.8 g, 1.035 mmol) and XPhos (0.9 g, 2.069 mmol) in portions at room temperature under nitrogen atmosphere. The resulting mixture was stirred overnight at 100° C. under nitrogen atmosphere and concentrated under reduced pressure. The residue was purified by silica gel column chromatography, eluted with petroleum ether/EtOAc (5:1 to 1:1) to afford the product (3.1 g, 86%). [M+H]$^+$=349.3.

Step 2: tert-butyl 7-(6-aminopyridin-3-yl)-2,7-diazaspiro[3.5]nonane-2-carboxylate

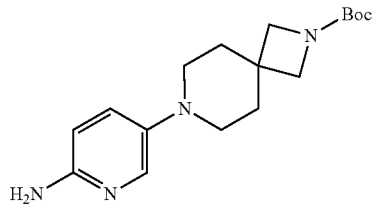

To a solution of tert-butyl 7-(6-nitropyridin-3-yl)-2,7-diazaspiro[3.5]nonane-2-carboxylate (3.1 g, 8.898 mmol) in 60 mL MeOH was added Pd/C (10%, 3 g) under nitrogen atmosphere in a 250 mL round-bottom flask. The mixture was hydrogenated at room temperature overnight under hydrogen atmosphere using a hydrogen balloon, filtered through a Celite pad and concentrated under reduced pressure to afford the product (2.4 g, 84%). [M+H]$^+$=319.2.

Step 3: tert-butyl (R)-7-(6-((6-(4-(1-(3-(tert-butyl)-1,2,4-oxadiazole-5-carboxamido)ethyl)-3-methylphenyl)pyrimidin-4-yl)amino)pyridin-3-yl)-2,7-diazaspiro[3.5]nonane-2-carboxylate

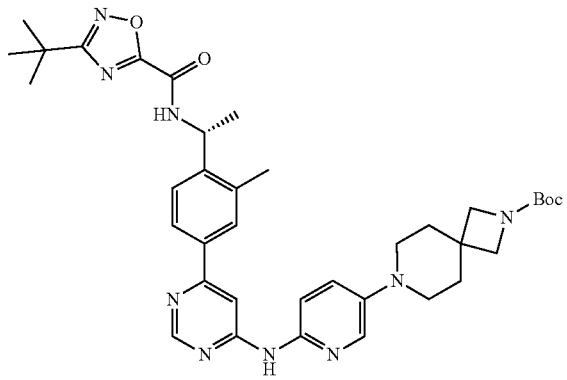 [SMILES: Cc1cc(-c2cc(Nc3ccc(N4CCC5(CC4)CN(C(=O)OC(C)(C)C)C5)cn3)ncn2)ccc1[C@@H](C)NC(=O)c1nc(C(C)(C)C)no1]

Step 4: (R)—N-(1-(4-(6-((5-(2,7-diazaspiro[3.5]nonan-7-yl)pyridin-2-yl)amino)pyrimidin-4-yl)-2-methylphenyl)ethyl)-3-(tert-butyl)-1,2,4-oxadiazole-5-carboxamide

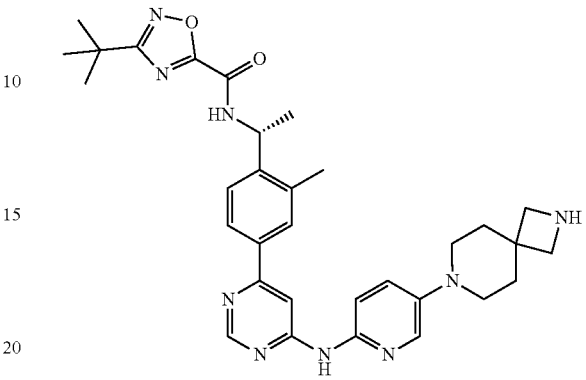

To a stirred solution of (R)-3-(tert-butyl)-N-(1-(4-(6-chloropyrimidin-4-yl)-2-methylphenyl)ethyl)-1,2,4-oxadiazole-5-carboxamide (1.2 g, 3.001 mmol) and tert-butyl 7-(6-aminopyridin-3-yl)-2,7-diazaspiro[3.5]nonane-2-carboxylate (1.1 g, 3.601 mmol) in dioxane (24 mL) were added XPhos Pd G3 (0.3 g, 0.300 mmol), XPhos (0.3 g, 0.600 mmol) and Cs$_2$CO$_3$ (1.9 g, 6.002 mmol) in portions at room temperature under nitrogen atmosphere. The resulting mixture was stirred overnight at 100° C. under nitrogen atmosphere and concentrated under reduced pressure. The residue was purified by silica gel column chromatography, eluted with petroleum ether/EtOAc (5:1 to 1:1) to afford the product (1.5 g, 73%). [M+H]$^+$=682.4.

To a stirred solution of tert-butyl (R)-7-(6-((6-(4-(1-(3-(tert-butyl)-1,2,4-oxadiazole-5-carboxamido)ethyl)-3-methylphenyl)pyrimidin-4-yl)amino)pyridin-3-yl)-2,7-diazaspiro [3.5]nonane-2-carboxylate (1.5 g, 2.127 mmol) in DCM (32 mL) was added TFA (8 mL) dropwise at room temperature under nitrogen atmosphere. The resulting mixture was stirred for 1 h at room temperature under nitrogen atmosphere and concentrated under reduced pressure. The residue was purified by reverse phase flash chromatography with the following conditions: Column: Spherical C18, 20-40 um, 330 g; Mobile Phase A: Water (plus 10 mM NH$_4$HCO$_3$); Mobile Phase B: ACN; How rate: 100 mL/min; Gradient: 5%-5% B, 10 min, 33% B-45% B gradient in 20 min; Detector: 220 nm. The fractions containing the desired product were collected at 40% B and concentrated under reduced pressure to afford the product (1.1 g, 89%). H NMR (400 MHz, DMSO) δ 9.97 (s, 1H), 9.88 (s, 1H), 8.70 (s, 1H), 8.17-7.91 (m, 2H), 7.90-7.75 (m, 2H), 7.70-7.67 (m, 1H), 7.64-7.60 (m, 1H), 7.45 (dd, J=9.1, 3.0 Hz, 1H), 5.34 (q, J=6.9 Hz, 1H), 3.58-3.56 (m, 1H), 3.28-3.24 (m, 4H), 3.08-3.04 (m, 4H), 2.48 (s, 3H), 1.81 (t, J=5.6 Hz, 4H), 1.52 (d, J=6.9 Hz, 3H), 1.37 (s, 9H); [M+H]$^+$=582.3.

Step 5: (R)-3-(tert-butyl)-N-(1-(4-(6-((5-(2-(1-(4-(2,4-dioxotetrahydropyrimidin-1(2H)-yl)phenyl)azetidine-3-carbonyl)-2,7-diazaspiro[3.5]nonan-7-yl)pyridin-2-yl)amino)pyrimidin-4-yl)-2-methylphenyl)ethyl)-1,2,4-oxadiazole-5-carboxamide

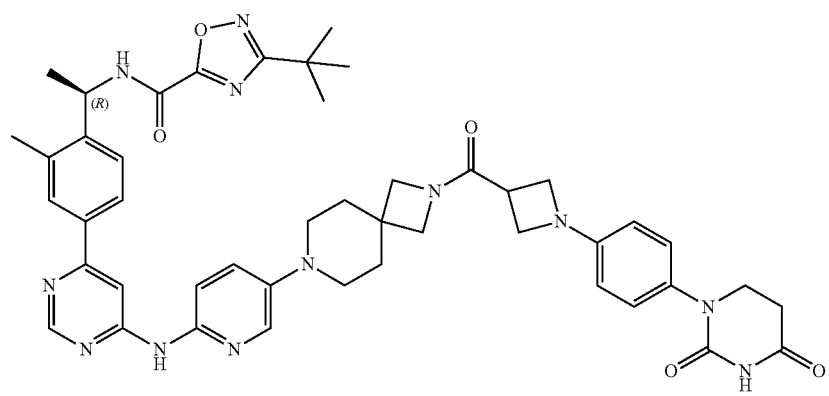

To a solution of (R)—N-(1-(4-(6-((5-(2,7-diazaspiro[3.5]nonan-7-yl)pyridin-2-yl)amino)pyrimidin-4-yl)-2-methylphenyl)ethyl)-3-(tert-butyl)-1,2,4-oxadiazole-5-carboxamide (120 mg, 0.206 mmol) in DMF (6 mL), was added 1-(4-(2,4-dioxotetrahydropyrimidin-1(2H)-yl)phenyl)azetidine-3-carboxylic acid (71 mg, 0.247 mmol), HATU (117 mg, 0.309 mmol) and DIEA (0.5 mL). The mixture was stirred at room temperature overnight and concentrated in vacuum. To the residue was added H$_2$O (30 mL), and extracted with DCM (30 mL×3). The organic layer was purified by combi flash, eluted with a gradient of DCM:MeOH 1:0 to 10:1 to afford the product (36 mg, 21%). $^1$H NMR (500 MHz, DMSO) δ 10.24 (s, 1H), 9.98 (s, 1H), 9.89 (d, J=5.0 Hz, 1H), 8.70 (s, 1H), 8.06-8.02 (m, 2H), 7.84-7.83 (m, 2H), 7.68 (s, 1H), 7.61 (d, J=5.0 Hz, 1H), 7.47 (dd, J=10.0 Hz, 5.0 Hz, 1H), 7.12 (d, J=10.0 Hz, 2H), 6.44 (d, J=10.0 Hz, 2H), 5.35-5.32 (m, 1H), 4.00-3.97 (m, 2H), 3.86-3.81 (m, 4H), 3.69-3.57 (m, 5H), 3.15-3.07 (m, 4H), 2.69-2.66 (m, 2H), 2.47 (s, 3H), 1.84 (s, 4H), 1.52 (d, J=5.0 Hz, 3H), 1.36 (s, 9H); [M+H]$^+$=853.7.

Example 37: 3-(tert-butyl)-N-((1R)-1-(4-(6-((5-(6-(1-(4-(2,4-dioxotetrahydropyrimidin-1(2H)-yl)phenyl)pyrrolidine-3-carbonyl)-2,6-diazaspiro [3.3]heptan-2-yl)pyridin-2-yl)amino)pyrimidin-4-yl)-2-methylphenyl)ethyl)-1,2,4-oxadiazole-5-carboxamide

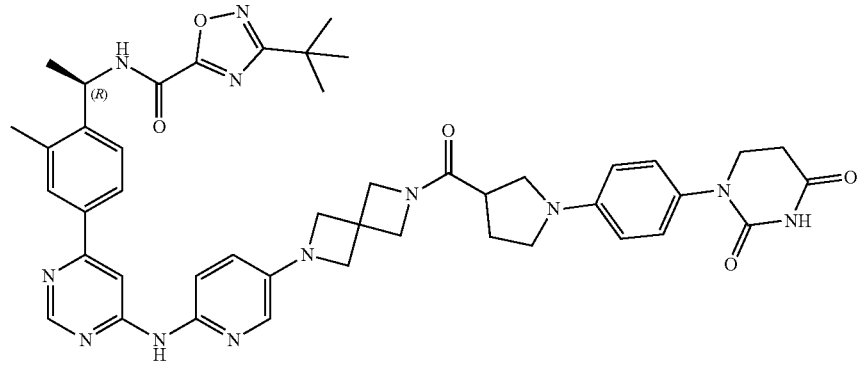

The titled compound was synthesized in the procedures similar to Example 35. $^1$H NMR (500 MHz, DMSO) δ 10.21 (s, 1H), 9.93 (s, 1H), 9.88 (d, J=10.0 Hz, 1H), 8.68 (s, 1H), 7.96 (s, 1H), 7.82 (s, 2H), 7.66-7.59 (m, 3H), 7.10 (d, J=10.0 Hz, 2H), 6.99 (dd, J=10.0 Hz, 5.0 Hz, 1H), 6.53 (d, J=10.0 Hz, 2H), 5.35-5.32 (m, 1H), 4.46-4.41 (m, 2H), 4.08 (s, 2H), 4.00 (s, 4H), 3.68-3.65 (m, 2H), 3.46-3.43 (m, 1H), 3.35-3.34 (m, 1H), 3.28-3.25 (m, 2H), 3.17-3.14 (m, 1H), 2.69-2.66 (m, 2H), 2.47 (s, 3H), 2.17-2.05 (m, 2H), 1.52 (d, J=5.0 Hz, 3H), 1.36 (s, 9H); [M+H]$^+$=839.7.

Example 38: 3-(tert-butyl)-N-((1R)-1-(4-(6-((5-(2-(1-(4-(2,4-dioxotetrahydropyrimidin-1(2H)-yl)phenyl)pyrrolidine-3-carbonyl)-2,7-diazaspiro[3.5]nonan-7-yl)pyridin-2-yl)amino)pyrimidin-4-yl)-2-methylphenyl)ethyl)-1,2,4-oxadiazole-5-carboxamide

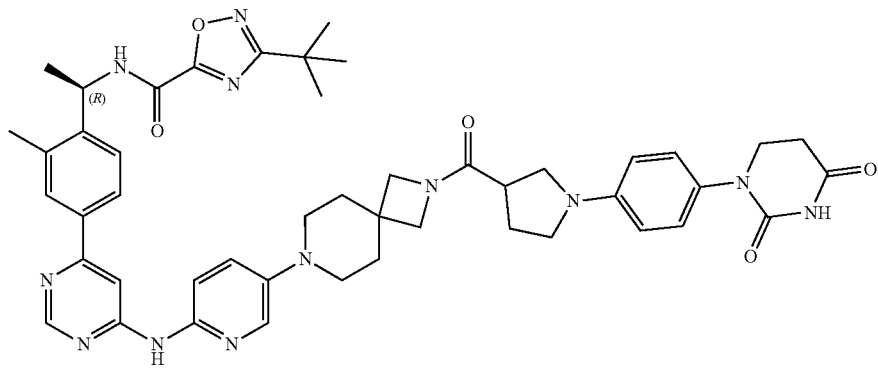

The titled compound was synthesized in the procedures similar to Example 36. $^1$H NMR (500 MHz, DMSO) δ 10.21 (s, 1H), 9.98 (s, 1H), 9.89 (d, J=5.0 Hz, 1H), 8.70 (s, 1H), 8.07 (d, J=5.0 Hz, 1H), 8.02 (s, 1H), 7.84-7.83 (m, 2H), 7.69 (s, 1H), 7.61 (d, J=5.0 Hz, 1H), 7.48 (dd, J=10.0 Hz, 5.0 Hz, 1H), 7.10 (d, J=10.0 Hz, 2H), 6.54 (d, J=10.0 Hz, 2H), 5.35-5.31 (m, 1H), 4.01-3.96 (m, 2H), 3.68-3.64 (m, 4H), 3.47-3.44 (m, 1H), 3.35-3.34 (m, 1H), 3.28-3.09 (m, 7H), 2.69-2.66 (m, 2H), 2.47 (s, 3H), 2.18-2.07 (m, 2H), 1.85 (s, 4H), 1.52 (d, J=5.0 Hz, 3H), 1.36 (s, 9H); [M+H]$^+$=867.6.

Example 39: (R)-3-(tert-butyl)-N-(1-(4-(6-((5-(4-(1'-(4-(2,4-dioxotetrahydropyrimidin-1(2H)-yl)phenyl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide Step 1: (R)-3-(tert-butyl)-N-(1-(4-(6-((5-(4-(1'-(4-(2,4-dioxo-3-((2-(trimethylsilyl)ethoxy)methyl)tetrahydropyrimidin-1(2H)-yl)phenyl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide

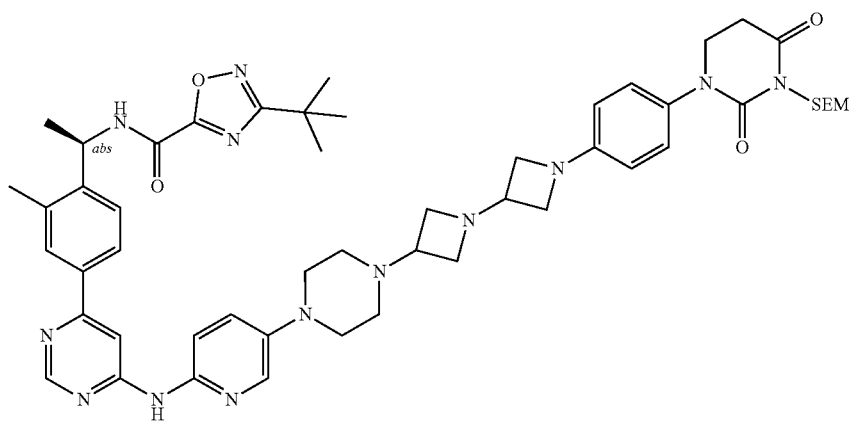

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.08 g, 0.148 mmol) and 1-(4-(3-oxo-[1,3'-biazetidin]-1'-yl)phenyl)-3-((2-(trimethylsilyl)ethoxy)methyl)dihydropyrimidine-2,4(1H,3H)-dione (the compound was obtained through the same way in WO2021219070A) (0.098 g, 0.221 mmol) in 1,2-dichloroethane (10 mL) and HOAc (9 mg) was stirred in a round bottom flask at room temperature for 0.5 hour. To the mixture was added NaBH(OAc)₃ (0.785 g, 0.37 mmol) and stirred at room temperature for 3 hours. Then the mixture was evaporated in vacuum to afford the crude product, which was purified by silica gel column chromatography, eluted with 1%-10% MeOH in DCM to afford the product (0.115 g, 80%). [M+H]⁺=970.5.

Step 2: (R)-3-(tert-butyl)-N-(1-(4-(6-((5-(4-(1'-(4-(2,4-dioxotetrahydropyrimidin-1(2H)-yl)phenyl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide

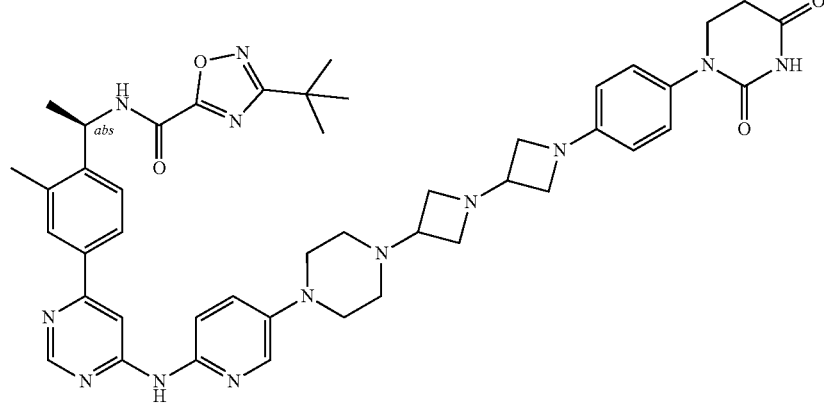

A mixture of (R)-3-(tert-butyl)-N-(1-(4-(6-((5-(4-(1'-(4-(2,4-dioxo-3-((2-(trimethylsilyl)ethoxy)methyl)tetrahydropyrimidin-1(2H)-yl)phenyl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide (0.115 g, 0.118 mmol) and trifluoroacetic acid (5 mL) in dichloromethane (5 mL) was stirred in a round bottom flask at room temperature overnight. The mixture was evaporated in vacuum to afford brown oil. Then MeOH (5 mL) and NH₃/H₂O (2 mL) was added to the residue and the mixture was allowed to stir at 0° C. for 30 min. LCMS showed the reaction was completed. The mixture was evaporated in vacuum to afford the crude product, which was purified by pre-HPLC to afford the product (37.27 mg, 38%). ¹H NMR (500 MHz, DMSO) δ 10.23 (s, 1H), 9.99 (s, 1H), 9.88 (d, J=7.7 Hz, 1H), 8.70 (s, 1H), 8.04 (s, 2H), 7.83 (d, J=6.3 Hz, 2H), 7.68 (s, 1H), 7.60 (d, J=8.7 Hz, 1H), 7.48-7.43 (m, 1H), 7.11 (d, J=8.6 Hz, 2H), 6.43 (d, J=8.6 Hz, 2H), 5.33 (s, 1H), 3.85 (s, 2H), 3.70-3.55 (m, 5H), 3.14 (s, 4H), 2.67 (t, J=6.7 Hz, 2H), 2.51-2.35 (m, 12H), 1.51 (d, J=6.9 Hz, 3H), 1.36 (s, 9H); [M+H]⁺=840.6.

Example 40: (R)-3-(tert-butyl)-N-(1-(4-(6-((5-(4-(1-(4-(2,4-dioxotetrahydropyrimidin-1(2H)-yl)phenyl)azetidin-3-yl)piperazin-1-yl)pyridin-2-yl)amino)pyrimidin-4-yl)-2-methylphenyl)ethyl)-1,2,4-oxadiazole-5-carboxamide

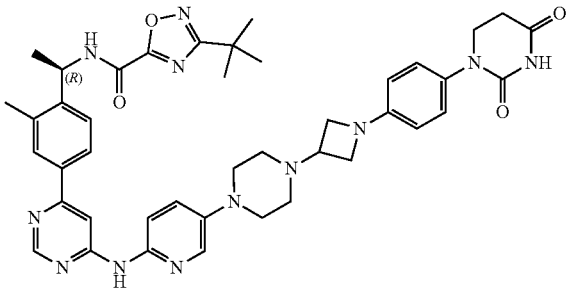

The titled compound was synthesized in the procedures similar to Example 15. ¹H NMR (500 MHz, DMSO) δ 10.23 (s, 1H), 9.99 (s, 1H), 9.88 (d, J=5.0 Hz, 1H), 8.70 (s, 1H), 8.05-8.03 (m, 2H), 7.84-7.83 (m, 2H), 7.68 (s, 1H), 7.61 (d, J=5.0 Hz, 1H), 7.47 (d, J=5.0 Hz, 1H), 7.12 (d, J=5.0 Hz, 2H), 6.45 (d, J=5.0 Hz, 2H), 5.35-5.32 (m, 1H), 3.96-3.94 (m, 2H), 3.68-3.63 (m, 4H), 3.36-3.32 (m, 1H), 3.16 (s, 4H), 2.69-2.66 (m, 2H), 2.56-2.54 (m, 4H), 2.47 (s, 3H), 1.52 (d, J=5.0 Hz, 3H), 1.36 (s, 9H); [M+H]⁺=785.5.

Example 41: 3-(tert-butyl)-N-((1R)-1-(4-(6-((5-(4-(1-(4-(2,6-dioxopiperidin-3-yl)phenyl)azetidin-3-yl)piperazin-1-yl)pyridin-2-yl)amino)pyrimidin-4-yl)-2-methylphenyl)ethyl)-1,2,4-oxadiazole-5-carboxamide Step 1: 3-(tert-butyl)-N-((1R)-1-(4-(6-((5-(4-(1-(4-(2,6-dioxo-1-((2-(trimethylsilyl)ethoxy)methyl)piperidin-3-yl)phenyl)azetidin-3-yl)piperazin-1-yl)pyridin-2-yl)amino)pyrimidin-4-yl)-2-methylphenyl)ethyl)-1,2,4-oxadiazole-5-carboxamide

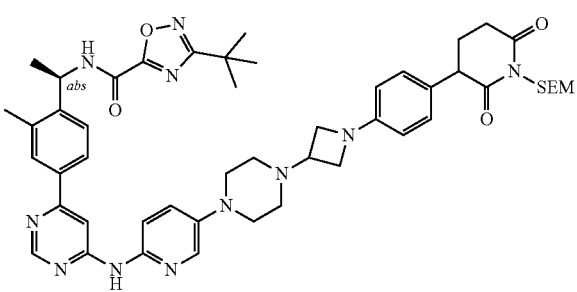 [SMILES: Cc1cc(-c2cc(Nc3ccc(N4CCN(C5CN(c6ccc(C7CCC(=O)N(COCC[Si](C)(C)C)C7=O)cc6)C5)CC4)cn3)ncn2)ccc1[C@@H](C)NC(=O)c1nc(C(C)(C)C)no1]

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.08 g, 0.148 mmol) and 3-(4-(3-oxoazetidin-1-yl)phenyl)-1-((2-(trimethylsilyl)ethoxy)methyl)piperidine-2,6-dione (0.086 g, 0.221 mmol) in 1,2-dichloroethane (10 mL) and HOAc (25 mg) was stirred in a round bottom flask at room temperature for 0.5 hour. To the mixture was added NaBH(OAc)₃ (0.785 g, 0.37 mmol) and stirred at room temperature for 3 hours. Then the mixture was evaporated in vacuum to afford the crude product, which was purified by silica gel column chromatography, eluted with 1%-15% MeOH in DCM to afford the product (0.108 g, 80%). [M+H]⁺=914.4.

Step 2: 3-(tert-butyl)-N-((1R)-1-(4-(6-((5-(4-(1-(4-(2,6-dioxopiperidin-3-yl)phenyl)azetidin-3-yl)piperazin-1-yl)pyridin-2-yl)amino)pyrimidin-4-yl)-2-methylphenyl)ethyl)-1,2,4-oxadiazole-5-carboxamide

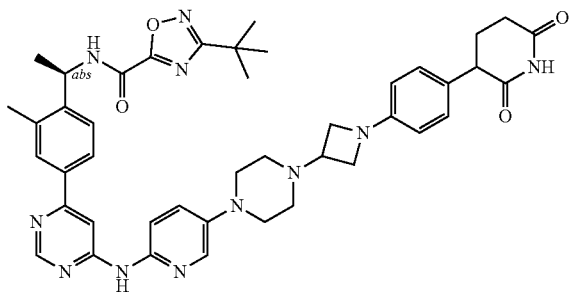 [SMILES: Cc1cc(-c2cc(Nc3ccc(N4CCN(C5CN(c6ccc(C7CCC(=O)NC7=O)cc6)C5)CC4)cn3)ncn2)ccc1[C@@H](C)NC(=O)c1nc(C(C)(C)C)no1]

A mixture of 3-(tert-butyl)-N-((1R)-1-(4-(6-((5-(4-(1-(4-(2,6-dioxo-1-((2-(trimethylsilyl)ethoxy)methyl)piperidin-3-yl)phenyl)azetidin-3-yl)piperazin-1-yl)pyridin-2-yl)amino)pyrimidin-4-yl)-2-methylphenyl)ethyl)-1,2,4-oxadiazole-5-carboxamide (0.108 g, 0.118 mmol) and trifluoroacetic acid (5 mL) in dichloromethane (5 mL) was stirred in a round bottom flask at room temperature overnight. The mixture was evaporated in vacuum to afford brown oil. Then MeOH (5 mL) and NH₃/H₂O (2 mL) were added to the residue and the mixture was allowed to stir at 0° C. for 30 min. LCMS showed the reaction was completed. The mixture was evaporated in vacuum to afford the crude product, which was purified by pre-HPLC to afford the product (15.51 mg, 17%). ¹H NMR (500 MHz, DMSO) δ 10.75 (s, 1H), 9.99 (s, 1H), 9.88 (d, J=7.8 Hz, 1H), 8.70 (s, 1H), 8.09 (d, J=43.9 Hz, 2H), 7.83 (d, J=5.7 Hz, 2H), 7.69 (s, 1H), 7.60 (d, J=8.6 Hz, 1H), 7.47 (d, J=8.7 Hz, 1H), 7.02 (d, J=8.2 Hz, 2H), 6.42 (d, J=8.0 Hz, 2H), 5.33 (t, J=7.2 Hz, 1H), 5.08 (d, J=7.2 Hz, 1H), 4.01-3.82 (m, 2H), 3.75-3.55 (m, 2H), 3.16 (s, 4H), 2.75-2.45 (m, 9H), 2.16-1.96 (m, 1H), 1.51 (d, J=6.9 Hz, 3H), 1.36 (s, 9H); [M+H]⁺=784.6.

Example 42: 3-(tert-butyl)-N-((1R)-1-(4-(6-((5-(4-(1'-(4-(2,6-dioxopiperidin-3-yl)phenyl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide

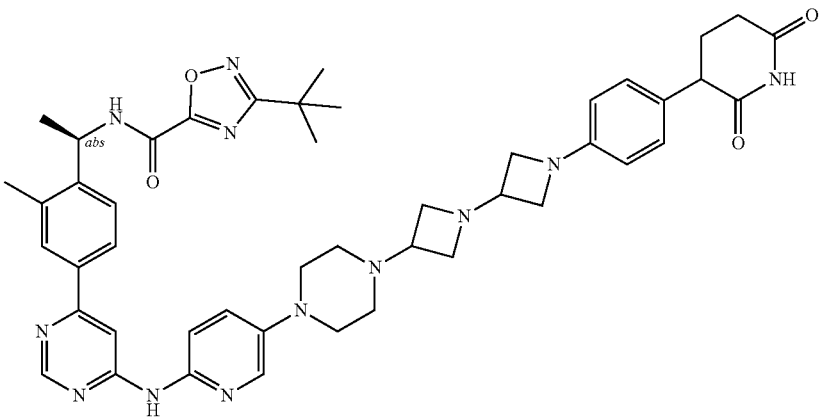 [SMILES: Cc1cc(-c2cc(Nc3ccc(N4CCN(C5CN(C6CN(c7ccc(C8CCC(=O)NC8=O)cc7)C6)C5)CC4)cn3)ncn2)ccc1[C@@H](C)NC(=O)c1nc(C(C)(C)C)no1]

The titled compound was synthesized in the procedures similar to Example 41. $^1$H NMR (400 MHz, DMSO) δ 10.78 (s, 1H), 10.03 (s, 1H), 9.91 (d, J=7.7 Hz, 1H), 8.71 (s, 1H), 8.05 (d, J=16.0 Hz, 2H), 7.83 (d, J=7.6 Hz, 2H), 7.70 (s, 1H), 7.60 (d, J=8.0 Hz, 1H), 7.49 (d, J=8.0 Hz, 1H), 7.05 (d, J=8.0 Hz, 2H), 6.47 (d, J=7.6 Hz, 2H), 5.38-5.28 (m, 1H), 4.72-3.66 (m, 10H), 3.25-2.85 (m, 6H), 2.70-2.41 (m, 11H), 2.20-1.95 (m, 2H), 1.51 (d, J=6.8 Hz, 3H), 1.36 (s, 9H); [M+H]$^+$=839.7.

Example 43: (R)-3-(tert-butyl)-N-(1-(4-(6-((5-(4-(7-(4-(2,4-dioxotetrahydropyrimidin-1(2H)-yl)phenyl)-7-azaspiro[3.5]nonan-2-yl)piperazin-1-yl)pyridin-2-yl)amino)pyrimidin-4-yl)-2-methylphenyl)ethyl)-1,4-oxadiazole-5-carboxamide

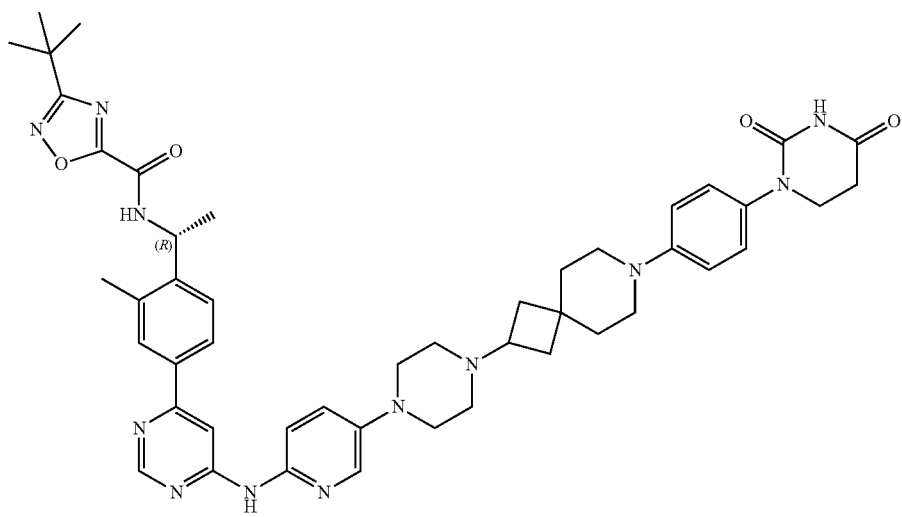

The titled compound was synthesized in the procedures similar to Example 15. $^1$H NMR (500 MHz, DMSO) δ 10.25 (s, 1H), 9.98 (s, 1H), 9.88 (d, J=7.8 Hz, 1H), 8.70 (s, 1H), 8.03 (d, J=2.7 Hz, 2H), 7.83 (d, J=5.9 Hz, 2H), 7.68 (s, 1H), 7.60 (d, J=8.7 Hz, 1H), 7.45 (dd, J=9.1, 2.9 Hz, 1H), 7.13 (d, J=8.9 Hz, 2H), 6.93 (d, J=9.1 Hz, 2H), 5.38-5.28 (m, 1H), 3.69 (t, J=6.7 Hz, 2H), 3.13 (s, 6H), 3.05 (s, 2H), 2.79-2.71 (m, 1H), 2.68 (t, J=6.7 Hz, 2H), 2.47 (s, 3H), 2.41 (s, 4H), 2.01 (t, J=8.5 Hz, 2H), 1.68 (s, 2H), 1.64-1.56 (m, 4H), 1.51 (d, J=7.0 Hz, 3H), 1.36 (s, 9H); [M+H]$^+$=853.6.

Example 44: 3-(tert-butyl)-N-((1R)-1-(4-(6-((5-(4-(1'-(2-(2,6-dioxopiperidin-3-yl)-1,3-dioxoisoindolin-5-yl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide Step 1: 3-(tert-butyl)-N-((1R)-1-(4-(6-((5-(4-(1'-(2-(2,6-dioxo-1-((2-(trimethylsilyl)ethoxy)methyl)piperidin-3-yl)-1,3-dioxoisoindolin-5-yl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide

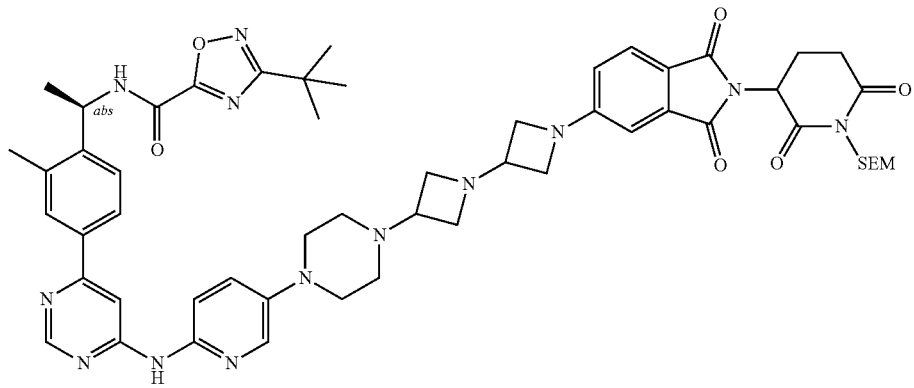 [SMILES: Cc1cc(-c2cc(Nc3ccc(N4CCN(C5CN(C6CN(c7ccc8c(c7)C(=O)N(C7CCC(=O)N(COCC[Si](C)(C)C)C7=O)C8=O)C6)C5)CC4)cn3)ncn2)ccc1[C@@H](C)NC(=O)c1nc(C(C)(C)C)no1]

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.12 g, 0.222 mmol) and 2-(2,6-dioxo-1-((2-(trimethylsilyl)ethoxy)methyl)piperidin-3-yl)-5-(3-oxo-[1,3'-biazetidin]-1'-yl)isoindoline-1,3-dione (0.171 g, 0.333 mmol) in 1,2-dichloroethane (10 mL) and HOAc (25 mg) was stirred in a round bottom flask at room temperature for 0.5 hour. To the mixture was added NaBH(OAc)$_3$ (0.117 g, 0.55 mmol) and stirred at room temperature for 12 hours. Then the mixture was evaporated in vacuum to afford the crude product, which was purified by silica gel column chromatography, eluted with 1%-15% MeOH in DCM to afford the product (0.185 g, 81%). [M+H]$^+$=1038.5.

Step 2: 3-(tert-butyl)-N-((1R)-1-(4-(6-((5-(4-(1'-(2-(2,6-dioxopiperidin-3-yl)-1,3-dioxoisoindolin-5-yl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide

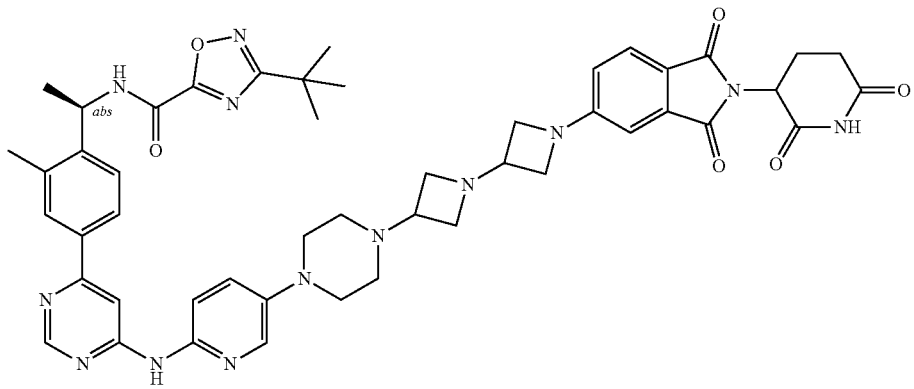 [SMILES: Cc1cc(-c2cc(Nc3ccc(N4CCN(C5CN(C6CN(c7ccc8c(c7)C(=O)N(C7CCC(=O)NC7=O)C8=O)C6)C5)CC4)cn3)ncn2)ccc1[C@@H](C)NC(=O)c1nc(C(C)(C)C)no1]

A mixture of 3-(tert-butyl)-N-((1R)-1-(4-(6-((5-(4-(1'-(2-(2,6-dioxo-1-((2-(trimethylsilyl)ethoxy)methyl)piperidin-3-yl)-1,3-dioxoisoindolin-5-yl)-[1,3'-biazetidin]-3-yl)piperazin-1-yl)pyridin-2-yl)amino)pyrimidin-4-yl)-2-methylphenyl)ethyl)-1,2,4-oxadiazole-5-carboxamide (0.185 g, 0.178 mmol) and trifluoroacetic acid (5 mL) in dichloromethane (5 mL) was stirred in a round bottom flask at room temperature overnight. The mixture was evaporated in vacuum to afford brown oil. Then MeOH (5 mL) and NH$_3$/H$_2$O (2 mL) were added to the residue and the mixture was allowed to stir at 0° C. for 30 min. LCMS showed the reaction was completed. The mixture was evaporated in vacuum to afford the crude product, which was purified by pre-HPLC to afford the product (40.13 mg, 25%). $^1$H NMR (500 MHz, DMSO) δ 11.07 (s, 1H), 9.99 (s, 1H), 9.88 (d, J=7.8 Hz, 1H), 8.70 (s, 1H), 8.04 (d, J=2.4 Hz, 2H), 7.83 (d, J=5.6 Hz, 2H), 7.73-7.55 (m, 3H), 7.48-7.41 (m, 1H), 6.80 (s, 1H), 6.66 (d, J=8.4 Hz, 1H), 5.38-5.30 (m, 1H), 5.05 (dd, J=12.8, 5.2 Hz, 1H), 4.05 (t, J=7.8 Hz, 2H), 3.81 (dd, J=8.7, 4.2 Hz, 2H), 3.64 (s, 1H), 3.42 (s, 2H), 3.13 (s, 4H), 2.99 (s, 3H), 2.88 (t, J=12.8 Hz, 1H), 2.65-2.35 (m, 9H), 2.05-1.97 (m, 1H), 1.51 (d, J=6.9 Hz, 3H), 1.36 (s, 9H); [M+H]$^+$=908.6.

Example 45: 3-(tert-butyl)-N-((1R)-1-(4-(6-((5-(4-(4-(2,6-dioxopiperidin-3-yl)-3,5-difluorophenethyl)piperazin-1-yl)pyridin-2-yl)amino)pyrimidin-4-yl)-2-methylphenyl)ethyl)-1,2,4-oxadiazole-5-carboxamide Example 46: 3-(tert-butyl)-N—((R)-1-(4-(6-((5-(4-(4-((R)-2,6-dioxopiperidin-3-yl)-3,5-difluorophenethyl)piperazin-1-yl)pyridin-2-yl)amino)pyrimidin-4-yl)-2-methylphenyl)ethyl)-1,2,4-oxadiazole-5-carboxamide

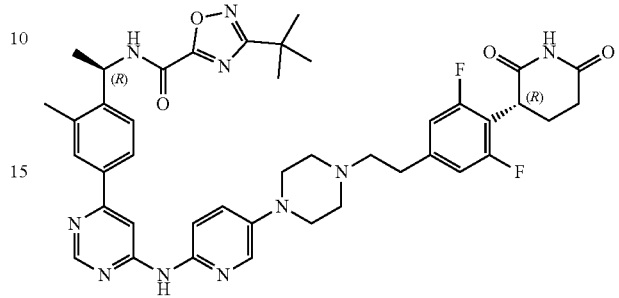

The titled compound was synthesized in the procedures similar to Example 15. $^1$H NMR (500 MHz, DMSO) δ 10.95 (s, 1H), 9.99 (s, 1H), 9.89 (d, J=5.0 Hz, 1H), 8.70 (s, 1H), 8.05-8.03 (m, 2H), 7.84-7.83 (m, 2H), 7.69-7.60 (m, 2H), 7.46 (dd, J=10.0 Hz, 5.0 Hz, 1H), 7.06 (d, J=10.0 Hz, 2H), 5.35-5.31 (m, 1H), 4.22-4.18 (m, 1H), 3.14 (s, 4H), 2.83-2.77 (m, 3H), 2.62-2.60 (m, 5H), 2.47 (s, 3H), 2.15-2.11 (m, 1H), 2.01-1.99 (m, 1H), 1.51 (d, J=5.0 Hz, 3H), 1.38-1.34 (m, 9H), 1.23-1.18 (m, 2H); [M+H]$^+$=793.7.

Example 47: 3-(tert-butyl)-N-((1R)-1-(4-(6-((5-(4-(4-(2,6-dioxopiperidin-3-yl)-3-fluorophenethyl)piperazin-1-yl)pyridin-2-yl)amino)pyrimidin-4-yl)-2-methylphenyl)ethyl)-1,2,4-oxadiazole-5-carboxamide

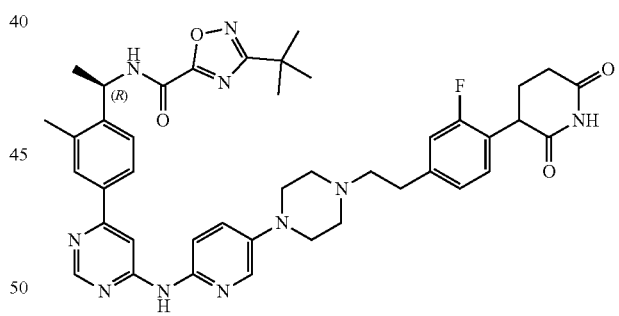

The titled compound was synthesized in the procedures similar to Example 15. $^1$H NMR (500 MHz, DMSO) δ 10.95 (s, 1H), 9.99 (s, 1H), 9.89 (d, J=5.0 Hz, 1H), 8.70 (s, 1H), 8.05-8.03 (m, 2H), 7.84-7.83 (m, 2H), 7.68-7.60 (m, 2H), 7.46 (d, J=10.0 Hz, 1H), 7.06 (d, J=10.0 Hz, 2H), 5.35-5.31 (m, 1H), 4.22-4.18 (m, 1H), 3.14 (s, 4H), 2.82-2.77 (m, 3H), 2.62-2.60 (m, 5H), 2.47 (s, 3H), 2.15-2.09 (m, 1H), 2.01-1.98 (m, 1H), 1.51 (d, J=5.0 Hz, 3H), 1.38-1.34 (m, 9H), 1.23-1.18 (m, 2H); [M+H]$^+$=793.5.

The titled compound was synthesized in the procedures similar to Example 15. $^1$H NMR (500 MHz, DMSO) δ 10.86 (s, 1H), 9.99 (s, 1H), 9.88 (d, J=10.0 Hz, 1H), 8.70 (s, 1H), 8.05-8.04 (m, 2H), 7.84-7.83 (m, 2H), 7.68-7.60 (m, 2H), 7.46 (d, J=10.0 Hz, 1H), 7.23-7.20 (m, 1H), 7.11 (d, J=10.0 Hz, 1H), 7.07 (d, J=10.0 Hz, 1H), 5.35-5.31 (m, 1H), 4.02-3.98 (m, 1H), 3.14 (s, 4H), 2.81-2.71 (m, 3H), 2.61-2.60 (m, 5H), 2.47 (s, 3H), 2.20-2.17 (m, 1H), 2.00-1.97 (m, 1H), 1.51 (d, J=5.0 Hz, 3H), 1.38-1.34 (m, 9H), 1.23-1.17 (m, 2H); [M+H]$^+$=775.5.

Example 48: 3-(tert-butyl)-N-((1R)-1-(4-(6-((5-(4-(4-(2,6-dioxopiperidin-3-yl)-3-methylphenethyl)piperazin-1-yl)pyridin-2-yl)amino)pyrimidin-4-yl)-2-methylphenyl)ethyl)-1,2,4-oxadiazole-5-carboxamide

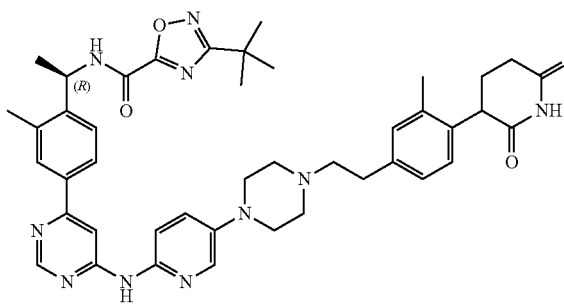

The titled compound was synthesized in the procedures similar to Example 15. ¹H NMR (500 MHz, DMSO) δ 10.81 (s, 1H), 9.99 (s, 1H), 9.88 (d, J=10.0 Hz, 1H), 8.70 (s, 1H), 8.05-8.04 (m, 2H), 7.84-7.83 (m, 2H), 7.68 (s, 1H), 7.61 (d, J=5.0 Hz, 1H), 7.46 (d, J=10.0 Hz, 1H), 7.07-7.00 (m, 3H), 5.35-5.31 (m, 1H), 4.01-3.97 (m, 1H), 3.15 (s, 4H), 2.76-2.69 (m, 3H), 2.61-2.55 (m, 5H), 2.47 (s, 3H), 2.24 (s, 3H), 2.17-2.14 (m, 1H), 1.98-1.95 (m, 1H), 1.51 (d, J=5.0 Hz, 3H), 1.38-1.34 (m, 9H), 1.27-1.18 (m, 2H); [M+H]⁺=771.6.

Example 49: 3-(tert-butyl)-N-((1R)-1-(4-(6-((5-(4-(2-(3-(2,6-dioxopiperidin-3-yl)-2-oxo-2,3-dihydrobenzo[d]oxazol-6-yl)ethyl)piperazin-1-yl)pyridin-2-yl)amino)pyrimidin-4-yl)-2-methylphenyl)ethyl)-1,2,4-oxadiazole-5-carboxamide

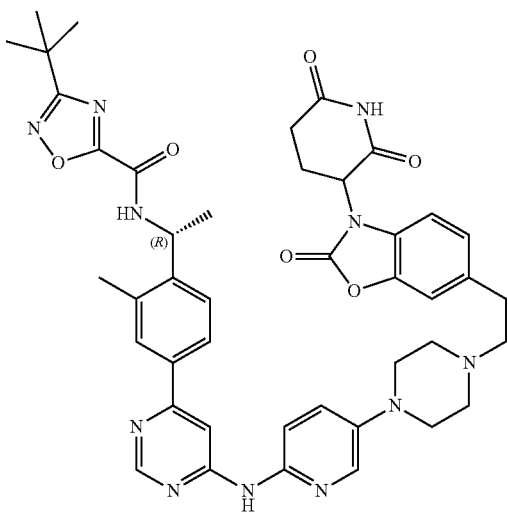

The titled compound was synthesized in the procedures similar to Example 15. ¹H NMR (500 MHz, DMSO) δ 11.20 (s, 1H), 9.99 (s, 1H), 9.89 (d, J=5.0 Hz, 1H), 8.70 (s, 1H), 8.05 (d, J=5.0 Hz, 1H), 8.03 (s, 1H), 7.84-7.83 (m, 2H), 7.68 (s, 1H), 7.61 (d, J=5.0 Hz, 1H), 7.46 (dd, J=10.0 Hz, 5.0 Hz, 1H), 7.33 (s, 1H), 7.17 (d, J=10.0 Hz, 1H), 7.11 (d, J=10.0 Hz, 1H), 5.37-5.31 (m, 2H), 3.14 (s, 4H), 2.89-2.81 (m, 3H), 2.71-2.57 (m, 8H), 2.47 (s, 3H), 2.17-2.14 (m, 1H), 1.52 (d, J=5.0 Hz, 3H), 1.36 (s, 9H); [M+H]⁺=814.7.

Example 50: 3-(tert-butyl)-N-((1R)-1-(4-(6-((5-(4-(2-(1-(2,6-dioxopiperidin-3-yl)-3-methyl-2-oxo-2,3-dihydro-1H-benzo[d]imidazol-4-yl)ethyl)piperazin-1-yl)pyridin-2-yl)amino)pyrimidin-4-yl)-2-methylphenyl)ethyl)-1,2,4-oxadiazole-5-carboxamide

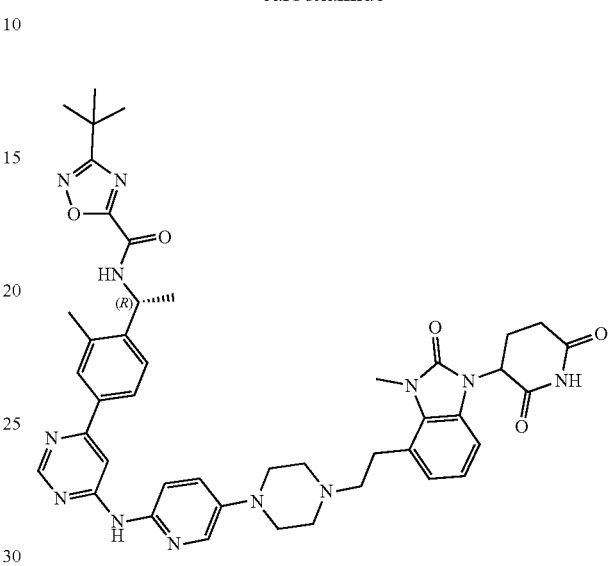

The titled compound was synthesized in the procedures similar to Example 15. ¹H NMR (500 MHz, DMSO) δ 11.209 (s, 1H), 9.99 (s, 1H), 9.89 (d, J=5.0 Hz, 1H), 8.70 (s, 1H), 8.05 (d, J=5.0 Hz, 1H), 8.03 (s, 1H), 7.84-7.83 (m, 2H), 7.68 (s, 1H), 7.61 (d, J=10.0 Hz, 1H), 7.46 (dd, J=10.0 Hz, 5.0 Hz, 1H), 6.99-6H 0.1 (1, H) 0.0953 Hz, H), 7.1 (1H,3H)) 3.16-3.10 (m, 6H, 2.9-2.1 (m, 1H), 2.89-2.86 (m, 1H), 2.47 (s, 3H), 2.17-1.99 (m, 1H), 1.52 (d, J=5.0 Hz, 3H), 1.36 (s, 9H); [M+]⁺=827.7.

Example 51: 3-(tert-butyl)-N-((1R)-1-(4-(6-((5-(4-(2-(3-(2,6-dioxopiperidin-3-yl)-2-oxo-2,3-dihydrobenzo[d]oxazol-7-yl)ethyl)piperazin-1-yl)pyridin-2-yl)amino)pyrimidin-4-yl)-2-methylphenyl)ethyl)-1,2,4-oxadiazole-5-carboxamide formate

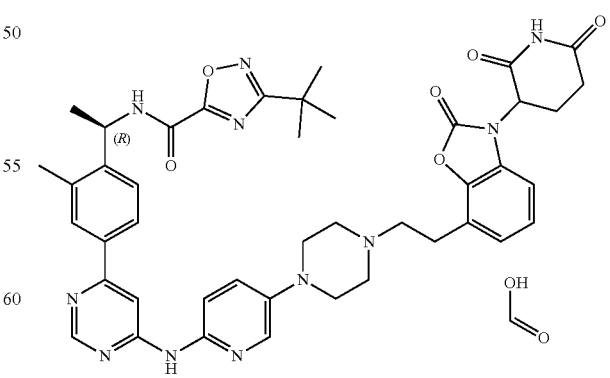

The titled compound was synthesized in the procedures similar to Example 15. ¹H NMR (500 MHz, DMSO) δ 11.21 (s, 1H), 9.99 (s, 1H), 9.88 (d, J=10.0 Hz, 1H), 8.70 (s, 1H), 8.13 (s, 1H), 8.05 (d, J=5.0 Hz, 1H), 8.03 (s, 1H), 7.84-7.83 (m, 2H), 7.69 (s, 1H), 7.61 (d, J=5.0 Hz, 1H), 7.46 (dd, J=10.0 Hz, 5.0 Hz, 1H), 7.17-7.09 (m, 3H), 5.38-5.32 (m, 2H), 3.15 (s, 4H), 2.93-2.86 (m, 3H), 2.72-2.64 (m, 8H), 2.47 (s, 3H), 2.18-2.15 (m, 1H), 1.52 (d, J=5.0 Hz, 3H), 1.36 (s, 9H); [M+H]$^+$=814.1.

Example 52: 3-(tert-butyl)-N—((R)-1-(4-(6-((5-(4-((1S,3s)-3-(4-(((R)-2,6-dioxopiperidin-3-yl)amino) phenyl)cyclobutyl)piperazin-1-yl)pyridin-2-yl) amino)pyrimidin-4-yl)-2-methylphenyl)ethyl)-1,2,4-oxadiazole-5-carboxamide

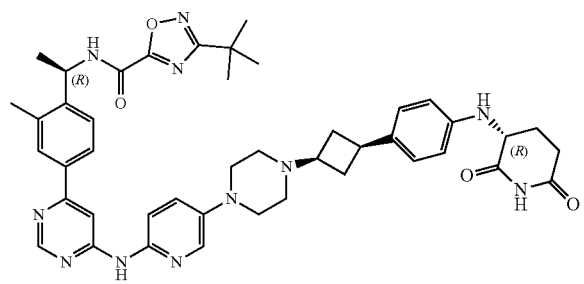

The titled compound was synthesized in the procedures similar to Example 15. $^1$H NMR (500 MHz, DMSO) δ 10.76 (s, 1H), 9.99 (s, 1H), 9.89 (d, J=5.0 Hz, 1H), 8.70 (s, 1H), 8.04 (s, 2H), 7.84-7.83 (m, 2H), 7.68 (s, 1H), 7.61 (d, J=10.0 Hz, 1H), 7.46 (dd, J=10.0 Hz, 5.0 Hz, 1H), 6.97 (d, J=10.0 Hz, 2H), 6.62 (d, J=10.0 Hz, 2H), 5.68 (d, J=5.0 Hz, 1H), 5.36-5.31 (m, 1H), 4.30-4.26 (m, 1H), 3.14 (s, 4H), 3.00-2.95 (m, 1H), 2.77-2.66 (m, 3H), 2.47-2.40 (m, 9H), 2.12-2.08 (m, 1H), 1.88-1.76 (m, 3H), 1.52 (d, J=5.0 Hz, 3H), 1.36 (s, 9H); [M+H]$^+$=798.2.

Example 53: 3-(tert-butyl)-N—((R)-1-(4-(6-((5-(4-((1S,3r)-3-(4-(((S)-2,6-dioxopiperidin-3-yl)amino) phenyl)cyclobutyl)piperazin-1-yl)pyridin-2-yl) amino)pyrimidin-4-yl)-2-methylphenyl)ethyl)-1,2,4-oxadiazole-5-carboxamide formate

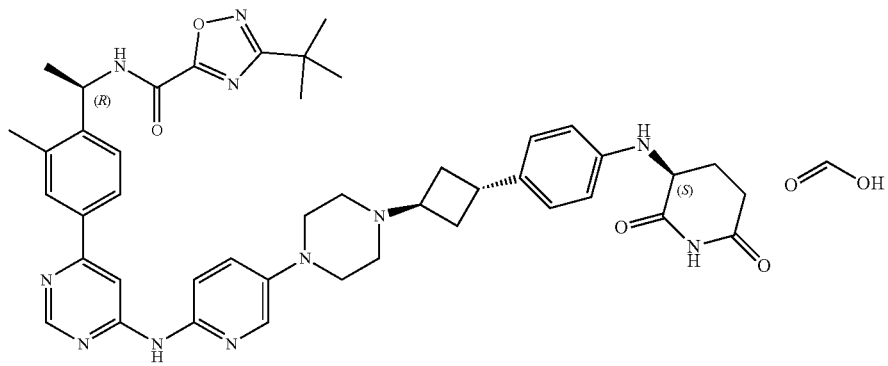

The titled compound was synthesized in the procedures similar to Example 15. $^1$H NMR (500 MHz, DMSO) δ 10.78 (s, 1H), 10.07 (s, 1H), 9.89-9.74 (m, 2H), 8.72 (s, 1H), 8.13-8.05 (m, 2H), 7.84-7.83 (m, 2H), 7.74 (s, 1H), 7.61 (d, J=5.0 Hz, 1H), 7.55-7.47 (m, 1H), 7.06 (d, J=10.0 Hz, 2H), 6.66 (d, J=10.0 Hz, 2H), 5.78-5.69 (m, 1H), 5.36-5.30 (m, 1H), 4.30 (s, 1H), 4.00-3.86 (m, 2H), 3.54-3.43 (m, 2H), 3.15-2.89 (m, 5H), 2.78-2.71 (m, 2H), 2.64-2.54 (m, 2H), 2.47 (s, 3H), 2.36-2.35 (m, 2H), 2.12-2.09 (m, 2H), 1.91-1.84 (m, 1H), 1.52 (d, J=5.0 Hz, 3H), 1.36 (s, 9H); [M+H]$^+$=798.2.

Example 54: 3-(tert-butyl)-N—((R)-1-(4-(6-((5-(4-((1R,3s)-3-(4-(((S)-2,6-dioxopiperidin-3-yl)amino) phenyl)cyclobutyl)piperazin-1-yl)pyridin-2-yl) amino)pyrimidin-4-yl)-2-methylphenyl)ethyl)-1,2,4-oxadiazole-5-carboxamide

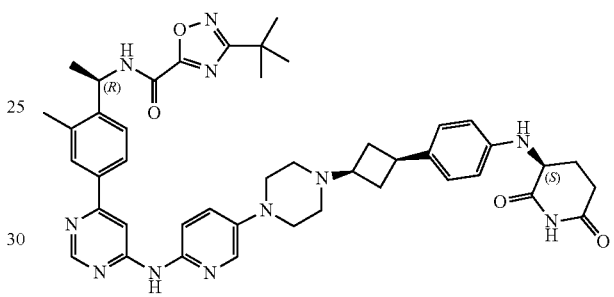

The titled compound was synthesized in the procedures similar to Example 15. $^1$H NMR (500 MHz, DMSO) δ 10.76 (s, 1H), 9.99 (s, 1H), 9.89 (d, J=5.0 Hz, 1H), 8.70 (s, 1H), 8.04 (s, 2H), 7.84-7.83 (m, 2H), 7.68 (s, 1H), 7.61 (d, J=5.0 Hz, 1H), 7.46 (dd, J=10.0 Hz, 5.0 Hz, 1H), 6.97 (d, J=10.0 Hz, 2H), 6.62 (d, J=10.0 Hz, 2H), 5.67 (d, J=10.0 Hz, 1H), 5.36-5.31 (m, 1H), 4.30-4.26 (m, 1H), 3.14 (s, 4H), 3.00-2.97 (m, 1H), 2.73-2.64 (m, 2H), 2.59-2.54 (m, 1H), 2.45-2.40 (m, 9H), 2.12-2.08 (m, 1H), 1.88-1.76 (m, 3H), 1.52 (d, J=5.0 Hz, 3H), 1.36 (s, 9H); [M+H]$^+$=798.2.

Example 55: 3-(tert-butyl)-N—((R)-1-(4-(6-((5-(4-((1R,3r)-3-(4-(((R)-2,6-dioxopiperidin-3-yl)amino)phenyl)cyclobutyl)piperazin-1-yl)pyridin-2-yl)amino)pyrimidin-4-yl)-2-methylphenyl)ethyl)-1,2,4-oxadiazole-5-carboxamide

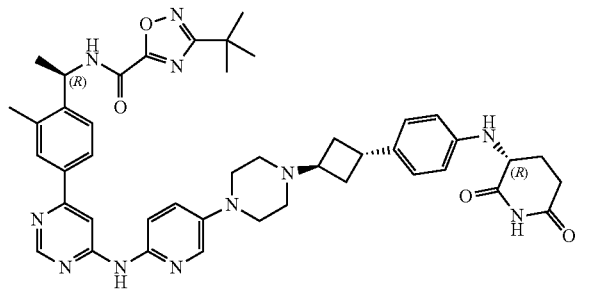

The titled compound was synthesized in the procedures similar to Example 15. ¹H NMR (500 MHz, DMSO) δ 10.78 (s, 1H), 10.07 (s, 1H), 9.90-9.74 (m, 2H), 8.72 (s, 1H), 8.13-8.05 (m, 2H), 7.84-7.83 (m, 2H), 7.74 (s, 1H), 7.61 (d, J=5.0 Hz, 1H), 7.55-7.47 (m, 1H), 7.06 (d, J=5.0 Hz, 2H), 6.66 (d, J=5.0 Hz, 2H), 5.78-5.69 (m, 1H), 5.36-5.30 (m, 1H), 4.30 (s, 1H), 4.01-3.86 (m, 2H), 3.54-3.43 (m, 2H), 3.15-2.99 (m, 4H), 2.78-2.71 (m, 2H), 2.64-2.54 (m, 3H), 2.47 (s, 3H), 2.36-2.35 (m, 2H), 2.12-2.09 (m, 2H), 1.91-1.84 (m, 1H), 1.52 (d, J=5.0 Hz, 3H), 1.36 (s, 9H); [M+H]⁺=798.2.

Example 56: (R)-3-(tert-butyl)-N-(1-(4-(6-((5-(4-(2-(3-(2,4-dioxotetrahydropyrimidin-1(2H)-yl)phenyl)acetyl)piperazin-1-yl)pyridin-2-yl)amino)pyrimidin-4-yl)-2-methylphenyl)ethyl)-1,2,4-oxadiazole-5-carboxamide

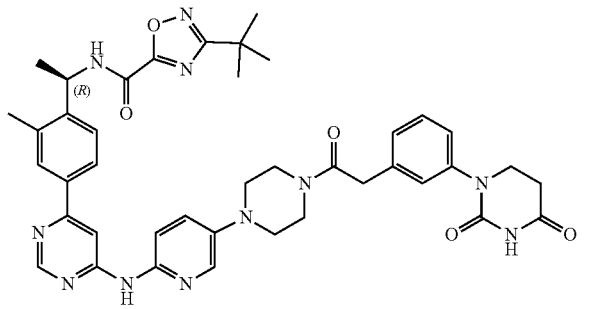

The titled compound was synthesized in the procedures similar to Example 15. ¹H NMR (500 MHz, DMSO) δ 10.36 (s, 1H), 10.01 (s, 1H), 9.89 (d, J=5.0 Hz, 1H), 8.71 (s, 1H), 8.04 (d, J=5.0 Hz, 1H), 8.03 (s, 1H), 7.84-7.83 (m, 2H), 7.70 (s, 1H), 7.61 (d, J=5.0 Hz, 1H), 7.46 (dd, J=10.0 Hz, 5.0 Hz, 1H), 7.35-7.32 (m, 1H), 7.22-7.19 (m, 2H), 7.12 (d, J=10.0 Hz, 1H), 5.35-5.32 (m, 1H), 3.80-3.76 (m, 4H), 3.66-3.64 (m, 4H), 3.10-3.06 (m, 4H), 2.71-2.69 (m, 2H), 2.47 (s, 3H), 1.52 (d, J=5.0 Hz, 3H), 1.36 (s, 9H); [M+H]⁺=772.0.

Example 57: (R)-3-(tert-butyl)-N-(1-(4-(6-((5-(4-((1-(3-((2,4-dioxotetrahydropyrimidin-1(2H)-yl)methyl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide Step 1: 3-((2-(trimethylsilyl)ethoxy)methyl)dihydropyrimidine-2,4(1H,3H)-dione

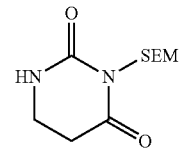

To a stirred mixture of 5,6-dihydrouracil (14 g, 122.695 mmol) and Cs₂CO₃ (79.95 g, 245.390 mmol) in DMF (280 mL) was added SEMCl (26.11 mL, 147.234 mmol) dropwise at 0° C. under nitrogen atmosphere. The resulting mixture was stirred for 16 h at room temperature under nitrogen atmosphere and filtered. The filter cake was washed with EtOAc (2×200 mL). The filtrate was concentrated under reduced pressure. The resulting mixture was diluted with water (200 mL) and extracted with EtOAc (3×300 mL). The combined organic layers were washed with brine (2×100 mL) and dried over anhydrous Na₂SO₄. After filtration, the filtrate was concentrated under reduced pressure. The residue was purified by silica gel column chromatography, eluted with MeOH in DCM (0-5%) to afford the product (14 g, 47%). [M+H]⁺=245.0.

Step 2: 1-(3-bromobenzyl)-3-((2-(trimethylsilyl)ethoxy)methyl)dihydropyrimidine-2,4(1H,3H)-dione

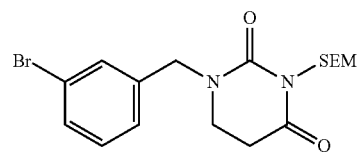 [SMILES: C[Si](C)(C)CCOCN1C(=O)CCN(Cc2cccc(Br)c2)C1=O]

To a stirred mixture of 3-((2-(trimethylsilyl)ethoxy)methyl)dihydropyrimidine-2,4(1H,3H)-dione (4 g, 16.369 mmol) in DMF (60 mL) was added NaH (720 mg, 18.006 mmol) in portions at 0° C. under nitrogen atmosphere. The resulting mixture was stirred for 0.5 h at 0° C. under nitrogen atmosphere. To the above mixture was added 1-bromo-3-(bromomethyl)benzene (4.5 g, 18.006 mmol) in DMF (30 mL) dropwise at 0° C. The resulting mixture was stirred for 16 h at room temperature and quenched with sat. NH₄Cl (aq.) at 0° C. The resulting mixture was extracted with EtOAc (3×300 mL). The combined organic layers were washed with brine (2×100 mL) and dried over anhydrous Na₂SO₄. After filtration, the filtrate was concentrated under reduced pressure. The residue was purified by silica gel column chromatography, eluted with EtOAc in PE (0-30%) to afford the product (3.3 g, 49%). [M+H]⁺=413.1.

Step 3: 1-(3-(4-(1,3-dioxolan-2-yl)piperidin-1-yl)benzyl)-3-((2-(trimethylsilyl)ethoxy)methyl)dihydropyrimidine-2,4(1H,3H)-dione

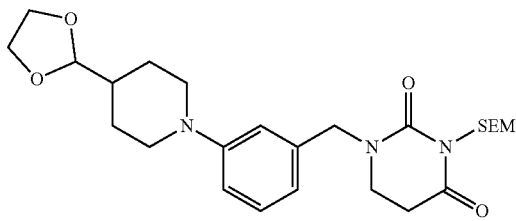 [SMILES: C[Si](C)(C)CCOCN1C(=O)CCN(Cc2cccc(N3CCC(C4OCCO4)CC3)c2)C1=O]

To a stirred mixture of 1-(3-bromobenzyl)-3-((2-(trimethylsilyl)ethoxy)methyl)dihydropyrimidine-2,4(1H,3H)-dione (3 g, 7.257 mmol) and 4-(1,3-dioxolan-2-yl) piperidine (1.37 g, 8.708 mmol) in dioxane (60 mL) were added XPhos Pd G3 (921 mg, 1.089 mmol), XPhos (1.04 g, 2.177 mmol) and Cs₂CO₃ (4.73 g, 14.514 mmol) at room temperature under nitrogen atmosphere. The resulting mixture was stirred for 16 h at 100° C. under nitrogen atmosphere and concentrated under reduced pressure. The residue was purified by silica gel column chromatography, eluted with EtOAc in PE (0-30%) to afford the product (2.77 g, 78%). [M+H]⁺=490.3.

Step 4: 1-(3-(4-(1,3-dioxolan-2-yl)piperidin-1-yl)benzyl)dihydropyrimidine-2,4(1H,3H)-dione

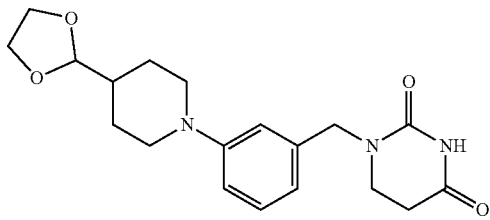 [SMILES: O=C1CCN(Cc2cccc(N3CCC(C4OCCO4)CC3)c2)C(=O)N1]

A solution of 1-(3-(4-(1,3-dioxolan-2-yl)piperidin-1-yl)benzyl)-3-((2-(trimethylsilyl)ethoxy)methyl)dihydropyrimidine-2,4(1H,3H)-dione (2.7 g, 5.514 mmol) in TFA (15 mL) and DCM (60 mL) was stirred for 2 h at room temperature. The resulting mixture was concentrated under reduced pressure. To the residue was added DCM (30 mL) and basified to pH 8 with NH₃·H₂O. The resulting mixture was stirred for 24 h at room temperature and concentrated under reduced pressure. To the resulting mixture was added water (20 mL) and filtered. The filter cake was washed with water (3×10 mL). The solid was dried under infrared light. This resulted in the product (1.64 g, 83%). [M+H]⁺=360.2.

Step 5: 1-(3-((2,4-dioxotetrahydropyrimidin-1(2H)-yl)methyl)phenyl)piperidine-4-carbaldehyde

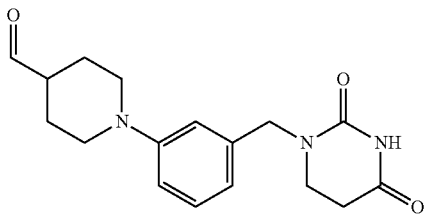 [SMILES: O=CC1CCN(c2cccc(CN3CCC(=O)NC3=O)c2)CC1]

A solution of 1-(3-(4-(1,3-dioxolan-2-yl)piperidin-1-yl)benzyl)dihydropyrimidine-2,4(1H,3H)-dione (1.6 g, 4.452 mmol) in HCl (15 mL) and THF (15 mL) was stirred for 16 h at 40° C. The mixture was basified to pH 6 with NaOH and concentrated under reduced pressure. The residue was purified by reverse phase flash chromatography with the following conditions: Column: Spherical C18, 20-40 um, 120 g; Mobile Phase A: Water (plus 5 mM NH₄HCO₃), Mobile Phase B: ACN; How rate: 60 mL/min; Gradient (B %): 5%-10%, 4 min; 10%-50%, 20 min; 50%-95%; 2 min; 95%, 5 min; Detector: 254 nm. The fractions containing desired product were collected at 30% B and concentrated under reduced pressure to afford the product (1.1552 g, 82%). ¹H NMR (400 MHz, DMSO) δ 10.16 (s, 1H), 9.64 (s, 1H), 7.22-7.13 (m, 1H), 6.89-6.81 (m, 2H), 6.70-6.63 (m, 1H), 4.58-4.36 (m, 2H), 3.74-3.53 (m, 2H), 3.34-3.22 (m, 2H), 2.88-2.77 (m, 2H), 2.62-2.39 (m, 3H), 1.99-1.74 (m, 2H), 1.66-1.18 (m, 2H); [M+H]⁺=316.1.

Step 6: (R)-3-(tert-butyl)-N-(1-(4-(6-((5-(4-((1-(3-((2,4-dioxotetrahydropyrimidin-1(2H)-yl)methyl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide

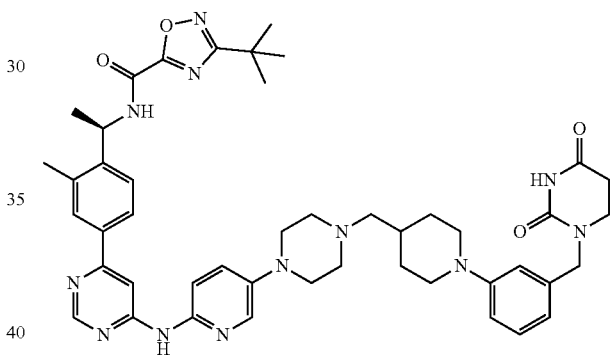

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.06 g, 0.222 mmol) and 1-(3-((2,4-dioxotetrahydropyrimidin-1(2H)-yl)methyl)phenyl)piperidine-4-carbaldehyde (0.028 g, 0.133 mmol) in 1,2-dichloroethane (4 mL) and HOAc (25 mg) was stirred in a round bottom flask at room temperature for 0.5 hour. To the mixture was added NaBH(OAc)₃ (0.036 g, 0.166 mmol) and stirred at room temperature for 12 hours. Then the mixture was evaporated in vacuum to afford the crude product, which was purified by pre-HPLC to afford the product (45.73 mg, 49%). ¹H NMR (500 MHz, DMSO) δ 10.17 (s, 1H), 9.98 (s, 1H), 9.88 (d, J=7.8 Hz, 1H), 8.70 (s, 1H), 8.04 (d, J=2.9 Hz, 2H), 7.83 (d, J=6.0 Hz, 2H), 7.68 (s, 1H), 7.60 (d, J=8.7 Hz, 1H), 7.45 (dd, J=9.2, 2.9 Hz, 1H), 7.16 (t, J=8.1 Hz, 1H), 6.84 (d, J=6.8 Hz, 2H), 6.65 (d, J=7.4 Hz, 1H), 5.33 (t, J=7.3 Hz, 1H), 4.44 (s, 2H), 3.67 (d, J=12.2 Hz, 2H), 3.26 (d, J=6.8 Hz, 3H), 3.14 (s, 4H), 2.66 (t, J=11.0 Hz, 2H), 2.55-2.52 (m, 6H), 2.47 (s, 3H), 2.23 (d, J=7.1 Hz, 2H), 1.81 (d, J=12.0 Hz, 2H), 1.71 (s, 1H), 1.51 (d, J=8.1 Hz, 3H), 1.36 (s, 9H), 1.27-1.16 (m, 2H); [M+H]⁺=841.1.

Example 58: (R)-3-(tert-butyl)-N-(1-(4-(6-((5-(4-(2-(3-((2,4-dioxotetrahydropyrimidin-1(2H)-yl)methyl)-2-oxopyridin-1(2H)-yl)ethyl)piperazin-1-yl)pyridin-2-yl)amino)pyrimidin-4-yl)-2-methylphenyl)ethyl)-1,2,4-oxadiazole-5-carboxamide Step 1: 1-allyl-2-oxo-1,2-dihydropyridine-3-carbaldehyde

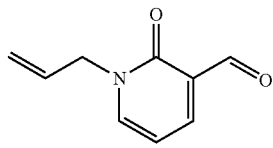

To a stirred solution of 2-oxo-1H-pyridine-3-carbaldehyde (14 g, 113.719 mmol) and allyl bromide (16.5 g, 136.463 mmol) in DMF (300 mL) was added $K_2CO_3$ (31.4 g, 227.438 mmol) in portions at room temperature. The resulting mixture was stirred for 16 h at room temperature. The resulting mixture was diluted with water (600 mL) and extracted with EtOAc (3×300 mL). The combined organic layers were washed with brine (3×200 mL) and dried over anhydrous $Na_2SO_4$. After filtration, the filtrate was concentrated under reduced pressure. The residue was purified by silica gel column chromatography, eluted with PE/EA (8:1 to 2:1) to afford the product (9.5 g, 51%). $[M+H]^+=164.1$.

Step 2: 1-allyl-3-(hydroxymethyl)pyridin-2(1H)-one

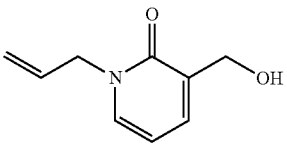

A solution of 1-allyl-2-oxo-1,2-dihydropyridine-3-carbaldehyde (9.5 g, 58.219 mmol) in MeOH (220 mL) was stirred for 5 min at 0° C. under nitrogen atmosphere followed by the addition of $NaBH_4$ (3.3 g, 87.329 mmol) in portions at 0° C. The resulting mixture was stirred for 1 h at room temperature under nitrogen atmosphere and concentrated under vacuum. The residue was purified by silica gel column chromatography, eluted with $CH_2Cl_2$/MeOH (20:1 to 10:1) to afford the product (9.0 g, 93%). $[M+H]^+=166.1$.

Step 3: 1-allyl-3-(chloromethyl)pyridin-2(1H)-one

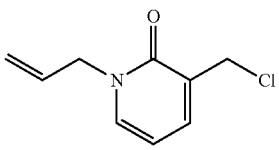

To a stirred solution of 1-allyl-3-(hydroxymethyl)pyridin-2(1H)-one (9.0 g, 54.482 mmol) in DCM (180 mL) was added $SOCl_2$ (32.4 g, 272.410 mmol) dropwise at −20° C. under nitrogen atmosphere. The resulting mixture was stirred for 16 h at room temperature under nitrogen atmosphere and concentrated under reduced pressure. The residue was basified to pH 8 with saturated $NaHCO_3$(aq.). The resulting mixture was extracted with EtOAc (3×300 mL). The combined organic layers were washed with brine (200 mL) and dried over anhydrous $Na_2SO_4$. After filtration, the filtrate was concentrated under reduced pressure. The residue was purified by silica gel column chromatography, eluted with PE/EA (5:1 to 1:1) to afford the product (8.3 g, 83%).

Step 4: 1-((1-allyl-2-oxo-1,2-dihydropyridin-3-yl)methyl)-3-((2-(trimethylsilyl)ethoxy)methyl)dihydropyrimidine-2,4(1H,3H)-dione

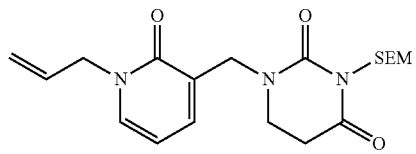 [SMILES: C=CCn1cccc(CN2CCC(=O)N(COCC[Si](C)(C)C)C2=O)c1=O]

To a stirred mixture of 3-[2-(trimethylsilyl)ethoxy]methyl-1,3-diazinane-2,4-dione (13.2 g, 54.236 mmol) in DMF (170 mL) was added NaH (2.2 g, 54.236 mmol, 60%) in portions at 0° C. under nitrogen atmosphere. The resulting mixture was stirred for 1 h at 0° C. under nitrogen atmosphere. To the above mixture was added 1-allyl-3-(chloromethyl)pyridin-2(1H)-one (8.3 g, 45.197 mmol) at 0° C. The resulting mixture was stirred for additional 2 h at room temperature. The reaction was quenched with sat. $NH_4Cl$ (aq.) at 0° C. The resulting mixture was extracted with EtOAc (3×300 mL). The combined organic layers were washed with brine (3×100 mL) and dried over anhydrous $Na_2SO_4$. After filtration, the filtrate was concentrated under reduced pressure. The residue was purified by silica gel column chromatography, eluted with PE/EA (5:1 to 1:1) to afford the product (9.3 g, 52%). $[M+H]^+=392.2$.

Step 5: 2-(3-((2,4-dioxo-3-((2-(trimethylsilyl)ethoxy)methyl)tetrahydropyrimidin-1(2H)-yl)methyl)-2-oxopyridin-1(2H)-yl)acetaldehyde

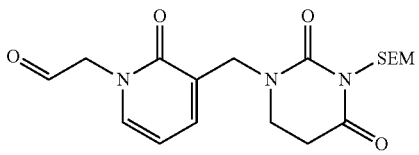 [SMILES: C[Si](C)(C)CCOCN1C(=O)CCN(Cc2cccn(CC=O)c2=O)C1=O]

To a stirred mixture of 1-((1-allyl-2-oxo-1,2-dihydropyridin-3-yl)methyl)-3-((2-(trimethylsilyl)ethoxy)methyl)dihydropyrimidine-2,4(1H,3H)-dione (9.3 g, 23.752 mmol) and $NaIO_4$ (20.3 g, 95.008 mmol) in THF (180 mL) and $H_2O$ (45 mL) was added $K_2OsO_4 \cdot 2H_2O$ (87.51 mg, 0.238 mmol) at 0° C. under nitrogen atmosphere. The resulting mixture was stirred for 2 h at room temperature and quenched with sat. $Na_2S_2O_3$ (aq.) at 0° C. The resulting mixture was extracted with EtOAc (3×400 mL). The combined organic layers were washed with brine (300 mL) and dried over anhydrous $Na_2SO_4$. After filtration, the filtrate was concentrated under reduced pressure. The residue was purified by silica gel Step 6: 2-(3-((2,4-dioxotetrahydropyrimidin-1(2H)-yl)methyl)-2-oxopyridin-1(2H)-yl)acetaldehyde

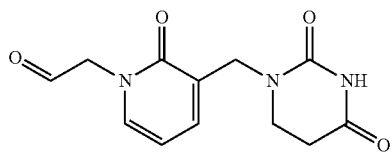 [SMILES: O=CCn1cccc(CN2CCC(=O)NC2=O)c1=O]

To a stirred solution of 2-(3-((2,4-dioxo-3-((2-(trimethylsilyl)ethoxy)methyl)tetrahydropyrimidin-1(2H)-yl)methyl)-2-oxopyridin-1(2H)-yl)acetaldehyde (2.3 g, 5.845 mmol) in DCM (30 mL) was added TFA (6 mL) at room temperature. The resulting mixture was stirred for 1 h at room temperature and concentrated under reduced pressure. The residue was basified to pH 9 with $NH_3·H_2O$. The resulting mixture was stirred for 16 h at room temperature and concentrated under reduced pressure. The residue was purified by reverse phase flash chromatography with the following conditions: Column: Spherical C18, 20-40 μm, 330 g; Mobile Phase A: Water (plus 5 mM $NH_4HCO_3$); Mobile Phase B: ACN; Flow rate: 100 mL/min; Gradient: 5%-5% B, 10 min, 5% B-30% B gradient in 20 min; Detector: 220 nm. The fractions containing the desired product were collected at 12% B and concentrated under reduced pressure to afford the product (768 mg, 50%). $^1$H NMR (400 MHz, DMSO) δ 10.12 (s, 1H), 7.58-7.49 (m, 1H), 7.29-7.21 (m, 1H), 6.32-6.08 (m, 1H), 4.28-4.24 (m, 2H), 3.89-3.83 (m, 2H), 3.75-3.71 (m, 1H), 3.44-3.37 (m, 2H), 2.60-2.55 (m, 2H); $[M+H]^+$=264.1.

Step 7: (R)-3-(tert-butyl)-N-(1-(4-(6-((5-(4-(2-(3-((2,4-dioxotetrahydropyrimidin-1(2H)-yl)methyl)-2-oxopyridin-1(2H)-yl)ethyl)piperazin-1-yl)pyridin-2-yl)amino)pyrimidin-4-yl)-2-methylphenyl)ethyl)-1,2,4-oxadiazole-5-carboxamide

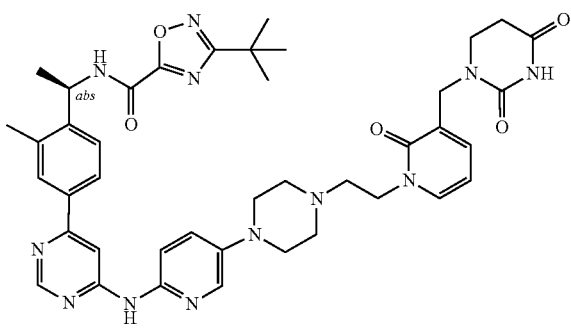 [SMILES: Cc1cc(-c2cc(Nc3ccc(N4CCN(CCn5cccc(CN6CCC(=O)NC6=O)c5=O)CC4)cn3)ncn2)ccc1[C@@H](C)NC(=O)c1nc(C(C)(C)C)no1]

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.03 g, 0.055 mmol) and 2-(3-((2,4-dioxotetrahydropyrimidin-1(2H)-yl)methyl)-2-oxopyridin-1(2H)-yl)acetaldehyde (0.022 g, 0.083 mmol) in 1,2-dichloroethane (5 mL) and HOAc (25 mg) was stirred in a round bottom flask at room temperature for 0.5 hour. To the mixture was added $NaBH(OAc)_3$ (0.018 g, 0.083 mmol) and stirred at room temperature for 12 hours. Then the mixture was evaporated in vacuum to afford the crude product, which was purified by pre-HPLC to afford the product (17.57 mg, 40%). $^1$H NMR (500 MHz, DMSO) δ 10.15 (s, 1H), 9.98 (s, 1H), 9.88 (d, J=7.8 Hz, 1H), 8.70 (s, 1H), 8.03 (d, J=2.9 Hz, 2H), 7.83 (d, J=6.4 Hz, 2H), 7.72-7.58 (m, 3H), 7.45 (dd, J=9.1, 2.9 Hz, 1H), 7.28 (d, J=6.1 Hz, 1H), 6.22 (t, J=6.8 Hz, 1H), 5.37-5.30 (m, 1H), 4.28 (s, 2H), 4.07 (t, J=6.4 Hz, 2H), 3.42 (t, J=6.8 Hz, 2H), 3.11 (s, 4H), 2.65-2.54 (m, 8H), 2.47 (s, 3H), 1.51 (d, J=7.0 Hz, 3H), 1.36 (s, 9H); $[M+H]^+$=789.2.

Example 59: (R)-3-(tert-butyl)-N-(1-(4-(6-((5-(4-((1-(4-((2,4-dioxotetrahydropyrimidin-1(2H)-yl)methyl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide Step 1: 1-(4-bromobenzyl)-3-((2-(trimethylsilyl)ethoxy)methyl)dihydropyrimidine-2,4(1H,3H)-dione

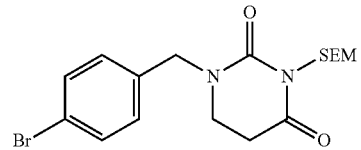 [SMILES: C[Si](C)(C)CCOCN1C(=O)CCN(Cc2ccc(Br)cc2)C1=O]

To a solution of 3-[2-(trimethylsilyl)ethoxy]methyl-1,3-diazinane-2,4-dione (5 g, 20.461 mmol) in DMF (100 mL) was added sodium hydride (60% in oil, 0.8 g) at 0° C. The mixture was stirred for 15 min. 1-Bromo-4-(bromomethyl)benzene (5.1 g, 20.461 mmol) was added and the mixture was allowed to warm to RT and stirred for 4 h. The reaction mixture was quenched by water (500 mL) and extracted with DCM (3×50 mL). The combined organic layers were washed with DCM (3×100 mL) and dried over anhydrous $Na_2SO_4$. After filtration, the filtrate was concentrated under reduced pressure. The residue was purified by silica gel column chromatography, eluted with petroleum ether/EtOAc (4:1 to 1:1) to afford the product (3.5 g, 41%). $[M+H]^+$=413.1.

Step 2: 1-(4-(4-(1,3-dioxolan-2-yl)piperidin-1-yl)benzyl)-3-((2-(trimethylsilyl)ethoxy)methyl)dihydropyrimidine-2,4(1H,3H)-dione

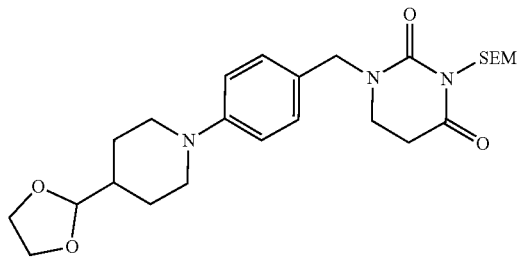

To a stirred solution of 1-(4-bromobenzyl)-3-((2-(trimethylsilyl)ethoxy)methyl)dihydropyrimidine-2,4(1H,3H)-dione (3.5 g, 8.467 mmol) and 4-(1,3-dioxolan-2-yl) piperidine (1.6 g, 10.160 mmol) in dioxane (60 mL) were added XPhos Pd G3 (0.7 g, 0.847 mmol), $Cs_2CO_3$ (4.1 g, 12.701 mmol) and XPhos (0.8 g, 1.693 mmol) in portions at room temperature under nitrogen atmosphere. The resulting mixture was stirred overnight at 110° C. under nitrogen atmosphere. The mixture was allowed to cool down to room temperature and concentrated under reduced pressure. The residue was purified by silica gel column chromatography, eluted with petroleum ether/EtOAc (2:1 to 1:1) to afford the product (2.8 g, 67%). [M+H]$^+$=490.3.

Step 3: 1-(4-(4-(1,3-dioxolan-2-yl)piperidin-1-yl)benzyl)dihydropyrimidine-2,4(1H,3H)-dione

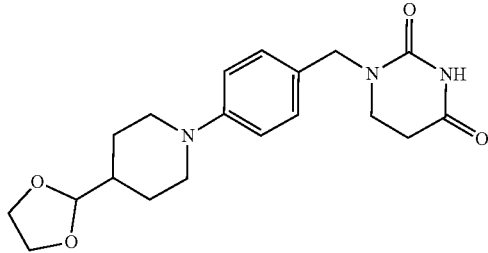

To a stirred solution of 1-(4-(4-(1,3-dioxolan-2-yl)piperidin-1-yl)benzyl)-3-((2-(trimethylsilyl)ethoxy)methyl)dihydropyrimidine-2,4(1H,3H)-dione (2.8 g, 5.718 mmol) in DCM (40 mL) was added TFA (10 mL) dropwise at room temperature under nitrogen atmosphere. The resulting mixture was stirred for 1 h at room temperature under nitrogen atmosphere and concentrated under reduced pressure. The resulting mixture was diluted with DCM (20 mL) and basified to pH 8 with NH$_3$·H$_2$O. The resulting mixture was stirred overnight at room temperature under nitrogen atmosphere and concentrated under reduced pressure. The residue was purified by silica gel column chromatography, eluted with petroleum ether/EtOAc (2:1 to 1:1) to afford the product (1.6 g, 77%). [M+H]$^+$=360.1.

Step 4: 1-(4-((2,4-dioxotetrahydropyrimidin-1(2H)-yl)methyl)phenyl)piperidine-4-carbaldehyde

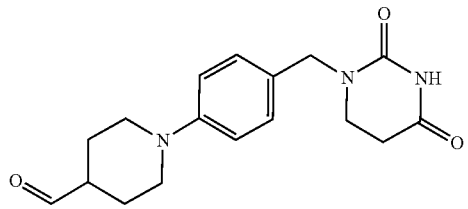

To a stirred solution of 1-(4-(4-(1,3-dioxolan-2-yl)piperidin-1-yl)benzyl)dihydropyrimidine-2,4(1H,3H)-dione (1.5 g, 4.173 mmol) in THF (15 mL) was added HCl (6 M, 15 mL) dropwise at room temperature under nitrogen atmosphere. The resulting mixture was stirred overnight at 40° C. under nitrogen atmosphere. The mixture was allowed to cool down to room temperature and concentrated under reduced pressure. The residue was purified by reverse phase flash chromatography with the following conditions: Column: Spherical C18, 20-40 μm, 330 g; Mobile Phase A: Water (plus 5 mM NH$_4$HCO$_3$); Mobile Phase B: ACN; Flow rate: 80 mL/min; Gradient: 5%-5% B, 10 min, 33% B-45% B gradient in 20 min; Detector: 220 nm. The fractions containing the desired product were collected at 40% B and concentrated under reduced pressure to afford the product (1.0 g, 76%). $^1$H NMR (400 MHz, DMSO) δ 10.12 (s, 1H), 9.64 (s, 1H), 7.14-7.10 (m, 2H), 6.93-6.88 (m, 2H), 5.51 (d, J=6.2 Hz, 1H), 4.54-4.50 (m, 1H), 3.69-3.66 (m, 1H), 3.61-3.58 (m, 1H), 3.23 (dd, J=6.9, 1.7 Hz, 2H), 2.84-2.78 (m, 1H), 2.59-2.47 (m, 3H), 2.00-1.72 (m, 2H), 1.63-1.54 (m, 1H), 1.48-1.20 (m, 2H); [M+H]$^+$=316.1.

Step 5: (R)-3-(tert-butyl)-N-(1-(4-(6-((5-(4-((1-(4-((2,4-dioxotetrahydropyrimidin-1(2H)-yl)methyl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide

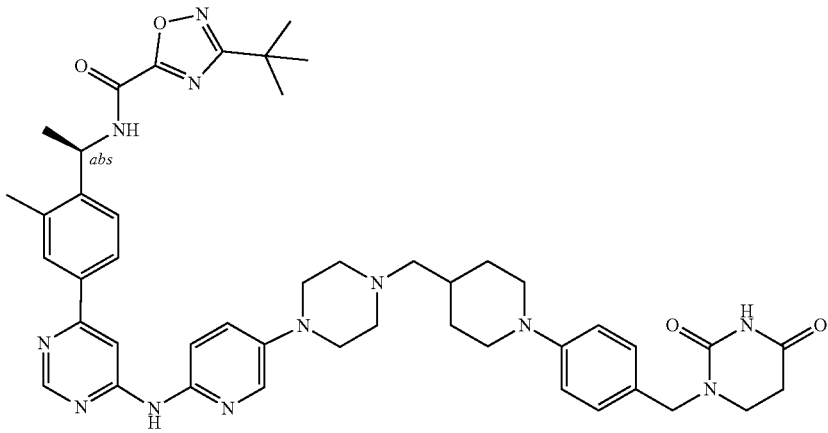 [SMILES: Cc1cc(-c2cc(Nc3ccc(N4CCN(CC5CCN(c6ccc(CN7CCC(=O)NC7=O)cc6)CC5)CC4)cn3)ncn2)ccc1[C@@H](C)NC(=O)c1nc(C(C)(C)C)no1]

A mixture of (R)-3-(tert-butyl)-N-(1-(2-methyl-4-(6-((5-(piperazin-1-yl)pyridin-2-yl)amino)pyrimidin-4-yl)phenyl)ethyl)-1,2,4-oxadiazole-5-carboxamide (0.06 g, 0.111 mmol) and 1-(4-((2,4-dioxotetrahydropyrimidin-1(2H)-yl)methyl)phenyl)piperidine-4-carbaldehyde (0.028 g, 0.133 mmol) in 1,2-dichloroethane (5 mL) and HOAc (25 mg) was stirred in a round bottom flask at room temperature for 0.5 hour. To the mixture was added NaBH(OAc)$_3$ (0.036 g, 0.166 mmol) and stirred at room temperature for 3 hours. Then the mixture was evaporated in vacuum to afford the crude product, which was purified by pre-HPLC to afford the product (45.96 mg, 49%). $^1$H NMR (500 MHz, DMSO) δ 10.14 (s, 1H), 9.98 (s, 1H), 9.88 (d, J=7.8 Hz, 1H), 8.70 (s, 1H), 8.16 (s, 1H), 8.04 (d, J=2.9 Hz, 2H), 7.83 (d, J=5.9 Hz, 2H), 7.69 (s, 1H), 7.60 (d, J=8.7 Hz, 1H), 7.45 (dd, J=9.1, 2.9 Hz, 1H), 7.12 (d, J=8.6 Hz, 2H), 6.90 (d, J=8.7 Hz, 2H), 5.33 (t, J=7.2 Hz, 1H), 4.39 (s, 2H), 3.67 (d, J=12.2 Hz, 2H), 3.23 (t, J=6.8 Hz, 2H), 3.13 (s, 4H), 2.64 (t, J=11.2 Hz, 2H), 2.55-2.50 (m, 6H), 2.47 (s, 3H), 2.22 (d, J=7.1 Hz, 2H), 1.81 (d, J=11.8 Hz, 2H), 1.70 (s, 1H), 1.51 (d, J=7.0 Hz, 3H), 1.36 (s, 9H), 1.26-1.17 (m, 2H); [M+H]$^+$=841.1.

Example 60: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-6-ethylpyridin-2-yl)amino)pyrimidin-4-yl)-2-methylphenyl)ethyl)-1,2,4-oxadiazole-5-carboxamide Step 1: 5-bromo-6-ethylpyridin-2-amine

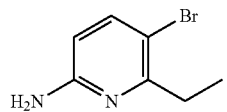

To a stirred solution of 6-ethylpyridin-2-amine (5 g, 40.926 mmol) in CHCl$_3$ (200 mL) was added NBS (8.0 g, 45.019 mmol) in portions at 0° C. under nitrogen atmosphere. The resulting mixture was stirred for 1 h at 0° C. under nitrogen atmosphere and concentrated under reduced pressure. The residue was purified by silica gel column chromatography, eluted with petroleum ether/EtOAc (10:1 to 5:1) to afford the product (6.7 g, 81%). [M+H]$^+$=200.9.

Step 2: 3-bromo-6-(2,5-dimethyl-1H-pyrrol-1-yl)-2-ethylpyridine

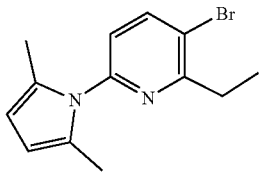 [SMILES: CCc1nc(-n2c(C)ccc2C)ccc1Br]

To a stirred solution of 5-bromo-6-ethylpyridin-2-amine (3 g, 14.920 mmol) and 2,5-hexanedione (2.5 g, 22.380 mmol) in toluene (80 mL) was added p-toluenesulfonic acid (0.3 g, 1.492 mmol) in portions at room temperature under nitrogen atmosphere. The resulting mixture was stirred overnight at 140° C. under nitrogen atmosphere. The mixture was allowed to cool down to room temperature and concentrated under reduced pressure. The resulting mixture was diluted with water (100 mL) and extracted with EtOAc (3×50 mL). The combined organic layers were washed with brine (2×30 mL) and dried over anhydrous Na$_2$SO$_4$. After filtration, the filtrate was concentrated under reduced pressure. The residue was purified by silica gel column chromatography, eluted with petroleum ether/EtOAc (5:1 to 1:1) to afford the product (3.5 g, 84%). [M+H]$^+$=279.0.

Step 3: tert-butyl 4-(6-(2,5-dimethyl-1H-pyrrol-1-yl)-2-ethylpyridin-3-yl)piperazine-1-carboxylate

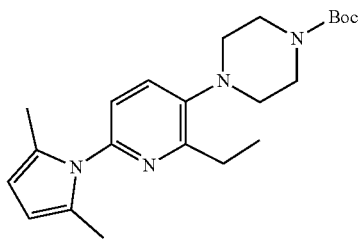 [SMILES: CCc1nc(-n2c(C)ccc2C)ccc1N1CCN(C(=O)OC(C)(C)C)CC1]

To a stirred solution of 3-bromo-6-(2,5-dimethylpyrrol-1-yl)-2-ethylpyridine (4 g, 14.328 mmol) and tert-butyl piperazine-1-carboxylate (4 g, 21.492 mmol) in dioxane (80 mL) were added CPhos Pd G3 (0.6 g, 0.716 mmol) and t-BuONa (4.1 g, 42.984 mmol) in portions at room temperature under nitrogen atmosphere. The resulting mixture was stirred overnight at 100° C. under nitrogen atmosphere. The mixture was allowed to cool down to room temperature and concentrated under reduced pressure. The residue was purified by silica gel column chromatography, eluted with petroleum ether/EtOAc (5:1 to 1:1) to afford the product (4.6 g, 83%). [M+H]$^+$=385.6.

Step 4: tert-butyl 4-(6-amino-2-ethylpyridin-3-yl)piperazine-1-carboxylate

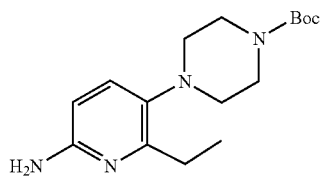 [SMILES: CCc1nc(N)ccc1N1CCN(C(=O)OC(C)(C)C)CC1]

To a stirred solution of tert-butyl 4-(6-(2,5-dimethyl-1H-pyrrol-1-yl)-2-ethylpyridin-3-yl)piperazine-1-carboxylate (4.5 g, 11.703 mmol) and NH$_2$OH·HCl (4.1 g, 58.515 mmol) in EtOH (30 mL) and H$_2$O (15 mL) was added TEA (1.2 g, 11.703 mmol) dropwise at room temperature under nitrogen atmosphere. The resulting mixture was stirred overnight at 80° C. under nitrogen atmosphere. The mixture was allowed to cool down to room temperature and concentrated under reduced pressure. The residue was purified by silica gel column chromatography, eluted with petroleum ether/EtOAc (10:1 to 5:1) to afford the product (3.3 g, 92%). [M+H]$^+$=307.2.

Step 5: tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-ethylpyridin-3-yl)piperazine-1-carboxylate

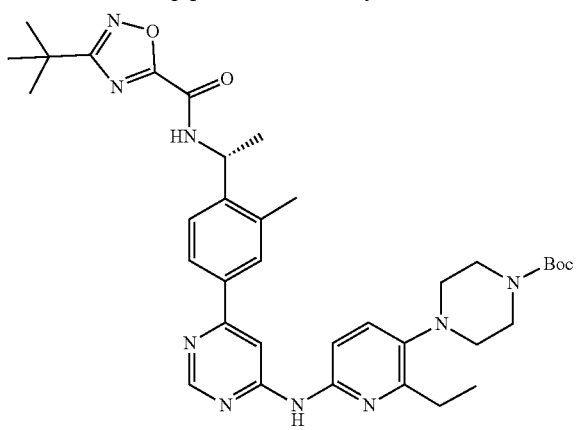

To a stirred solution of tert-butyl 4-(6-amino-2-ethylpyridin-3-yl)piperazine-1-carboxylate (551.70 mg, 1.800 mmol), Cs$_2$CO$_3$ (977.7 mg, 3.000 mmol) and (R)-3-(tert-butyl)-N-(1-(4-(6-chloropyrimidin-4-yl)-2-methylphenyl)ethyl)-1,2,4-oxadiazole-5-carboxamide (600 mg, 1.500 mmol) in dioxane (12 mL) were added XPhos Pd G3 (190.5 mg, 0.225 mmol) and XPhos (214.5 mg, 0.450 mmol) in portions at room temperature under nitrogen atmosphere. The resulting mixture was stirred overnight at 100° C. under nitrogen atmosphere. The mixture was allowed to cool down to room temperature and concentrated under vacuum. The residue was purified by silica gel column chromatography, eluted with petroleum ether/EtOAc (5:1 to 1:1) to afford the product (410 mg, 40%). [M+H]$^+$=670.3.

Step 6: (R)-3-(tert-butyl)-N-(1-(4-(6-(((6-ethyl-5-(piperazin-1-yl)pyridin-2-yl)amino)pyrimidin-4-yl)-2-methylphenyl)ethyl)-1,2,4-oxadiazole-5-carboxamide hydrochloride

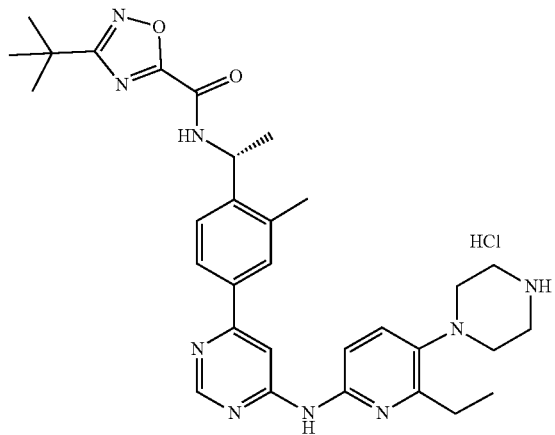 [SMILES: CCc1nc(Nc2cc(-c3ccc([C@@H](C)NC(=O)c4nc(C(C)(C)C)no4)c(C)c3)ncn2)ccc1N1CCNCC1 ; Cl]

To a stirred solution of tert-butyl (R)-4-(6-(((6-(4-(1-(3-(tert-butyl)-1,2,4-oxadiazole-5-carboxamido)ethyl)-3-methylphenyl)pyrimidin-4-yl)amino)-2-ethylpyridin-3-yl)piperazine-1-carboxylate (410 mg, 0.612 mmol) in DCM (7 mL) was added HCl in 1,4-dioxane (7 mL) dropwise at room temperature under nitrogen atmosphere. The final reaction mixture was irradiated with microwave radiation for 1 h at room temperature. The resulting mixture was concentrated under reduced pressure. The residue was purified by trituration with ethyl ether (20 mL) to afford the product (220 mg, 59%). $^1$H NMR (400 MHz, DMSO) δ 11.12 (s, 1H), 9.92 (d, J=7.7 Hz, 1H), 9.06 (brs, 2H), 8.86 (s, 1H), 8.49 (s, 1H), 7.99-7.74 (m, 2H), 7.69-7.64 (m, 2H), 7.47 (s, 1H), 5.36 (q, J=7.1 Hz, 1H), 3.28-3.24 (m, 4H), 3.07-3.03 (m, 4H), 2.89 (q, J=7.4 Hz, 2H), 2.49 (s, 3H), 1.52 (d, J=7.4 Hz, 3H), 1.37 (s, 9H); [M+H]$^+$=570.5.

Step 7: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-6-ethylpyridin-2-yl)amino)pyrimidin-4-yl)-2-methylphenyl)ethyl)-1,2,4-oxadiazole-5-carboxamide

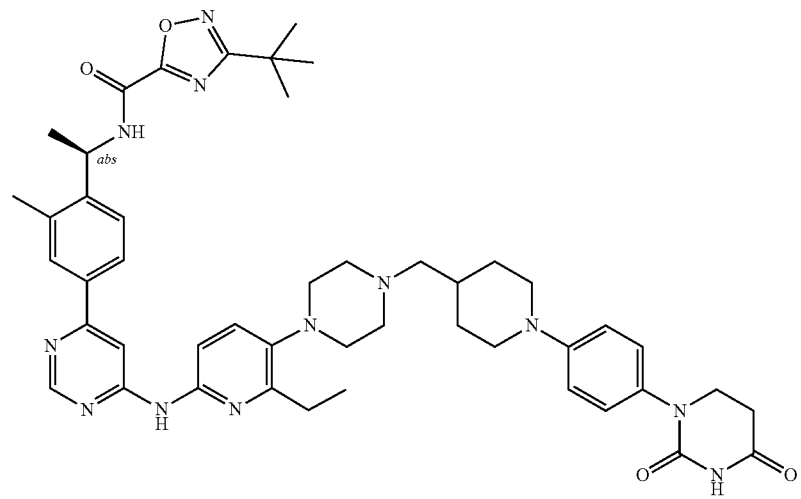 [SMILES: CCc1nc(Nc2cc(-c3ccc([C@@H](C)NC(=O)c4nc(C(C)(C)C)no4)c(C)c3)ncn2)ccc1N1CCN(CC2CCN(c3ccc(N4CCC(=O)NC4=O)cc3)CC2)CC1]

A mixture of (R)-3-(tert-butyl)-N-(1-(4-(6-(((6-ethyl-5-(piperazin-1-yl)pyridin-2-yl)amino)pyrimidin-4-yl)-2-methylphenyl)ethyl)-1,2,4-oxadiazole-5-carboxamide hydrochloride (0.05 g, 0.083 mmol) and 1-(4-(2,4-dioxotetrahydropyrimidin-1(2H)-yl)phenyl)piperidine-4-carbaldehyde (0.037 g, 0.124 mmol) in 1,2-dichloroethane (5 mL) and HOAc (25 mg) was stirred in a round bottom flask at room temperature for 0.5 hour. To the mixture was added NaBH(OAc)$_3$ (0.044 g, 0.206 mmol) and stirred at room temperature for 3 hours. Then the mixture was evaporated in vacuum to afford the crude product, which was purified by pre-HPLC to afford the product (42.99 mg, 61%). $^1$H NMR (500 MHz, DMSO) δ 10.25 (s, 1H), 10.08 (s, 1H), 9.87 (d, J=7.8 Hz, 1H), 8.72 (s, 1H), 8.46 (s, 1H), 7.91-7.84 (m, 2H), 7.62 (d, J=8.1 Hz, 1H), 7.56 (d, J=8.7 Hz, 1H), 7.42 (s, 1H), 7.13 (d, J=8.9 Hz, 2H), 6.93 (d, J=9.1 Hz, 2H), 5.38-5.31 (m, 1H), 3.69 (t, J=6.7 Hz, 4H), 2.87-2.76 (m, 6H), 2.67 (dd, J=16.4, 9.6 Hz, 4H), 2.55-2.42 (m, 7H), 2.24 (s, 2H), 1.85-1.65 (m, 3H), 1.51 (d, J=7.0 Hz, 3H), 1.39-1.31 (m, 12H), 1.27-1.17 (m, 2H). [M+H]$^+$=855.6.

Example 61: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-6-methylpyridin-2-yl)amino)pyrimidin-4-yl)-2-methylphenyl)ethyl)-1,2,4-oxadiazole-5-carboxamide Step 1: 3-bromo-6-(2,5-dimethyl-1H-pyrrol-1-yl)-2-methylpyridine

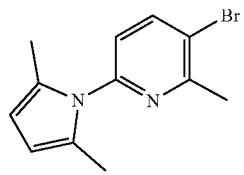

To a stirred solution of 5-bromo-6-methylpyridin-2-amine (5.0 g, 26.732 mmol) and 2,5-hexanedione (4.6 g, 40.098 mmol) in toluene (130 mL) was added p-TsOH (460 mg, 2.673 mmol) at room temperature. The resulting mixture was stirred for 16 h at 140° C. via Dean-Stark trap to remove the water. The mixture was allowed to cool down to room temperature and concentrated under reduced pressure. To the residue was added water (300 mL) and extracted with EtOAc (2×300 mL). The combined organic layers were washed with brine (3×200 mL) and dried over anhydrous Na$_2$SO$_4$. After filtration, the filtrate was concentrated under reduced pressure. The residue was purified by silica gel column chromatography, eluted with 5%-10% EtOAc in petroleum ether to afford the product (5.5 g, 77%). [M+H]$^+$=265.0.

Step 2: tert-butyl 4-(6-(2,5-dimethyl-1H-pyrrol-1-yl)-2-methylpyridin-3-yl)piperazine-1-carboxylate

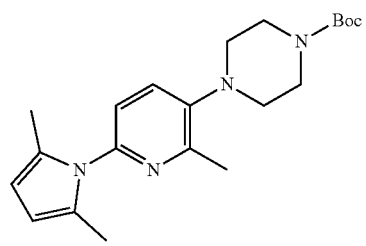 [SMILES: Cc1nc(-n2c(C)ccc2C)ccc1N1CCN(C(=O)OC(C)(C)C)CC1]

To a stirred mixture of 3-bromo-6-(2,5-dimethyl-1H-pyrrol-1-yl)-2-methylpyridine (3.0 g, 11.314 mmol) and tert-butyl piperazine-1-carboxylate (3.2 g, 16.971 mmol) in dioxane (60 mL) were added t-BuONa (3.3 g, 33.94 mmol) and CPhos Pd G3 (465 mg, 0.566 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with 10%-20% EtOAc in petroleum ether to afford the product (3.6 g, 85%). [M+H]$^+$=371.2.

Step 3: tert-butyl 4-(6-amino-2-methylpyridin-3-yl)piperazine-1-carboxylate

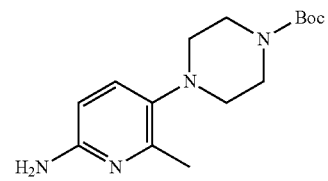

To a stirred mixture of tert-butyl 4-(6-(2,5-dimethyl-1H-pyrrol-1-yl)-2-methylpyridin-3-yl)piperazine-1-carboxylate (3.6 g, 9.717 mmol) and NH$_2$OH·HCl (3.4 g, 48.585 mmol) in EtOH (36 mL) and H$_2$O (18 mL) was added TEA (980 mg, 9.717 mmol) at room temperature. The resulting mixture was stirred for 16 h at 80° C. The mixture was allowed to cool down to room temperature and concentrated. The residue was purified by reverse phase flash chromatography with the following conditions: column, C18; mobile phase A: water (plus 10 mM NH$_4$HCO$_3$), phase B: ACN, 40% to 70% gradient in 30 min; detector, UV 254/220 nm. This resulted in the product (2.1 g, 74%). [M+H]$^+$=293.1.

Step 4: tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-methylpyridin-3-yl)piperazine-1-carboxylate

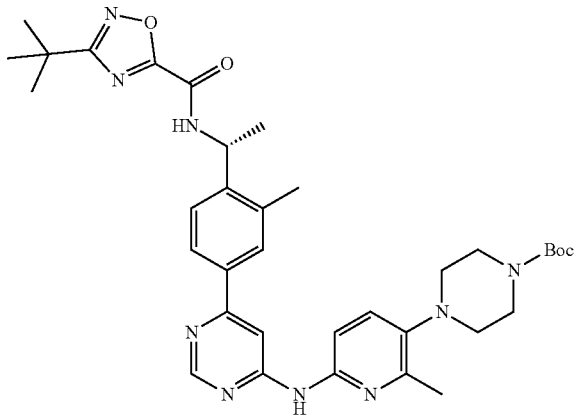 [SMILES: Cc1cc(-c2cc(Nc3ccc(N4CCN(C(=O)OC(C)(C)C)CC4)c(C)n3)ncn2)ccc1[C@@H](C)NC(=O)c1nc(C(C)(C)C)no1]

To a stirred mixture of (R)-3-(tert-butyl)-N-(1-(4-(6-chloropyrimidin-4-yl)-2-methylphenyl)ethyl)-1,2,4-oxadiazole-5-carboxamide (600 mg, 1.50 mmol) and tert-butyl 4-(6-amino-2-methylpyridin-3-yl)piperazine-1-carboxylate (526 mg, 1.80 mmol) in dioxane (12 mL) were added XPhos Pd G3 (190 mg, 0.23 mmol), XPhos (214 mg, 0.45 mmol) and Cs$_2$CO$_3$ (977 mg, 3.00 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography, eluted with 30%-60% EtOAc in CH$_2$Cl$_2$ to afford the product (560 mg, 57%). [M+H]$^+$=656.4.

Step 5: (R)-3-(tert-butyl)-N-(1-(2-methyl-4-(6-((6-methyl-5-(piperazin-1-yl)pyridin-2-yl)amino)pyrimidin-4-yl)phenyl)ethyl)-1,2,4-oxadiazole-5-carboxamide hydrochloride

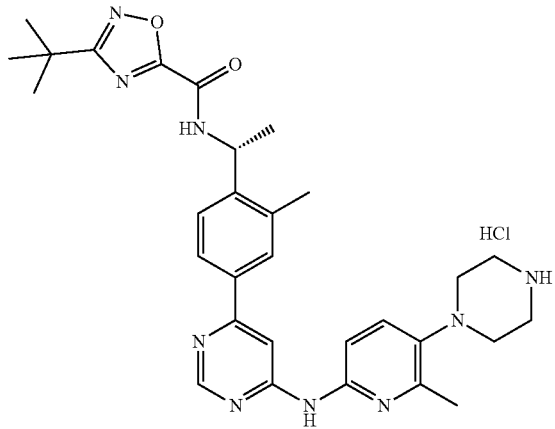

To a stirred solution of tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-methylpyridin-3-yl)piperazine-1-carboxylate (600 mg, 0.915 mmol) in CH$_2$Cl$_2$ (10 mL) was added 4 M HCl in 1,4-dioxane (10 mL) dropwise at room temperature. The resulting mixture was stirred for 1 h at room temperature and concentrated under reduced pressure. The resulting mixture was triturated with Et$_2$O (50 mL) and filtered. The filter cake was washed with Et$_2$O (3×10 mL). The solid was dried under infrared light. This resulted in the product (455 mg, 84%). $^1$H NMR (400 MHz, DMSO) δ 10.90 (s, 1H), 9.93 (d, J=7.8 Hz, 1H), 9.13 (s, 2H), 8.87 (s, 1H), 8.18 (s, 1H), 7.84 (d, J=8.5 Hz, 2H), 7.70-7.58 (m, 3H), 5.38-5.31 (m, 1H), 3.26 (s, 4H), 3.08 (t, J=5.1 Hz, 4H), 2.52-2.50 (m, 6H), 1.53 (d, J=7.0 Hz, 3H), 1.37 (s, 9H); [M+H]$^+$=556.5.

Step 6: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-6-methylpyridin-2-yl)amino)pyrimidin-4-yl)-2-methylphenyl)ethyl)-1,2,4-oxadiazole-5-carboxamide

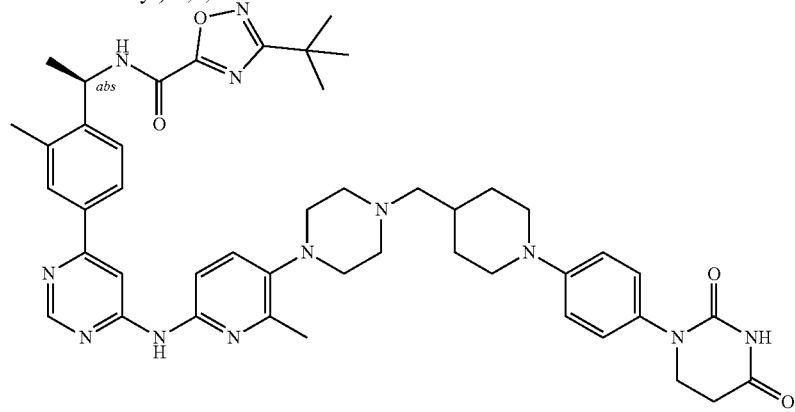 [SMILES: Cc1cc(-c2cc(Nc3ccc(N4CCN(CC5CCN(c6ccc(N7CCC(=O)NC7=O)cc6)CC5)CC4)c(C)n3)ncn2)ccc1[C@@H](C)NC(=O)c1nc(C(C)(C)C)no1]

A mixture of (R)-3-(tert-butyl)-N-(1-(2-methyl-4-(6-((6-methyl-5-(piperazin-1-yl)pyridin-2-yl)amino)pyrimidin-4-yl)phenyl)ethyl)-1,2,4-oxadiazole-5-carboxamide hydrochloride (0.06 g, 0.101 mmol) and 1-(4-((2,4-dioxotetrahydropyrimidin-1(2H)-yl)methyl)phenyl)piperidine-4-carbaldehyde (0.046 g, 0.152 mmol) in 1,2-dichloroethane (5 mL) and HOAc (25 mg) was stirred in a round bottom flask at room temperature for 0.5 hour. To the mixture was added NaBH(OAc)$_3$ (0.044 g, 0.206 mmol) and stirred at room temperature for 3 hours. Then the mixture was evaporated in vacuum to afford the crude product, which was purified by pre-HPLC to afford the product (46.14 mg, 54%). $^1$H NMR (500 MHz, DMSO) δ 10.25 (s, 1H), 10.07 (s, 1H), 9.87 (d, J=7.8 Hz, 1H), 8.72 (s, 1H), 8.16 (d, J=15.7 Hz, 1H), 7.84 (d, J=5.6 Hz, 2H), 7.62 (d, J=8.7 Hz, 2H), 7.51 (d, J=8.7 Hz, 1H), 7.13 (d, J=8.9 Hz, 2H), 6.93 (d, J=9.0 Hz, 2H), 5.38-5.29 (m, 1H), 3.69 (t, J=6.7 Hz, 4H), 2.85 (s, 4H), 2.67 (dd, J=16.1, 9.3 Hz, 4H), 2.58-2.45 (m, 10H), 2.25 (d, J=7.1 Hz, 2H), 1.85-1.65 (m, 3H), 1.51 (t, J=8.6 Hz, 3H), 1.36 (s, 9H), 1.27-1.19 (m, 2H); [M+H]$^+$=841.6.

Example 62: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-4-methylpyridin-2-yl)amino)pyrimidin-4-yl)-2-methylphenyl)ethyl)-1,2,4-oxadiazole-5-carboxamide Step 1: 5-bromo-2-(2,5-dimethyl-1H-pyrrol-1-yl)-4-methylpyridine

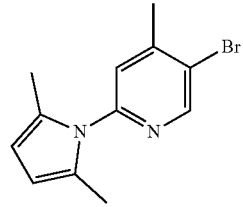

To a stirred solution of 5-bromo-4-methylpyridin-2-amine (10 g, 53.46 mmol) and hexane-2,5-dione (7.93 g, 69.50 mmol) in toluene (200 mL) was added p-TsOH (0.92 g, 5.35 mmol) at room temperature. The resulting mixture was stirred for 16 h at 140° C. via Dean-Stark trap to remove the water. The mixture was allowed to cool down to room temperature and concentrated under reduced pressure. To the residue was added water (300 mL) and extracted with EtOAc (2×300 mL). The combined organic layers were washed with brine (3×200 mL) and dried over anhydrous Na₂SO₄. After filtration, the filtrate was concentrated under reduced pressure. The residue was purified by silica gel column chromatography to give the titled product (12 g, 85%). [M+H]⁺=265.0.

Step 2: tert-butyl 4-(6-(2,5-dimethyl-1H-pyrrol-1-yl)-4-methylpyridin-3-yl)piperazine-1-carboxylate

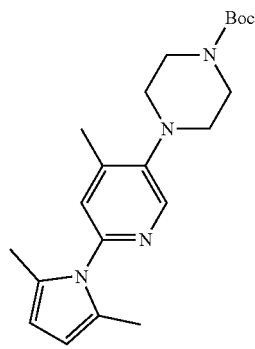 [SMILES: Cc1cc(-n2c(C)ccc2C)ncc1N1CCN(C(=O)OC(C)(C)C)CC1]

To a stirred solution of 5-bromo-2-(2,5-dimethyl-1H-pyrrol-1-yl)-4-methylpyridine (5 g, 18.86 mmol) and tert-butyl piperazine-1-carboxylate (5.27 g, 28.29 mmol) in dioxane (100 mL) were added CPHOS Pd G3 (0.78 g, 0.94 mmol) and t-BuONa (5.44 g, 56.57 mmol) at room temperature under nitrogen atmosphere. The resulting mixture was stirred overnight at 100° C. under nitrogen atmosphere and concentrated under reduced pressure. The residue was purified by silica gel column chromatography to give the titled product (5 g, 72%). [M+H]⁺=371.2.

Step 3: tert-butyl 4-(6-amino-4-methylpyridin-3-yl)piperazine-1-carboxylate

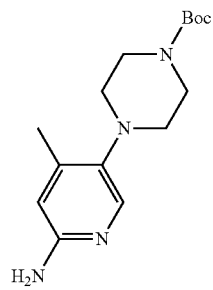 [SMILES: Cc1cc(N)ncc1N1CCN(C(=O)OC(C)(C)C)CC1]

To a stirred solution of tert-butyl 4-(6-(2,5-dimethyl-1H-pyrrol-1-yl)-4-methylpyridin-3-yl)piperazine-1-carboxylate (5 g, 13.50 mmol) in EtOH (80 mL) and water (40 mL) were added TEA (1.37 g, 13.50 mmol) and NH₂OH·HCl (4.69 g, 67.48 mmol) at room temperature under nitrogen atmosphere. The resulting mixture was stirred overnight at 80° C. under nitrogen atmosphere and concentrated under reduced pressure. The residue was purified by reverse phase flash chromatography with the following conditions: column, C18; mobile phase, ACN in water (0.5 M NH₄HCO₃), 10% to 70% gradient in 10 min; detector, UV 254 nm. This gave the titled product (3.6 g, 92%). [M+H]⁺=293.2.

Step 4: tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-methylpyridin-3-yl)piperazine-1-carboxylate

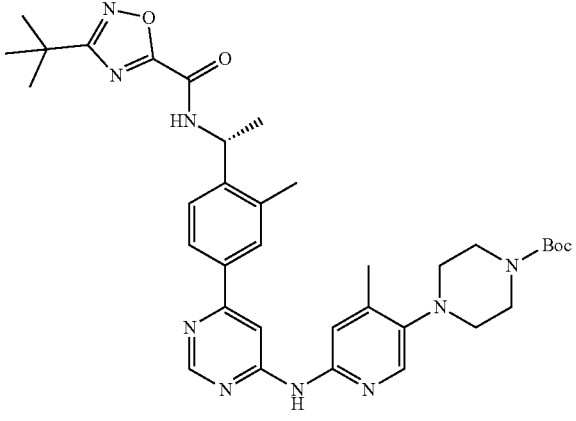 [SMILES: Cc1cc(-c2cc(Nc3cc(C)c(N4CCN(C(=O)OC(C)(C)C)CC4)cn3)ncn2)ccc1[C@@H](C)NC(=O)c1nc(C(C)(C)C)no1]

To a stirred solution of tert-butyl 4-(6-amino-4-methylpyridin-3-yl)piperazine-1-carboxylate (0.86 g, 2.93 mmol) and (R)-3-(tert-butyl)-N-(1-(4-(6-chloropyrimidin-4-yl)-2-methylphenyl)ethyl)-1,2,4-oxadiazole-5-carboxamide (900 mg, 2.25 mmol) in dioxane (30 mL) was added XPhos Pd G3 (190.51 mg, 0.23 mmol) at room temperature under nitrogen atmosphere. The resulting mixture was stirred overnight at 100° C. under nitrogen atmosphere and concentrated under vacuum. The residue was purified by silica gel column chromatography to give the titled product (600 mg, 41%). [M+H]⁺=656.4.

Step 5: (R)-3-(tert-butyl)-N-(1-(2-methyl-4-(6-((4-methyl-5-(piperazin-1-yl)pyridin-2-yl)amino)pyrimidin-4-yl)phenyl)ethyl)-1,2,4-oxadiazole-5-carboxamide

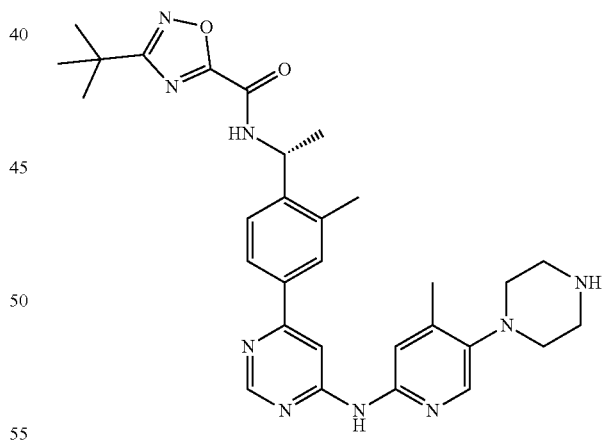

To a stirred solution of tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-methylpyridin-3-yl)piperazine-1-carboxylate (600 mg, 0.92 mmol) in DCM (10 mL) was added 4.0 M HCl in 1,4-dioxane (10 mL) dropwise at room temperature under nitrogen atmosphere. The resulting mixture was stirred for 2 h at room temperature under nitrogen atmosphere and concentrated under vacuum. The residue was purified by trituration with Et₂O (30 mL). The resulting mixture was filtered to afford the titled product (359 mg, 67%). [M+H]⁺=556.5.

Step 6: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-4-methylpyridin-2-yl)amino)pyrimidin-4-yl)-2-methylphenyl)ethyl)-1,2,4-oxadiazole-5-carboxamide

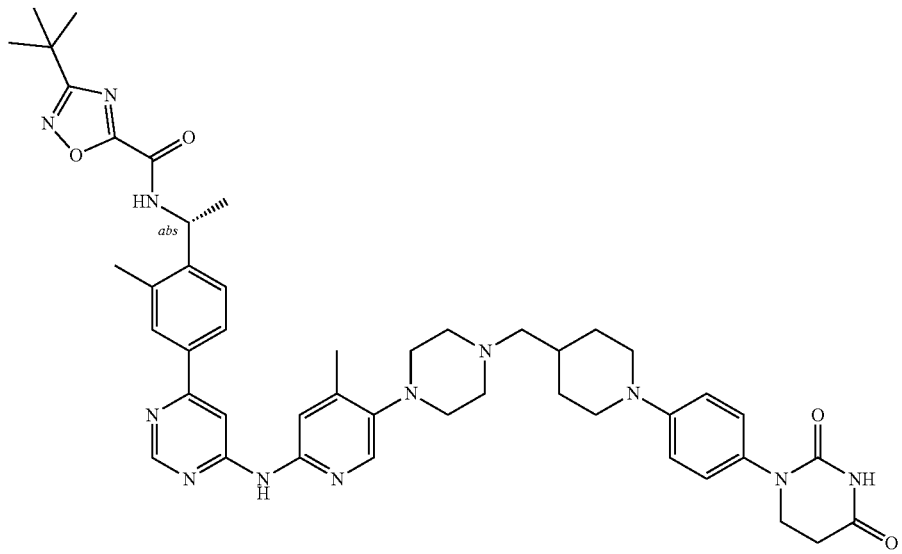 [SMILES: Cc1cc(-c2cc(Nc3cc(C)c(N4CCN(CC5CCN(c6ccc(N7CCC(=O)NC7=O)cc6)CC5)CC4)cn3)ncn2)ccc1[C@@H](C)NC(=O)c1nc(C(C)(C)C)no1]

A mixture of (R)-3-(tert-butyl)-N-(1-(2-methyl-4-(6-((4-methyl-5-(piperazin-1-yl)pyridin-2-yl)amino)pyrimidin-4-yl)phenyl)ethyl)-1,2,4-oxadiazole-5-carboxamide (100 mg, 0.17 mmol), 1-(4-(2,4-dioxotetrahydropyrimidin-1(2H)-yl)phenyl)piperidine-4-carbaldehyde (60 mg, 0.2 mmol), NaBH(OAc)$_3$ (106 mg, 0.5 mmol) and NaOAc (82 mg, 1.0 mmol) in DCE was stirred at room temperature for 16 h. The mixture was concentrated and purified by silica gel column chromatography to give the titled product (45 mg, 31%). $^1$H NMR (500 MHz, DMSO) δ 10.25 (s, 1H), 10.02 (s, 1H), 9.89 (d, J=7.8 Hz, 1H), 8.73 (d, J=0.9 Hz, 1H), 8.16 (s, 1H), 8.03 (s, 1H), 7.84 (d, J=5.7 Hz, 2H), 7.64-7.52 (m, 2H), 7.13 (d, J=8.9 Hz, 2H), 6.93 (d, J=9.1 Hz, 2H), 5.39-5.29 (m, 1H), 3.73-3.64 (m, 4H), 2.92 (s, 4H), 2.72-2.62 (m, 4H), 2.53-2.48 (m, 7H), 2.30-2.21 (m, 5H), 1.82 (d, J=11.6 Hz, 2H), 1.75-1.67 (m, 1H), 1.51 (d, J=7.1 Hz, 3H), 1.36 (s, 9H), 1.28-1.21 (m, 2H); [M+H]$^+$=841.6.

Example 63: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-6-methoxypyridin-2-yl)amino)pyrimidin-4-yl)-2-methylphenyl)ethyl)-1,2,4-oxadiazole-5-carboxamide Step 1: 5-bromo-6-methoxypyridin-2-amine

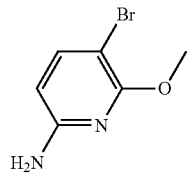

To a stirred solution of 6-methoxypyridin-2-amine (5 g, 40.28 mmol) in ACN (20 mL) was added NBS (7.89 g, 44.30 mmol) in portions at room temperature under nitrogen atmosphere. The resulting mixture was stirred for 1 h at room temperature under nitrogen atmosphere and concentrated under reduced pressure. The residue was purified by silica gel column chromatography to give the titled product (4.3 g, 52%). [M+H]$^+$=203.0.

Step 2: 3-bromo-6-(2,5-dimethyl-1H-pyrrol-1-yl)-2-methoxypyridine

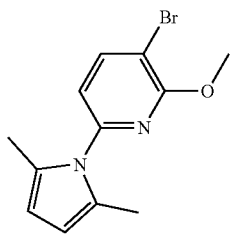

To a stirred solution of 5-bromo-6-methoxypyridin-2-amine (4.3 g, 21.18 mmol) and hexane-2,5-dione (3.14 g, 27.53 mmol) in toluene (200 mL) was added p-TsOH·H$_2$O (0.40 g, 2.12 mmol) at room temperature. The resulting mixture was stirred for 16 h at 140° C. via Dean-Stark trap to remove the water. The mixture was allowed to cool down to room temperature and concentrated under reduced pressure. To the residue was added water (300 mL) and extracted with EtOAc (2×300 mL). The combined organic layers were washed with brine (3×200 mL) and dried over anhydrous Na$_2$SO$_4$. After filtration, the filtrate was concentrated under Step 3: tert-butyl 4-(6-(2,5-dimethyl-1H-pyrrol-1-yl)-2-methoxypyridin-3-yl)piperazine-1-carboxylate

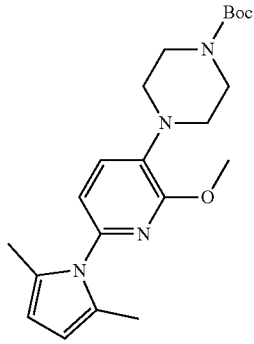 [SMILES: COc1nc(-n2c(C)ccc2C)ccc1N1CCN(C(=O)OC(C)(C)C)CC1]

To a stirred solution of tert-butyl piperazine-1-carboxylate (900 mg, 4.84 mmol) and 3-bromo-6-(2,5-dimethyl-1H-pyrrol-1-yl)-2-methoxypyridine (1.04 g, 3.70 mmol) in dioxane (30 mL) was added XPhos Pd G3 (191 mg, 0.23 mmol) at room temperature. The resulting mixture was stirred for 16 h at 100° C. The mixture was allowed to cool down to room temperature and concentrated under reduced pressure. The residue was purified by silica gel column chromatography to give the titled product (600 mg, 42%). [M+H]$^+$=387.2.

Step 4: tert-butyl 4-(6-amino-2-methoxypyridin-3-yl)piperazine-1-carboxylate

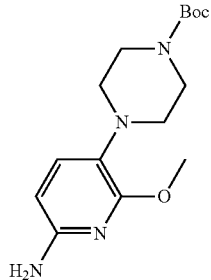 [SMILES: COc1nc(N)ccc1N1CCN(C(=O)OC(C)(C)C)CC1]

To a stirred solution of tert-butyl 4-(6-(2,5-dimethyl-1H-pyrrol-1-yl)-2-methoxypyridin-3-yl)piperazine-1-carboxylate (6.1 g, 15.78 mmol) in EtOH (100 mL) and water (50 mL) were added TEA (1.60 g, 15.78 mmol) and NH$_2$OH·HCl (5.48 g, 78.92 mmol) at room temperature under nitrogen atmosphere. The resulting mixture was stirred overnight at 80° C. under nitrogen atmosphere and concentrated under reduced pressure. The residue was purified by reverse phase flash chromatography with the following conditions: column, C18; mobile phase, ACN in water (0.5 M NH$_4$HCO$_3$), 10% to 70% gradient in 10 min; detector, UV 254 nm. This gave the titled product (2.4 g, 50%). [M+H]$^+$=309.2.

Step 5: tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-methoxypyridin-3-yl)piperazine-1-carboxylate

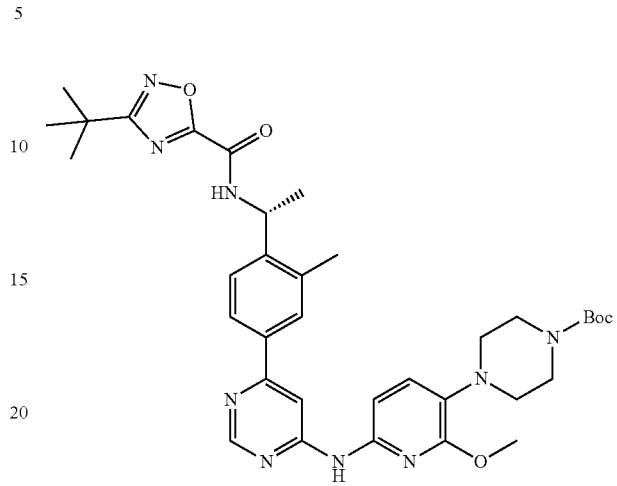

To a stirred solution of (R)-3-(tert-butyl)-N-(1-(4-(6-chloropyrimidin-4-yl)-2-methylphenyl)ethyl)-1,2,4-oxadiazole-5-carboxamide (900 mg, 2.25 mmol) and tert-butyl 4-(6-amino-2-methoxypyridin-3-yl)piperazine-1-carboxylate (1.04 g, 3.38 mmol) in dioxane (30 mL) was added XPhos Pd G3 (190.51 mg, 0.23 mmol) at room temperature. The resulting mixture was stirred for 16 h at 100° C. The mixture was allowed to cool down to room temperature and concentrated under reduced pressure. The residue was purified by silica gel column chromatography to give the titled product (600 mg, 40%). [M+H]$^+$=672.4.

Step 6: (R)-3-(tert-butyl)-N-(1-(4-(6-((6-methoxy-5-(piperazin-1-yl)pyridin-2-yl)amino)pyrimidin-4-yl)-2-methylphenyl)ethyl)-1,2,4-oxadiazole-5-carboxamide

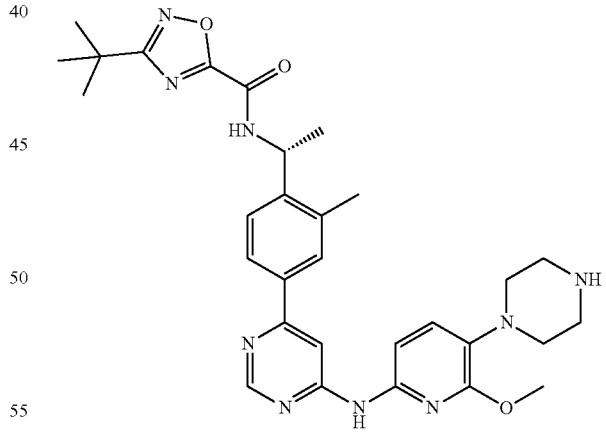

To a stirred solution of tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-methoxypyridin-3-yl)piperazine-1-carboxylate (600 mg, 0.89 mmol) in DCM (10 mL) was added 4M HCl in 1,4-dioxane (10 mL) dropwise at room temperature under nitrogen atmosphere. The resulting mixture was stirred for 2 h at room temperature under nitrogen atmosphere and concentrated under vacuum. The residue was purified by trituration with Et$_2$O (30 mL). The resulting mixture was filtered to afford the titled product (353 mg, 65%). [M+H]$^+$=572.3.

Step 7: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-6-methoxypyridin-2-yl)amino)pyrimidin-4-yl)-2-methylphenyl)ethyl)-1,2,4-oxadiazole-5-carboxamide

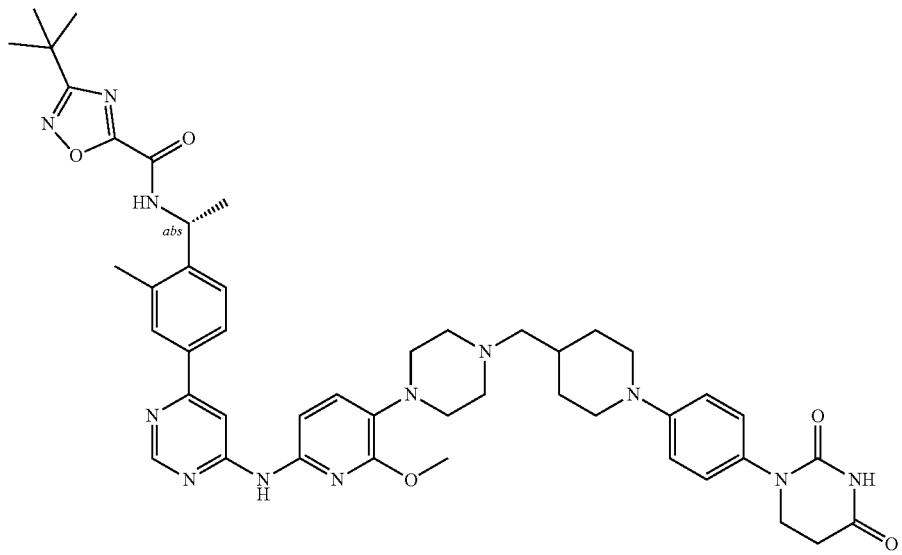 [SMILES: COc1nc(Nc2cc(-c3ccc([C@@H](C)NC(=O)c4nc(C(C)(C)C)no4)c(C)c3)ncn2)ccc1N1CCN(CC2CCN(c3ccc(N4CCC(=O)NC4=O)cc3)CC2)CC1]

A mixture of (R)-3-(tert-butyl)-N-(1-(4-(6-((6-methoxy-5-(piperazin-1-yl)pyridin-2-yl)amino)pyrimidin-4-yl)-2-methylphenyl)ethyl)-1,2,4-oxadiazole-5-carboxamide (100 mg, 0.16 mmol), 1-(4-(2,4-dioxotetrahydropyrimidin-1(2H)-yl)phenyl)piperidine-4-carbaldehyde (60 mg, 0.2 mmol), NaBH(OAc)$_3$ (106 mg, 0.5 mmol) and NaOAc (82 mg, 1.0 mmol) in DCE was stirred at room temperature for 16 h. The mixture was concentrated and purified by silica gel column chromatography to give the titled product (50 mg, 36%). $^1$H NMR (500 MHz, DMSO) δ 10.25 (s, 1H), 9.96 (s, 1H), 9.88 (d, J=7.9 Hz, 1H), 8.71 (s, 1H), 8.27 (s, 1H), 7.92-7.82 (m, 2H), 7.61 (d, J=8.1 Hz, 1H), 7.29 (d, J=8.3 Hz, 1H), 7.13 (d, J=8.8 Hz, 3H), 6.93 (d, J=8.9 Hz, 2H), 5.39-5.28 (m, 1H), 4.01 (s, 3H), 3.73-3.64 (m, 4H), 2.96 (s, 3H), 2.72-2.61 (m, 4H), 2.58-2.39 (m, 8H), 2.22 (d, J=7.0 Hz, 2H), 1.81 (d, J=11.4 Hz, 2H), 1.70 (s, 1H), 1.50 (d, J=7.4 Hz, 3H), 1.36 (s, 9H), 1.29-1.23 (m, 2H); [M+H]$^+$=857.6.

Example 64: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-4-methoxypyridin-2-yl)amino)pyrimidin-4-yl)-2-methylphenyl)ethyl)-1,2,4-oxadiazole-5-carboxamide Step 1: 5-bromo-4-methoxypyridin-2-amine

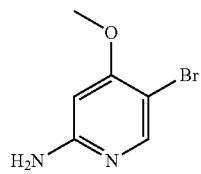

To a stirred solution of 4-methoxypyridin-2-amine (6.2 g, 49.94 mmol) in AcOH (175 mL) was added Br$_2$ (7.98 g, 49.94 mmol) in AcOH (50 mL) dropwise at room temperature. The resulting mixture was stirred for 2 h at room temperature and concentrated under reduced pressure. The precipitated solids were collected by filtration and washed with EtOAc (3×50 mL). The resulting mixture was concentrated under reduced pressure. The residue was purified by silica gel column chromatography, eluted with 0-20% MeOH in DCM to afford the product (4 g, 30%). [M+H]$^+$=204.9.

Step 2: 5-bromo-2-(2,5-dimethyl-1H-pyrrol-1-yl)-4-methoxypyridine

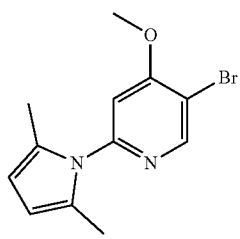 [SMILES: COc1cc(-n2c(C)ccc2C)ncc1Br]

A mixture of 5-bromo-4-methoxypyridin-2-amine (3.8 g, 18.72 mmol), p-toluenesulfonic acid (323 mg, 1.87 mmol) and 2,5-hexanedione (2.78 g, 24.33 mmol) in toluene (76 mL) was stirred for 16 h at 140° C. via Dean-Stark trap to remove the water. The resulting mixture was concentrated under reduced pressure. The residue was purified by silica gel column chromatography, eluted with 0-20% EtOAc in petroleum ether to afford the product (1.19 g, 23%). [M+H]$^+$=280.9.

Step 3: tert-butyl 4-(6-(2,5-dimethyl-1H-pyrrol-1-yl)-4-methoxypyridin-3-yl)piperazine-1-carboxylate

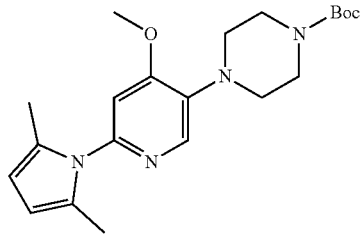 [SMILES: COc1cc(-n2c(C)ccc2C)ncc1N1CCN(C(=O)OC(C)(C)C)CC1]

To a stirred mixture of 5-bromo-2-(2,5-dimethyl-1H-pyrrol-1-yl)-4-methoxypyridine (2 g, 7.11 mmol) and tert-butyl piperazine-1-carboxylate (1.99 g, 10.671 mmol) in dioxane (40 mL) were added CPhos PD G3 (293 mg, 0.36 mmol) and t-BuONa (2.05 g, 21.34 mmol) at room temperature under nitrogen atmosphere. The resulting mixture was stirred for 4 h at 100° C. under nitrogen atmosphere and concentrated under reduced pressure. The residue was purified by silica gel column chromatography, eluted with 0-30% EtOAc in petroleum ether to afford the product (2.3 g, 84%). [M+H]$^+$=387.3.

Step 4: tert-butyl 4-(6-amino-4-methoxypyridin-3-yl)piperazine-1-carboxylate

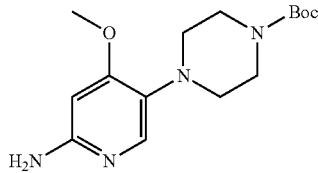 [SMILES: COc1cc(N)ncc1N1CCN(C(=O)OC(C)(C)C)CC1]

A solution of tert-butyl 4-(6-(2,5-dimethyl-1H-pyrrol-1-yl)-4-methoxypyridin-3-yl)piperazine-1-carboxylate (2 g, 5.175 mmol), TEA (524 mg, 5.175 mmol) and NH$_2$OH·HCl (1.8 g, 25.875 mmol) in EtOH (14 mL) and H$_2$O (7 mL) was stirred for 16 h at 80° C. The resulting mixture was concentrated under reduced pressure. The residue was purified by silica gel column chromatography, eluted with 0-20% MeOH in DCM to afford the product (1.5 g, 94%). [M+H]$^+$=309.3.

Step 5: tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-methoxypyridin-3-yl)piperazine-1-carboxylate

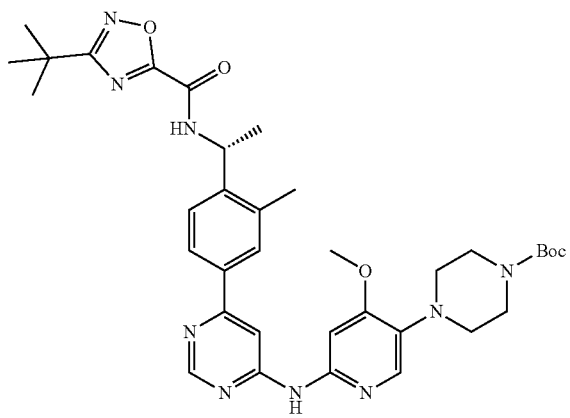 [SMILES: COc1cc(Nc2cc(-c3ccc([C@@H](C)NC(=O)c4nc(C(C)(C)C)no4)c(C)c3)ncn2)ncc1N1CCN(C(=O)OC(C)(C)C)CC1]

To a stirred mixture of (R)-3-(tert-butyl)-N-(1-(4-(6-chloropyrimidin-4-yl)-2-methylphenyl)ethyl)-1,2,4-oxadiazole-5-carboxamide (600 mg, 1.50 mmol) and tert-butyl 4-(6-amino-4-methoxypyridin-3-yl)piperazine-1-carboxylate (694 mg, 2.25 mmol) in dioxane (12 mL) were added XPhos (215 mg, 0.45 mmol), Cs$_2$CO$_3$ (978 mg, 3.00 mmol) and XPhos Pd G3 (191 mg, 0.23 mmol) at room temperature under nitrogen atmosphere. The resulting mixture was stirred for 16 h at 100° C. under nitrogen atmosphere and concentrated under reduced pressure. The residue was purified by silica gel column chromatography, eluted with 20%-70% EtOAc in DCM to afford the product (510 mg, 51%). [M+H]$^+$=672.4.

Step 6: (R)-3-(tert-butyl)-N-(1-(4-(6-((4-methoxy-5-(piperazin-1-yl)pyridin-2-yl)amino)pyrimidin-4-yl)-2-methylphenyl)ethyl)-1,2,4-oxadiazole-5-carboxamide hydrochloride

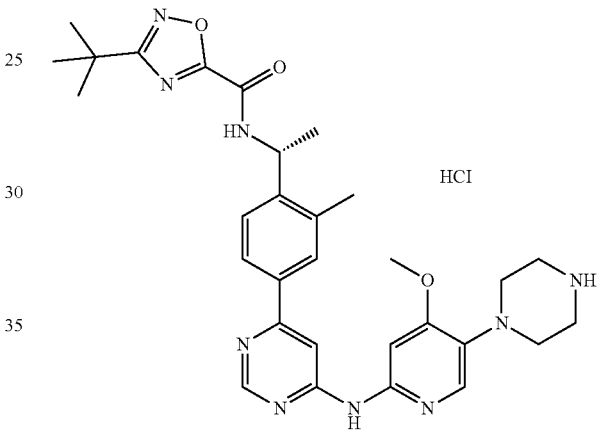

To a stirred solution of tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-methoxypyridin-3-yl)piperazine-1-carboxylate (500 mg, 0.74 mmol) in DCM (10 mL) was added HCl in 1,4-dioxane (10 mL) dropwise at room temperature. The resulting mixture was stirred for 1 h at room temperature and concentrated under reduced pressure. The residue was triturated with Et$_2$O (80 mL). The solid was dried under infrared light. This resulted in the product (409.7 mg, 91%). $^1$H NMR (400 MHz, DMSO) δ 12.30 (s, 1H), 9.95 (d, J=7.6 Hz, 1H), 9.30 (s, 2H), 8.97 (s, 1H), 7.93-7.84 (m, 4H), 7.67 (d, J=8.4 Hz, 1H), 7.30 (s, 1H), 5.40-5.29 (m, 1H), 4.02 (s, 3H), 3.25 (s, 8H), 2.52-2.50 (m, 3H), 1.53 (d, J=6.8 Hz, 3H), 1.37 (s, 9H); [M+H]$^+$=572.4.

Step 7: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-4-methoxypyridin-2-yl)amino)pyrimidin-4-yl)-2-methylphenyl)ethyl)-1,2,4-oxadiazole-5-carboxamide

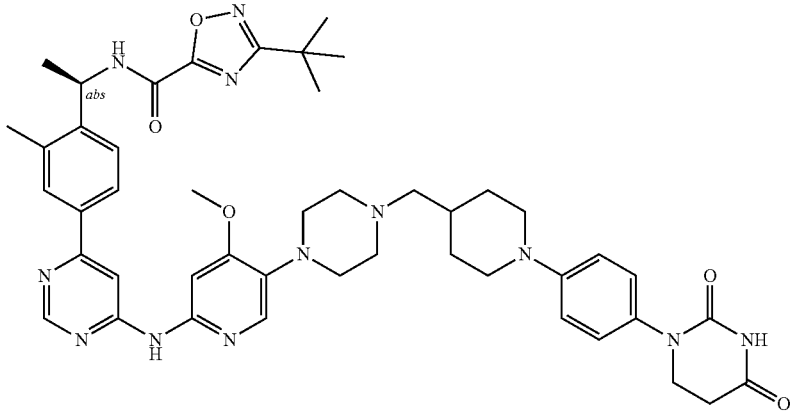 [SMILES: COc1cc(Nc2cc(-c3ccc([C@@H](C)NC(=O)c4nc(C(C)(C)C)no4)c(C)c3)ncn2)ncc1N1CCN(CC2CCN(c3ccc(N4CCC(=O)NC4=O)cc3)CC2)CC1]

A mixture of (R)-3-(tert-butyl)-N-(1-(4-(6-((4-methoxy-5-(piperazin-1-yl)pyridin-2-yl)amino)pyrimidin-4-yl)-2-methylphenyl)ethyl)-1,2,4-oxadiazole-5-carboxamide hydrochloride (0.06 g, 0.099 mmol) and 1-(4-(2,4-dioxotetrahydropyrimidin-1(2H)-yl)phenyl)piperidine-4-carbaldehyde (0.045 g, 0.148 mmol) in 1,2-dichloroethane (5 mL) and HOAc (25 mg) was stirred in a round bottom flask at room temperature for 0.5 hour. To the mixture was added NaBH(OAc)₃ (0.053 g, 0.247 mmol) and stirred at room temperature for 10 hours. Then the mixture was evaporated in vacuum to afford the crude product, which was purified by pre-HPLC to afford the product (37.74 mg, 45%). ¹H NMR (500 MHz, DMSO) δ 10.25 (s, 1H), 9.98 (s, 1H), 9.89 (d, J=7.7 Hz, 1H), 8.73 (d, J=0.9 Hz, 1H), 8.25 (s, 1H), 7.86-7.78 (m, 3H), 7.64-7.59 (m, 1H), 7.38 (s, 1H), 7.13 (d, J=9.0 Hz, 2H), 6.93 (d, J=9.1 Hz, 2H), 5.38-5.30 (m, 1H), 3.86 (s, 3H), 3.69 (dd, J=12.6, 5.9 Hz, 4H), 3.32 (s, 2H), 2.99 (s, 4H), 2.67 (dd, J=16.3, 9.5 Hz, 4H), 2.48 (s, 2H), 2.22 (d, J=7.0 Hz, 2H), 1.77 (t, J=29.9 Hz, 3H), 1.51 (t, J=8.1 Hz, 3H), 1.36 (s, 9H), 1.22 (dd, J=21.7, 11.2 Hz, 2H); [M+H]⁺=857.4.

Example 65: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-4-fluoropyridin-2-yl)amino)pyrimidin-4-yl)-2-methylphenyl)ethyl)-1,2,4-oxadiazole-5-carboxamide Step 1: 5-bromo-4-fluoro-N,N-bis(4-methoxybenzyl)pyridin-2-amine

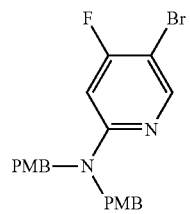

To a stirred mixture of 5-bromo-4-fluoropyridin-2-amine (2.5 g, 13.09 mmol) in THF (50 mL) was added NaH (1.57 g, 39.27 mmol) in portions at 0° C. under nitrogen atmosphere. The resulting mixture was stirred for 1 h at 0° C. under nitrogen atmosphere. To the above mixture was added PMBCl (6.1 g, 39.27 mmol) dropwise at 0° C. The resulting mixture was stirred for additional 16 h at 75° C. The mixture was allowed to cool down to room temperature and quenched with sat. NH₄Cl (aq.) at 0° C. The resulting mixture was extracted with EtOAc (3×200 mL). The combined organic layers were washed with brine (2×200 mL) and dried over anhydrous Na₂SO₄. After filtration, the filtrate was concentrated under reduced pressure. The residue was purified by silica gel column chromatography to give the titled product (3.5 g, 62%). [M+H]⁺=433.1.

Step 2: tert-butyl 4-(6-(bis(4-methoxybenzyl)amino)-4-fluoropyridin-3-yl)piperazine-1-carboxylate

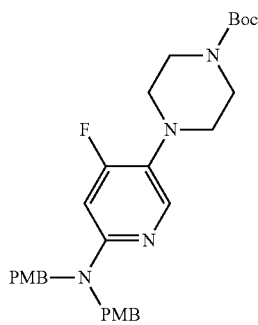

To a stirred mixture of 5-bromo-4-fluoro-N,N-bis(4-methoxybenzyl)pyridin-2-amine (3.3 g, 7.65 mmol) and tert-butyl piperazine-1-carboxylate (1.7 g, 9.18 mmol) in toluene (66 mL) were added Pd₂(dba)₃ (700 mg, 0.77 mmol), t-BuONa (1.1 g, 11.47 mmol) and BINAP (952 mg, 1.53 mmol) at room temperature under nitrogen atmosphere. The resulting mixture was stirred for 16 h at 80° C. under nitrogen atmosphere. The mixture was allowed to cool down to room temperature and concentrated under reduced pressure. The residue was purified by silica gel column chromatography to give the titled product (3.6 g, 87%). [M+H]⁺=537.3.

Step 3: 4-fluoro-5-(piperazin-1-yl)pyridin-2-amine

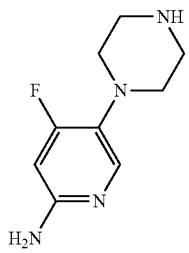 [SMILES: Nc1cc(F)c(N2CCNCC2)cn1]

A solution of tert-butyl 4-(6-(bis(4-methoxybenzyl)amino)-4-fluoropyridin-3-yl)piperazine-1-carboxylate (3.6 g, 6.71 mmol) in TFA (40 mL) was stirred for 1 h at 75° C. under nitrogen atmosphere. The resulting mixture was concentrated under reduced pressure. To the resulting mixture was added Et$_2$O (50 mL) and filtered. The filter cake was washed with Et$_2$O (3×10 mL). The solid was dried under infrared light to give the titled product (2.3 g, 80%). [M+H]$^+$=197.1.

Step 4: tert-butyl 4-(6-amino-4-fluoropyridin-3-yl)piperazine-1-carboxylate

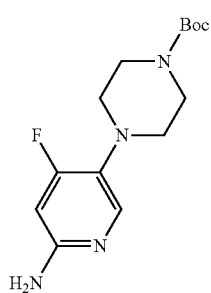

To a stirred mixture of 4-fluoro-5-(piperazin-1-yl)pyridin-2-amine (2.3 g, 5.421 mmol) and TEA (2.2 g, 21.68 mmol) in CH$_2$Cl$_2$ (40 mL) was added Boc$_2$O (1.4 g, 6.51 mmol) at 0° C. The resulting mixture was stirred for 1 h at room temperature and concentrated under reduced pressure. The residue was purified by silica gel column chromatography to give the titled product (1.3 g, 81%). [M+H]$^+$=297.2.

Step 5: tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-fluoropyridin-3-yl)piperazine-1-carboxylate

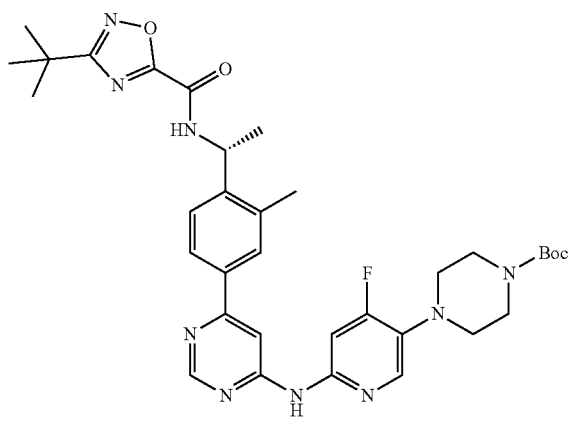 [SMILES: Cc1cc(-c2cc(Nc3cc(F)c(N4CCN(C(=O)OC(C)(C)C)CC4)cn3)ncn2)ccc1[C@@H](C)NC(=O)c1nc(C(C)(C)C)no1]

To a stirred mixture of (R)-3-(tert-butyl)-N-(1-(4-(6-chloropyrimidin-4-yl)-2-methylphenyl)ethyl)-1,2,4-oxadiazole-5-carboxamide (500 mg, 1.25 mmol) and tert-butyl 4-(6-amino-4-fluoropyridin-3-yl)piperazine-1-carboxylate (444 mg, 1.50 mmol) in dioxane (10 mL) were added XPhos Pd G3 (158 mg, 0.19 mmol), XPhos (178 mg, 0.38 mmol) and Cs$_2$CO$_3$ (815 mg, 2.50 mmol) at room temperature under nitrogen atmosphere. The resulting mixture was stirred for 16 h at 100° C. under nitrogen atmosphere. The mixture was allowed to cool down to room temperature and concentrated under reduced pressure. The residue was purified by silica gel column chromatography to give the titled product (600 mg, 73%). [M+H]$^+$=660.3.

Step 6: (R)-3-(tert-butyl)-N-(1-(4-(6-((4-fluoro-5-(piperazin-1-yl)pyridin-2-yl)amino)pyrimidin-4-yl)-2-methylphenyl)ethyl)-1,2,4-oxadiazole-5-carboxamide

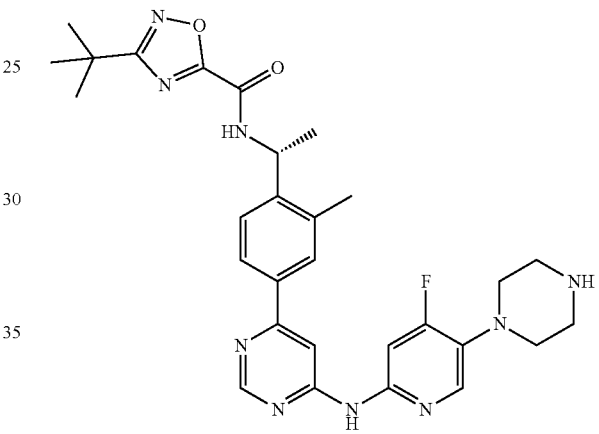

To a stirred mixture of tert-butyl (R)-4-(6-((6-(4-(1-(3-(tert-butyl)-1,2,4-oxadiazole-5-carboxamido)ethyl)-3-methylphenyl)pyrimidin-4-yl)amino)-4-fluoropyridin-3-yl)piperazine-1-carboxylate (650 mg, 0.99 mmol) in DCM (10 mL) was added HCl in 1,4-dioxane (10 mL) dropwise at room temperature. The resulting mixture was stirred for 1 h at room temperature and concentrated under reduced pressure. To the resulting mixture was added Et$_2$O (50 mL) and filtered. The filter cake was washed with Et$_2$O (3×10 mL). The solid was dried under infrared light to afford the titled product (563 mg, 96%). [M+H]$^+$=560.3.

Step 7: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-4-fluoropyridin-2-yl)amino)pyrimidin-4-yl)-2-methylphenyl)ethyl)-1,2,4-oxadiazole-5-carboxamide

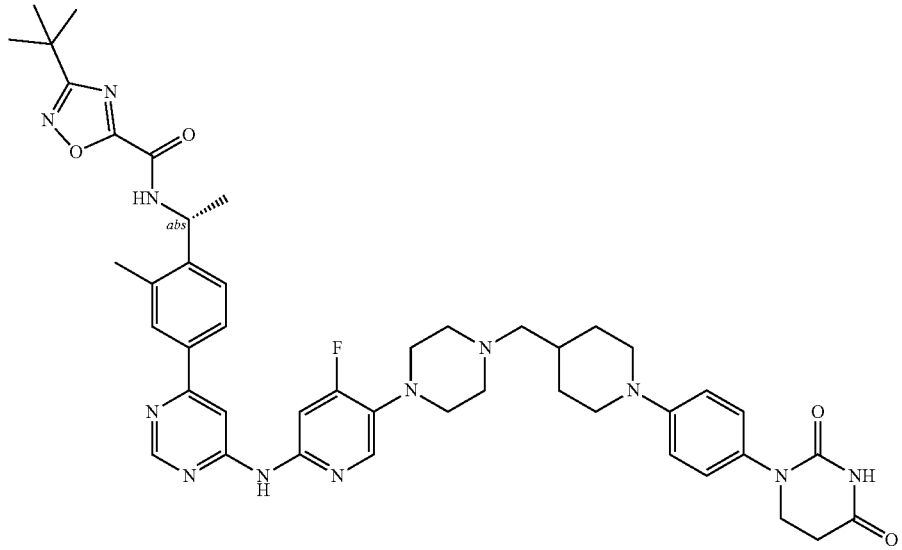 [SMILES: Cc1cc(-c2cc(Nc3cc(F)c(N4CCN(CC5CCN(c6ccc(N7CCC(=O)NC7=O)cc6)CC5)CC4)cn3)ncn2)ccc1[C@@H](C)NC(=O)c1nc(C(C)(C)C)no1]

A mixture of (R)-3-(tert-butyl)-N-(1-(4-(6-((4-fluoro-5-(piperazin-1-yl)pyridin-2-yl)amino)pyrimidin-4-yl)-2-methylphenyl)ethyl)-1,2,4-oxadiazole-5-carboxamide (100 mg, 0.167 mmol), 1-(4-(2,4-dioxotetrahydropyrimidin-1(2H)-yl)phenyl)piperidine-4-carbaldehyde (50 mg, 0.166 mmol), NaBH(OAc)$_3$ (150 mg, 0.65 mmol) and NaOAc (150 mg, 1.9 mmol) in DCM/MeOH (20 mL/5 mL) was stirred at room temperature for 16 h. The mixture was concentrated and purified by silica gel column chromatography to give the titled product (90 mg, 64%). $^1$H NMR (500 MHz, DMSO) δ 10.26 (d, J=5.6 Hz, 2H), 9.89 (d, J=7.8 Hz, 1H), 8.77 (s, 1H), 8.08 (d, J=11.6 Hz, 1H), 8.00 (s, 1H), 7.87-7.73 (m, 3H), 7.61 (d, J=8.6 Hz, 1H), 7.13 (d, J=8.8 Hz, 2H), 6.93 (d, J=8.9 Hz, 2H), 5.37-5.30 (m, 1H), 3.73-3.64 (m, 4H), 3.05 (s, 4H), 2.71-2.62 (m, 4H), 2.57-2.44 (m, 7H), 2.23 (d, J=7.0 Hz, 2H), 1.81 (d, J=11.9 Hz, 2H), 1.71 (s, 1H), 1.51 (d, J=6.9 Hz, 3H), 1.36 (s, 9H), 1.29-1.23 (m, 2H); [M+H]$^+$=845.6.

Example 66: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-6-fluoropyridin-2-yl)amino)pyrimidin-4-yl)-2-methylphenyl)ethyl)-1,2,4-oxadiazole-5-carboxamide Step 1: 5-bromo-6-fluoro-N,N-bis(4-methoxybenzyl)pyridin-2-amine

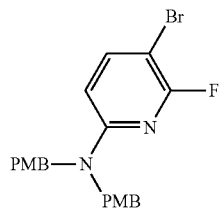

To a stirred mixture of 5-bromo-6-fluoropyridin-2-amine (2.5 g, 13.09 mmol) in THF (50 mL) was added NaH (1.57 g, 39.27 mmol) in portions at 0° C. under nitrogen atmosphere. The resulting mixture was stirred for 1 h at 0° C. under nitrogen atmosphere. To the above mixture was added PMBCl (6.15 g, 39.27 mmol) dropwise at 0° C. The resulting mixture was stirred for additional 16 h at 25° C. and quenched by the addition of sat. NH$_4$Cl (aq.) (50 mL) at 0° C. The resulting mixture was diluted with water (100 mL) and extracted with EtOAc (3×200 mL). The combined organic layers were washed with brine (2×50 mL) and dried over anhydrous Na$_2$SO$_4$. After filtration, the filtrate was concentrated under reduced pressure. The residue was purified by silica gel column chromatography to give the titled product (3.56 g, 63%). [M+H]$^+$=433.1.

Step 2: tert-butyl 4-(6-(bis(4-methoxybenzyl)amino)-2-fluoropyridin-3-yl)piperazine-1-carboxylate

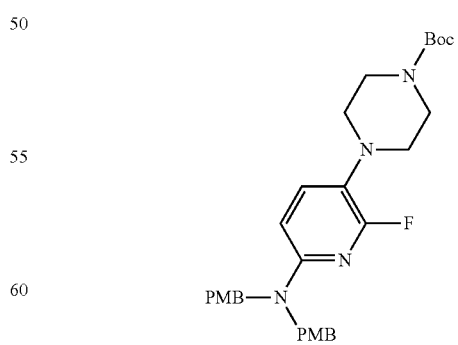

To a stirred mixture of 5-bromo-6-fluoro-N,N-bis(4-methoxybenzyl)pyridin-2-amine (3.5 g, 8.12 mmol) and tert-butyl piperazine-1-carboxylate (1.96 g, 10.55 mmol) in toluene (50 mL) were added BINAP (1.01 g, 1.62 mmol), Pd$_2$(dba)$_3$ (743 mg, 0.81 mmol) and t-BuONa (1.17 g, 12.17 mmol) at room temperature under nitrogen atmosphere. The resulting mixture was stirred for 16 h at 80° C. under nitrogen atmosphere and concentrated under reduced pressure. The residue was purified by silica gel column chromatography to give the titled product (3.1 g, 71%). [M+H]$^+$=537.3.

Step 3: 6-fluoro-5-(piperazin-1-yl)pyridin-2-amine

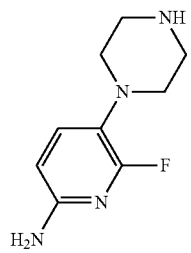

A solution of tert-butyl 4-(6-(bis(4-methoxybenzyl) amino)-2-fluoropyridin-3-yl)piperazine-1-carboxylate (3 g, 5.59 mmol) in TFA (60 mL) was stirred for 2 h at 72° C. under nitrogen atmosphere. The resulting mixture was concentrated under reduced pressure. The crude product was used in the next step directly without further purification. [M+H]$^+$=197.1.

Step 4: tert-butyl 4-(6-amino-2-fluoropyridin-3-yl) piperazine-1-carboxylate

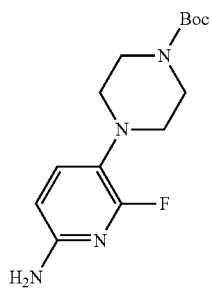

To a stirred mixture of 6-fluoro-5-(piperazin-1-yl)pyridin-2-amine (3 g, 3.54 mmol) and Et$_3$N (1.97 mL, 14.14 mmol) in DCM (60 mL) was added Boc$_2$O (0.93 g, 4.24 mmol) dropwise at 0° C. under nitrogen atmosphere. The resulting mixture was stirred for 1 h at room temperature under nitrogen atmosphere and concentrated under reduced pressure. The residue was purified by silica gel column chromatography to give the titled product (710 mg, 68%). [M+H]$^+$=297.2.

Step 5: tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-fluoropyridin-3-yl)piperazine-1-carboxylate

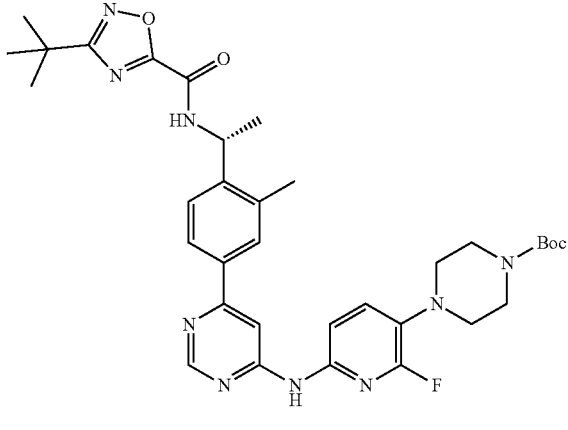 [SMILES: Cc1cc(-c2cc(Nc3ccc(N4CCN(C(=O)OC(C)(C)C)CC4)c(F)n3)ncn2)ccc1[C@@H](C)NC(=O)c1nc(C(C)(C)C)no1]

To a stirred mixture of (R)-3-(tert-butyl)-N-(1-(4-(6-chloropyrimidin-4-yl)-2-methylphenyl)ethyl)-1,2,4-oxadiazole-5-carboxamide (500 mg, 1.25 mmol) and tert-butyl 4-(6-amino-2-fluoropyridin-3-yl)piperazine-1-carboxylate (445 mg, 1.50 mmol) in dioxane (10 mL) were added XPhos (179 mg, 0.38 mmol), Cs$_2$CO$_3$ (815 mg, 2.50 mmol) and XPhos Pd G3 (159 mg, 0.19 mmol) at room temperature under nitrogen atmosphere. The resulting mixture was stirred for 16 h at 100° C. under nitrogen atmosphere and concentrated under reduced pressure. The residue was purified by silica gel column chromatography to give the titled product (370 mg, 45%). [M+H]$^+$=660.3.

Step 6: (R)-3-(tert-butyl)-N-(1-(4-(6-((6-fluoro-5-(piperazin-1-yl)pyridin-2-yl)amino)pyrimidin-4-yl)-2-methylphenyl)ethyl)-1,2,4-oxadiazole-5-carboxamide

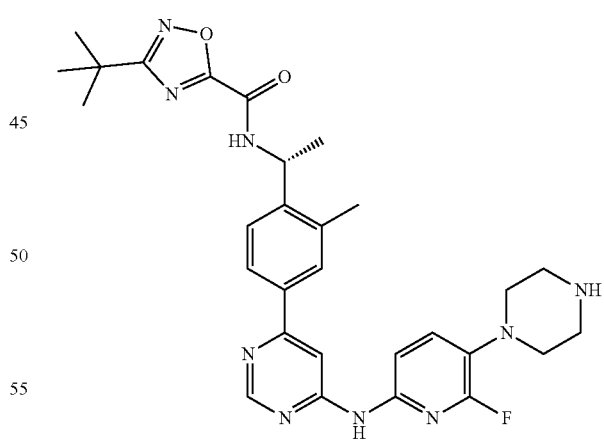

To a stirred solution of tert-butyl (R)-4-(6-((6-(4-(1-(3-(tert-butyl)-1,2,4-oxadiazole-5-carboxamido)ethyl)-3-methylphenyl)pyrimidin-4-yl)amino)-2-fluoropyridin-3-yl)piperazine-1-carboxylate (370 mg, 0.56 mmol) in DCM (5 mL) was added 4 M HCl in 1,4-dioxane (5 mL) dropwise at room temperature. The resulting mixture was stirred for 1 h at room temperature and concentrated under reduced pressure. The residue was purified by trituration with Et$_2$O (50 mL) to afford the titled product (277.6 mg, 83%). [M+H]$^+$=560.3.

Step 7: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)-6-fluoropyridin-2-yl)amino)pyrimidin-4-yl)-2-methylphenyl)ethyl)-1,2,4-oxadiazole-5-carboxamide

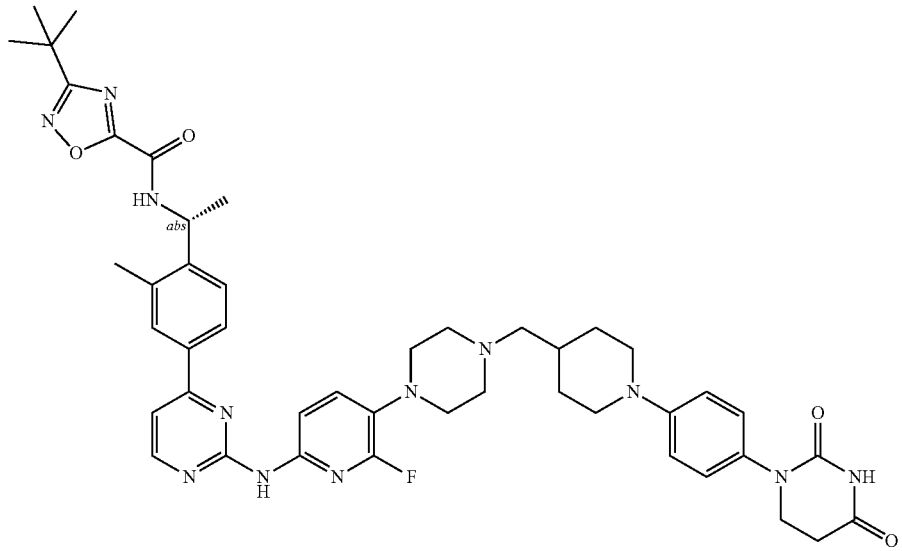 [SMILES: Cc1cc(-c2ccnc(Nc3ccc(N4CCN(CC5CCN(c6ccc(N7CCC(=O)NC7=O)cc6)CC5)CC4)c(F)n3)n2)ccc1[C@@H](C)NC(=O)c1nc(C(C)(C)C)no1]

A mixture of (R)-3-(tert-butyl)-N-(1-(4-(6-((6-fluoro-5-(piperazin-1-yl)pyridin-2-yl)amino)pyrimidin-4-yl)-2-methylphenyl)ethyl)-1,2,4-oxadiazole-5-carboxamide (80 mg, 0.13 mmol), 1-(4-(2,4-dioxotetrahydropyrimidin-1(2H)-yl)phenyl)piperidine-4-carbaldehyde (40 mg, 0.13 mmol), NaBH(OAc)$_3$ (100 mg, 0.43 mmol) and NaOAc (100 mg, 1.3 mmol) in DCM/MeOH (10 mL/2 mL) was stirred at room temperature for 16 h. The mixture was concentrated and purified by silica gel column chromatography to give the titled product (50 mg, 35%). $^1$H NMR (500 MHz, DMSO) δ 10.24 (d, J=15.2 Hz, 2H), 9.88 (d, J=7.8 Hz, 1H), 8.76 (s, 1H), 7.86-7.77 (m, 4H), 7.65-7.56 (m, 2H), 7.13 (d, J=8.9 Hz, 2H), 6.93 (d, J=9.0 Hz, 2H), 5.38-5.29 (m, 1H), 3.69 (t, J=6.7 Hz, 4H), 3.01 (s, 4H), 2.72-2.62 (m, 4H), 2.55-2.44 (m, 7H), 2.23 (d, J=7.0 Hz, 2H), 1.81 (d, J=11.5 Hz, 2H), 1.70 (s, 1H), 1.51 (d, J=6.9 Hz, 3H), 1.36 (s, 9H), 1.29-1.22 (m, 2H); [M+H]$^+$=844.9.

Example 67: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide Step 1: tert-butyl 4-(6-nitropyridin-3-yl)piperazine-1-carboxylate

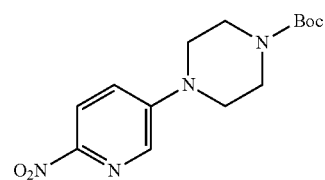 [SMILES: CC(C)(C)OC(=O)N1CCN(c2ccc([N+](=O)[O-])nc2)CC1]

To a stirred mixture of 5-bromo-2-nitropyridine (g, 24.63 mmol) and tert-butyl piperazine-1-carboxylate (6.88 g, 36.94 mmol) in dioxane (100 mL) were added X-Phos (3.52 g, 7.38 mmol), Cs$_2$CO$_3$ (16.05 g, 49.26 mmol) and XPhos Pd G3 (3.13 g, 3.69 mmol) at room temperature under nitrogen atmosphere. The resulting mixture was stirred for 16 h at 100° C. under nitrogen atmosphere and concentrated under vacuum. The residue was purified by silica gel column chromatography to give the titled product (3.5 g, 46%). [M+H]$^+$=309.3.

Step 2: tert-butyl 4-(6-aminopyridin-3-yl)piperazine-1-carboxylate

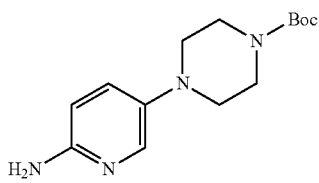

A mixture of tert-butyl 4-(6-nitropyridin-3-yl)piperazine-1-carboxylate (3.5 g, 11.35 mmol) and Fe (6.34 g, 113.51 mmol) in AcOH (80 mL) was stirred for 4 h at 30° C. The resulting mixture was filtered. The filter cake was washed with EtOAc (2×300 mL). The filtrate was concentrated under reduced pressure. The residue was purified by silica gel column chromatography to give the titled product (3.1 g, 98%). [M+H]$^+$=279.2.

Step 3: tert-butyl (R)-4-(6-((4-(4-(1-(3-(tert-butyl)-1,2,4-oxadiazole-5-carboxamido)ethyl)-3-methylphenyl)pyrimidin-2-yl)amino)pyridin-3-yl)piperazine-1-carboxylate

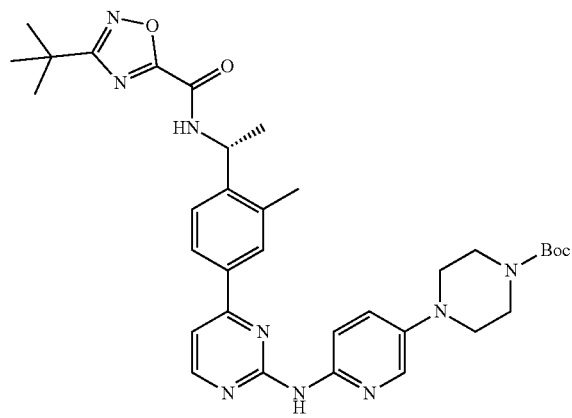 [SMILES: Cc1cc(-c2ccnc(Nc3ccc(N4CCN(C(=O)OC(C)(C)C)CC4)cn3)n2)ccc1[C@@H](C)NC(=O)c1nc(C(C)(C)C)no1]

To a stirred mixture of tert-butyl 4-(6-aminopyridin-3-yl)piperazine-1-carboxylate (300 mg, 1.08 mmol) and (R)-3-(tert-butyl)-N-(1-(4-(2-chloropyrimidin-4-yl)-2-methylphenyl)ethyl)-1,2,4-oxadiazole-5-carboxamide (the compound was obtained through the similar way in example 1) (430.97 mg, 1.08 mmol) in dioxane (6.00 mL) were added X-Phos (102.76 mg, 0.216 mmol), XPhos Pd G3 (91.23 mg, 0.11 mmol) and Cs$_2$CO$_3$ (702.31 mg, 2.16 mmol) in portions at room temperature. The resulting mixture was stirred for 16 h at 100° C. under nitrogen atmosphere and concentrated under vacuum. The residue was purified by silica gel column chromatography to give the titled product (710 mg, 98%). [M+H]$^+$=642.2.

Step 4: (R)-3-(tert-butyl)-N-(1-(2-methyl-4-(2-((5-(piperazin-1-yl)pyridin-2-yl)amino)pyrimidin-4-yl)phenyl)ethyl)-1,2,4-oxadiazole-5-carboxamide

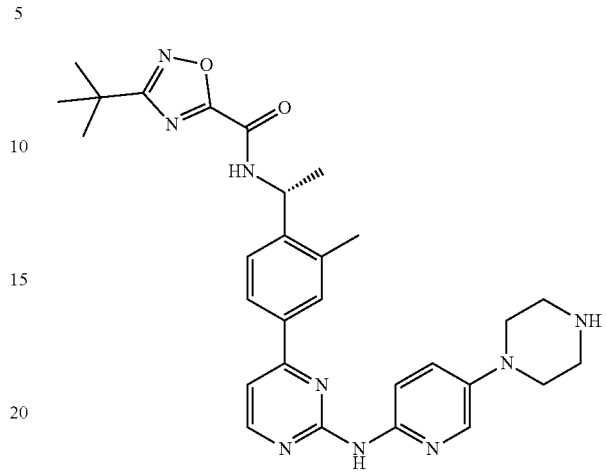

A solution of tert-butyl (R)-4-(6-((4-(4-(1-(3-(tert-butyl)-1,2,4-oxadiazole-5-carboxamido)ethyl)-3-methylphenyl)pyrimidin-2-yl)amino)pyridin-3-yl)piperazine-1-carboxylate (741 mg, 1.16 mmol) and HCl in 1,4-dioxane (10 mL) in DCM (10 mL) was stirred for 1 h at room temperature. The resulting mixture was concentrated under vacuum. The residue was triturated with Et$_2$O to give the titled product (640 mg, 95%). $^1$H NMR (400 MHz, DMSO) δ 11.65 (s, 1H), 9.96 (d, J=7.7 Hz, 1H), 9.50 (brs, 2H), 8.74 (d, J=5.5 Hz, 1H), 8.15-8.11 (m, 1H), 8.09-8.00 (m, 3H), 7.81-7.74 (m, 2H), 7.67 (d, J=8.1 Hz, 1H), 5.37-5.33 (m, 1H), 3.48-3.43 (m, 4H), 3.28-3.24 (m, 4H), 2.48 (s, 3H), 1.53 (d, J=7.0 Hz, 3H), 1.37 (s, 9H); [M+H]$^+$=542.4.

Step 5: (R)-3-(tert-butyl)-N-(1-(4-(2-((5-(4-((1-(4-(2,4-dioxotetrahydropyrimidin-1(2H)-yl)phenyl)piperidin-4-yl)methyl)piperazin-1-yl)pyridin-2-yl)amino)pyrimidin-4-yl)-2-methylphenyl)ethyl)-1,2,4-oxadiazole-5-carboxamide

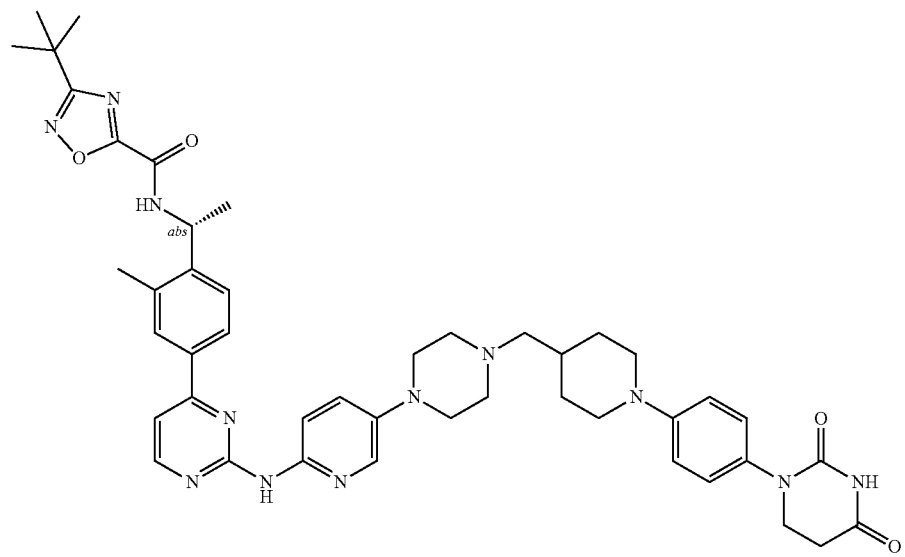 [SMILES: Cc1cc(-c2ccnc(Nc3ccc(N4CCN(CC5CCN(c6ccc(N7CCC(=O)NC7=O)cc6)CC5)CC4)cn3)n2)ccc1[C@@H](C)NC(=O)c1nc(C(C)(C)C)no1]

A mixture of (R)-3-(tert-butyl)-N-(1-(2-methyl-4-(2-((5-(piperazin-1-yl)pyridin-2-yl)amino)pyrimidin-4-yl)phenyl)ethyl)-1,2,4-oxadiazole-5-carboxamide (100 mg, 0.17 mmol), 1-(4-(2,4-dioxotetrahydropyrimidin-1(2H)-yl)phenyl)piperidine-4-carbaldehyde (60 mg, 0.2 mmol), NaBH(OAc)₃ (106 mg, 0.5 mmol) and NaOAc (82 mg, 1.0 mmol) in DCE was stirred at room temperature for 16 h. The mixture was concentrated and purified by silica gel column chromatography to give the titled product (45 mg, 32%). ¹H NMR (500 MHz, DMSO) δ 10.25 (s, 1H), 9.89 (d, J=7.8 Hz, 1H), 9.45 (s, 1H), 8.53 (d, J=5.2 Hz, 1H), 8.18 (d, J=9.1 Hz, 1H), 8.04-7.94 (m, 3H), 7.62 (d, J=8.1 Hz, 1H), 7.48 (dd, J=9.2, 2.9 Hz, 1H), 7.40 (d, J=5.2 Hz, 1H), 7.13 (d, J=8.9 Hz, 2H), 6.93 (d, J=9.0 Hz, 2H), 5.39-5.29 (m, 1H), 3.73-3.64 (m, 4H), 3.14 (s, 4H), 2.71-2.62 (m, 4H), 2.57-2.52 (m, 4H), 2.48 (s, 3H), 2.23 (d, J=7.2 Hz, 2H), 1.81 (d, J=12.0 Hz, 2H), 1.76-1.66 (m, 1H), 1.52 (d, J=7.0 Hz, 3H), 1.36 (s, 9H), 1.29-1.17 (m, 2H); [M+H]⁺=827.5.

Example 68: (R)-3-(tert-butyl)-N-(1-(4-(2-((5-(4-(7-(4-(2,4-dioxotetrahydropyrimidin-1(2H)-yl)phenyl)-7-azaspiro[3.5]nonan-2-yl)piperazin-1-yl)pyridin-2-yl)amino)pyrimidin-4-yl)-2-methylphenyl)ethyl)-1,2,4-oxadiazole-5-carboxamide Step 1: 7-azaspiro[3.5]nonan-2-ol

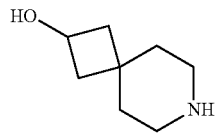

To a solution of 7-azaspiro[3.5]nonan-2-one (200 mg, 1.1 mmol) in MeOH (10 mL) was added NaBH₄ (45 mg, 1.2 mmol) slowly at 0° C. The reaction mixture was stirred at room temperature for 3 h and concentrated under reduced pressure. The residue was purified by silica gel column chromatography to give the titled product (140 mg, 90%). ¹H NMR (500 MHz, DMSO) δ 4.10-4.00 (m, 1H), 2.62-2.51 (m, 4H), 2.11-2.03 (m, 2H), 1.52-1.46 (m, 2H), 1.39-1.33 (m, 4H).

Step 2: 1-(4-(2-oxo-7-azaspiro[3.5]nonan-7-yl)phenyl)-3-((2-(trimethylsilyl)ethoxy)methyl)dihydropyrimidine-2,4(1H,3H)-dione

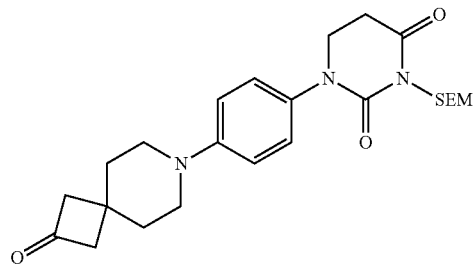 [SMILES: C[Si](C)(C)CCOCN1C(=O)CCN(c2ccc(N3CCC4(CC3)CC(=O)C4)cc2)C1=O]

A mixture of 7-azaspiro[3.5]nonan-2-ol (130 mg, 0.92 mmol), 4-(2,4-dioxo-3-((2-(trimethylsilyl)ethoxy)methyl)tetrahydropyrimidin-1(2H)-yl)phenyl trifluoromethanesulfonate (450 mg, 0.96 mmol), Pd₂dba₃ (40 mg, 0.044 mmol), RuPhos (40 mg, 0.086 mmol) and Cs₂CO₃ (600 mg, 1.84 mmol) in dioxane was heated to reflux for 16 h. The resulting mixture was concentrated under reduced pressure. The residue was purified by silica gel column chromatography to give the titled product (60 mg, 14%). [M+H]⁺=458.3.

Step 3: (R)-3-(tert-butyl)-N-(1-(4-(2-((5-(4-(7-(4-(2,4-dioxo-3-((2-(trimethylsilyl)ethoxy)methyl)tetrahydropyrimidin-1(2H)-yl)phenyl)-7-azaspiro[3.5]nonan-2-yl)piperazin-1-yl)pyridin-2-yl)amino)pyrimidin-4-yl)-2-methylphenyl)ethyl)-1,2,4-oxadiazole-5-carboxamide

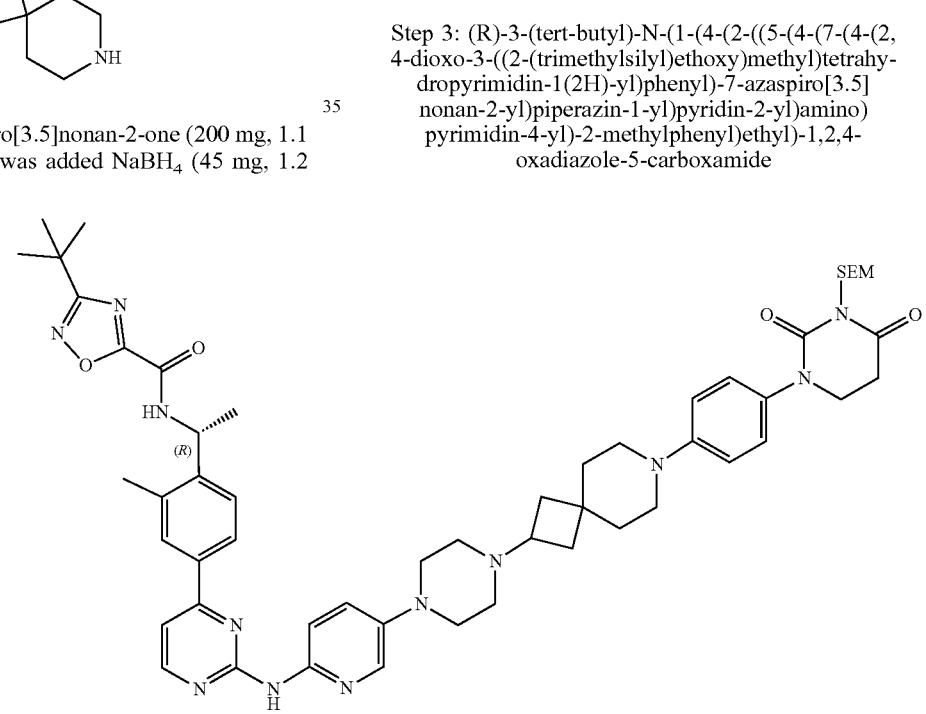

A mixture of (R)-3-(tert-butyl)-N-(1-(2-methyl-4-(2-((5-(piperazin-1-yl)pyridin-2-yl)amino)pyrimidin-4-yl)phenyl)ethyl)-1,2,4-oxadiazole-5-carboxamide (37 mg, 0.068 mmol), 1-(4-(2-oxo-7-azaspiro [3.5]nonan-7-yl)phenyl)-3-((2-(trimethylsilyl)ethoxy)methyl)dihydropyrimidine-2,4 (1H,3H)-dione (40 mg, 0.087 mmol), NaBH(OAc)₃ (50 mg, 0.23 mmol) and NaOAc (71 mg, 0.86 mmol) in DCE (8 mL)

was stirred at room temperature for 16 h. The resulting mixture was concentrated under reduced pressure. The residue was purified by silica gel column chromatography to give the titled product (30 mg, 45%). [M+H]$^+$=982.7.

Step 4: (R)-3-(tert-butyl)-N-(1-(4-(2-((5-(4-(7-(4-(2,4-dioxotetrahydropyrimidin-1(2H)-yl)phenyl)-7-azaspiro[3.5]nonan-2-yl)piperazin-1-yl)pyridin-2-yl)amino)pyrimidin-4-yl)-2-methylphenyl)ethyl)-1,2,4-oxadiazole-5-carboxamide

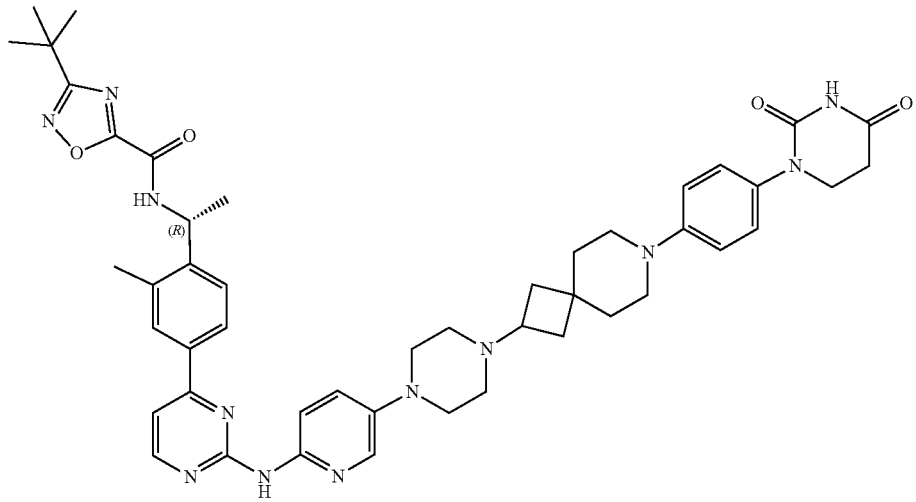

A solution of (R)-3-(tert-butyl)-N-(1-(4-(2-((5-(4-(7-(4-(2,4-dioxo-3-((2-(trimethylsilyl)ethoxy)methyl)tetrahydropyrimidin-1(2H)-yl)phenyl)-7-azaspiro[3.5]nonan-2-yl)piperazin-1-yl)pyridin-2-yl)amino)pyrimidin-4-yl)-2-methylphenyl)ethyl)-1,2,4-oxadiazole-5-carboxamide (30 mg, 0.031 mmol) in HCl/dioxane (4 N, 10 mL) was stirred at room temperature for 16 h. The mixture was concentrated and stirred with NH$_3$/MeOH (7 N, 5 mL) at room temperature for 10 minutes. The resulting mixture was concentrated under reduced pressure. The residue was purified by silica gel column chromatography to give the titled product (12 mg, 45%). $^1$H NMR (500 MHz, DMSO) δ 10.25 (s, 1H), 9.89 (d, J=7.8 Hz, 1H), 9.44 (s, 1H), 8.53 (d, J=5.2 Hz, 1H), 8.17 (d, J=9.1 Hz, 1H), 8.03-7.94 (m, 3H), 7.61 (d, J=8.1 Hz, 1H), 7.47 (dd, J=9.2, 2.8 Hz, 1H), 7.40 (d, J=5.3 Hz, 1H), 7.13 (d, J=8.9 Hz, 2H), 6.93 (d, J=9.0 Hz, 2H), 5.37-5.30 (m, 1H), 3.69 (t, J=6.7 Hz, 2H), 3.13 (s, 6H), 3.05 (s, 2H), 2.78-2.72 (m, 1H), 2.68 (t, J=6.7 Hz, 2H), 2.48 (s, 3H), 2.41 (s, 4H), 2.01 (t, J=9.0 Hz, 2H), 1.71-1.56 (m, 6H), 1.52 (d, J=7.0 Hz, 3H), 1.36 (s, 9H); [M+H]$^+$=853.8.

Example 69: (R)-3-(tert-butyl)-N-(1-(4-(2-((4-(4-((1-(4-(2,4-dioxotetrahydropyrimidin-1(2H)-yl)phenyl)piperidin-4-yl)methyl)piperazin-1-yl)phenyl)amino)pyrimidin-4-yl)-2-methylphenyl)ethyl)-1,2,4-oxadiazole-5-carboxamide Step 1: benzyl 4-(4-nitrophenyl)piperazine-1-carboxylate

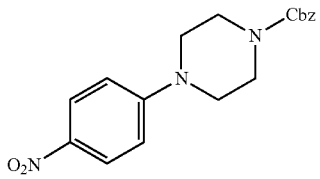 [SMILES: O=C(OCc1ccccc1)N1CCN(c2ccc([N+](=O)[O-])cc2)CC1]

To a stirred solution of 4-fluoronitrobenzene (5 g, 35.436 mmol) and benzyl piperazine-1-carboxylate (9.3 g, 42.523 mmol) in DMSO (100 mL) was added TEA (10.7 g, 106.308 mmol) dropwise at room temperature under nitrogen atmosphere. The resulting mixture was stirred overnight at 100° C. under nitrogen atmosphere and diluted with water (500 mL). The resulting mixture was filtered. The filter cake was washed with water (3×50 mL). The filter cake was collected and dried under vacuum to afford the product (10 g, 82%). [M+H]$^+$=342.0.

Step 2: benzyl 4-(4-aminophenyl)piperazine-1-carboxylate

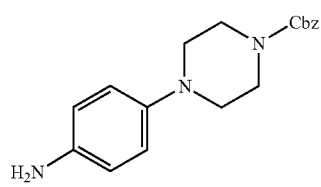

To a stirred solution of benzyl 4-(4-nitrophenyl)piperazine-1-carboxylate (9.5 g, 27.829 mmol) in AcOH (260 mL) was added Fe powder (15.5 g, 278.290 mmol) in portions at room temperature under nitrogen atmosphere. The resulting mixture was stirred overnight at room temperature under nitrogen atmosphere and filtered. The filter cake was washed with EtOAc (3×50 mL). The filtrate was concentrated under reduced pressure. The residue was purified by silica gel column chromatography, eluted with 40%-60% petroleum ether in EtOAc to afford the product (9 g, 93%). [M+H]$^+$=312.1.

Step 3: benzyl (R)-4-(4-((4-(4-(1-(3-(tert-butyl)-1,2,4-oxadiazole-5-carboxamido)ethyl)-3-methylphenyl)pyrimidin-2-yl)amino)phenyl)piperazine-1-carboxylate

Step 4: (R)-3-(tert-butyl)-N-(1-(2-methyl-4-(2-((4-(piperazin-1-yl)phenyl)amino)pyrimidin-4-yl)phenyl)ethyl)-1,2,4-oxadiazole-5-carboxamide

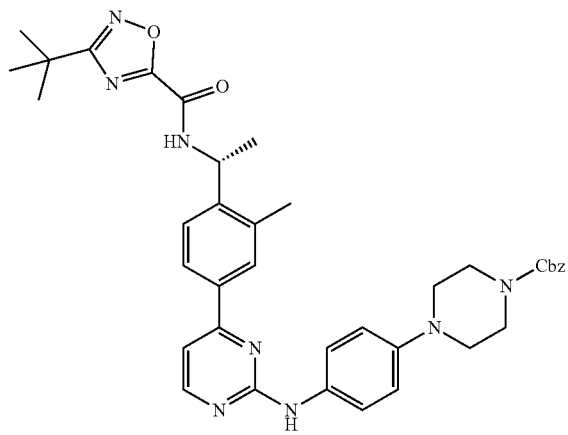 [SMILES: Cc1cc(-c2ccnc(Nc3ccc(N4CCN(C(=O)OCc5ccccc5)CC4)cc3)n2)ccc1[C@@H](C)NC(=O)c1nc(C(C)(C)C)no1]

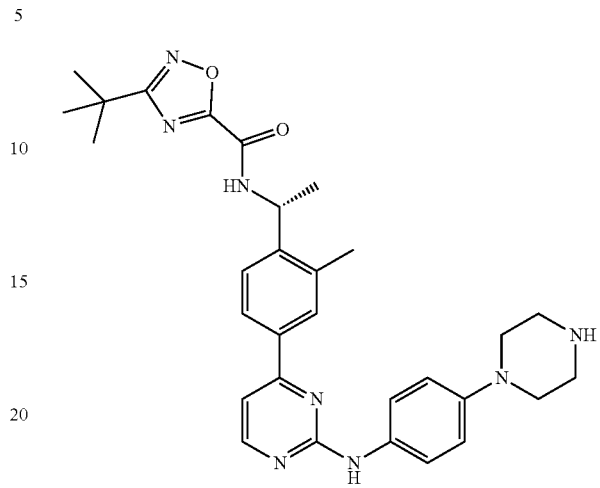

Into a 50 mL round-bottom flask were added benzyl (R)-4-(4-((4-(4-(1-(3-(tert-butyl)-1,2,4-oxadiazole-5-carboxamido)ethyl)-3-methylphenyl)pyrimidin-2-yl)amino)phenyl)piperazine-1-carboxylate (890 mg, 1.319 mmol) and TFA (15 mL) at room temperature. The resulting mixture was stirred overnight at 70° C. under nitrogen atmosphere and concentrated under reduced pressure. The residue was purified by trituration with ethyl ether (20 mL) to afford the product (636 mg, 73%). $^1$H NMR (400 MHz, DMSO) δ 9.89 (d, J=7.8 Hz, 1H), 9.41 (s, 1H), 8.47 (d, J=5.2 Hz, 1H), 8.25 (s, 1H), 8.01-7.95 (m, 2H), 7.96 (s, 1H), 7.72-7.64 (m, 2H), 7.62 (d, J=8.7 Hz, 1H), 7.30 (d, J=5.2 Hz, 1H), 6.94 (d, J=9.0 Hz, 2H), 5.36-5.32 (m, 1H), 3.13-3.09 (m, 4H), 3.03-2.99 (m, 4H), 2.48 (s, 3H), 1.52 (d, J=6.9 Hz, 3H), 1.37 (s, 9H); [M+H]$^+$=541.3.

To a stirred solution of (R)-3-(tert-butyl)-N-(1-(4-(2-chloropyrimidin-4-yl)-2-methylphenyl)ethyl)-1,2,4-oxadiazole-5-carboxamide (900 mg, 2.251 mmol) and benzyl 4-(4-aminophenyl)piperazine-1-carboxylate (840 mg, 2.701 mmol) in dioxane (18 mL) were added XPhos Pd G3 (285 mg, 0.338 mmol), Cs$_2$CO$_3$ (1.4 g, 4.502 mmol) and XPhos (321 mg, 0.675 mmol) in portions at room temperature under nitrogen atmosphere. The resulting mixture was stirred overnight at 100° C. under nitrogen atmosphere. The mixture was allowed to cool down to room temperature and concentrated. The residue was purified by silica gel column chromatography, eluted with 20%-50% petroleum ether in EtOAc to afford the product (890 mg, 58%). [M+H]$^+$=675.3.

Step 5: (R)-3-(tert-butyl)-N-(1-(4-(2-((4-(4-((1-(4-(2,4-dioxotetrahydropyrimidin-1(2H)-yl)phenyl)piperidin-4-yl)methyl)piperazin-1-yl)phenyl)amino)pyrimidin-4-yl)-2-methylphenyl)ethyl)-1,2,4-oxadiazole-5-carboxamide

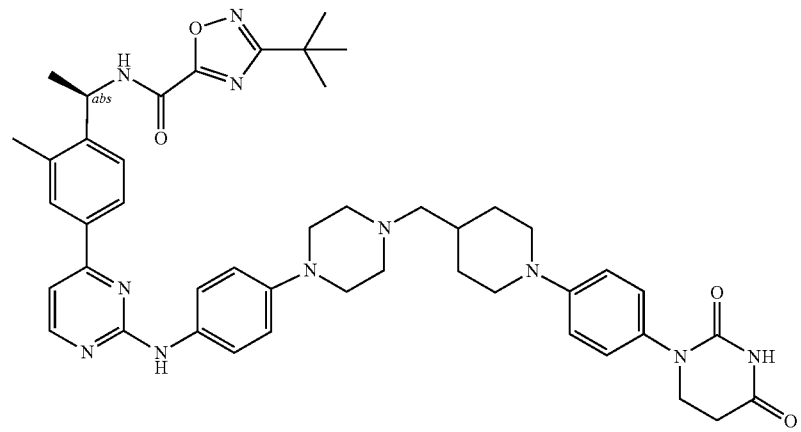 [SMILES: Cc1cc(-c2ccnc(Nc3ccc(N4CCN(CC5CCN(c6ccc(N7CCC(=O)NC7=O)cc6)CC5)CC4)cc3)n2)ccc1[C@@H](C)NC(=O)c1nc(C(C)(C)C)no1]

A mixture of (R)-3-(tert-butyl)-N-(1-(2-methyl-4-(2-((4-(piperazin-1-yl)phenyl)amino)pyrimidin-4-yl)phenyl)ethyl)-1,2,4-oxadiazole-5-carboxamide (0.06 g, 0.092 mmol) and 1-(4-(2,4-dioxotetrahydropyrimidin-1(2H)-yl)phenyl)piperidine-4-carbaldehyde (0.042 g, 0.137 mmol) in 1,2-dichloroethane (5 mL) and HOAc (25 mg) was stirred in a round bottom flask at room temperature for 0.5 hour. To the mixture was added NaBH(OAc)$_3$ (0.044 g, 0.206 mmol) and stirred at room temperature for 3 hours. Then the mixture was evaporated in vacuum to afford the crude product, which was purified by pre-HPLC to afford the product (41.51 mg, 55%). $^1$H NMR (500 MHz, DMSO) δ 10.25 (s, 1H), 9.88 (d, J=7.8 Hz, 1H), 9.37 (s, 1H), 8.46 (d, J=5.2 Hz, 1H), 7.96 (d, J=8.0 Hz, 2H), 7.65 (d, J=8.9 Hz, 2H), 7.61 (d, J=8.0 Hz, 1H), 7.29 (d, J=5.2 Hz, 1H), 7.13 (d, J=8.9 Hz, 2H), 6.92 (dd, J=8.9, 4.8 Hz, 4H), 5.37-5.29 (m, 1H), 3.69 (t, J=6.7 Hz, 4H), 3.08 (s, 4H), 2.70-2.63 (m, 4H), 2.55-2.50 (m, 4H), 2.47 (s, 3H), 2.23 (d, J=6.9 Hz, 2H), 1.81 (d, J=11.7 Hz, 2H), 1.71 (s, 1H), 1.51 (d, J=7.0 Hz, 3H), 1.36 (s, 9H), 1.28-1.17 (m, 2H); [M+H]$^+$=826.6.

Example 70: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)pyridin-2-yl)amino)-5-fluoropyrimidin-4-yl)-2-methylphenyl)ethyl)-1,2,4-oxadiazole-5-carboxamide

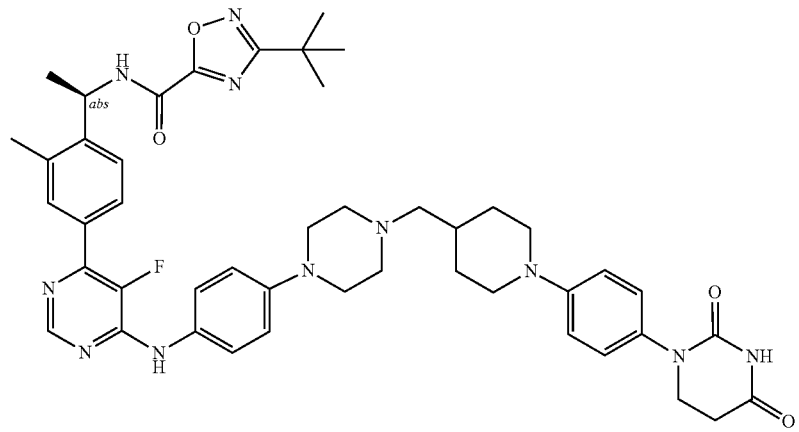 [SMILES: Cc1cc(-c2ncnc(Nc3ccc(N4CCN(CC5CCN(c6ccc(N7CCC(=O)NC7=O)cc6)CC5)CC4)cc3)c2F)ccc1[C@@H](C)NC(=O)c1nc(C(C)(C)C)no1]

The titled compound was synthesized in the procedures similar to Example 68. $^1$H NMR (500 MHz, DMSO) δ 10.25 (s, 1H), 9.90 (d, J=10.0 Hz, 1H), 9.72 (s, 1H), 8.48 (s, 1H), 8.09-8.05 (m, 1H), 7.95 (d, J=10.0 Hz, 2H), 7.82-7.79 (m, 2H), 7.63 (d, J=5.0 Hz, 1H), 7.45 (d, J=5.0 Hz, 1H), 7.13 (d, J=10.0 Hz, 2H), 6.93 (d, J=10.0 Hz, 2H), 5.36-5.33 (m, 1H), 3.71-3.68 (m, 4H), 3.17 (s, 4H), 2.69-2.65 (m, 4H), 2.55-2.53 (m, 4H), 2.47 (s, 3H), 2.24-2.23 (m, 2H), 1.83-1.72 (m, 3H), 1.52 (d, J=10.0 Hz, 3H), 1.36 (s, 9H), 1.26-1.20 (m, 2H); [M+H]$^+$=845.6.

Example 71: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)thiazol-2-yl)amino)pyrimidin-4-yl)-5-fluoro-2-methylphenyl)ethyl)-1,2,4-oxadiazole-5-carboxamide Step 1: tert-butyl 4-(2-aminothiazol-5-yl)piperazine-1-carboxylate

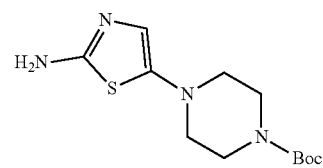 [SMILES: CC(C)(C)OC(=O)N1CCN(c2cnc(N)s2)CC1]

To a stirred mixture of 5-bromothiazol-2-amine hydrobromide (1.5 g, 5.77 mmol) and tert-butyl piperazine-1-carboxylate (1.29 g, 6.93 mmol) in DMF (20 mL) was added K₂CO₃ (2.4 g, 17.39 mmol) at room temperature. The resulting mixture was stirred for 3 h at 50° C. under nitrogen atmosphere and concentrated under reduced pressure. The residue was purified by silica gel column chromatography, eluted with 5%-90% EtOAc in petroleum ether to afford the product (1.4 g, 85%). [M+H]⁺=285.1.

Step 2: tert-butyl 4-(2-((6-chloropyrimidin-4-yl)amino)thiazol-5-yl)piperazine-1-carboxylate

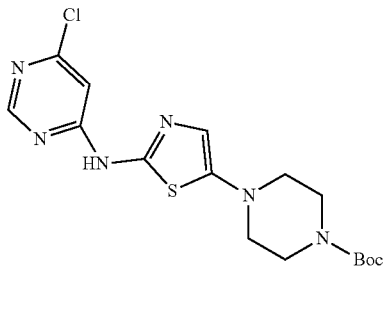 [SMILES: CC(C)(C)OC(=O)N1CCN(c2cnc(Nc3cc(Cl)ncn3)s2)CC1]

To a stirred mixture of tert-butyl 4-(2-aminothiazol-5-yl)piperazine-1-carboxylate (1.4 g, 4.92 mmol) and 4,6-dichloropyrimidine (1.4 g, 9.39 mmol) in ethanol (40 mL) was added DIEA (1.27 g, 9.84 mmol) at room temperature. The resulting mixture was stirred for 12 hours at 75° C. under nitrogen atmosphere and concentrated under reduced pressure. The residue was purified by silica gel column chromatography, eluted with 5%-90% EtOAc in petroleum ether to afford the product (1.2 g, 77%). [M+H]⁺=397.1.

Step 3: tert-butyl (R)-4-(2-((6-(4-(1-(3-(tert-butyl)-1,2,4-oxadiazole-5-carboxamido)ethyl)-2-fluoro-5-methylphenyl)pyrimidin-4-yl)amino)thiazol-5-yl)piperazine-1-carboxylate

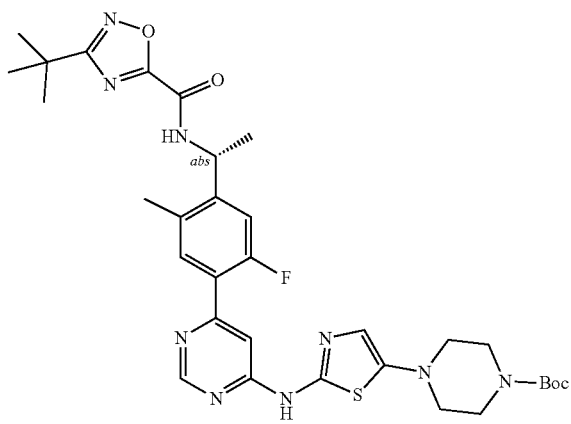 [SMILES: Cc1cc(-c2cc(Nc3ncc(N4CCN(C(=O)OC(C)(C)C)CC4)s3)ncn2)c(F)cc1[C@@H](C)NC(=O)c1nc(C(C)(C)C)no1]

To a stirred mixture of tert-butyl 4-(2-((6-chloropyrimidin-4-yl)amino)thiazol-5-yl)piperazine-1-carboxylate (400 mg, 1.007 mmol) and (R)-3-(tert-butyl)-N-(1-(5-fluoro-2-methyl-4-(4,4,5,5-tetramethyl-1,3,2-dioxaborolan-2-yl)phenyl)ethyl)-1,2,4-oxadiazole-5-carboxamide (480 mg, 1.114 mmol) in dioxane (8 mL) and H₂O (2 mL) were added K₂CO₃ (280 mg, 2.029 mmol) and Pd(dppf)Cl₂ (80 mg, 0.098 mmol) at room temperature under nitrogen atmosphere. The resulting mixture was stirred for 16 h at 89° C. under nitrogen atmosphere. The mixture was allowed to cool down to room temperature and concentrated under reduced pressure. The residue was purified by silica gel column chromatography, eluted with 10%-95% EtOAc in petroleum ether to afford the product (280 mg, 42%). [M+H]⁺=666.3.

Step 4: (R)-3-(tert-butyl)-N-(1-(5-fluoro-2-methyl-4-(6-((5-(piperazin-1-yl)thiazol-2-yl)amino)pyrimidin-4-yl)phenyl)ethyl)-1,2,4-oxadiazole-5-carboxamide

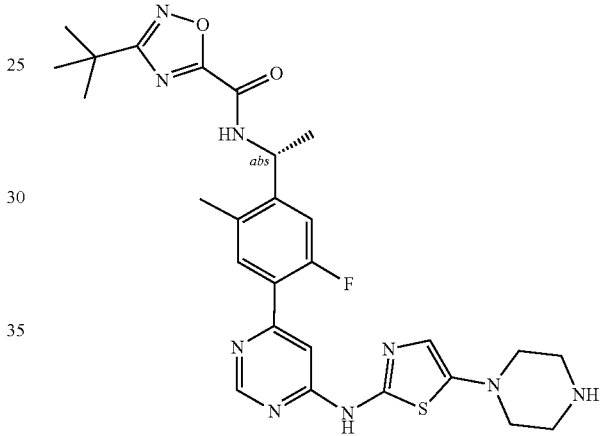

To a stirred solution of tert-butyl (R)-4-(2-((6-(4-(1-(3-(tert-butyl)-1,2,4-oxadiazole-5-carboxamido)ethyl)-2-fluoro-5-methylphenyl)pyrimidin-4-yl)amino)thiazol-5-yl)piperazine-1-carboxylate (75 mg, 0.132 mmol) in DCM (5 mL) was added TFA (1 mL) at room temperature. The resulting solution was stirred for 0.5 h at room temperature and concentrated under vacuum. The residue (100 mg, crude) was used directly for next step without any further purification. [M+H]⁺=566.2.

Step 5: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)thiazol-2-yl)amino)pyrimidin-4-yl)-5-fluoro-2-methylphenyl)ethyl)-1,2,4-oxadiazole-5-carboxamide

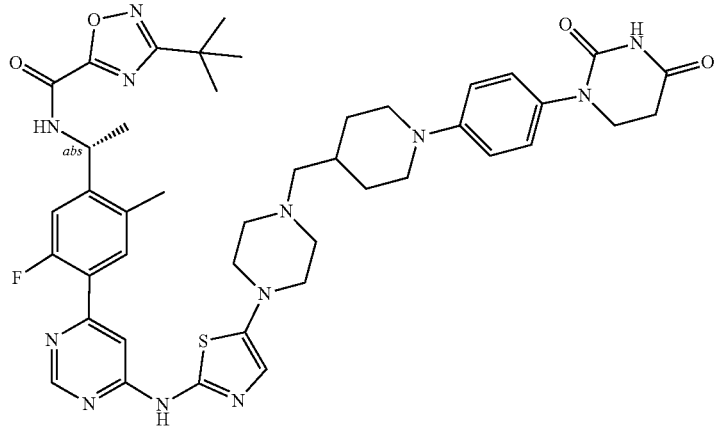 [SMILES: Cc1cc(-c2cc(Nc3ncc(N4CCN(CC5CCN(c6ccc(N7CCC(=O)NC7=O)cc6)CC5)CC4)s3)ncn2)c(F)cc1[C@@H](C)NC(=O)c1nc(C(C)(C)C)no1]

A mixture of (R)-3-(tert-butyl)-N-(1-(5-fluoro-2-methyl-4-(6-((5-(piperazin-1-yl)thiazol-2-yl)amino)pyrimidin-4-yl)phenyl)ethyl)-1,2,4-oxadiazole-5-carboxamide (0.1 g, crude) and 1-(4-(2,4-dioxotetrahydropyrimidin-1(2H)-yl)phenyl)piperidine-4-carbaldehyde (0.05 g, 0.166 mmol) in 1,2-dichloroethane (5 mL) and HOAc (25 mg) was stirred in a round bottom flask at room temperature for 0.5 hour. To the mixture was added NaBH(OAc)₃ (0.04 g, 0.189 mmol) and stirred at room temperature for 12 hours. Then the mixture was evaporated in vacuum to afford the crude product, which was purified by pre-HPLC to afford the product (19.58 mg, 21%). ¹H NMR (500 MHz, DMSO) δ 11.45 (s, 1H), 10.25 (s, 1H), 9.87 (d, J=7.9 Hz, 1H), 8.83 (d, J=0.9 Hz, 1H), 7.90 (d, J=8.0 Hz, 1H), 7.44 (d, J=12.9 Hz, 2H), 7.13 (d, J=8.9 Hz, 2H), 6.93 (d, J=8.9 Hz, 2H), 6.66 (s, 1H), 5.29 (t, J=7.1 Hz, 1H), 3.69 (t, J=6.7 Hz, 4H), 3.05 (s, 4H), 2.67 (dd, J=16.1, 9.4 Hz, 4H), 2.55-2.40 (m, 7H), 2.22 (s, 2H), 1.85-1.65 (m, 3H), 1.50 (d, J=7.0 Hz, 3H), 1.37 (s, 9H), 1.27-1.18 (m, 2H); [M+H]⁺=851.6.

Example 72: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-1,3,4-thiadiazol-2-yl)amino)pyrimidin-4-yl)-2-methylphenyl)ethyl)-1,2,4-oxadiazole-5-carboxamide Step 1: tert-butyl 4-(5-amino-1,3,4-thiadiazol-2-yl)piperazine-1-carboxylate

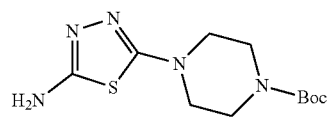 [SMILES: CC(C)(C)OC(=O)N1CCN(c2nnc(N)s2)CC1]

A mixture of 5-bromo-1,3,4-thiadiazol-2-amine (5 g, 27 mmol), tert-butyl piperazine-1-carboxylate (7.5 g, 40 mmol) and K₂CO₃ (7.0 g, 51 mmol) in DMA (50 mL) was stirred at 100° C. for 16 h. The mixture was cooled, and water (250 mL) was added. The resulting mixture was extracted with EA (2×100 mL). The combined organic layers were washed with sat. NaCl (aq.) (200 mL) and dried over anhydrous Na₂SO₄. After filtration, the filtrate was concentrated under reduced pressure. The residue was purified by silica gel column chromatography to afford the product (5.2 g, 67%). [M+H]⁺=285.9.

Step 2: tert-butyl 4-(5-((6-chloropyrimidin-4-yl)amino)-1,3,4-thiadiazol-2-yl)piperazine-1-carboxylate

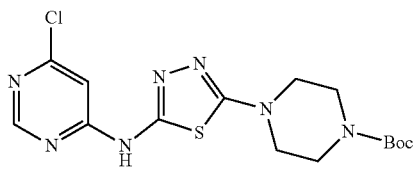 [SMILES: CC(C)(C)OC(=O)N1CCN(c2nnc(Nc3cc(Cl)ncn3)s2)CC1]

A mixture of tert-butyl 4-(5-amino-1,3,4-thiadiazol-2-yl)piperazine-1-carboxylate (590 mg, 2.1 mmol), 4,6-dichloropyrimidine (300 mg, 2.0 mmol), Pd₂dba₃ (60 mg, 0.066 mmol), XantPhos (100 mg, 0.172 mmol) and Na₂CO₃ (580 mg, 5.47 mmol) in dioxane (20 mL) was stirred for 16 hours at 110° C. The resulting mixture was cooled and concentrated under reduced pressure. The residue was purified by silica gel column chromatography to afford the product (410 mg, 52%). [M+H]⁺=398.2.

Step 3: tert-butyl (R)-4-(5-((6-(4-(1-(3-(tert-butyl)-1,2,4-oxadiazole-5-carboxamido)ethyl)-3-methylphenyl)pyrimidin-4-yl)amino)-1,3,4-thiadiazol-2-yl)piperazine-1-carboxylate

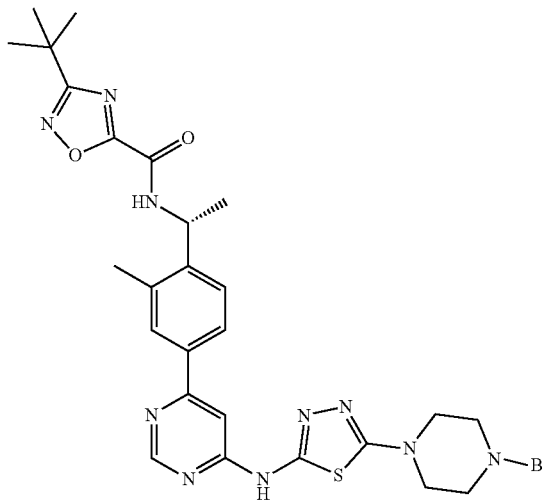

A mixture of tert-butyl 4-(5-((6-chloropyrimidin-4-yl)amino)-1,3,4-thiadiazol-2-yl)piperazine-1-carboxylate (260 mg, 0.65 mmol), (R)-3-(tert-butyl)-N-(1-(2-methyl-4-(4,4,5,5-tetramethyl-1,3,2-dioxaborolan-2-yl)phenyl)ethyl)-1,2,4-oxadiazole-5-carboxamide (230 mg, 0.56 mmol), Pd(dppf)Cl$_2$ (50 mg, 0.068 mmol) and K$_2$CO$_3$ (300 mg, 2.17 mmol) in dioxane (16 mL) and H$_2$O (4 mL) was stirred for 16 hours at 110° C. The resulting mixture was cooled and concentrated under reduced pressure. The residue was purified by silica gel column chromatography to afford the product (200 mg, 55%). [M+H]$^+$=649.4.

Step 4: (R)-3-(tert-butyl)-N-(1-(2-methyl-4-(6-((5-(piperazin-1-yl)-1,3,4-thiadiazol-2-yl)amino)pyrimidin-4-yl)phenyl)ethyl)-1,2,4-oxadiazole-5-carboxamide

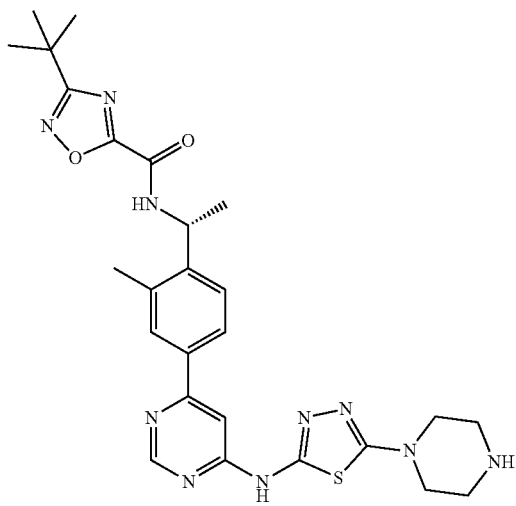 [SMILES: Cc1cc(-c2cc(Nc3nnc(N4CCNCC4)s3)ncn2)ccc1[C@@H](C)NC(=O)c1nc(C(C)(C)C)no1]

To a stirred solution of tert-butyl (R)-4-(5-((6-(4-(1-(3-(tert-butyl)-1,2,4-oxadiazole-5-carboxamido)ethyl)-3-methylphenyl)pyrimidin-4-yl)amino)-1,3,4-thiadiazol-2-yl)piperazine-1-carboxylate (77 mg, 0.12 mmol) in dioxane (4 mL) was added 4 N HCl/dioxane (4 mL) at room temperature. The resulting solution was stirred for 16 h at room temperature. The resulting mixture was concentrated under vacuum to afford the product (85 mg, crude). [M+H]$^+$=549.5.

Step 5: (R)-3-(tert-butyl)-N-(1-(4-(6-((5-(4-((1-(4-(2,4-dioxotetrahydropyrimidin-1(2H)-yl)phenyl)piperidin-4-yl)methyl)piperazin-1-yl)-1,3,4-thiadiazol-2-yl)amino)pyrimidin-4-yl)-2-methylphenyl)ethyl)-1,2,4-oxadiazole-5-carboxamide

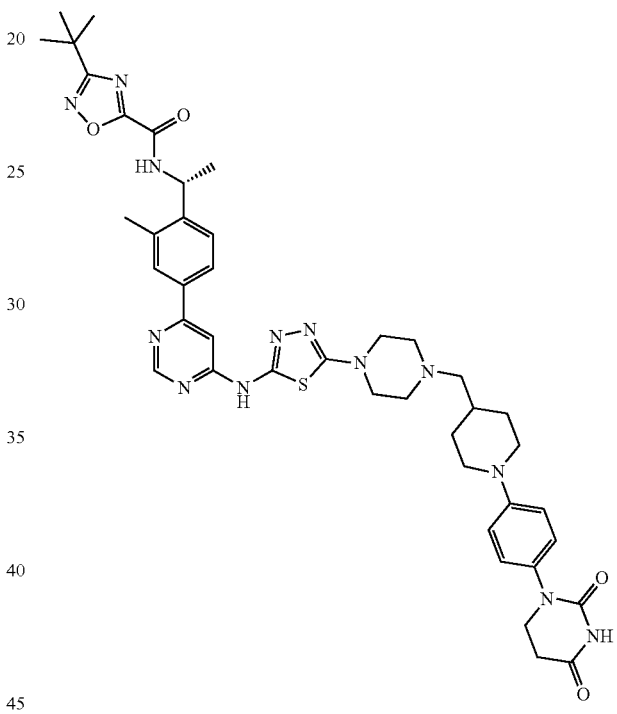

A mixture of (R)-3-(tert-butyl)-N-(1-(2-methyl-4-(6-((5-(piperazin-1-yl)-1,3,4-thiadiazol-2-yl)amino)pyrimidin-4-yl)phenyl)ethyl)-1,2,4-oxadiazole-5-carboxamide (85 mg, crude), 1-(4-(2,4-dioxotetrahydropyrimidin-1(2H)-yl)phenyl)piperidine-4-carbaldehyde (40 mg, 0.13 mmol), NaOAc (100 mg, 1.2 mmol) and NaBH(OAc)$_3$ (100 mg, 0.47 mmol) in DCE (10 mL) was stirred at room temperature for 2 h. The mixture was concentrated and purified by silica gel column chromatography to give the titled product (15 mg, 15%). $^1$H NMR (500 MHz, DMSO) δ 11.68 (s, 1H), 10.25 (s, 1H), 9.89 (d, J=7.8 Hz, 1H), 8.80 (s, 1H), 7.84 (s, 2H), 7.62 (d, J=8.7 Hz, 1H), 7.37 (s, 1H), 7.13 (d, J=8.9 Hz, 2H), 6.93 (d, J=9.1 Hz, 2H), 5.37-5.28 (m, 1H), 3.72-3.64 (m, 4H), 3.46-3.36 (m, 4H), 2.71-2.61 (m, 4H), 2.52-2.44 (m, 7H), 2.23 (d, J=7.0 Hz, 2H), 1.81 (d, J=12.1 Hz, 2H), 1.71 (s, 1H), 1.51 (d, J=6.9 Hz, 3H), 1.36 (s, 9H), 1.27-1.18 (m, 2H); [M+H]$^+$=834.6.

Cell Degradation
Cell Treatment

TMD-8 cells were seeded at 20000 cells/well at a volume of 15 μl/well in cell culture medium [RPMI1640 (Gibco, phenol red free, Cat #11835-030), 10% heat-inactive FBS, 1% PS (Gibco, Cat #10378)] in Corning 96 well plate (Cat #3799). TMD-8 cells were treated with compounds diluted in 0.2% DMSO, dilution was done according to the following protocol: (1) making 500×stock solution in DMSO from 1 mM by 6-fold dilution, total 8 doses were included; (2) making 2×solution in cell culture medium by transferring 0.5 μl 500×stock solution into 125 μl medium; (3) adding 15 μl of 2×solution to cells for incubation of 6 h.

HTFR Assay

After 6 h treatment, 10 μl 4×lysis buffer was added to each well; the plate was sealed and incubated for 30 min at room temperature on a plate shaker; Once the cells was lysed, 16 μL of cell lysate were transferred to a PE 384-well HTRF detection plate; 4 μL of pre-mixed HTRF antibodies were added to each well; the plate was covered with a plate sealer, and then spinned at 1000 rpm for 1 min, then incubated overnight at room temperature; the results were read on BMG PheraStar with HTRF protocol (337 nm-665 nm-620 nm).

The inhibition (degradation) percentage of the compound was calculated by the following equation: Inhibition percentage of Compound=100−100×(Signal-low control)/(High control-low control), wherein signal=each test compound group Low control=only lysis buffer without cells, indicating that BTK is completely degraded;

High control=Cell group with added DMSO and without compound, indicating microplate readings without BTK degradation;

Dmax is the maximum percentage of inhibition (degradation).

The $IC_{50}$ ($DC_{50}$) value of a compound can be obtained by fitting the following equation $$Y=\text{Bottom}+(TOP-\text{Bottom})/(1+((IC_{50}/X)^{\text{hillslope}}))$$

wherein, X and Y are known values, and $IC_{50}$, Hillslope, Top and Bottom are the parameters obtained by fitting with software. Y is the inhibition percentage (calculated from the equation), X is the concentration of the compound; $IC_{50}$ is the concentration of the compound when the 50% inhibition is reached. The smaller the $IC_{50}$ value is, the stronger the inhibitory ability of the compound is. Vice versa, the higher the $IC_{50}$ value is, the weaker the ability the inhibitory ability of the compound is; Hillslope represents the slope of the fitted curve, generally around 1*; Bottom represents the minimum value of the curve obtained by data fitting, which is generally 0%±20%; Top represents the maximum value of the curve obtained by data fitting, which is generally 100%±20%. The experimental data were fitted by calculating and analyzing with Dotmatics data analysis software.

HEK-293 Cell Treatment

HEK-293 cells were seeded at 2000 cells/well at a volume of 50 ul/well in cell culture medium [DMEM (Gibco, Cat #11965-092), 10% heat-inactive FBS (Gibco, Cat #10099), 1% PS (Gibco, Cat #10378)] in Corning 96 well plate (Cat #3903), and then incubated overnight. HEK-293 cells were treated with compounds diluted in 0.2% DMSO, dilution was done according to the following protocol: (1) making 500×stock solution in DMSO from 5 mM by 4-fold dilution, total 8 doses were included; (2) making 2×solution in cell culture medium by transferring 0.5 ul 500×stock solution into 125 ul medium; (3) adding 50 ul of 2×solution to cells for incubation of 72 h.

Cytotoxicity Detection

25 μl of the CellTiter-Glo® Reagent [(Promega)—Cat No. G7572] was added to each well in the 96-well plate. The contents were mixed for 2 minutes on an orbital shaker to induce cell lysis. The plate was then allowed to incubate at room temperature for 10 minutes to stabilize luminescent signal. Luminescence was recorded on BMG PheraStar with luminescence protocol.

IC50 Calculation

The inhibition percentage of the compound was calculated by the following equation: Inhibition percentage of Compound=100−100×(Signal-low control)/(High control-low control), wherein signal=each test compound group Low control=only medium group (without cells), indicating that cells proliferation is completely inhibited;

High control=Cell group with added DMSO and without compound, indicating cells proliferation with no inhibition;

Imax is the maximum percentage of inhibition.

The IC50 value of a compound can be obtained by fitting the following equation $$Y=\text{Bottom}+(TOP-\text{Bottom})/(1+((IC50/X)^{\text{hillslope}}))$$

Wherein, X and Y are known values, and IC50, Hillslope, Top and Bottom are the parameters obtained by fitting with software. Y is the inhibition percentage (calculated from the equation), X is the concentration of the compound; IC50 is the concentration of the compound when the 50% inhibition is reached. The smaller the IC50 value is, the stronger the inhibitory ability of the compound is. Vice versa, the higher the IC50 value is, the weaker the ability the inhibitory ability of the compound is; Hillslope represents the slope of the fitted curve, generally around 1*; Bottom represents the minimum value of the curve obtained by data fitting, which is generally 0%±20%; Top represents the maximum value of the curve obtained by data fitting, which is generally 100%±20%. The experimental data were fitted by calculating and analyzing with Dotmatics data analysis software.

TABLE 1

Degradation and HEK293 result for Example 1 to Example 72

| Example | HEK293 (nM) | DC50 (nM) |
|---|---|---|
| 1 | >10000.0 | 21.33 |
| 2 | >10000.0 | 236.3 |
| 3 | >10000.0 | 103.7 |
| 4 | >10000.0 | 16.93 |
| 5 | >10000.0 | 242.2 |
| 6 | >10000.0 | 48.06 |
| 7 | >10000.0 | 12.83 |
| 8 | >10000.0 | 1.48 |
| 9 | >10000.0 | 137.8 |
| 10 | >10000.0 | 89.47 |
| 11 | >10000.0 | 1.21 |
| 12 | >10000.0 | 1.28 |
| 13 | >10000.0 | 32.73 |
| 14 | >10000.0 | 3.21 |
| 15 | >10000.0 | 0.638 |
| 16 | >10000.0 | 1.29 |
| 17 | >10000.0 | 2.2 |
| 18 | >10000.0 | 1.15 |
| 19 | >10000.0 | 2.51 |
| 20 | >10000.0 | 1.23 |
| 21 | >10000.0 | 2.11 |
| 22 | >10000.0 | 1.58 |
| 23 | 2895.9 | 1.14 |
| 24 | >10000.0 | 5.63 |
| 25 | >10000.0 | 0.935 |
| 26 | >10000.0 | 0.899 |
| 27 | >10000.0 | 3.57 |
| 28 | >10000.0 | 1.66 |
| 29 | >10000.0 | 0.836 |
| 30 | 1000.5 | 0.539 |
| 31 | 1872 | 1.99 |

TABLE 1-continued

Degradation and HEK293 result for Example 1 to Example 72

| Example | HEK293 (nM) | DC50 (nM) |
|---|---|---|
| 32 | 1914.9 | 1.73 |
| 33 | >10000.0 | 1.3 |
| 34 | 891.4 | 1.88 |
| 35 | >10000.0 | 0.981 |
| 36 | >10000.0 | 0.566 |
| 37 | >10000.0 | 0.835 |
| 38 | >10000.0 | 0.954 |
| 39 | >10000.0 | 0.209 |
| 40 | >10000.0 | 0.382 |
| 41 | >10000.0 | 2.47 |
| 42 | >10000.0 | 1.2 |
| 43 | >10000.0 | 2.99 |
| 44 | >10000.0 | 1.63 |
| 45 | >10000.0 | 1.75 |
| 46 | >10000.0 | 2.73 |
| 47 | >10000.0 | 0.96 |
| 48 | >10000.0 | 1.44 |
| 49 | >10000.0 | 0.486 |
| 50 | 920.4 | 0.632 |
| 51 | >10000.0 | 1.35 |
| 52 | >10000.0 | 3.04 |
| 53 | >10000.0 | 1.91 |
| 54 | >10000.0 | 4.13 |
| 55 | >10000.0 | 2.08 |
| 56 | >10000.0 | 9.9 |
| 57 | >10000.0 | 29.51 |
| 58 | >10000.0 | 0.276 |
| 59 | >10000.0 | 10.18 |
| 60 | >10000.0 | 3.93 |
| 61 | >10000.0 | 1.65 |
| 62 | >10000.0 | 12.32 |
| 63 | 614.3 | 0.979 |
| 64 | >10000.0 | 25.98 |
| 65 | >10000.0 | 3.7 |
| 66 | >10000.0 | 2.93 |
| 67 | >10000.0 | 10.58 |
| 68 | >10000.0 | 17.4 |
| 69 | >10000.0 | 2.42 |
| 70 | >10000.0 | >2000 |
| 71 | >10000.0 | 17.91 |
| 72 | 1914.9 | 11.25 |

The foregoing examples and description of certain embodiments should be taken as illustrating, rather than as limiting the present invention as defined by the claims. As will be readily appreciated, numerous variations and combinations of the features set forth above can be utilized without departing from the present invention as set forth in the claims. All such variations are intended to be included within the scope of the present invention. All references cited are incorporated herein by reference in their entireties.

It is to be understood that, if any prior art publication is referred to herein, such reference does not constitute an admission that the publication forms a part of the common general knowledge in the art in any country.

What is claimed is:

1. A compound of Formula (I):

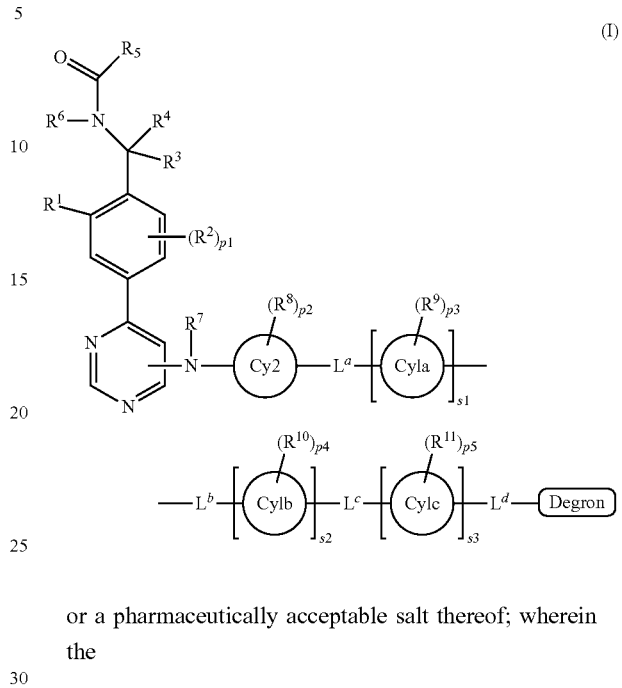

or a pharmaceutically acceptable salt thereof; wherein the

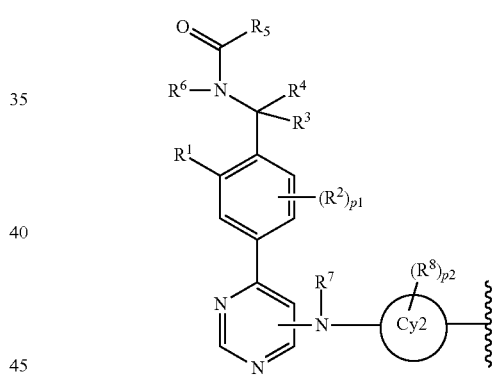

moiety is

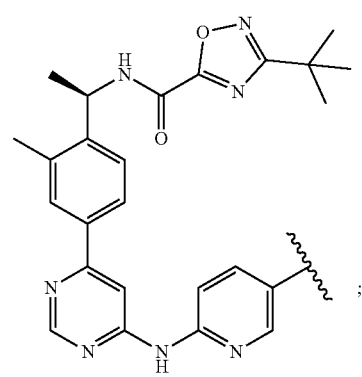 [SMILES: *c1ccc(Nc2cc(-c3ccc([C@@H](C)NC(=O)c4nc(C(C)(C)C)no4)c(C)c3)ncn2)nc1]

the Degron moiety is

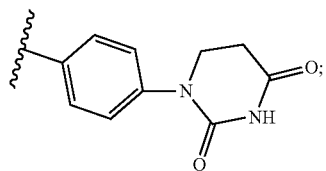 [SMILES: *c1ccc(N2CCC(=O)NC2=O)cc1]

Cy1a is

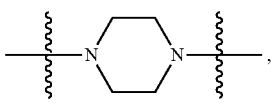

wherein Cy1a is optionally substituted with $R^9$;
Cy1b is

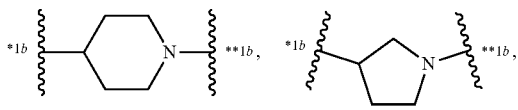

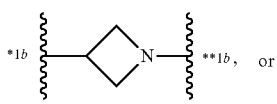

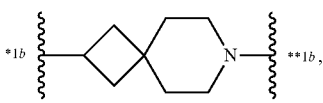

wherein Cy1b is optionally substituted with $R^{10}$, *1b refers to the position attached to the

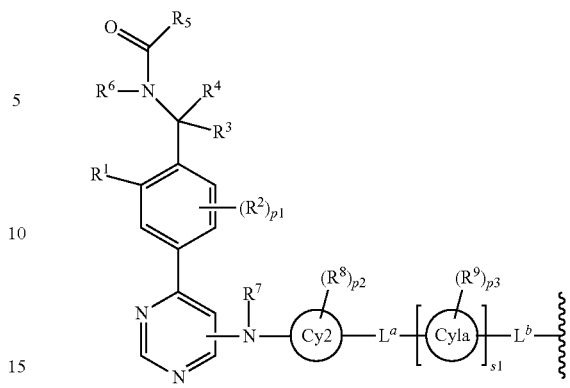

moiety and ** 1b refers to the position attached to the

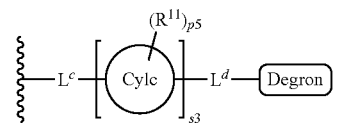

moiety;
$L^a$, $L^c$, and $L^d$ are each a single bond;
$L^b$ is a single bond, —CO—, —CH$_2$—, —CH$_2$CH$_2$—, —CH$_2$CH$_2$CH$_2$—, or —CH$_2$CH$_2$CH$_2$CH$_2$—;
each of occurrence, $R^9$ and $R^{10}$ are each independently hydrogen or $C_{1-8}$alkyl,
p3 and p4 are each 1;
s1 is 1;
s2 is 0 or 1; and
s3 is 0.

2. The compound of claim 1, wherein s2 is 0, or a pharmaceutically acceptable salt thereof.

3. The compound of claim 2, wherein $L^b$ is —CH$_2$CH$_2$—, or a pharmaceutically acceptable salt thereof.

4. The compound of claim 1, wherein $L^b$ is —CH$_2$CH$_2$—, or a pharmaceutically acceptable salt thereof.

5. A pharmaceutical composition comprising the compound of claim 3, or a pharmaceutically acceptable salt thereof.

\* \* \* \* \*